US006862023B1

(12) United States Patent
Shaikh

(10) Patent No.: US 6,862,023 B1
(45) Date of Patent: *Mar. 1, 2005

(54) FULLY INTEGRATED MACHINABLE PROFILE BASED PARAMETRIC SOLID MODELER

(76) Inventor: Mohammad Salim Shaikh, 7512 Sweetbriar Dr., College Park, MD (US) 20740

( * ) Notice: Subject to any disclaimer, the term of this patent is extended or adjusted under 35 U.S.C. 154(b) by 381 days.

This patent is subject to a terminal disclaimer.

(21) Appl. No.: 09/665,569

(22) Filed: Sep. 19, 2000

Related U.S. Application Data

(63) Continuation-in-part of application No. 08/663,637, filed on Jun. 14, 1996, now Pat. No. 6,120,171.
(60) Provisional application No. 60/002,507, filed on Aug. 18, 1995.

(51) Int. Cl.[7] ............................................. G06T 17/00
(52) U.S. Cl. ...................... 345/420; 345/441; 345/442; 345/472
(58) Field of Search ................................. 345/420, 419, 345/685, 441, 442, 472; 700/98, 182

(56) References Cited

U.S. PATENT DOCUMENTS

| 4,649,498 A | | 3/1987 | Kedem et al. | |
|---|---|---|---|---|
| 5,351,196 A | | 9/1994 | Sowar et al. | |
| 5,506,785 A | * | 4/1996 | Blank et al. | 345/419 |
| 6,120,171 A | * | 9/2000 | Shaikh | 345/685 |

OTHER PUBLICATIONS

"The A.S.U. Features Testbed: An Overview," Department of Mechanical & Aerospace Engineering, Arizona State University, Mar. 1990.
"Geometric Reasoning as a Guide to Process Planning," ASME Computers in Engineering Conference, Aug. 1989.
"Automatic Generation of NC–Code for Hole Cutting with In–Process Metrology," National Institue of Standards and Technology & Reasearch Associate, Catholic University, Jan. 1989.
"QTC–An Integrated Design/Manufacturing/Inspection System for Prismatic Parts," ASME Computers in Engineering Conference, Aug. 1988.
"Using Hierarchically Structured Problem–Solving Knowledge in a Rule–Based Process Planning System," U.S. Department of Energy, Jun. 1987.
"XCUT: A Rule–Based Expert System For the Automated Process Planning of Machined Parts," ASME Symposium on Integrated and Intelligent Manufacturing, Jun. 1987.
"Solid Modeling for Production Design," IBM Journal of Research and Development, May 1987.
"Creating and Using a Features Data Base," ASME Computers in Mechanical Engineering, Nov. 1986.
"Symbolic Representation of Manufacturing Features for an Automated Process Planning System," ASME Knowledge–Based Expert Systems For Manufacturing Symposium, Oct. 1986.

*Primary Examiner*—Mark Zimmerman
*Assistant Examiner*—Kimbinh T. Nguyen
(74) *Attorney, Agent, or Firm*—Liniak, Berenato & White

(57) ABSTRACT

A solid modeler is provided which is specifically tailored for the material removal process associated with milling procedure. The solid modeler permits a part to be designed using only machinable profiles thereby constraining the designer to real world machinable operations. The method utilized by this solid modeler allows design manipulation of the edges and curves of a very general feature profile, thereby representing the milling process with the same degree of flexibility that the actual milling process has, and provides a means to create and store for use in the generation of other parts any combination of 2D and 3D features.

25 Claims, 73 Drawing Sheets

OTHER PUBLICATIONS

"Software for an Automated Machining Workstation," Kramer and Jan–shi Jun, Jul. 1986.

"The Characterization of Parametric Surface Sections," Academic Press, Inc., Oct. 1985.

"A Hierarchical Data Structure for Representing Assemblies:Part I," Computer–Aided Design, Butterworth & Co., Feb. 1985.

"Computer Recognition and Extraction of Form Features: A CAD/CAM Link," Elsevier Science Publishers B.V., 1984.

"Intersections of Parametic Surfaces and a Plane," IEEE CG&A, 1984.

"A Geometric Modeling System for Automated Mechanical Assembly," IBM Journal of Research and Development, Jan. 1980.

"The Automatic Production of Machined Components Starting From a Stored Geometric Description," Advances in Computer–Aided Manufacture, North–Holland Publishing Co., 1977.

"NC Machine Tool Path Generation from CDG Path Representations," Department of Mechanical Engineering, University of California, Irvine, CA.

"Process Planning for a Milling Machine From a Feature–Based Design," Technology Promotion Int.

* cited by examiner

Line dividing the rectangle after applying Rule 3

Fig. 95

| Profile | Intersecting Combinations | | | |
|---|---|---|---|---|
| | A | B | C | D |
| ○ | ⚭ | ☘ | ⚬⚬⚬⚬ | ⊘ |
| ▭ | ▭▭ | ⊤ | ⊞ | ⊠ |
| ▽ | ⋈ | ⋎ | ⬥ | ⬥ (crossed out) |
| ⬭ | ⬭ | ⬭⬭ | ⬯ | ⬯ (crossed out) |
| Various | | | ⬭ | ⬭ (crossed out) |

| FMEM on face 1 | Combinations of intersecting FMEMs ||| 
|---|---|---|---|
| | A | B | C |
|  |  |  |  |
|  |  |  |  |
|  |  |  |  |

FULLY INTEGRATED MACHINABLE PROFILE BASED PARAMETRIC SOLID MODELER

This application is a continuation-in-part of application Ser. No. 08/663,637 filed on Jun. 14, 1996 now U.S. Pat. No. 6,120,171 which claims benefit of provisional App. 60/002,507 filed Aug. 18, 1995.

BACKGROUND OF THE INVENTION a) Field of the Invention

This invention provides a solid modeler specifically tailored for the material removal process associated with milling procedure, and that permits a part to be designed using only machinable profiles.

b) Description of the Prior Art

Object modeling is a tool for a designer to display and verify his conceptual design on a computer screen. Earlier methods of object modeling were based on designing a part with 2D drawings. The designer provided the machining information using manufacturing symbols, tolerances, and dimensions. The completed design was turned over to a process planner. He reviewed 2D engineering drawings and integrated them to arrive at, in the case of milling, material removal information, which was then converted into a set of machining operations. This set of machining operations was then used to machine the part.

With increased computing power available, methods were introduced whereby one could model a part as a 3D shape. The process of representing a 3D shape by relationships that can be manipulated using a computer is called geometric modeling. A model of a part developed using a geometric modeling method is called a geometric model, sometimes referred to as a CAD model. Geometric modeling has progressed from wire frame to surface modeling to solid modeling schemes. Initial modelers represented and scored an object by its vertices and edges. Such a model is called a wire frame model. A wire frame model is used for computer display. However, a wire frame model is an ambiguous model and, therefore, the surface area and volume of the part cannot be computed. Another type of 3D modeler, called a surface modeler, maintains the surfaces of an object. Each surface in a surface model is a free form surface that is represented by many bicubic patches. Each bicubic patch is defined by cubic equations of two parameters, which vary from 0 to 1 and which define all points on the surface. The surface modeler is suitable for object visualization and aesthetic designs of objects like car bodies and airplane fuselages. However, a surface model cannot be used to determine the volume of an object.

Solid modelers overcame the limitations of wire frame and surface modelers, and can now be used to determine both the surface area and the volume. A solid model is represented by quadric primitives or entities. A quadric primitive is the space bounded by a quadric surface, which is a surface described by a second order polynomial. Examples of quadric primitives are cylinders, blocks, spheres, cones and torii. A part is modeled by applying boolean operations on these quadric primitives. Solid modeling has gained wide acceptance because it provides an unambiguous model of an object However, because of the small set of primitives currently available it is very difficult to use the present modelers to represent any but the simplest material removal operations. Consequently, machining information is not automatically available from a solid model; however, it can be extracted from it. Machined features, that is, the volume removed by a machining operation, are either manually or automatically extracted after the geometry has been completely defined A process planner is then often used to decide the tool path for machining each individual feature. Based on this machining information the NC code is generated for input to an MC machine cool for machining the part. The difficulty with this method is that the machining information has to be extracted from the solid model after it is formed, which is a computationally difficult task.

Another approach is to use a method called feature based design in which a part is created using a set of functional volumes called features. In a feature based design system the features, which are sometimes called form features are the regions of importance from a designer's point of view, and satisfy a functional role rather than satisfying any machining process requirement. In general, a feature may not be machinable. For example, consider a thin wall ridge existing between two parallel slots. The thin wall between the slots is a form feature, whereas the slots are the machined features. The feature based design method develops a model with the form features and stores the features in a database. This feature database is utilized by an expert process to establish the process plans, and eliminates having to extract the material removal information from a general purpose solid model. However, a feature modeler must contain a very large library of differently shaped volumes to be of any practical use. Furthermore, the feature based design method is not constrained by any limitation inherent in the machining process itself.

As will be discussed below there is a need for a method that: (i) allows an interactive development of a solid model using machinable features, (ii) can simultaneously store the appropriate machining information, and (iii) can constrain the part creation by incorporating the limits of the machining operations as part of the design process. This dissertation describes the development of a solid modeler that meets these criteria A process of interactively building a geometric model is implemented by sequentially applying a fundamental machinable entity for milling (FMEM) to a solid rectangular prismatic part. Each FMEM is a 3D design entity that is natural to the machining process, thereby automatically constraining the design to an object that is manufactrable by milling. Each FMEM represents the material removed after a milling operation has been implemented. Thus, the need for extracting this information at a later stage is eliminated, and the final part geometry is obtained in a manner that has been fully integrated with the milling process.

Solid modeling has been linked with manufacturing in one of two ways: either by extracting machinable feature information from the part model or by developing the model using features and then using these features to determine a manufacturing process plan. An overview of the research efforts in solid modeling, feature extraction and feature based design methods will be provided below. In addition, some of the methods of integrating solid modeling with CAM are discussed in detail.

A successful scheme for solid modeling must be (1) complete, unambiguous, and unique, (2) appropriate to the class of engineering components, and (3) practical to use with existing computers (Requicha, 1980).

There are six unambiguous schemes available for representing rigid solids (Meagher, 1981). These schemes are (i) Primitive Instancing, (ii) Spatial Enumeration, (iii) Cell Decomposition, (iv) Constructive Solid Geometry (CSG), (v) Sweep Representation, and (vi) Boundary Representation (B-Rep).

Among these schemes Constructive Solid Geometry (CSG) and Boundary Representation (B-Rep), or a hybrid of them, are used in current solid modelers. In a CSG scheme, the objects are represented as collections of primitive solids that are connected via boolean operations. In B-Rep, objects are represented by their enclosing surfaces. Topology of a B-Rep model is given by the connectivity of faces, edges and vertices. In both schemes to date, only quadric surfaces (planes, cylinders, cones, spheres and torii) are considered (Pratt, 1989). Edges are obtained by the intersection between these surfaces. These edges are either straight lines, conic curves (exact representation possible).or space curves (approximated). In the B-Rep scheme each face is divided into planar facets or patches. However, some systems define each facet as a ring of four connected edges (Pratt, 1989).

Braid and Lang (1973) at Cambridge proposed the very first solid modeling system, which was based on a B-Rep scheme. Their solid modeler, which is called BUILD, represents an object as a solid model and stores the information about the object's vertices, edges and faces. The topological information about the model is derived from a table of faces, edges and vertices. A solid is then formed by the region bounded by its faces.

Another solid modeler called TIPS was developed at Hokkaido University by Okino, Kakazu & Kubo (1973) using CSG. TIPS stores the object as a collection of primitive solids like blocks and cylinders. However, the solid primitives are represented by half-spaces in the CSG tree. Half-spaces are infinite surfaces that divide a 3D space into two regions. For example, a cube is bounded by six planar surfaces. TIPS has been improved upon and is now available as the CAM-I solid modeler (CAM-International, 1981). After TIPS and BUILD were introduced, a debate over the advantages of one scheme over the other ensued.

The TIPS-BUILD debate ended when the PADL-1 (Part and Assembly Description Language) (Voelcker & Requicha, 1977 and Voelcker & Requicha, 1981) solid modeler was introduced. PADL-1, an experimental solid modeler, was based on CSG. In PADL-1 an object is stored as a binary CSG tree whose termination nodes are solid primitives rather than half-spaces. PADL-1 also provided the option of generating the B-Rep tree from a CSG tree. In PADL-1 only bricks and cylinders were included. In the next version of the solid modeler, called PADL-2 (Brown, 1982), a solid modeler that had commercial applicability was developed. PADL-2 was also based on CSG, but the number of primitives available was extended to wedges, spheres, cones and torii. These primitives, when combined through boolean operations, can model an object. GMSolid (Boyse & Gilchrist, 1982), a CSG solid modeler developed at General Motors for internal use, adopted the concepts developed by the PADL-2 project.

Baumgart (1975) introduced the "winged-edge structure" representation of solids in his solid modeler called GEOMED. The representation consists of three elements: an edge, a face and a vertex Baumgart's winged-edge structure helps to determine the topological relationships of faces, edges and vertices in a B-Rep tree. Many solid modelers (Braid, 1979; Chiyokura, 1988; Eastman & Henrion, 1977; Hosaka, Kimura & Kalishita, 1974; Veenman, 1979) were later introduced based on the winged-edge boundary representation of an object Baumgart's representation was adopted in the next version of the BUILD software (BUILD-2) (Braid, 1979). However, Braid extended the winged-edge method to represent solids with holes. In BUILD-2 a face is represented by many child-loops within a parent-loop. A parent-loop is a closed contour of connected edges that bounds a face on a surface, whereas a child-loop is the contour of edges bounding a hole on the same surface. Parent and child loops exist on the same surface and, therefore, can be represented by the same surface equation. Another solid modeler that is similar to BUILD-2 is DESIGNBASE (Chiyokura, 1988). DESIGNBASE uses B-Rep as a representation scheme for the solid modeler and implements the use of "local operations", in addition to the known boolean operations. The local operations help the designer to modify the part design quickly and conveniently.

Other solid modeling systems based on B-Rep emerged in the early 1970s. These include: (1) ROMULUS (Veenman, 1979), which, is a solid modeler based on the concepts developed by BUILD-2 and GEOMED; (2) GEOMAP (Hosaka et al, 1974) from the University of Tokyo; (3) COMPAC (Spur & Gausmieier, 1975) from the Technical University of Berlin; and (4) GUIDE (Eastman & Henrion, 1977) from Carnegie Mellon University.

There are now many solid modelers available for commercial use (Johnson, 1986; Dartech Inc, 1984). Most of them support not only CSG and B-Rep representations, but also the sweeping technique. Among them are: (1) CATIA from Dassault Systems; (2) EUCLID from Matra Datavision; (3) GEOMOD from Structural Dynamic Research Corporation; (4) MEDUSA from Cambridge Interactive Systems Ltd; and (5) ANVIL-5000 from MCS Inc.

There are several PC based CAD modelers (Hart, 1986 and Dartech Inc, 1984) that have started implementing solid modeling techniques. Among these PC based CAD tools are CADKEY, ANVIL-1000 and AUTOCAD.

Several researchers have attempted to link a solid model to a process planner. They have used two basic approaches: (i) recognize and extract the material removal information from the part geometry; and (ii) develop the part geometry itself using special shaped volumes. These volumes are then used to extract the features and generate the process plan.

In the first method a part model is developed in a solid modeler system, usually using B-Rep. Features are then extracted from the solid model of the part. This is done either manually or automatically. These machining features are then used in a process planner, and NC code is generated. This method allows the designer to model his part in any way, and is not limited by manufacturing restrictions. Consequently, it is possible to create a part that is not manufacturable. Another drawback of this method is that the material removal information is extracted from the solid model and, therefore, the original part geometry is lost.

In the second method a part geometry is based on form features themselves. As mentioned previously, an example of the form feature is a ridge that is formed by two parallel slots machined in proximity. A designer considers the ridge a feature because the integrity of the designed part depends on the strength of the ridge. A form feature is a region of importance from the designer's point of view, but may not be a machinable feature. A model is assembled by these form features. Machinable features are then manually identified (as in XCUT [Hummel & Brooks, 1986 and Hummel & Brooks, 1987]) or automatically extracted from the form feature database (as in QTC [Chang, Anderson & Mitchell, 1989]). Machined features are then processed by a process planner, and NC code is generated. A feature model is not used for part display and a separate solid modeler is used for displaying the part geometry. This method provides some integration of CAD and CAM, but the part geometry is comprised of volumes of too many shapes, sizes and forms (Ishii & Miller, 1992). Secondly, no consideration is given to the machinability of a feature. A design is based on standard features like slots, holes, pockets and grooves. A machining process is capable of removing volumes that are more complicated than these simple features. Using only these features in the design process limits the manufacturing to only that class of parts that can be made with these operations.

Among the researchers whose work is related to feature extraction from a solid model are Grayer (1977), Woo (1977), Henderson (1984), Kumar, Anand and Kirk (1988), Kumar (1988) and Fields and Anderson (1993). Their contributions have been to develop methods that automatically extract feature information from a solid model. The works of Luby, Dixon and Simmons (1986), Hummel and Brooks (1986), Kramer and Jun (1987), Shah et al. (1988), Chang et al. (1989) and Xue and Dong (1993) have made contributions to feature based modeling. Karinthi and Nau (1989) have provided a review of the work of many others who have contributed to feature based design.

Grayer (1977) describes a procedure that generates a tool path directly from the CAD model. His work is limited to 2½-D parts. Such a machined part consists of fixed depth laminae plus a representation of the outside boundary of the finished part. The shapes of the laminae are precisely the cross section of the object at different heights. In an object, its cross section at any height may be determined by finding the intersection of each vertical face with the sectioning plane, and joining the resulting line segments to form contours. Holes can be placed within their respective outer boundaries by a 2-D comparison. Each lamina is represented by one or more two-dimensional contours giving the shape of the boundary and that of any islands projecting through the lamina, forming holes in the region to be removed. In addition, the thickness and vertical position of the lamina must be stored, together with some scheme to indicate the order of the machining operations.

Woo (1977) investigated the role of solids and negative solids in the creation of cavities. A cavity corresponds to the result of adding or removing a volume from other volumes. The essential idea of deriving cavities from volumetric designs is done by computing the various ways in which solids are shaped by other solids via certain addition and subtraction operations.

Henderson (1984) proposed that cavities in a part can be considered features. These features can be extracted from a part after the model is developed, and has suggested a detailed algorithm to extract them. Each feature can then be put in a form that is suitable for numerical code generation. Henderson has provided a method of implementing this algorithm for machining the parts.

Kumar (1988) developed a feature extractor using the IGES (Initial Graphics Exchange Specifications) for input part geometry and the part model format (PMF) for output. Kumar used the wire frame description of the part geometry and dealt with slots, pockets, holes, bosses and ridges.

Fields and Anderson (1993) described an algorithm to extract machinable features from either a feature based model or a B-rep model for the 2½-D cavity features. They have pointed out that the set of features available in a feature based model do not correspond to the process oriented machining features. In order to bridge this gap they have introduced a hybrid feature that accounts for the additional stock material to be removed.

Kramer and Jun (1987) have come up with a part editor for one-sided, 2½-D parts. The part can be made by specifying machinable features from their library of machinable features using the part editor. The part thus developed is displayed and then used to generate the process plans and the NC code.

Xue and Dong (1993) described a method for concurrent design and manufacturing. Their design is comprised of three distinct perspectives: functional, manufacturing and geometry. In this knowledge-based system design and manufacturing features are mapped to geometry features for displaying the geometry. The design features are maintained in a design database, whereas the manufacturing features are kept in a database that is based on group technology.

A few researchers have considered feature interactions. Ide (1987) considered feature interaction on a limited scale. In his work, he developed a feature based design system using the PADL-2 solid modeler. The purpose of his work was to integrate PADL-2 with SIPS, an automatic process planner, which can handle planar surfaces, slots, pockets, holes and countersunk holes. Hayes (1987) described her system called MACHINIST. This system is a rule-based system that uses feature interactions to determine precedence relations among features. Karinthi and Nau (1989) have pointed out that there is a need for a "feature algebra" for solving feature interaction problems, rather than using the rule based expert systems.

Hummel and Brooks (1986, 1987) proposed a feature based process planner called XCUT, which is based on a commercial solid modeler ROMULUS, a user interface for interactively identifying and extracting features from the solid modeler, a feature based database in which features are represented symbolically in an object oriented programming language called FLAVOR, and an expert process planner. The process planner interacts with the feature database and processes the features to generate the manufacturing information. The XCUT system appears to be the most advanced to date, although it still does not provide full integration of CAD and CAM because the features must be identified manually.

The Quick turnaround cell (Chang et al., 1989) is an integrated design, manufacturing and inspection system. It is a hybrid of the feature extraction and feature based design approaches. It consists of four modules: a feature based design system, a process planner, a direct numerical control programming module, and an inspection module based on vision.

The design module maintains the part definition in two representations: a feature based model and a boundary representation model. The feature based model is used for process planning and the B-Rep model is used for displaying the part geometry using an external solid modeler. A list of features is maintained in a part file used for process planning. The design module allows input of features such as a hole, slot and pocket. Tolerances can be attached to each feature. The model is constructed by features using "geometric handlers", which are characteristic geometric elements of features. For example, point and line specifications are geometric handlers. Vertices of a rectangular workpiece are its handlers, whereas line handlers are used to represent feature entities such as feature depth and length. Two features are related to each other in the model by their reference handlers, that is, by reference points on one of their faces. QTC seems to be a step towards automating the part production; however, the integration of CAD and CAM still lacks perfection as it maintains two separate models: a model for process planning and a display model. Furthermore, the feature model is based on functional requirements rather than the machining requirements.

Prior process oriented feature based design approaches will now be discussed. Luby et al. (1986) developed a methodology for designing castings using macro-features and co-features. The macro-features are the primitive volumes and the co-features are the extensions or attachments to them. They considered U-channels, I-brackets, and slabs as the macro-features. The co-features are holes, bosses and ribs. Macro and co-features are treated as primitives and the part geometry is constructed using these primitives. They then developed a menu driven system to design castings.

Another effort in the area of design for manufacturing has been made by Roller and Gschwind (1989). They proposed a CAD system that creates a 3D geometry by applying geometric transformations (translations and rotations) to a tool profile curve. This system works on manufacturing commands such as mill, extrude, drill, turn and lift A user first designs a tool profile and then uses the manufacturing commands to design a part.

Recently Delbressin & van der Wolf (1990) and Delbressin & Hijink (1991) showed that the designed part can be built by "delta volumes" or "manufacturable objects". Each manufacturable object is the result of the intersection of a solid object with "tools cutting parts volumes". A "tools cutting parts volume" is a function of the tools used and their movement with respect to the workpiece. They showed that only a limited number of manufacturable objects are available for a machining process. The inverse transformation between "delta volume" and "tools cutting parts volume" is a one to any mapping. This allows more than one option for the tools to approach or withdraw from the solid object in order to create the desired "delta volume". They suggest that a manufacturing oriented design method may be developed by attaching the withdraw/approach direction vector and tolerances to the manufacturable objects.

With limited success, many efforts have been made to integrate machining with the design process, but these efforts have still fallen short. Feature extraction methods are used to extract the features from a part geometry and then to create the process plan to obtain these features via NC part programming commands. When features are extracted, however, the total part geometry is lost.

Feature based design systems are favored because they provide the best CAD/CAM integration. However, feature based design methodologies emphasize the functional design, rather than the direct liking, of the design with the machining process. Typically, only simple features are considered and the very important aspect of feature interaction has not been treated. Often simple feature approaches result in part geometries that are comprised of too many differently shaped volumes. Features like holes, slots and pockets do not completely define all the volumes that could be created by the machining processes. The "delta volume" approach begins to integrate CAD and CAM, but it too results in a part geometry with too many differently shaped volumes.

SUMMARY OF THE INVENTION

In order to eliminate many of the limitations of the previous results, it is the objective of this research to develop a solid modeler specifically tailored for the material removal process associated with milling. The computer tool that will be described

- is based on designing a part by sculpting the stock block,
- directly integrates a geometric modeler with the machining process,
- results in a fast, powerful and fully integrated solid modeler, which is constrained by real world machining operations,
- is comprised of a single material removal entity, where the machinable feature information is contained within a uniform and compact geometric database,
- is capable of retaining the complete analytical specifications of each machinable feature, and
- makes the geometric results of all machining operations immediately available to the designer at each stage within the design process.

It will be shown that this modeler makes a significant departure and improvement over current solid modelers, and that it

- allows design manipulation of the edges and curves of a very general feature profile, thereby representing the milling process with the same degree of flexibility that the actual milling process has,
- allows the, determination of multi-feature intersections on a common surface,
- allows feature intersections on two orthogonal surfaces, and
- provides a means to create and store for use in the generation of other parts any combination of 2D and 3D features.

In addition, this modeler provides the design engineer with the heretofore unavailable and useful capabilities of

- simulating directly the application of milling operations to a rectangular prism,
- designing a geometric shape that can be created by either a cavity, an island or a combination of both, and
- designing with either common milling features, such as holes, slots, gaskets, pockets and islands, or 2D and 3D features resulting from the intersections of a very large combination of machinable features.

This invention provides a method that permits a part to be designed using only machinable profiles. By starting the design process from the same point that one starts the machining process, one can only select acceptable machining operation to arrive at the final part geometry. Consequently the material that is removed from part after each operation is exactly that volume that can be produced by the actual milling operations. The problem then reduces, in part, to selecting an appropriate geometric entity in such a way that a very large number of actual machining operations can be simulated. This entity is called a fundamental manufacturing entity for milling (FMEM). After each simulated milling operation on the computer, the design engineer can display the 3D solid model that resulted from the last and all previous milling operations. Upon completion of the simulated milling operations the individual machining operations can be readily converted into NC code to perform the actual machining of the part Furthermore, the design engineer will not be limited to a small set of features (holes, slots, pockets etc.) but can use a wide range of machinable features to remove material from the volume remaining from the previous operations.

BRIEF DESCRIPTION OF THE DRAWINGS

FIG. 95 is a table of combinations of profiles used for the verification of multi-profile intersections on a common surface.

FIG. 120 shows the profiles resulting from ortogonally intersecting same size rectangular profile shells.

FIG. 121 shows the profiles resulting from ortogonally intersecting not same size rectangular profile shells.

FIG. 122 shows the profiles resulting from ortogonally intersecting not same size rectangular profile shells when the axes of two profile shells are not in the same plane.

FIG. 123 shows the profiles resulting from ortogonally intersecting same size elliptical profile shells.

FIG. 124 shows the profiles resulting from ortogonally intersecting not same size elliptical profile shells.

FIG. 125 shows the profiles resulting from ortogonally intersecting not same size elliptical profile shells when the axes of two profile shells are not in the same plane.

FIG. 126 shows the profiles resulting from ortogonally intersecting a circular and a same size rectangular profile shells.

FIG. 127 shows the profiles resulting from ortogonally intersecting a circular and a smaller size rectangular profile shells.

FIG. 123 shows the profiles resulting from ortogonally intersecting a circular and a smaller size rectangular profile shells when the axes of two profile shells are not in the same plane.

FIG. 129 shows the profiles resulting from ortogonally intersecting a rectangular and a same size elliptical profile shells.

FIG. 130 shows the profiles resulting from ortogonally intersecting a rectangular and a smaller size elliptical profile shells.

FIG. 131 shows the profiles resulting from ortogonally intersecting a rectangular and a smaller size elliptical profile shells when the axes of two profile shells are not in the same plane.

Figure 132:
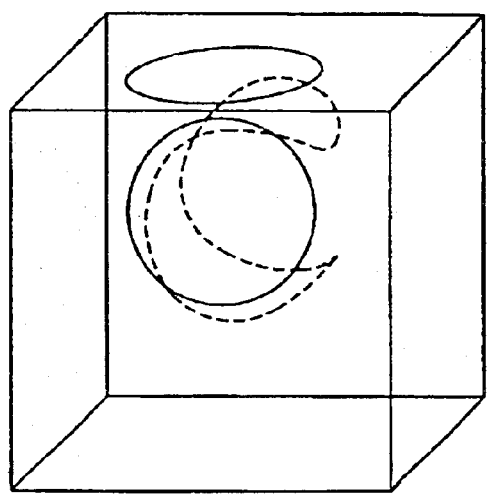

FIG. 132 shows the profiles resulting from ortogonally intersecting an elliptical and a same size circular profile, shells.

Figure 133:
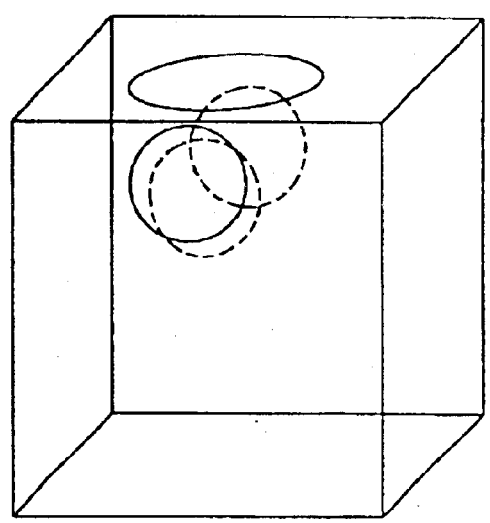

FIG. 133 shows the profiles resulting from ortogonally intersecting an elliptical and a smaller size circular profile shells.

Figure 134:
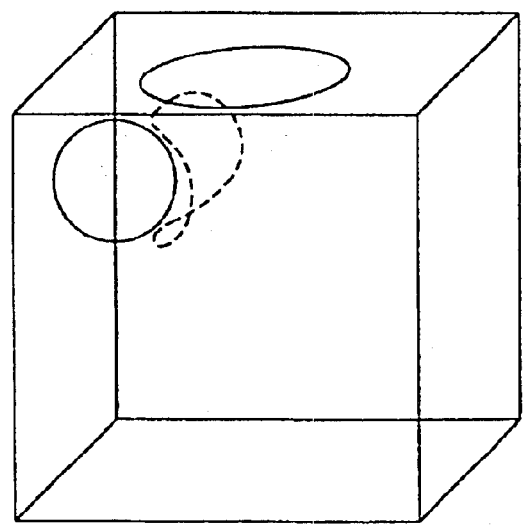

FIG. 134 shows the profiles resulting from ortogonally intersecting an elliptical and a smaller size circular profile shells when the axes of two profile shells are not in the same plane.

Figure 135:
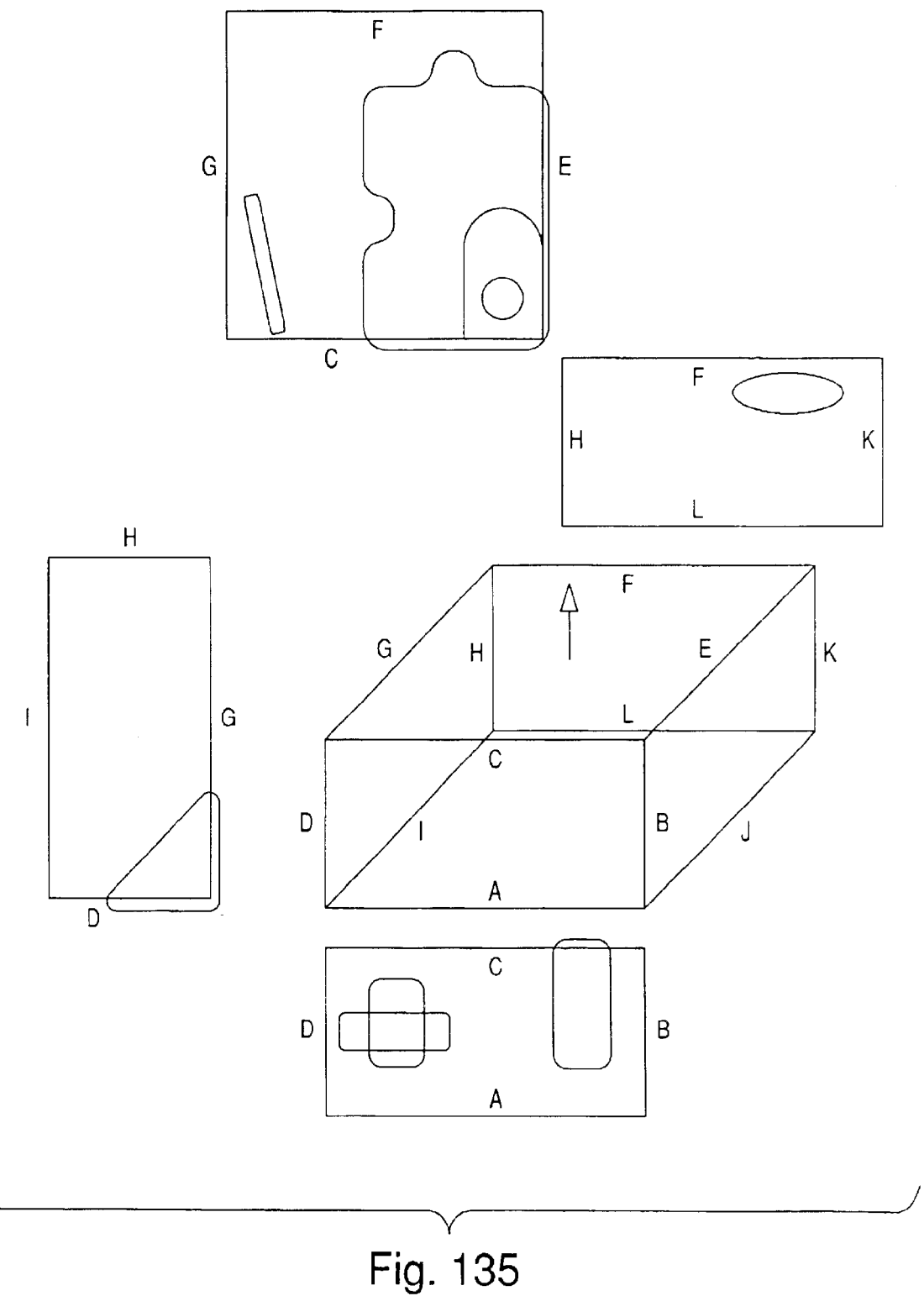

FIG. 135 illustrates the profiles shown on various faces of the stock block.

Figure 136:
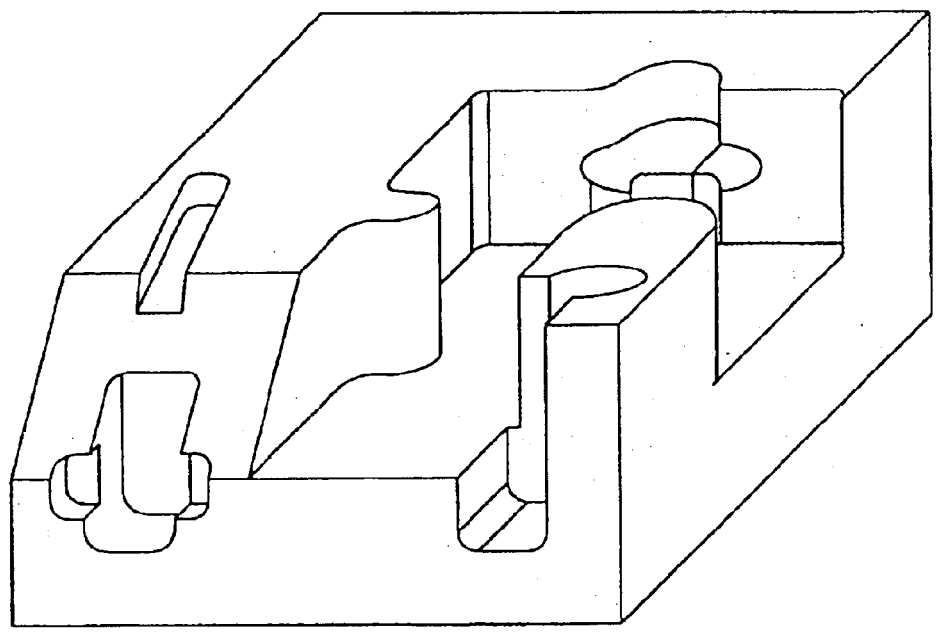

FIG. 136 illustrates the resultant geometry of the example part.

DETAILED DESCRIPTION OF THE PREFERRED EMBODIMENT

Figure 1:
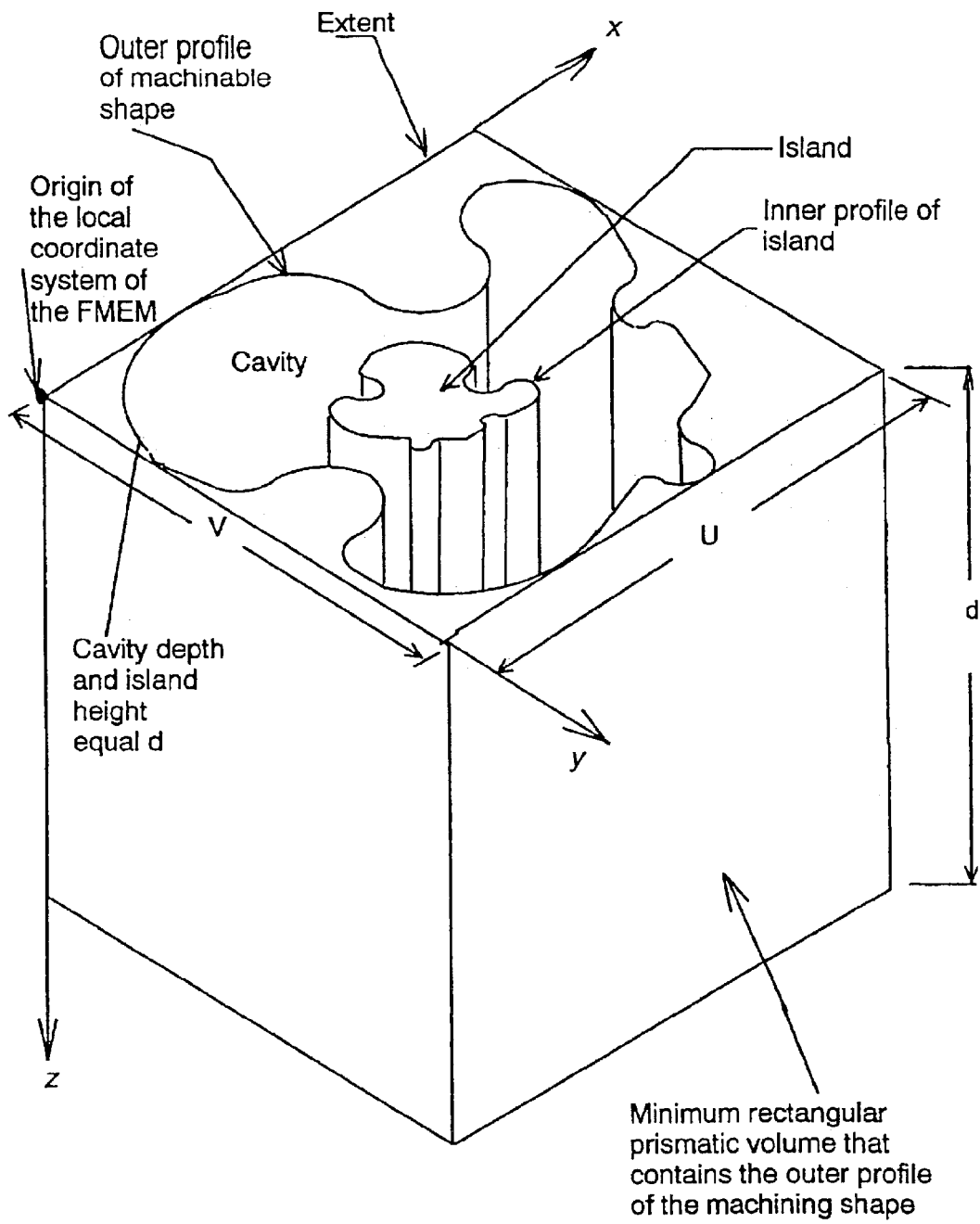
FIG. 1 is a perspective view of a schematic representation of the fundamental manufacturing entity for milling (FMEM) as described in this invention.

FIG. 1 illustrates the Fundamental Manufacturing Entity for Milling (FMEM), which is defined as the smallest solid volume that contains all the geometric information necessary to describe the shape of the volume of material removed during machining. The FMEM is a regular rectangular prismatic geometry containing a cavity and an island within the cavity. The shapes of the cavity and the island are each represented by very general profiles. The outer profile is contained within the smallest rectangular box of dimension U and V such that these edges are parallel to, and coincide with, the local coordinate axes x and y. The profile of the island can have any orientation with respect to the profile of the outer boundary, which in turn can have any orientation with respect to the coordinate axes x and y. The depth of the cavity and the depth of the prismatic block are equal. The profile can be applied to any of the six surfaces of the prismatic block.

Figure 2:
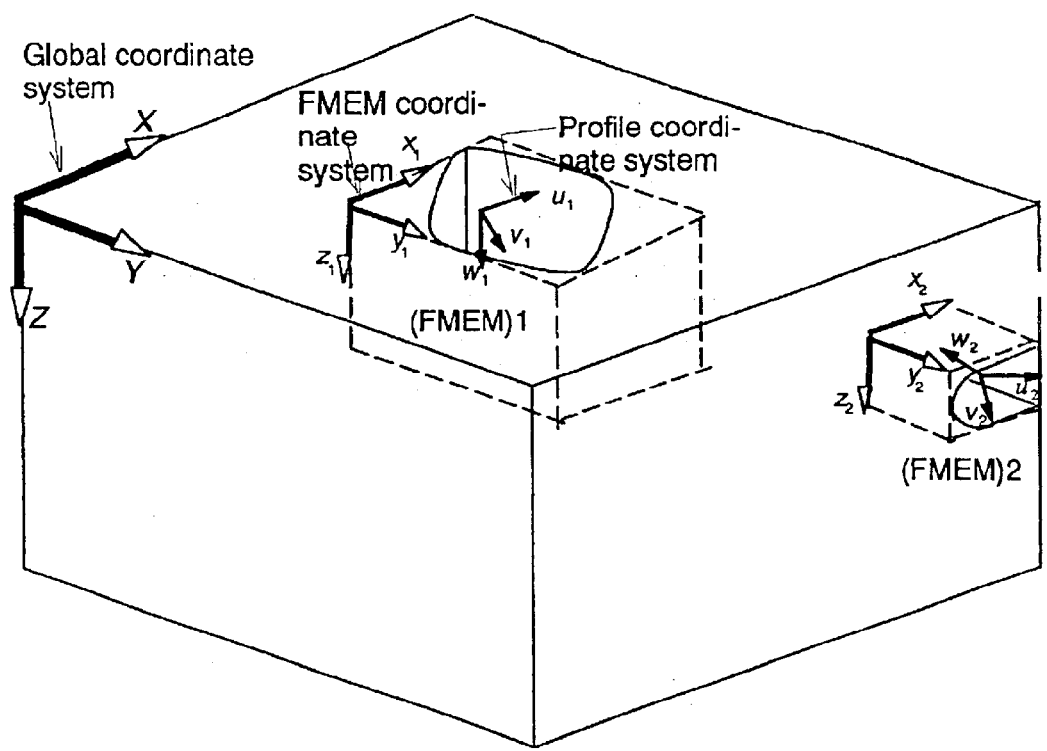
FIG. 2 illustrates the interrelationship of the various coordinate systems of this invention.

The three coordinate systems used in the modeling scheme are (i) the global coordinate system, (ii) the FMEM coordinate system, and (iii) the profile coordinate system. Referring to FIG. 2 the global coordinate system (X, Y, Z) is a right handed Cartesian system with its origin at the top left corner of the part stock. This system is chosen such that the working plane is the XY plane, and the Z-axis is pointing towards the stock material.

The FMEM coordinate system (x, y, z) is also a right handed Cartesian system. This system is always oriented parallel to the global coordinate system. The three axes of the FMEM coordinate system coincide with three mutually orthogonal edges of the FMEM.

Figure 3:
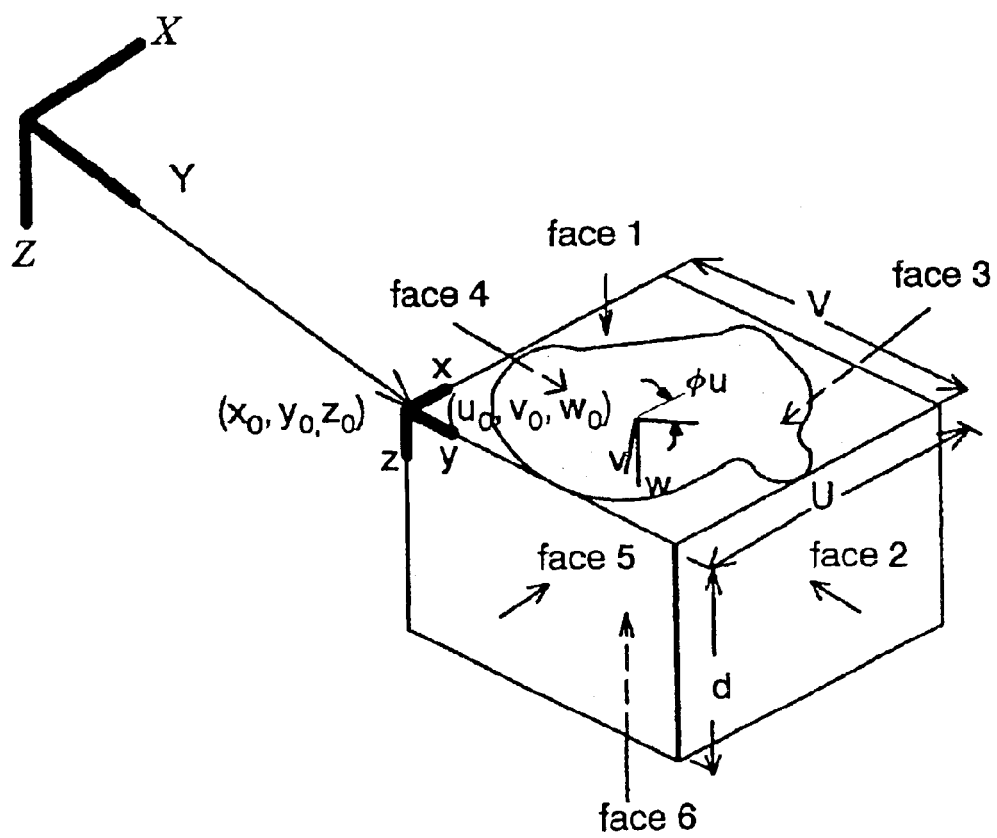
FIG. 3 illustrates the transformation between the profile, the FMEM and the global coordinate systems.

The machining profile coordinate system (u, v, w) is also a right handed Cartesian system. There are at most two profile coordinate systems within the FMEM, one is used to characterize the outer (cavity) profile and the other the inner (island) profile. The two profile coordinate systems are independent of each other. FIG. 3.2 shows the profile coordinate systems $u_1, v_1, w_1$) and ($u_2, v_2, w_2$) for the outer profiles of $(FMEM)_1$ and $(FMEM)_2$, respectively. The profiles are created in their respective profile coordinate system. They are then transformed to the desired orientation with respect to the (x, y, z) axes of the FMEM coordinate system. These various transformations are discussed in the next section.

A profile is created in the profile coordinate system (u, v, w) on the uv-plane and oriented in FMEM coordinate system by specifying the origin of the profile coordinate system ($u_0, v_0, 0$) and the orientation angle $\phi$ with respect to the FMEM coordinate system. The transformation from the (u, v, w) system to the FMEM coordinate system (x, y, z) is given by $$L = L_f \begin{bmatrix} \cos\phi & \sin\phi & 0 & 0 \\ -\sin\phi & \cos\phi & 0 & 0 \\ 0 & 0 & 0 & 0 \\ u_0 & v_0 & 0 & 1 \end{bmatrix} \quad (3.1)$$

where $$L = [x \ y \ z \ 1]$$

$$L_f = [u \ v \ w \ 1]$$

It is noted that $L_f$ can represent a point in the coordinate system for either the outer profile or the island profile. The transformation from the FMEM coordinate system to the global coordinate system is simply a translation. Thus, $$[X \ Y \ Z \ 1] = L \begin{bmatrix} 1 & 0 & 0 & 0 \\ 0 & 1 & 0 & 0 \\ 0 & 0 & 1 & 0 \\ x_0 & y_0 & z_0 & 1 \end{bmatrix} \quad (3.2)$$

where ($x_o, y_o, z_o$) are the coordinates of the origin of the FMEM coordinate system in the global coordinate system. The significance of $z_o$ will become apparant in the discussion of profile intersection on a surface provided subsequently in this disclosure.

The transformation of a point in the (u, v, w) coordinate system on face 1 to any other five faces (2 to 6) shown in FIG. 3 is given by $$T_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (3.3)$$

$$T_2 = \begin{bmatrix} 1 & 0 & 0 & 0 \\ 0 & 0 & 1 & 0 \\ 0 & -1 & 0 & 0 \\ 0 & V & 0 & 1 \end{bmatrix}$$

$$T_3 = \begin{bmatrix} 0 & 0 & 1 & 0 \\ 0 & 1 & 0 & 0 \\ -1 & 0 & 0 & 0 \\ U & 0 & 0 & 1 \end{bmatrix}$$

$$T_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

$$T_5 = \begin{bmatrix} 0 & 0 & 1 & 0 \\ 0 & 1 & 0 & 0 \\ 1 & 0 & 0 & 0 \\ 0 & 0 & 0 & 1 \end{bmatrix}$$

$$T_6 = \begin{bmatrix} 1 & 0 & 0 & 0 \\ 0 & 1 & 0 & 0 \\ 0 & 0 & -1 & 0 \\ 0 & 0 & d & 1 \end{bmatrix}$$

where U, V, and d are the dimensions of the FMEM in the x, y and z directions, respectively. The quantities U and V are determined by the method described subsequently. The depth d is specified by the user. In the development of the working equations the inverse of these transformation matrices are required. Thus $$M_1 = T_1^{-1} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (3.4)$$

$$M_2 = T_2^{-1} = \begin{bmatrix} 1 & 0 & 0 & 0 \\ 0 & 0 & 1 & 0 \\ 0 & -1 & 0 & 0 \\ 0 & V & 0 & 1 \end{bmatrix}$$

$$M_3 = T_3^{-1} = \begin{bmatrix} 0 & 0 & 1 & 0 \\ 0 & 1 & 0 & 0 \\ -1 & 0 & 0 & 0 \\ U & 0 & 0 & 1 \end{bmatrix}$$

$$M_4 = T_4^{-1} = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

$$M_5 = T_5^{-1} = \begin{bmatrix} 0 & 0 & 1 & 0 \\ 0 & 1 & 0 & 0 \\ 1 & 0 & 0 & 0 \\ 0 & 0 & 0 & 1 \end{bmatrix}$$

$$M_6 = T_6^{-1} = \begin{bmatrix} 1 & 0 & 0 & 0 \\ 0 & 1 & 0 & 0 \\ 0 & 0 & -1 & 0 \\ 0 & 0 & d & 1 \end{bmatrix}$$

Figure 4:
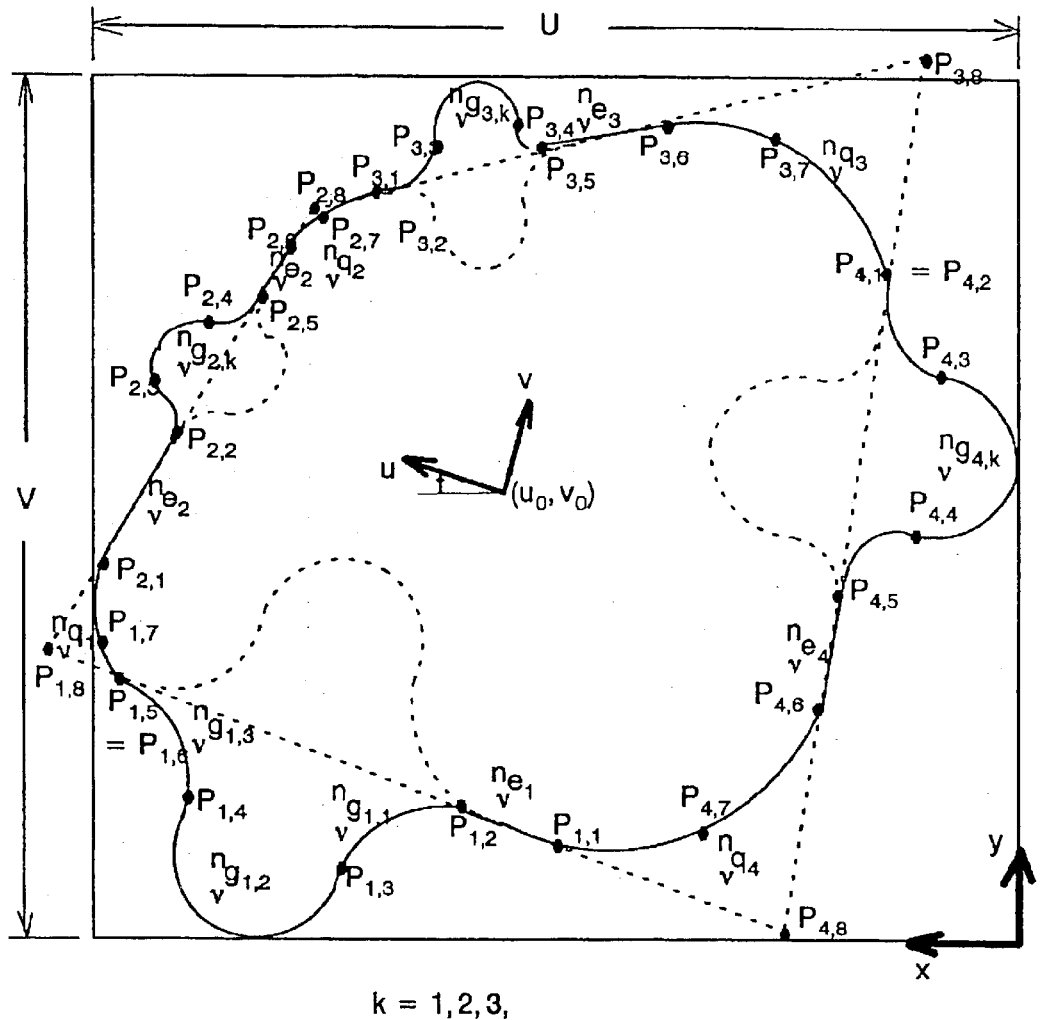
FIG. 4 is a very general machinable profile for either the cavity or the island in an FMEM.

A general profile for either the cavity or the island in an FMEM is shown in FIG. 4. The notation used to describe this very general profile is as follows. The left superscript indicates the surface number of the prismatic volume, the left subscript is reserved for the profile number and the two right subscripts separated by a comma identify the type of the curve of the profile. The very general profile is comprised of four straight edges $e_j$, four quadric curves $q_j$ and four groups of three circular arcs $g_{j,k}$. In its most general case, these edges and curves are an ordered combination of up to four quadrilateral edges of different lengths, up to four quadric curves of different curvature and up to four groups of three circular arcs of different radii. Any of the intermediate circular arc groups may lie either inside the boundary of the quadrilateral formed by the edges or outside the boundary as shown in FIG. 4.

Figure 5:
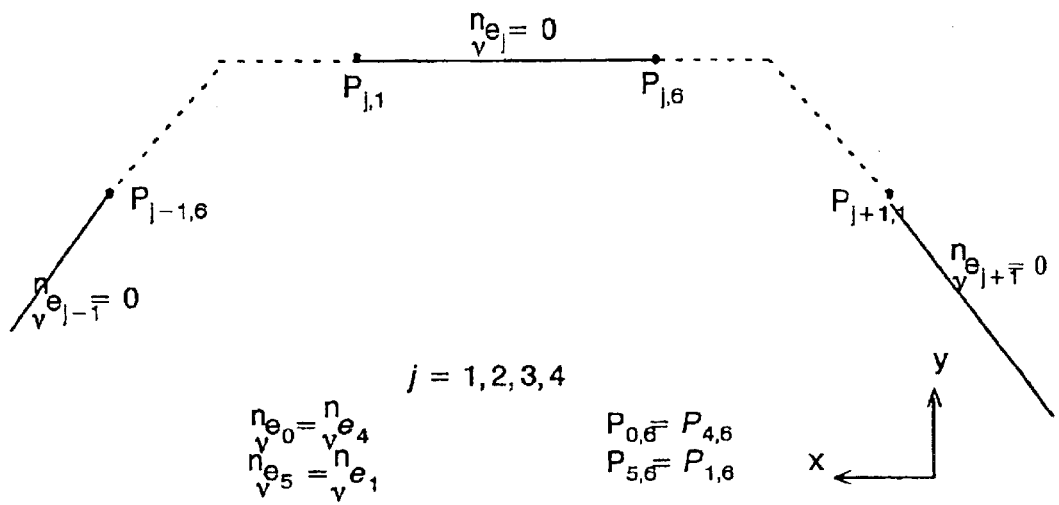
FIG. 5 illustrates the quadrilateral edges and the end points of the edges.

A straight edge $_v^n e_j=0$ of profile v on surface n, n=1, ..., 6, as shown in FIG. 5, is bounded by two points $P_{j,1}$ and $P_{j,6}$, j=1, 2, 3, 4, where the points $P_{j,1}$ and $P_{j,6}$ are given in the FMEM coordinate system (x, y, z). The implicit representation of the edge $_v^n e_j=0$ in matrix form with respect to the FMEM coordinate system is provided by Levin, 1976.

$$_v^n e_j(P_{j,1}, P_{j,6}; P) = LM_n E_j M_n^T L^T = 0 \; j=1, 2, 3, 4 \; n=1, \ldots 6 \quad (35)$$

where P is the point (x, y, z) on the straight line connecting $P_{j,1}$ and $P_{j,6}$, L and M, are given by equation (3.1) and equation (3.4), respectively, and $L^T$ and $M_n^T$ are the transposes of L and $M_n$, respectively. Note that P is simply the scalar form of L. The matrix $E_j$ is $$E_j = \begin{bmatrix} 0 & 0 & 0 & G_j \\ 0 & 0 & 0 & H_j \\ 0 & 0 & 0 & 0 \\ G_j & H_j & 0 & K_j \end{bmatrix} \quad (3.6)$$

The coefficients $G_j$, $H_j$ and $K_j$ are determined by the end points $P_{j,1}$ and $P_{j,6}$ of the edge $_v^n e=0$ and are given by $$G_j = (y_{j,1} - y_{j,6})/2$$

$$H_j = (x_{j,6} - x_{j,1})/2$$

$$K_j = x_{j,1} y_{1,6} - x_{j,6} y_{j,1} \quad (3.7)$$

where $(x_{j,1}, y_{j,1})$ and $(x_{j,6}, y_{j,6})$ are the coordinates of the points $P_{j,1}$ and $P_{j,6}$, respectively in the FMEM coordinate system. These coordinate values are obtained from the coordinate transformation of each point ($L_j$) as indicated in equation (3.1). When the straight edge $_v^n e_j$ is omitted, $P_{j,1}=P_{j,2}$ and $P_{j,4}=P_{j,5}$.

Figure 6:
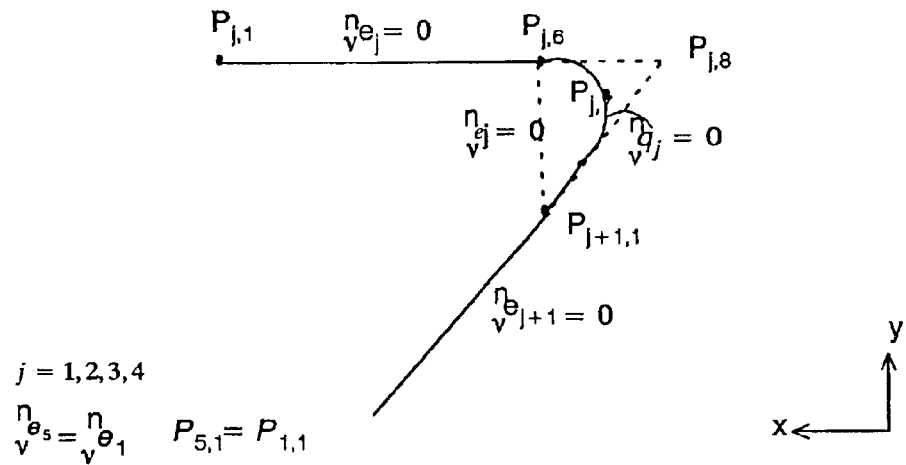
FIG. 6 illustrates a quadric curve and its end points.

A quadric curve $_v^n q_j=0$ on surface n, n=1, ..., 6 is bounded by two edges $_v^n e_j=0$ and $_v^n e_{j+1}=0$ as shown in FIG. 6. It is constructed using Pascal's theorem (Faux & Pratt, 1979) to yield $$(1-\lambda_j) \, _v^n e_j \, _v^n e_{j+1} + \lambda_j \, _v^n \epsilon_j^2 = 0 \; j=1, 2, 3, 4; \; n=1, \ldots 6 \quad (3.8)$$

When j=4, $_v^n e_5 = _v^n e_1$. The line $_v^n \epsilon_j=0$ is the line connecting the two points $P_{j,6}$ and $P_{j+1,1}$, which for j=4 yields $P_{1,1}=P_{5,1}$. Furthermore, $\lambda_j$ is a real number obtained by solving the equation (3.8) at the shoulder point $P_{j,7}$. Thus, $\lambda_j=1/(1-f_1f_2)$, where $$f_1 = {}_v^n\epsilon_j(P_{j,6}, P_{j+1,1})/ {}_v^n e_j(P_{j,1}, P_{j,6}; P_{j,7})$$

$$f_2 = {}_v^n\epsilon_j(P_{j,6}, P_{j+1,1})/ {}_v^n e_{j+1}(P_{j,1,1}, P_{j,1,6}; P_{j,7})$$

The shoulder point is specified inside the area bounded by the two edges ${}_v^n e_j=0$ and ${}_v^n e_{j+1}=0$, and the line ${}_v^n\epsilon_j=0$. This guarantees that the quadric curve passes through the shoulder point $P_{j,7}$ and is tangential to the edges ${}_v^n e_j=0$ and ${}_v^n e_{j+1}=0$ at $P_{j,6}$ and $P_{j+1,1}$, respectively. The line ${}_v^n\epsilon_j=0$ is given by $${}_v^n\epsilon_j = 2a_jx + 2b_jy + c_j = 0 \qquad (3.9)$$

where $$a_j = (y_{j,6} - y_{j+1,1})/2$$

$$b_j = (x_{j+1,1} - x_{j,6})/2$$

$$c_j = x_{j,6}y_{j+1,1} - y_{j,6}x_{j+1,1} \qquad (3.10)$$

The coordinates $(x_{j,6}, y_{j,6})$ and $(x_{j+1,1}, y_{j+1,1})$ are the coordinates of the points $P_{j,6}$ and $P_{j+1,1}$, respectively, in the FMEM coordinate system. The coordinates $x_{j,6}, y_{j,6}, x_{j+1,1}$ and $y_{j+1,1}$ are obtained from the coordinate transformation of each point $L_f$ as indicated in equation (3.1).

Substituting the expressions for ${}_v^n e_j, {}_v^n e_{j+1}, {}_v^n\epsilon_j$ and $\lambda_j$ in equation (3.8) yields the following implicit equation for the quadric curves on faces 1 through 6:

$${}_v^n q_j(e_j, e_{j+1}; P) LM_n Q_j M_n^T L^T = 0 \quad j=1, 2, 3, 4; \; n=1, \ldots 6 \qquad (3.11)$$

where $P=(x, y, z)$ is a point on the quadric curve bounded by $P_{j,6}$ and $P_{j+1,1}$ and passing through $P_{j,7}$, $$Q_j = \begin{bmatrix} A_j & D_j & 0 & \tilde{G}_j \\ D_j & B_j & 0 & \tilde{H}_j \\ 0 & 0 & 0 & 0 \\ \tilde{G}_j & \tilde{H}_j & 0 & \tilde{K}_j \end{bmatrix} \qquad (3.12)$$

and $A_j, B_j, D_j, \tilde{G}_j, \tilde{H}_j$ and $\tilde{K}_j$ are $$A_j = 4G_jG_{j+1}(1-\lambda_j) + 4\lambda_j a_j^2$$

$$B_j = 4H_jH_{j+1}(1-\lambda_j) + 4\lambda_j b_j^2$$

$$D_j = 2(G_jH_{j+1} + H_jG_{j+1})(1-\lambda_j) + 4\lambda_j a_j b_j$$

$$\tilde{G}_j = (G_jH_{j+1} + H_jG_{j+1})(1-\lambda_j) + 2\lambda_j a_j c_j$$

$$\tilde{H}_j = (H_jK_{j+1} + K_jH_{j+1})(1-\lambda_j) + 2\lambda_j b_j c_j$$

$$\tilde{K}_j = K_jK_{j+1}(1-\lambda_j) + \lambda_j c_j^2 \quad j=1, 2, 3, 4 \qquad (3.13)$$

where $G_j, H_j$ and $K_j$ are given by equation (3.7) and which, for the case of $j=4$, $G_5=G_1, H_5=H_1$ and $K_5=K_1$. The quantities $a_j, b_j$ and $c_j$ are given by equation (3.10). When the quadric curve is omitted, $P_{j,1}=P_{j+1,1}=P_{j,8}$. For the case of $j=4$, $P_{4,1}=P_{1,1}=P_{4,8}$.

Figure 7:
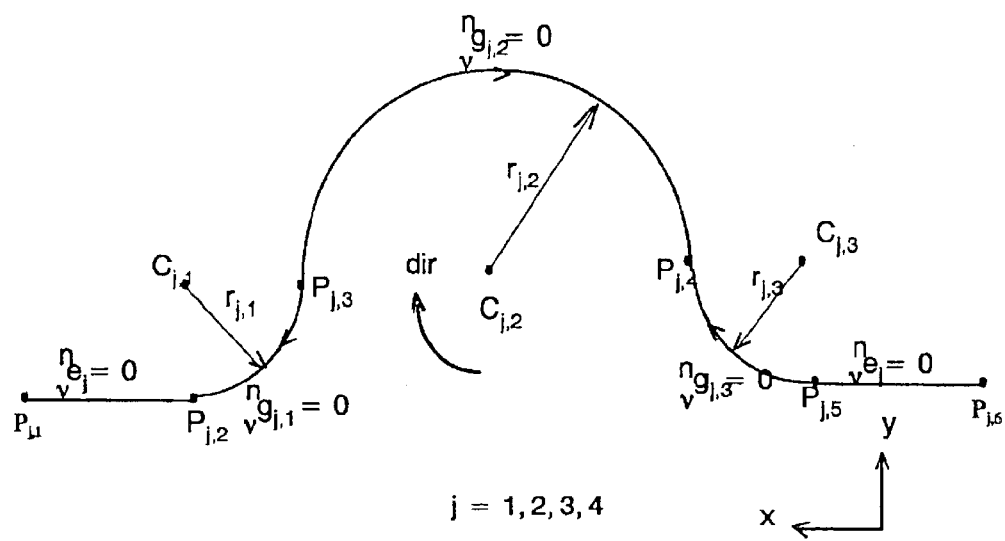
FIG. 7 illustrates a group of three circular arcs and their end points.

A representative group of the circular arcs is shown in FIG. 7. Each of the three circular arcs ${}_v^n g_{j,k}=0$, $k=1, 2, 3$, is tangent to each other. The arcs ${}_v^n g_{j,1}$ and ${}_v^n g_{j,3}$ are tangential to the edge ${}_v^n e_j=0$ in the manner shown. Each arc ${}_v^n g_{j,k}=0$, $k=1, 2, 3$, is bounded by the computationally obtained tangential points $P_{j,k+1}$ and $P_{j,k+2}$, $k=1, 2, 3$. The points $P_{j,2}$ and $P_{j,5}$ are determined in a similar manner when the straight edge ${}_v^n e_j=0$ is tangent to the arcs ${}_v^n g_{j,1}=0$ and ${}_v^n g_{j,3}=0$. The points $P_{j,3}$ and $P_{j,4}$ are the points at which the arcs ${}_v^n g_{j,1}=0$ and ${}_v^n g_{j,3}=0$ are tangent to the arc ${}_v^n g_{j,2}=0$, respectively. All these tangent points are determined after each arc's center location and radius are specified.

The implicit representation of the arcs ${}_v^n g_{j,k}=0$ of profile v on face n is given by $${}_v^n g_{jk}(P_{jk+1}, P_{jk+2}; P) = LM_n J_{jk} M_n^T L^T = 0 \qquad (3.14)$$

$$j = 1, 2, 3, 4$$

$$k = 1, 2, 3$$

$$n = 1, \ldots, 6$$

where $P=(x, y, z)$ is a point on the kth arc that is bounded by the points $P_{j,k+1}$ and $P_{j,k+2}$, $$J_{jk} = \begin{bmatrix} 1 & 0 & 0 & G_{jk} \\ 0 & 1 & 0 & H_{jk} \\ 0 & 0 & 0 & 0 \\ G_{jk} & H_{jk} & 0 & K_{jk} \end{bmatrix} \qquad (3.15)$$

where $G_{jk}, H_{jk}$ and $K_{jk}$ are the coefficients determined by the center points $C_{j,k}$ and radii $r_{j,k}$ of arcs ${}_v^n g_{j,k}$ such that $$G_{jk} = -xc_{j,k}$$

$$H_{jk} = -yc_{j,k}$$

$$K_{jk} = xc_{j,k}^2 + yc_{j,k}^2 - r_{j,k}^2 \qquad (3.16)$$

and $(xc_{j,k}, yc_{j,k})$ are the coordinates of the center points $C_{j,k}$. As shown in FIG. 7, only the segment of an arc that is clockwise is drawn. The directions of the arcs are determined by information about whether a group of arcs is inside or outside the quadrilateral formed by the edges ${}_v^n e_j=0$, $j=1, 2, 3, 4$. When the group of arcs ${}_v^n g_j$ is omitted, $P_{j,2}=P_{j,1}$ and $P_{j,5}=P_{j,6}$.

The ordered collection of the three arcs is defined as ${}_v^n g_j$ and is given by $${}_v^n g_j = \sum_{k=1}^{3} {}_v^n g_{j,k} \qquad (3.17)$$

The cavity and the island profiles are described by any ordered combination of these straight edges, quadric curves and groups of circular arcs such that the total perimeter for each of these profiles for the cavity ${}_v^n S_C$ and the island ${}_v^n S_I$ are given by $${}_v^n S_\sigma(P) = \sum_{j=1}^{4} {}_v^n S_j(P) \qquad (3.18)$$

where $\sigma=C$ or $I$ and $${}_v^n S_j(P) = {}_v^n e_j(P_{j,1}, P_{j,2}; P) + \sum_{k=1}^{3} {}_v^n g_{j,k}(P_{j,k+1}, P_{j,k+2}; P) + {}_v^n e_j(P_{j,5}, P_{j,6}; P) + {}_v^n q_j(e_j, e_{j+1}; P) \qquad (3.19)$$

$$j = 1, 2, 3, 4$$

$$n = 1, \ldots, 6$$

The values of P are those points restricted to lie on the specific lines, curves and arcs as previously indicated.

Figure 8:
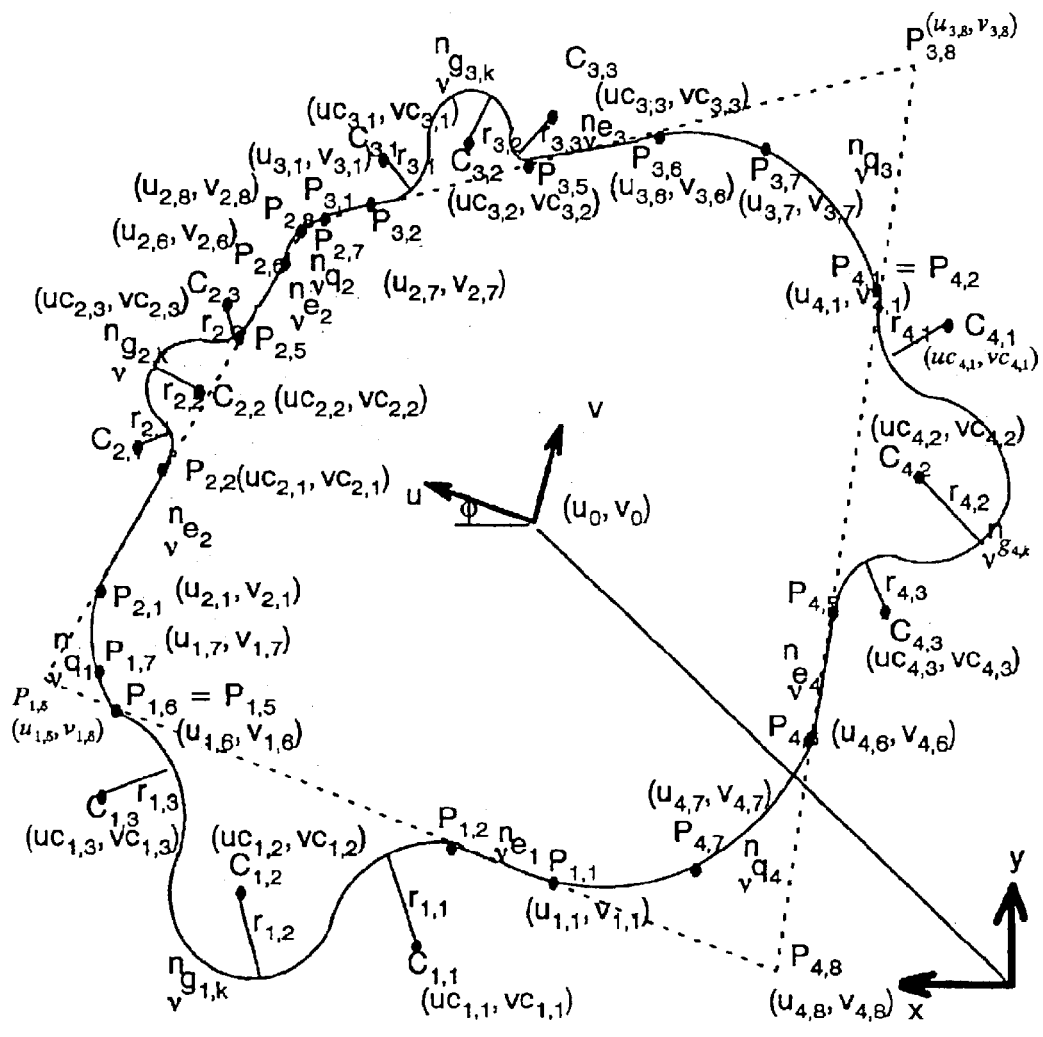
FIG. 8 illustrates the input data points to define a profile.

The general profile given by equation (3.18) is composed of a combination of straight edges, circular arcs and quadric curves. The engineer can choose any ordered combination of the curves comprising the profile to attain the desired profile. A profile v is specified by manipulating the individual curves ($_v{}^ne_j$, $_v{}^nq_j$, $_v{}^ng_j$) in the general profile $_v{}^nS_o(P)$. In addition, any curve in the profile may be omitted when describing a profile shape. This missing curve is specified as False in the data structure and no data are input for that curve. Referring to FIG. 8, an edge $_v{}^ne_j$ is defined by the coordinates of the vertices $P_{j,1}$ and $P_{j,6}$, the circular arcs $_v{}^ng_{j,k}$ are specified by the coordinates of their center points $C_{j,k}$, their radii $r_{j,k}$ and "dir", and the quadric curve $_v{}^nq_j$ is defined by its shoulder point $P_{j,7}$, its knee point $P_{j,8}$ and the tangent lines $_v{}^ne_j=0$ and $_v{}^ne_{j-1}=0$. The outside and island profiles are specified in their respective profile coordinate systems (u, v, w), which are then oriented in the xy-plane of the FMEM by specifying their corresponding ($u_0$, $v_0$, $w_0$) and $\phi$ (see FIG. 3). A hole is specified by its center point and its radius. A rectangular pocket has its input specified by the end points of four straight edges and the coordinates of the shoulder and knee points of the four quadric curves.

The transformation of the feature profiles from their (u, v, w) system to their (x, y, z) system requires the computation of the matrices $E_j$, $J_{jk}$ and $Q_j$. The data for a profile in the (x, y, z) system are then stored for subsequent use by the modeling system. The computed data for these twenty (20) matrices for each feature profile, along with their respective vertices are stored accordingly. Each edge $_v{}^ne_j$ is described by its matrix $E_j$ and the two vertices $P_{j,1}$ and $P_{j,6}$ bounding the edge. Each quadric curve $_v{}^nq_j$ is described by its matrix $Q_j$, its shoulder point $P_{j,7}$ and its knee point $P_{j,8}$. Each circular arc $_v{}^ng_{j,k}$ is expressed by its matrix $J_{jk}$ and the points $P_{j,k+1}$ and $P_{j,k+2}$ bounding each arc. Thus the inner and outer profiles of a cavity on any one face of the FMEM can be described, in general, as an ordering of four edge matrices, twelve circular arc matrices and four quadric curve matrices, and the vertices that bound each of these curves.

The determination of a profile's extent will now be described.

Figure 9:
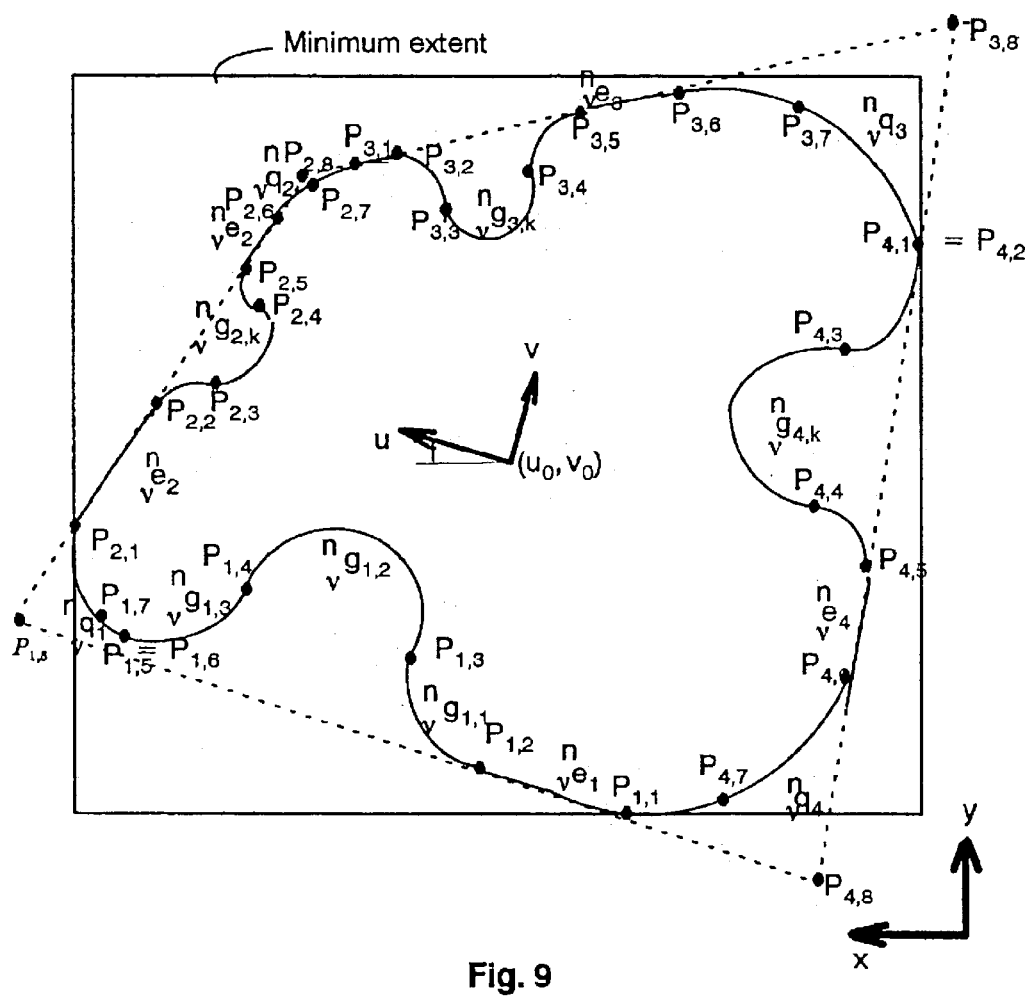
FIG. 9 is a schematical representation of the determination of an extent of a cavity's profile with straight edges and only inner arc groups.

The minimum rectangle that surrounds a cavity profile is called an extent. An extent is completely defined by the coordinates of two of its diagonal corners, ($x_{min}$, $y_{min}$) and ($x_{max}$, $y_{max}$), in the FMEM coordinate system. The minimum and maximum values of a coordinate (either x or y) are found by sequencing through the list of the coordinates of the points $P_{j,i}$, j=1, . . . , 4 and i=1, . . . , 6, and recording the smallest and the largest values for each coordinate. This minimum rectangle, as shown in FIG. 9, contains a feature profile that is formed by the edges $_v{}^ne_j$ and the inner arc groups. It is possible, however, that some portions of the quadric curves $_v{}^nq_j$ lie outside the minimum rectangle obtained in this manner. In addition, the circular arc groups that are outside the quadrilateral that is formed by joining the points $P_{j,8}$, j=1, . . . , 4, will also lie outside this minimum rectangle. The minimum rectangle, therefore, is reexamined if such circular arc groups are used and the quadric curves found in the profile.

Figure 10:
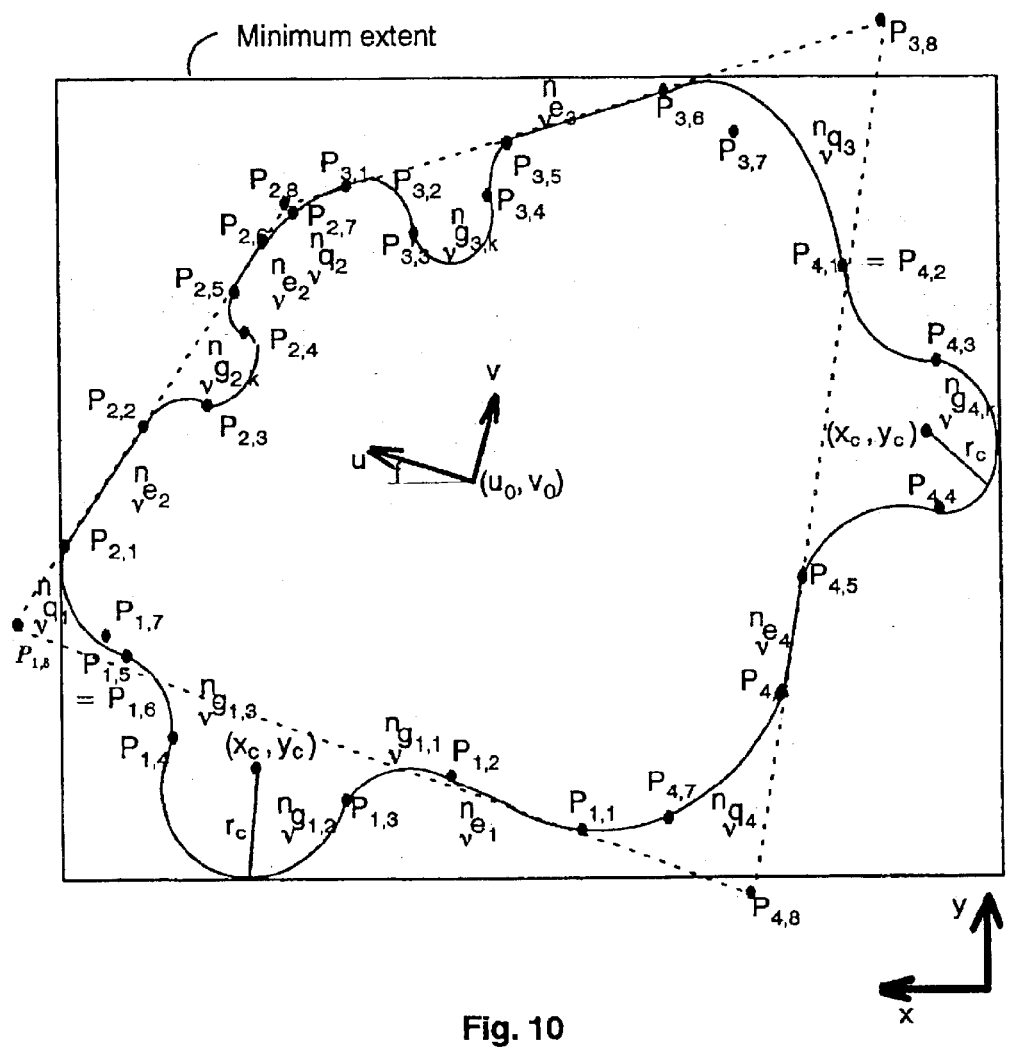
FIG. 10 is a schematical representation of the determination of an extent of a profile with external circular arc groups.
Figure 11:
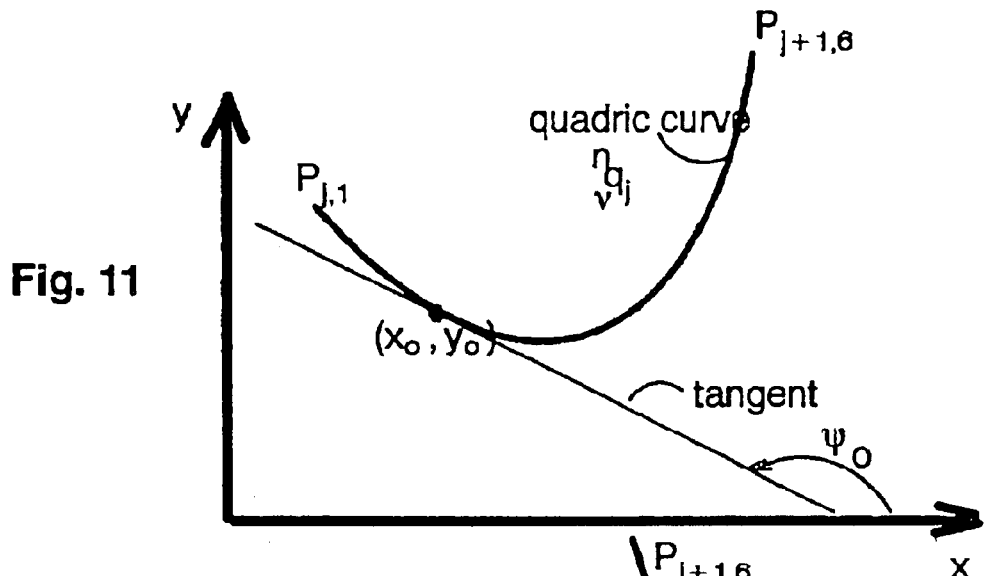
FIG. 11 is a schematical representation of the determination of an arbitrarily oriented extent of a profile with an external quadric curve.

Referring to FIG. 10, the following tests are performed to determine the maxima and minima of x and y when a circular curve $_v{}^ng_{j,k}$ of radius $\tau_{j,k}$ with its center at ($xc_{j,k}$, $yc_{j,k}$) is outside the quadrilateral of the profile (dir is counterclockwise):

(a) If $x_{min}>xc_{j,k}-\tau_{j,k}$, then $x_{min}=xc_{j,k}-\tau_{j,k}$ (a) If $x_{min}>xc_{j,k}-\tau_{j,k}$, then $x_{min}=xc_{j,k}-\tau_{j,k}$ (b) If $y_{min}>yc_{j,k}-\tau_{j,k}$, then $y_{min}=yc_{j,k}-\tau_{j,k}$ (c) If $x_{max}<xc_{j,k}-\tau_{j,k}$, then $x_{max}=xc_{j,k}-\tau_{j,k}$ (d) If $y_{max}<yc_{j,k}-\tau_{j,k}$, then $y_{min}=yc_{j,k}-\tau_{j,k}$ However, the previously determined values of $x_{min}$, $y_{min}$, $x_{max}$ and $y_{max}$ remain unchanged if none of these conditions is met The maxima and minima of x and y, when at least one quadric curve $_v{}^nq_j$, j=1, . . . 4 is in the profile, are determined in the following manner. Consider a point ($x_o$, $y_o$), as shown in FIG. 11, through which the quadric curve $_v{}^nq_j$ passes. The tangent at ($x_o$, $y_o$) makes an angle $\psi_o$ with the x-axis of the FMEM coordinate'system. Expanding equation (3.11) for n=1 at ($x_o$, $y_o$) in the FMEM coordinate system, and using some results from Faux and Pratt (1979), it is found that the following two equations are obtained from which the point ($x_o$, $y_o$) can be determined:

$$A_j x_o^2 + B_j y_o^2 + 2D_j x_o y_o + 2\tilde{G}_j x_o + 2\tilde{H}_j y_o + \tilde{K}_j = 0 \quad (3.20)$$

$$(A_j x_o + D_j y_o + \tilde{G}_j) \cos \psi_o + (D_j x_o + B_j y_o + \tilde{H}_j) \sin \psi_o = 0 \quad (3.21)$$

Figure 12:
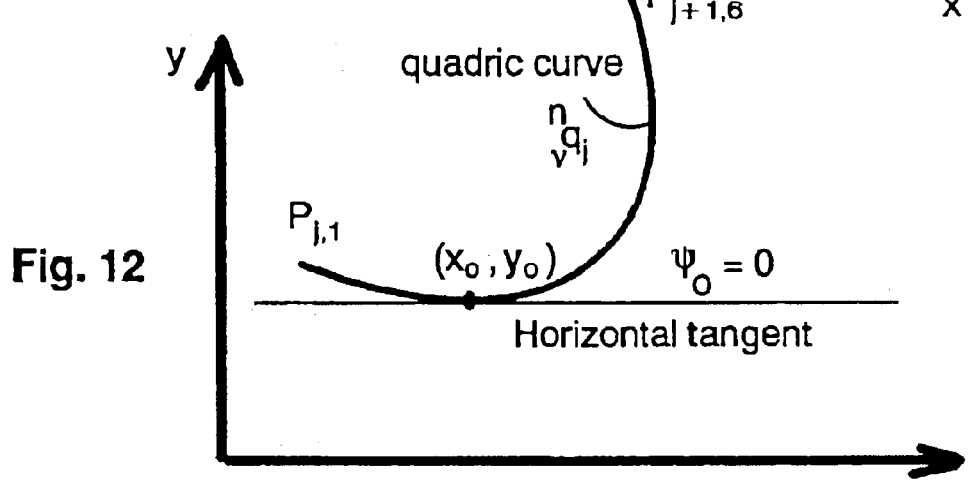
FIG. 12 is a schematical representation of the determination of an arbitrarily oriented extent of a profile with an external quadric curve for the case when the extent is parallel to the x-axis.

When the tangent is horizontal, as shown in FIG. 12, $\psi_o=0$. Then the roots of equations (3.20) and (3.21) are denoted $x_{o1}$ and $x_{o2}$. The values $x_{o1}$ and $x_{o2}$ are evaluated to determine if any of these values lie between $x_{j,1}$ and $x_{j+1,6}$. If both roots do not lie between $x_{j,6}$ and $x_{j+1,1}$, then they are rejected. If one of the roots, either $x_{o1}$, or $x_{o2}$, lies between $x_{j,6}$ and $x_{j+1,1}$, then its value is substituted into equation (3.21) to get a value of $y_o$. The root that does not lie between $x_{j,6}$ and $x_{j+1,1}$, is rejected. Only positive values of $y_o$ are accepted. If $y_o<y_{min}$, then $y_{min}=y_o$; if $y_o>y_{max}$, then $y_{max}=y_o$. If $x_{j,6} \geq x_{ok} \geq x_{j+1,1}$, k=1,2, then the two values $x_{ok}$, k=1,2 are substituted into equation (3.21) to yield two values $y_{ok}$, k=1,2. When $y_{o1}<y_{o2}$, and if $y_{o1<ymin}$, then $y_{min}=y_{o1}$; if $y_{o2}<y_{max}$, then $y_{max}=y_{o2}$. When $y_{o2}<y_{o1}$, and if $y_{o2}<y_{min}$, then $y_{min}=y_{o2}$; if $y_{o1}<y_{max}$, then $y_{max}=y_{o1}$.

Figure 13:
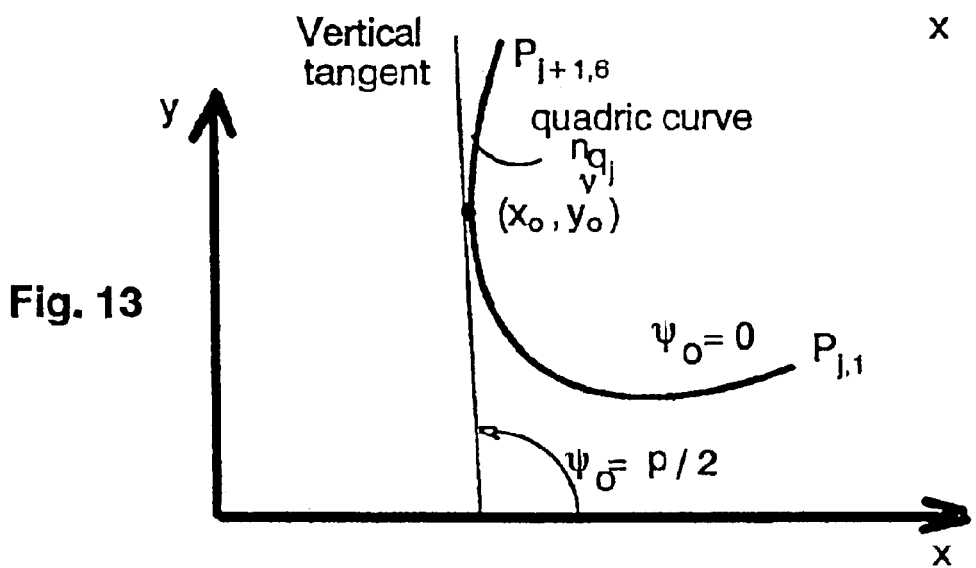
FIG. 13 is a schematical representation of the determination of an arbitrarily oriented extent of a profile with an external quadric curve for the case when the extent is parallel to the y-axis.

When the tangent is vertical as shown in FIG. 13, $\psi_o=\pi/2$. Then the roots of equations (3.20) and (3.21) are denoted $y_{o1}$ and $y_{o2}$. The values $y_{o1}$ and $y_{o2}$ are calculated to determine if any of these values lie between $y_{j,6}$ and $y_{j+1,1}$. If both roots do not lie between $y_{j,6}$ and $y_{j+1,1}$, then they are rejected. If one of the roots, either $y_{o1}$ or $y_{o2}$, lies between $y_{j,6}$ and $y_{j+1,1}$, then its value is substituted into equation (3.21) to get a value of $x_o$. The root that does not lie between $y_{j,6}$ and $y_{j+1,1}$ is rejected. Only positive values of $x_o$ are accepted. If $x_o<x_{min}$, then $x_{min}=$if $x_o>x_{max}$, then $x_{max}=x_o$. If $y_{j,6} \leq y_{ok} \leq y_{j+1,1}$, k=1,2, then the two values $y_{ok}$, k=1,2 are substituted into equation (3.21) to yield two values $x_{ok}$, k=1,2. When $x_{o1<xo2}$, and if $x_{o1}<x_{min}$ then $x_{min}=x_{o1}$; if $x_{o2}<x_{max}$, then $x_{max}=x_{o2}$. When $x_{o2}<x_{o1}$, and if $x_{o2}<x_{min}$, then $x_{min}=x_{o2}$; if $x_{o1}<x_{max}$, then $x_{max}=x_{o1}$.

The foregoing description introduced the fundamental manufacturing entity for milling. It explained how a profile is represented in the FMEM, what input data are required and in what form they are stored. The governing equations representing the individual components of the profile were also given. The following description will detail how these general profiles can be combined so that the intersection of any number of profiles of an FMEMs on a given face n can be handled.

An entity for modeling the volume removed by a milling operation, called the FMEM, was introduced above. This entity represents the various shapes of the cavity and island profiles that are created by a milling operation. During the design process the designer may want to achieve a shape that is not attainable from the very general profile given by equation (3.18), but can be achieved with the intersection of two or more profiles on a given surface. In order to do this a means must be developed to incorporate a profile that is formed by the intersection of many profiles on any of the six faces. The algorithm to calculate such intersections is discussed in this chapter. Identifying and calculating these intersections require that a means first be developed to determine if an intersection of the profiles has taken place. If it has, then all their intersection points are determined and the new profile is formed. This process can then be repeated to calculate the intersection of additional profiles. The final FMEM can then be stored and used throughout the design process.

Figure 14:
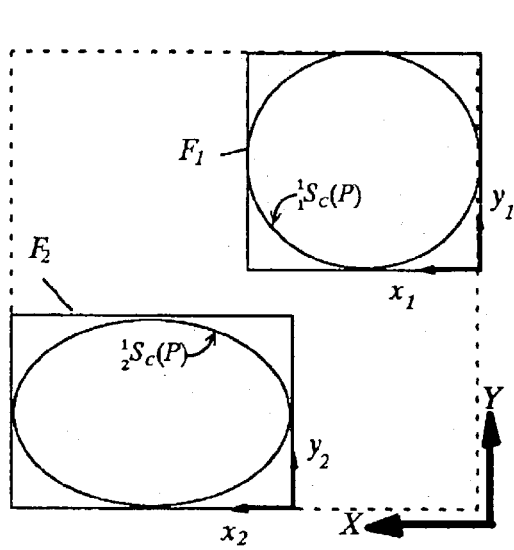
FIG. 14 is a schematical representation of the two extents that do not overlap.
Figure 15:
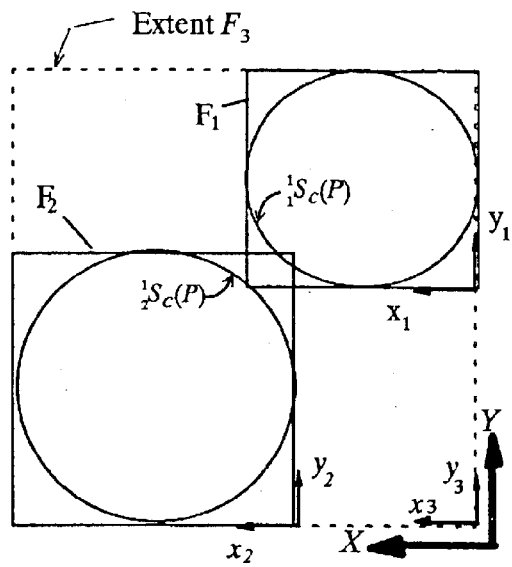
FIG. 15 is a schematical representation of the two extents that overlap, but their profiles do not intersect.

The use of extents to describe the intersection of profiles will now be discussed. Consider two extents $F_1$ and $F_2$. These two extents can be related to each other in one of three ways: (1) they do not overlap; (2) they overlap, but their profiles do not intersect; and (3) they overlap and their profiles intersect. FIG. 14 shows the case where the extents do not overlap. For this case the extents $F_1$ and $F_2$ contain the profiles of two independent FMEMs, $(FMEM)_1$ and $(FMEM)_2$. The procedure to define a profile of an FMEM in an extent was discussed above. FIG. 15 shows the case of two overlapping extents $F_1$ and $F_2$ in which the profiles do not intersect. In this case a third extent $F_3$ surrounds the two overlapping extents, and the extent $F_3$ is a new extent containing the two non-intersecting profiles ${}_1{}^n S_C(P)$ and ${}_2{}^n S_C(P)$. The curves of the profiles ${}_1{}^n S_C(P)$ and ${}_2{}^n S_C(P)$ when contained in the same extent, but do not intersect, are designated as combination $C_o$.

Figure 16:
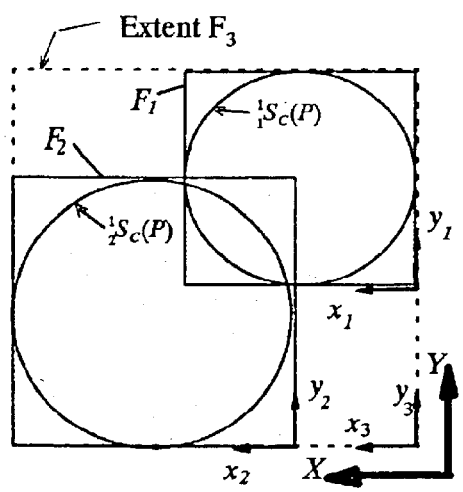
FIG. 16 is a schematical representation of the two extents that overlap and their profiles intersect.

FIG. 16 shows the case when the two extents $F_1$ and $F_2$ overlap, and some of the curves of the two profiles ${}_1{}^n S_C(P)$ and ${}_2{}^n S_C(P)$ intersect.

Figure 17:
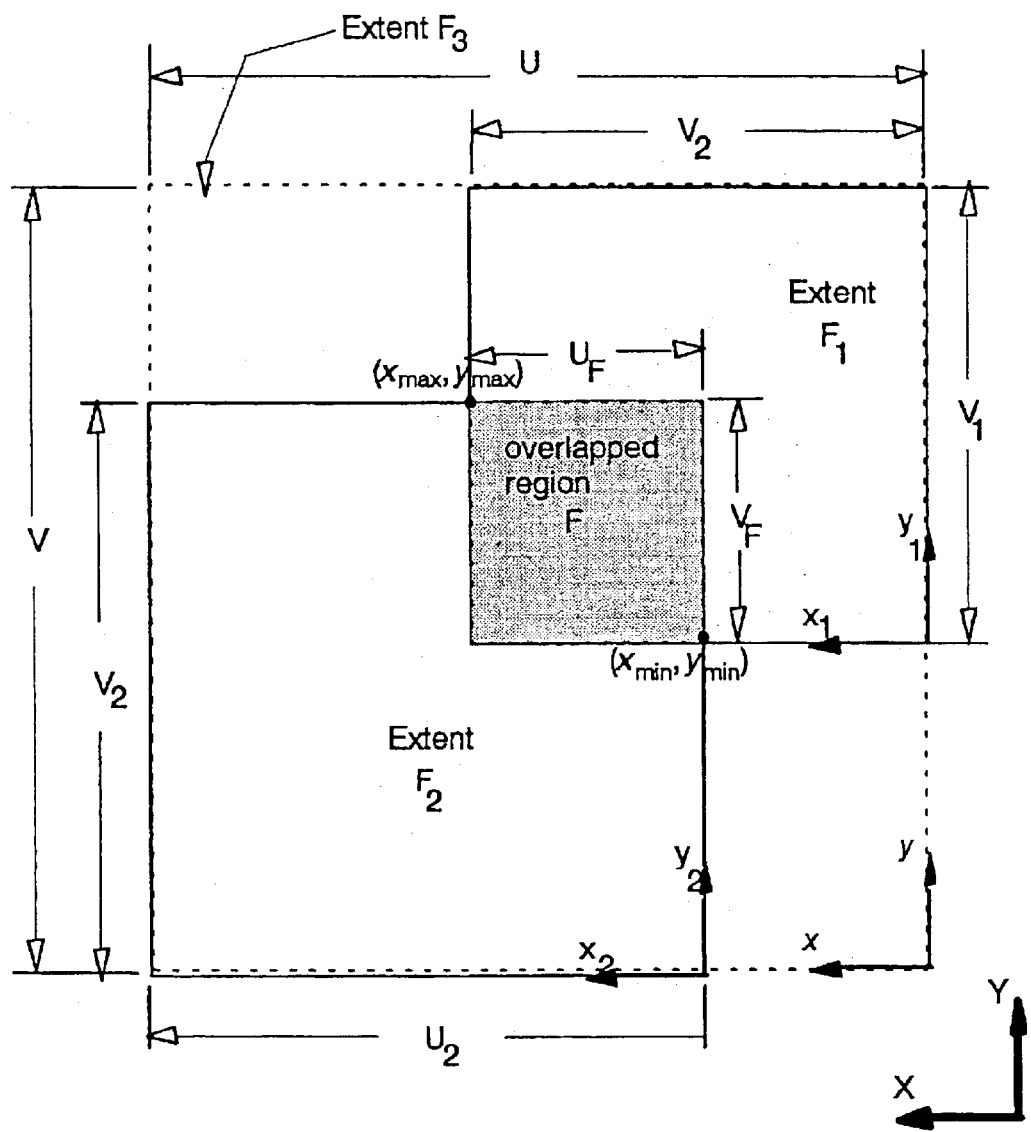
FIG. 17 illustrates two overlapping extents in their respective FMEM coordinate systems.

The test to determine whether or not two FMEM profiles intersect consists of two parts. The first part uses the extents of the individual profiles. Referring to FIG. 17, the two extents $F_1$ and $F_2$ are represented in their respective local FMEM coordinate systems $(x_1, y_1)$ and $(x_2, y_2)$ on the face n. Each of the extents is oriented parallel to the global coordinate system $(X, Y)$. However, the orientation of their respective profiles are with respect to the individual coordinate system $(x, y)$. Recall equation (3.1). The overlapped region F, which is the region common to extents $F_1$ and $F_2$, is first identified. When two extents overlap they are surrounded by a third extent $F_3$, which is the smallest rectangle that encloses $F_1$ and $F_2$, and is expressed in the composite FMEM coordinate system $(x, y)$. The profiles enclosed by the extents $F_1$ and $F_2$ can only intersect in the common region F. The coordinates of the bottom right hand corner of the region F in the $(x, y)$ coordinate system are $(x_{min}, y_{min})$ and the coordinates of the top left hand corner are $(x_{max}, y_{max})$.

Figure 18:
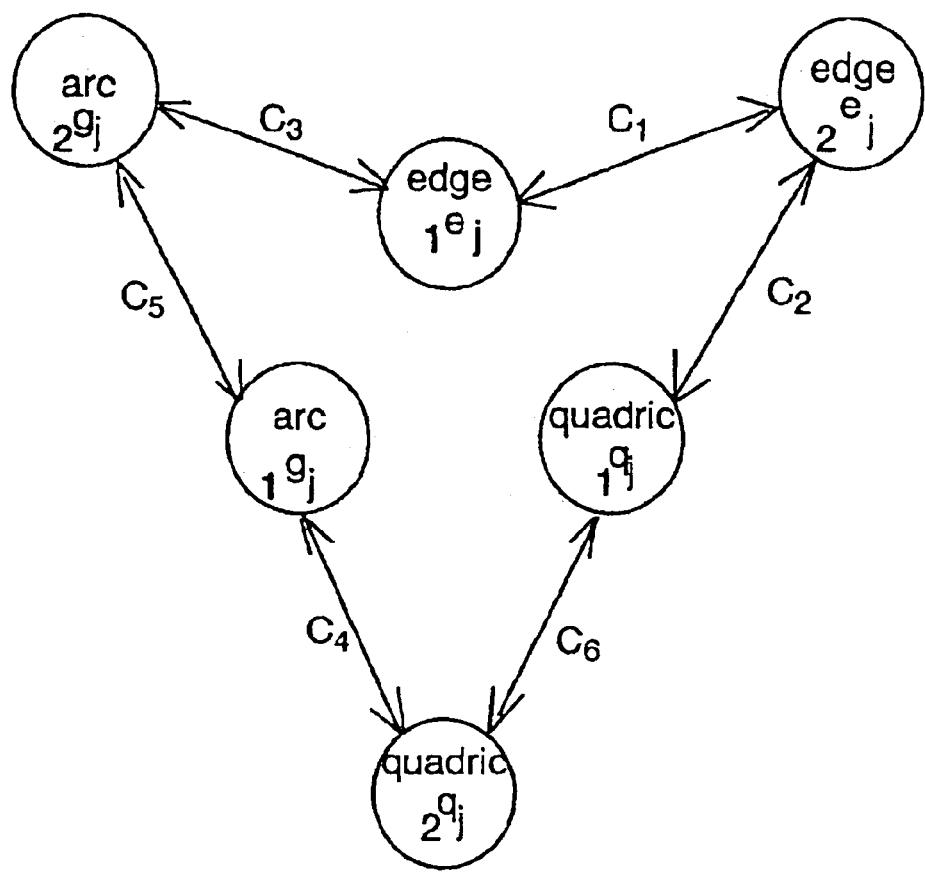
FIG. 18 illustrates the six unique combinations of curve intersections.

The second part of the test is applied only to the curves $e_j$, $q_j$ and $g_j$ of the two profiles ${}_1{}^n S_C(P)$ and ${}_2{}^n S_C(P)$ that are present within the region F. Each curve of the two profiles is evaluated to determine whether or not it is within the region F. If it is within F it is marked for further processing. Referring to FIG. 18 it is seen that there are only six unique combinations of intersections among the curves $e_j$, $q_j$ and $g_j$ of the two profiles ${}_1{}^n S_C(P)$ and ${}_2{}^n S_C(P)$ on a given face n. The combinations are denoted $C_k$, $k=1, \ldots, 6$. The combinations $C_1$, $C_2$ and $C_3$ represent interactions of an edge ${}_1{}^n e_j$ with another edge ${}_2{}^n e_j$, with a quadric curve ${}_2{}^n q_j$, and with any one of the circular arc group ${}_2{}^n g_j$, respectively. The combinations $C_4$, $C_5$ and $C_6$ represent intersections of two second order curves. Recall that when the curves do not intersect in the region F they are denoted $C_0$. Each intersection involving two second order curves is tested using the Sylvester's resultant method (Hoffman, 1989), in which the Sylvester's determinant $|R_x|$ is expressed in terms of the coordinate variable x. This determinant is obtained by expressing all the terms containing the variable x as coefficients of they coordinate. The combinations $C_1$, $C_2$ and $C_3$ are relatively easy to process, since only a qaudratic equation is solved to determine their intersection points. It should be noted that of the three combinations of profiles that can intersect, only two are physically realizable. The third, the intersections of two islands, is not admissible.

The six unique intersections $C_k$, $k=1, \ldots, 6$ can be determined by introducing a general curve ${}_v{}^n \gamma_i(U_i, U_{i+1}; P)$, $i=1, 2, 3, 4, 5$; $n=1, \ldots, 6$ and $v=1, 2, \ldots$ of a profile ${}_v{}^n S_\sigma(P)$, $\sigma=C$ or $I$, on face n. This curve is bounded by the points $U_i$ and $U_{i+1}$, and $P=(x, y, z)$ is a point on the curve. The curve is given in the composite FMEM's coordinate system $(z, y, z)$ as follows:

$${}_v{}^n \gamma_i(U_i, U_{i+1}; P) = \Gamma_i L^\Gamma = 0 \quad i=1, 2, 3, 4, 5; n=1, \ldots, 6 \quad (4.1)$$

For $i=1$, the curve ${}_v{}^n \gamma_1$ represents the straight edge ${}_v{}^n e_j$ and $\Gamma_1 = E_j$; for $i=2, 3, 4$ ${}_v{}^n \gamma_i$ represents one of the circular arcs ${}_v{}^n g_{j,k}$, $k=1, 2, 3$ and $\Gamma_i = J_{jk}$; and for $i=5$ ${}_v{}^n \gamma_5$ represents a quadric curve ${}_v{}^n q_j$ and $\Gamma_5 = Q_j$. Furthermore, $U_i = P_{j,i}$ and $U_{i+1} = P_{j,i+1}$ except for $i=5$, where $U_i = P_{j,i+1}$ and $U_{i+1} = P_{j+1i-4}$. The coordinates of the points $U_i$ and $U_{i+1}$ in the $(x, y, z)$ coordinate system are given by $(x_i, y_i, z_i)$ and $(x_{i+1}, y_{i+1} z_{i+1})$, respectively.

Consider an intersection of a cavity ${}_1{}^n S_C(P)$ with either another cavity ${}_2{}^n S_C(P)$ or an island ${}_2{}^n S_I(P)$. An island does not intersect with another island. Each of the six combinations $C_k$, $k=1, \ldots, 6$ for the intersections of a cavity with another cavity and a cavity with an island are discussed in the following sections. It is shown how the intersection points $R_t$, $t=1, \ldots, x$ are found. The quantity x is the total number of intersection points. The intersection points $R_t$ are the roots of the polynomials of the intersecting curves ${}_1{}^n \gamma_i$ and ${}_2{}^n \gamma_i$. Hence, the problem is reduced to finding the roots of the two polynomials of the intersecting curves ${}_1{}^n \gamma_i$ and ${}_2{}^n \gamma_i$ for each of the six combinations.

In case of a cavity ${}_1{}^n S_C(P)$ intersecting with another cavity ${}_2{}^n S_C(P)$, the $N_{p1}$ intersection points $R_t$, $t=1, \ldots, N_{p1}$ are found for the intersection of a curve ${}_1{}^n \gamma_i$ of a cavity ${}_1{}^n S_C(P)$ with all the curves of the intersecting cavity ${}_2{}^n S_C(P)$. These intersection points $R_t$, $t=1, \ldots, N_{p1}$ are then collected and ordered along the curve ${}_1{}^n \gamma_i$. The curve ${}_1{}^n \gamma_i$ is then segmented using the intersection points $R_t$, $t=1, \ldots, N_{p1}$. An algorithm, which is described in the preceding section, is then used to determine the segments that are removed and the segments that remain after the intersection. This procedure is repeated for all the curves of the cavity ${}_1{}^n S_C(P)$. Similarly, the $N_{p2}$ intersection points $R_t$, $t=1, \ldots, N_{p2}$ found for the intersection of a curve ${}_2{}^n \gamma_i$ of the cavity ${}_2{}^n S_C(P)$ with all the curves of the intersecting cavity ${}_1{}^n S_C(P)$ are collected and then ordered along the curve ${}_2{}^n K_i$. The segments of the curve ${}_2{}^n \gamma_i$ are then determined using the intersection points $R_t$, $t=1, \ldots, N_{p2}$ the same algorithm is used to identify the segments that are removed and the segments that remain. This is repeated for all the curves of the cavity ${}_2{}^n S_C(P)$.

For the case of a cavity ${}_1{}^n S_C(P)$ intersecting with an island ${}_2{}^n S_C(P)$, only the curves ${}_2{}^n \gamma_i$ of the island are affected. The cavity ${}_1{}^n S_C(P)$ removes the material from the island ${}_2{}^n S_C(P)$. However, an island ${}_2{}^n S_I(P)$ does not remove material from the cavity ${}_1{}^n S_C(P)$. Thus, for such an intersection, the curves ${}_1{}^n \gamma_i$ of the cavity ${}_1{}^n S_C(P)$ are not considered and only the curves ${}_2{}^n \gamma_i$ of the island ${}_2{}^n S_I(P)$ in the region F are considered. The $N_{p2}$ intersection points $R_t$, $t=1, \ldots, N_{p2}$ are found for the intersection of a curve ${}_2{}^n \gamma_i$ of the island ${}_2{}^n S_I(P)$ with all the curves of the intersecting cavity ${}_1{}^n S_C(P)$. These intersection points are then collected and ordered along the curve $_2{}^nK_i$. The segments of the curve $_2{}^n\gamma_i$ are determined using the intersection points $R_t$, $t=1, \ldots, N_{p2}$ and the segments that removed and the segments that remain are identified.

The following discussion explains in detail the six intersection combinations $C_k$, $k=1, \ldots, 6$, for a cavity $_1{}^nS_C(P)$ intersecting with either another cavity $_2{}^nS_C(P)$ or with an island $_2{}^nS_I(P)$.

The combination $C_1$ denotes the intersection of the two straight edges $_1{}^n\gamma_1(U_i, U_{i+1}; P)$ and $_2{}^n\gamma_1(U_i, U_{i+1}; P)$, which are each described by equation (3.5). Expanding their respective equations for face n in the (x, y) coordinate system yields $$_1{}^n\gamma_1(U_i, U_{i+1}; P) = 2_1{}^nG_j x + 2_1{}^nH_j y + _1{}^nK_j = 0 \quad (4.2a)$$

$$_2{}^n\gamma_1(U_i, U_{i+1}; P) = 2_2{}^nG_j x + 2_2{}^nH_j y + _2{}^nK_j = 0 \quad (4.2b)$$

Solving for x and y we get $$x_e = \tfrac{1}{2}(_2{}^nH_{j1}{}^nK_j - _1{}^nH_{j2}{}^nK_j)/D_0 \quad (4.3a)$$

$$y_e = \tfrac{1}{2}(_2{}^nK_{j1}{}^nG_j - _1{}^nK_{j2}{}^nG_j)/D_0 \quad (4.3b)$$

where $$D_0 = _1{}^nH_{j2}{}^nG_j - _1{}^nG_{j2}{}^nH_j \quad (4.3c)$$

Figure 19:
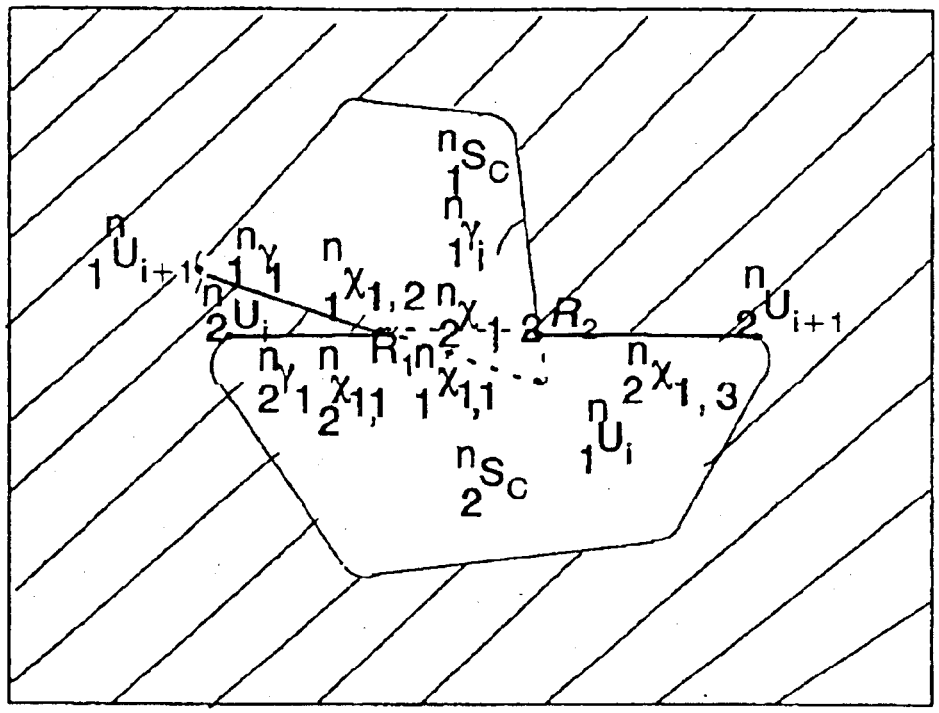
FIG. 19 shows the intersection of two straight edges when a cavity profile intersects with another cavity profile.
Figure 20:
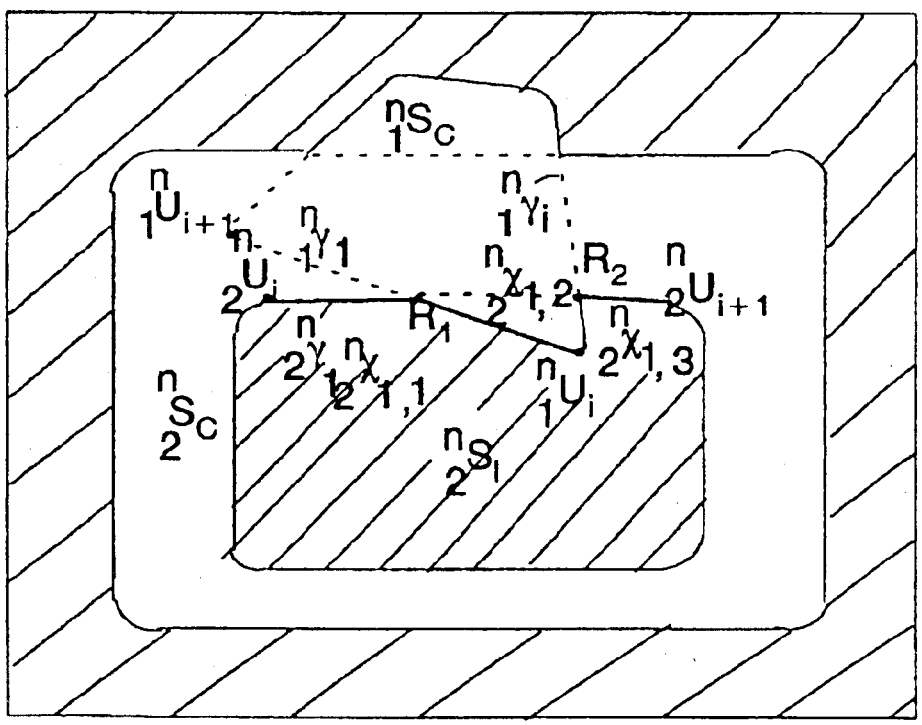
FIG. 20 shows the intersection of two straight edges when a cavity profile intersects with an island profile.

It can be seen from equations (43a) and (4.3b) that the two edges $_1{}^n\gamma_1(U_i, U_{i+1}; P)$ and $_2{}^n\gamma_1(U_i, U_{i+1}; P)$ do not intersect if $D_0=0$. When $D_0 \neq 0$ equations (43a) and (43b) yield the intersection point $R_1 = (x_e, y_e)$. Each intersection combination $C_1$ yields only one intersection point. However, the edge $_1{}^n\gamma_1(U_i, U_{i+1}; P)$ may intersect with other curves $_1{}^n\gamma_i$, $i=2, 3, 4, 5$, of the cavity profile $_2{}^nS_C(P)$ and may have $N_{p1}$ intersection points; that is, $R_t$, $t=1, \ldots, N_{p1}$. Similarly, the edge $_2{}^n\gamma_1(U_i, U_{i+1}; P)$ may intersect with other curves $_1{}^n\gamma_i$, $i=2, 3, 4, 5$ of the profile $_1{}^nS_C(P)$ and may have $N_{p2}$ intersection points; that is, $R_t$, $t=1, \ldots, N_{p2}$. This is illustrated in FIGS. 19 and 20. FIG. 19 shows the intersection of two straight edges $_1{}^n\gamma_1(U_i, U_{i+1}; P)$ and $_2{}^n\gamma_1(U_i, U_{i+1}; P)$ when a cavity profile $_1{}^nS_C(P)$ intersects with another cavity profile $_2{}^nS_C(P)$. FIG. 20 shows the intersection of two edges $_1{}^n\gamma_1(U_i, U_{i+1}; P)$ and $_2{}^n\gamma_1(U_i, U_{i+1}; P)$ when a cavity profile $_1{}^nS_C(P)$ intersects with an island profile $_2{}^nS_I(P)$. The intersection point $R_1$ that results from the intersection of the straight edges is obtained from equations (43a) and (4.3b). Another intersection point $R_2$, shown in FIGS. 19 and 20, results from the intersection of the edge $_2{}^n\gamma_1(U_i, U_{i+1}; P)$ with one of the curves $_1{}^n\gamma_i$, $i=2, 3, 4, 5$, of the cavity profile $_1{}^nS_C(P)$. The procedure for obtaining $R_2$ is explained subsequently.

FIGS. 19 and 20 show that the straight edge $_1{}^n\gamma_1(U_i, U_{i+1}; P)$ has only one intersection point $R_1$, whereas the straight edge $_2{}^n\gamma_1(U_i, U_{i+1}; P)$ has two intersection points $R_1$ and $R_2$. Therefore, the edge $_1{}^n\gamma_1(U_i, U_{i+1}; P)$ can be divided into two segments $_1{}^n\chi_{1,1}(U_i, R_1; P)$ and $_1{}^n\chi_{1,2}(R_1, U_{i+1}; P)$. The edge $_2{}^n\gamma_1(U_i, U_{i+1}; P)$ is subdivided into three segments; however, they cannot be identified until it has been determined whether $R_1$ or $R_2$ is loser to the end point $_2{}^nU_i$. In other words, the intersection points $R_1$ and $R_2$ need to be ordered along the edge $_2{}^n\gamma_1(U_i, U_{i+1}; P)$. This ordering is done only if there are more than one intersection points for the edge and is achieved by converting the implicit equation (41a) of the edge to the parametric form, which will be in terms of parameter t given by $$t(x) = \frac{(x - x_i)}{(x_{i+1} - x_i)} \quad x_{i+1} \neq x_i \quad (4.4)$$

$$t(y) = \frac{(y - y_i)}{(y_{i+1} - y_i)} \quad \begin{matrix} x_{i+1} = x_i \\ y_{i+1} \neq y_i \end{matrix}$$

It can be 'seen from equation (4.4) that $t=0$ at the starting point $_2{}^nU_i$ and that $t=1$ at the terminating point $_2{}^nU_{i+1}$ of the edge $_2{}^n\gamma_1(U_i, U_{i+1}; P)$. When the point lies on the edge $_2{}^n\gamma_1(U_i, U_{i+1}; P)$ between points $U_i$ and $U_{i+1}$, then $0 < t < 1$. However, a point that precedes $U_i$ will have $t<0$ and a point that follows $U_{i+1}$ will have $t<1$. The value $t(R_1)$ is obtained by substituting $x=x_e$ when $x_{i+1} \neq x_i$, or $y=y_e$ when $x_i=x_{i+1}$, into equation (4.4). Similarly, $t(R_2)$ is calculated by substituting the appropriate coordinates of the intersection point $R_2$ into equation (4.4). The intersection points are then ordered in ascending order for the parameter t. If $t(R_1) < t(R_2)$ then the order is $_2{}^nU_i, R_1, R_2$ and $_2{}^nU_{i+1}$; otherwise the order is $_2{}^nU_i, R_2, R_1$ and $_2{}^nU_{i+1}$. The former order is shown in FIG. 19, and the latter in FIG. 21. Once the order is known, the segments for the edge $_2{}^n\gamma_1$ can be identified. For the order $_2{}^nU_i, R_1, R_2$ and $_2{}^nU_{i+1}$ the segments are $_2{}^n\chi_{1,1}(_2{}^nU_i, R_1; P)$, $_2{}^n\chi_{1,2}(R_1, R_2; P)$ and $_2{}^n\chi_{1,3}(R_2, _2{}^nU_{i+1}; P)$. For the reverse situation the order of the points is $_2{}^nU_i, R_1, R_2$ and $_2{}^nU_{i+1}$ and the three segments are $_2{}^n\chi_{1,1}(_2{}^nU_i, R_2; P)$, $_2{}^n\chi_{1,2}(R_2, R_1; P)$ and $_2{}^n\chi_{1,3}(R_1, _2{}^nU_{i+1}; P)$. This can be seen by comparing FIG. 19 and FIG. 21.

Once the segments for an edge are known, the segments that are removed and the segments that remain are determined by using the points $_1{}^nU_i$ and $_2{}^nU_i$ in the Vertex Inside Algorithm (Hoffman, 1987). Consider the point $_1{}^nU_i$ shown in FIG. 22. Extend a line $_1{}^n\Lambda_i$ from the point $_1{}^nU_i$ through an arbitrarily chosen point $\Lambda_{p1}$. The equation of the line $_1{}^n\Lambda_i$ in the (x, y) coordinate system is then determined from the points $_1{}^nU_i$ and $\Lambda_{p1}$. The intersections $_1{}^nI_i$, $i=1, 2, 3, \ldots I_i$, of this line $_1{}^n\Lambda_i$ and all the curves $_2{}^n\gamma_i=1, 2, 3, 4, 5$, of the intersecting profile $_2{}^nS_o(P)$, $\sigma=C$ or $I$, are then obtained. Note that the intersection of the line $_1{}^n\Lambda_i$ with the edge $_2{}^n\gamma_1$ is similar to the combination $C_1$, and can be determined from equations (43a) and (43b). Similarly, when the line $_1{}^n\Lambda_1$ intersects a circular arc $_2{}^n\gamma_2, _2{}^n\gamma_3$ or $_2{}^n\gamma_4$, the intersection is similar to the combination $C_2$. When it intersects a quadric curve $_2{}^n\gamma_5$, it is similar to the combination $C_3$. The combinations $C_2$ and $C_3$ are explained in the following sections. If the number of intersections $_1{}^nI_1$ is odd, then the point $_1{}^nU_i$ is inside the intersecting profile $_2{}^nS_o(P)$; otherwise it is outside. Referring to FIG. 19, it is seen that the point $_1{}^nU_i$ is inside the intersecting cavity $_2{}^nS_C(P)$, whereas in FIG. 21 the point: $_1{}^nU_i$ is outside the intersecting cavity. The terminating point $_1{}^nU_{i+1}$ is also evaluated with this algorithm to determine if it is inside or outside the intersecting profile $_2{}^nS_o(P)$ in the same manner. If both points $_1{}^nU_i$ and $_1{}^nU_{i+1}$ are inside the intersecting profile (see FIG. 25), then the segment $_1{}^n\gamma_1$ is removed. The method described above for the starting point $_1{}^nU_i$ is also applicable to the points $_2{}^nU_i$ and $_2{}^nU_{i+1}$ of the edge $_2{}^n\gamma_1$.

If the starting point $U_i$ of an edge $\gamma_1$ is within the intersecting profile, then the odd segments $\chi_{1,1}, \chi_{1,3}, \chi_{1,5}, \ldots$ are removed; otherwise the even segments $\chi_{1,2}, \chi_{1,4}, \chi_{1,6}, \ldots$ are removed. Referring to FIG. 19, the edges $_1{}^n\gamma_1(U_i, U_{i+1}; P)$ and $_2{}^n\gamma_1(U_i, U_{i+1}; P)$ are subdivided into segments $_1{}^n\chi_{1,1}(U_i, R_1; P)$ and $_1{}^n\chi_{1,2}(R_1, U_{i+1}; P)$ and into $_2{}^n\chi_{1,1}(U_i, R_1; P), _2{}^n\chi_{1,2}(R_1, R_2; P)$ and $_2{}^n\chi_{1,3}(R_2, U_{i+1}; P)$, respectively. It is known that the point $_1{}^nU_i$ is inside the cavity $_2{}^nS_C(P)$. Therefore, the odd segment of the edge $_1{}^n\gamma_1(U_i, U_{i+1}; P)$, that is, $_1^n\chi_{1,1}(U_i, R_1; P)$, is removed and the even segment $_1^n\chi_{1,2}(R_1, U_{i+1}; P)$ remains. However, the end point $_2^nU_i$ is outside the cavity $_1^nS_C(P)$ and, therefore, the even segment of the edge $_2^n\gamma_1(U_i, U_{i+1}; P)$, that is, $_2^n\chi_{1,2}(R_1, R_2; P)$, is removed. The edges $_1^n\gamma_1(U_i, U_{i+1}; P)$ and $_2^n\gamma_1(U_i, U_{i+1}; P)$ then become a collection of line segments that are given by $$_1^n\gamma_1(U_i, U_{i+1}; P) = {}_1^n\chi_{1,2}(R_1, U_{i+1}; P) \tag{45a}$$

$$_1^n\gamma_1(U_i, U_{i+1}; P) = {}_2^n\chi_{1,1}(U_i, R_1; P) + {}_2^n\chi_{1,3}(R_2, U_{i+1}; P) \tag{45b}$$

However, as shown in FIG. 20, only the edge $_2^n\gamma_1(U_i, U_{i+1}; P)$, which belongs to the island profile $_2^nS_1(P)$, is considered. In this case the edge $_1^n\gamma_1(U_i, U_{i+1}; P)$ is not considered and the edge $_2^n\gamma_1(U_i, U_{i+1}; P)$ is given by equation (4.5b).

Figure 21:
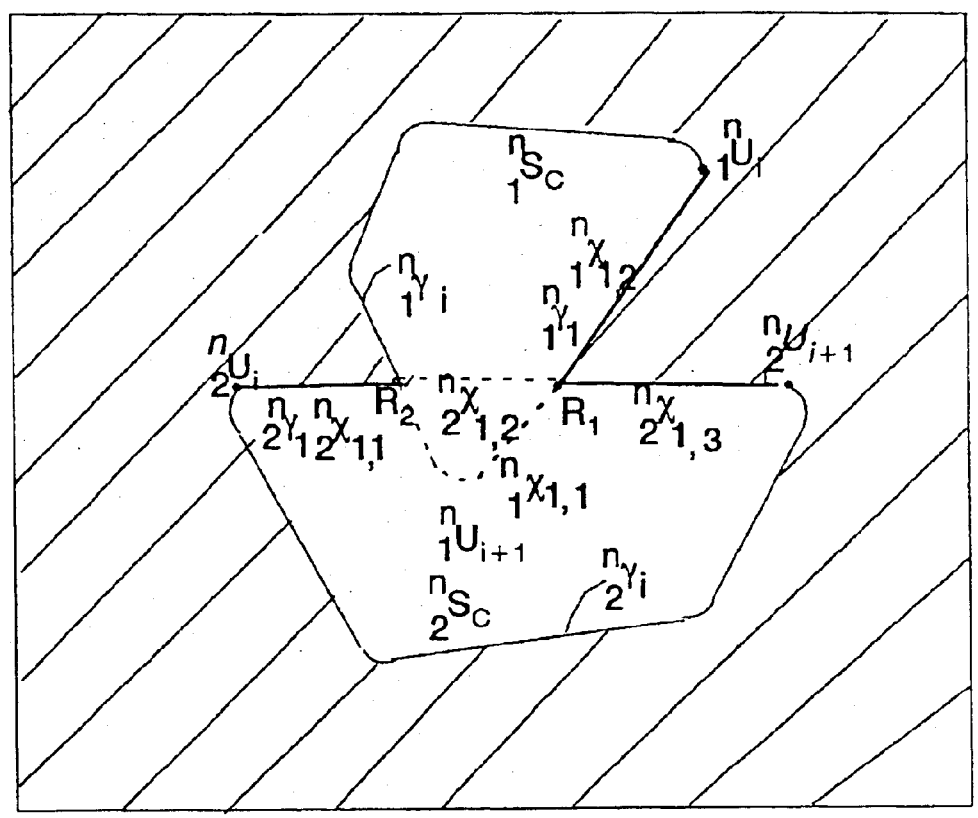
FIG. 21 shows a cavity profile intersects with another cavity profile when the respective starting end points and of the two edges and are outside the intersecting cavities.
Figure 22:
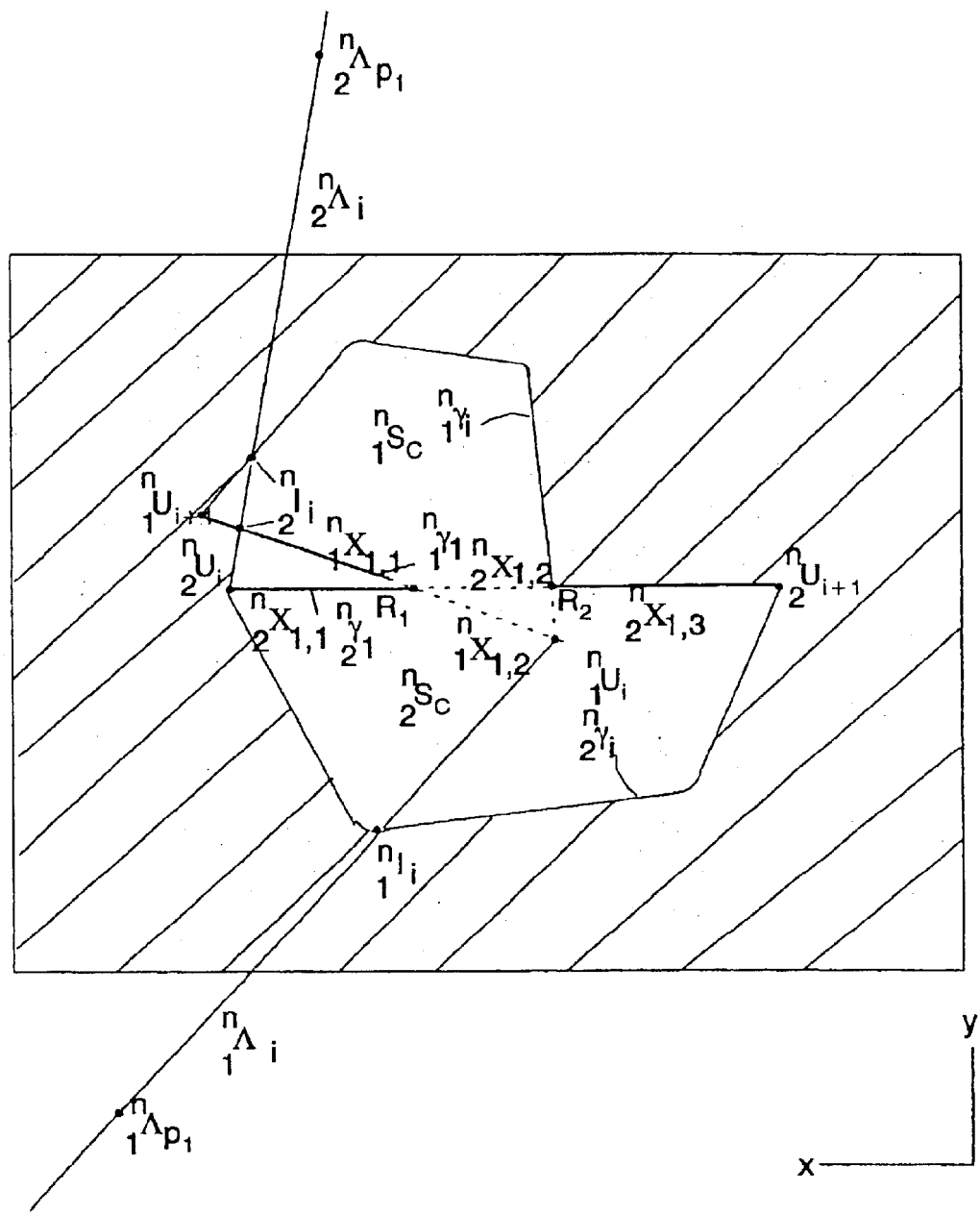
FIG. 22 illustration the Vertex Inside Algorithm using semi-infinite lines.

Referring to FIG. 21, the edges $_1^n\gamma_1(U_i, U_{i+1}; P)$ and $_2^n\gamma_1(U_i, U_{i+1}; P)$ are subdivided into segments $_1^n\chi_{1,1}(U_i, R_1; P)$ and $_1^n\chi_{1,2}(R_1, U_{i+1}; P)$ and into $_2^n\chi_{1,1}(U_i, R_2; P)$, $_2^n\chi_{1,2}(R_2, R_1; P)$ and $_2^n\chi_{1,3}(R_1, U_{i+1}; P)$, respectively. It can be seen that the points, $_1^nU_i$ and $_2^nU_i$ of the two edges are outside their respective intersecting cavities $_2^nS_C(P)$ and $_1^nS_C(P)$. Therefore, the even segment of both edges, $_1^n\chi_{1,2}(R_1, U_{i+1}; P)$ and $_2^n\chi_{1,2}(R_2, R_1; P)$, are removed and the edges are given as the collection of odd segments only. We can, therefore, write that $$_1^n\gamma_1(U_i, U_{i+1}; P) = {}_1^n\chi_{1,1}(U_i, R_1; P) \tag{4.5c}$$

$$_2^n\gamma_1(U_i, U_{i+1}; P) = {}_2^n\chi_{1,1}(U_i, R_2; P) + {}_2^n\chi_{1,3}(R_1, U_{i+1}; P) \tag{4.5d}$$

Figure 23:
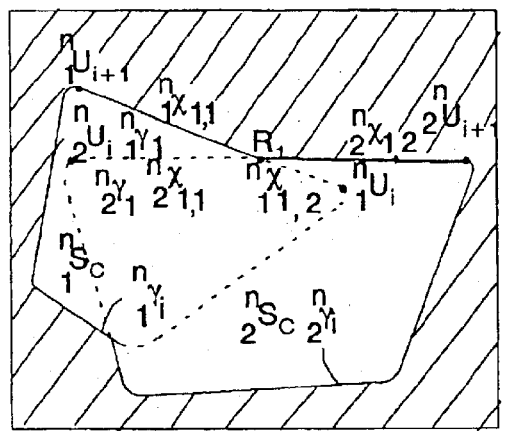
FIG. 23 illustrates the case of the intersection of two edges when a cavity profile intersects with another cavity profile and when the starting end points of both edges are within their respective intersecting cavities.

FIGS. 23 through 26 show some of the ways two edges $_1^n\gamma_1(U_i, U_{i+1}; P)$ and $_2^n\gamma_1(U_i, U_{i+1}; P)$ may intersect. FIG. 23 shows that both the edges $_1^n\gamma_1(U_i, U_{i+1}; P)$ and $_2^n\gamma_1(U_i, U_{i+1}; P)$ have only one intersection point $R_1$ and the points $_1^nU_i$ and $_2^nU_i$ are inside the intersecting cavities. These edges are therefore given by $$_1^n\gamma_1(U_i, U_{i+1}; P) = {}_1^n\chi_{1,2}(R_1, U_{i+1}; P) \tag{4.5e}$$

$$_2^n\gamma_1(U_i, U_{i+1}; P) = {}_2^n\chi_{1,2}(R_1, U_{i+1}; P) \tag{4.5f}$$

Figure 24:
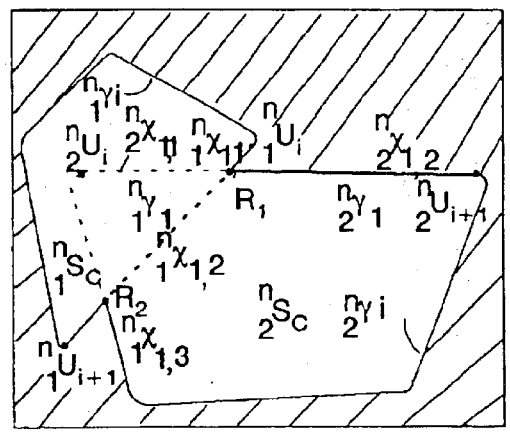
FIG. 24 illustrates the case of the intersection of two edges when a cavity profile intersects with another cavity profile and when the starting end point of one edge and the final end point of the other edge are within their respective intersecting cavities.

FIG. 24 illustrates that the point $_2^nU_i$ of the edge $_2^n\gamma_1(U_i, U_{i+1}; P)$ is inside the intersecting cavity $_1^nS_C(P)$, whereas the point $_1^nU_i$ of the edge $_1^n\gamma_1(U_i, U_{i+1}; P)$ is outside the intersecting profile $_2^nS_C(P)$. The edge $_1^n\gamma_1(U_i, U_{i+1}; P)$ has two intersecting points $R_1$ and $R_2$ and three segments, whereas the edge $_2^n\gamma_1(U_i, U_{i+1}; P)$ has only one intersecting point $R_1$ and two segments. These edges are thus given by $$_1^n\gamma_1(U_i, U_{i+1}; P) = {}_1^n\chi_{1,1}(U_i, R_1; P) + {}_1^n\chi_{1,3}(R_2, U_{i+1}; P) \tag{4.5g}$$

$$_2^n\gamma_1(U_i, U_{i+1}; P) = {}_2^n\chi_{1,2}(R_2, U_{i+1}; P) \tag{4.5h}$$

Figure 25:
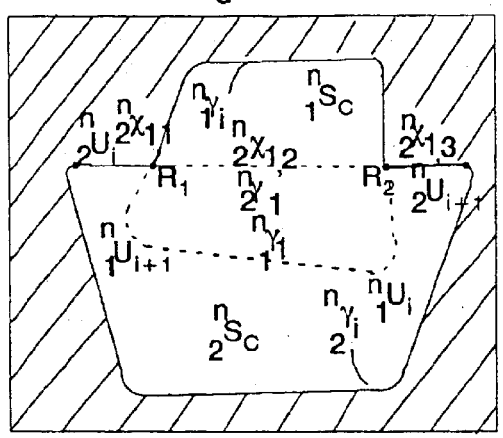
FIG. 25 illustrates the case of the intersection of two edges when a cavity profile intersects with another cavity profile and when both end points of an edge are inside the intersecting cavity.

FIG. 25 shows that the edges $_1^n\gamma_1(U_i, U_{i+1}; P)$ and $_2^n\gamma_1(U_i, U_{i+1}; P)$ do not intersect, however, The edge $_2^n\gamma_1(U_i, U_{i+1}; P)$ has both its end points $_1^nU_i$ and $_1^nU_{i+1}$ within the intersecting cavity $_2^nS_C(P)$. The edge $_2^n\gamma_1(U_i, U_{i+1}; P)$ intersects with other curves of the cavity $_1^nS_C(P)$ and has two intersection points $R_1$ and $R_2$. In this case, the edge $_1^n\gamma_1(U_i, U_{i+1}; P)$ is completely removed and the edge $_2^n\gamma_1(U_i, U_{i+1}; P)$ is given by $$_2^n\gamma_1(U_i, U_{i+1}; P) = {}_2^n\chi_{1,1}(U_i, R_2; P) + {}_2^n\chi_{1,3}(R_1, U_{i+1}; P) \tag{4.5i}$$

Figure 26:
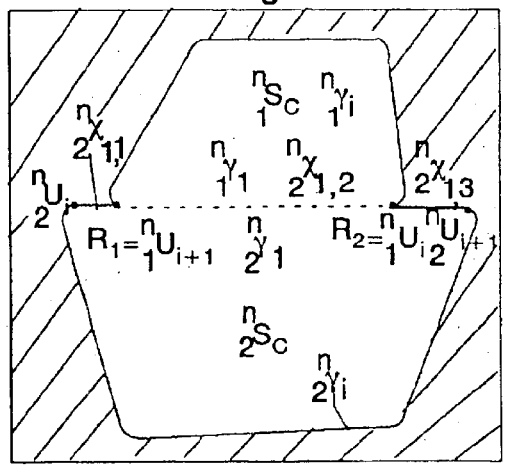
FIG. 26 illustrates the, case of the intersection of two edges when a cavity profile intersects with another cavity profile and when both edges coincide.

Another combination of $C_1$ is the case in which the edge $_1^n\gamma_1(U_i, U_{i+1}; P)$ is completely removed. This occurs when the two edges $(U_i, U_{i+1}; P)$ and $_2^n\gamma_1(U_i, U_{i+1}; P)$ coincide with each other as shown in FIG. 26. For this case the matrices $_1^nT_j = {}_2^nT_j$ and the intersection points are $R_1 = {}_1^nU_i$ and $R_2 = {}_1^nU_{i+1}$ which are obtained from intersection of the edge $_2^n\gamma_1(U_i, U_{i+1}; P)$ with other curves of the cavity $_2^nS_C(P)$. Thus the edge $_2^n\gamma_1(U_i, U_{i+1}; P)$ is also given by equation (4.5i).

It can be seen that there are two classes of intersections for $C_1$. For the first class the point $U_i$ is inside the intersecting cavity and for the second class the point $U_i$ is outside the intersecting cavity. Thus two general expressions for these two classes can be written as follows.

A general expression for an edge $_v^n\gamma_1(U_i, U_{i+1}; P)$ whose point $U_i$ is inside the intersecting profiles and is subdivided into the segments $_u^n\chi_{1,1}(\hat{U}_{i-1}, \hat{U}_i; P)$, $i=1, 2, \ldots, N_{se}$, is given by $$_v^n\gamma_1(U_i, U_{i+1}; P) = \sum_{r=1}^{\tilde{N}_{se}} {}_v^n\chi_{1,2r}(\hat{U}_{2r-1}, \hat{U}_{2r}; P) \tag{4.6a}$$

where $\tilde{N}_{se} = N_{se}/2$ if $N_{se}$ is even and $\tilde{N}_{se} = (N_{se}-1)/2$ if $N_{se}$ is odd. $N_{se}$ is the number of segments the edge $_v^n\gamma_1(U_i, U_{i+1}; P)$ is subdivided into, such that $N_{se} = N_{pe}+1$, where $N_{pe}$ is total number of intersection points for the straight edge. Furthermore, $\hat{U}_0 = U_i$, $\hat{U}_{N_{se}} = U_{i+1}$ and $\hat{U}_t = R_t$, $t=1, 2, \ldots, N_{pe}$.

The general expression for an edge $_v^n\gamma_1(U_i, U_{i+1}; P)$ whose point $U_i$ is outside the intersecting profiles and is subdivided into the segments $_u^n\chi_{1,1}(\hat{U}_{i-1}, \hat{U}_i; P)$, $i=1, 2, \ldots, N_{se}$ is given by $$_v^n\gamma_1(U_i, U_{i+1}; P) = \sum_{r=1}^{\tilde{N}_{se}} {}_v^n\chi_{1,2r-1}(\hat{U}_{2r-2}, \hat{U}_{2r-1}; P) \tag{4.6b}$$

where $\tilde{N}_{se} = N_{se}/2$ if $N_{se}$ is even and $\tilde{N}_{se} = (N_{se}+1)/2$ if $N_{se}$ is odd.

The combination $C_2$ denotes intersections between a straight edge $\gamma_1$ and a second order quadric curve $\gamma_5$. The implicit expressions for the straight edge $_1^n\gamma_1(U_i, U_{i+1}; P)$ and a quadric curve $_2^n\gamma_5(U_i, U_{i+1}; P)$ on face n in the (x, y) coordinate system are given by $$_1^n\gamma_1(U_i, U_{i+1}; P) = 2 {}_1^nG_j x + 2 {}_1^nH_j y + {}_1^nK_j = 0 \tag{4.7a}$$

$$_2^n\gamma_5(U_i, U_{i+1}; P) = {}_2^nA_j x^2 + {}_2^nB_j y^2 + 2 {}_2^nD_j xy + 2 {}_2^n\tilde{G}_j x + 2 {}_2^n\tilde{H}_j y + {}_2^n\tilde{K}_j \tag{4.7b}$$

We introduce the following parametrization for equation (4.7a):

$$x = 2 {}_1^nH_j t + {}_1^nG_j \zeta \tag{4.8a}$$

$$y = -2 {}_1^nG_j t + {}_1^nH_j \zeta \tag{4.8b}$$

where $$\zeta = -{}_1^nK_j/(2 {}_1^nG_j^2 + 2 {}_1^nH_j^2) \tag{4.8c}$$

Substituting equations (4.8a) and (4.8b) into the equation (4.7b) yields the following quadratic equation in t:

$$\delta_1 t^2 + \delta_2 t + \delta_3 = 0 \tag{4.9}$$

where, $$\delta_1 = 4 {}_2^nA_{j1} {}^nH_j^2 + 4 {}_2^nB_{j1} {}^nG_j^2 - 8 {}_2^nD_{j1} {}^nG_j {}^nH_j$$

$$\delta_2 = 4 {}_2^nA_{j1} {}^nG_j {}^nH_j \zeta - 4 {}_2^nB_{j1} {}^nG_j {}^nH_j \zeta - 4 {}_2^nD_{j1} {}^nG^2 \zeta + 4 {}_2^nD_{j1} {}^nH_j^2 \zeta + 4 {}_2^n\tilde{G}_{j1} {}^nH_j - 4 {}_2^n\tilde{H}_{j1} {}^nG_j$$

$$\delta_3 = {}_2^nA_{j1} {}^nG_j^2 \zeta^2 + {}_2^nB_{j1} {}^nH_j^2 \zeta^2 + 2 {}_2^nD_{j1} {}^nG_j {}^nH_j \zeta^2 + 2 {}_2^n\tilde{G}_{j1} {}^nG_j \zeta + 2 {}_2^n\tilde{H}_{j1} {}^nH_j \zeta + {}_2^n\tilde{K}_j$$

Solving for t in equation (4.9) gives the values $t_1$ and $t_2$. The straight edge $_1^n\gamma_1(U_i, U_{i+1}; P)$ and the quadric curve $_2^n\gamma_5(U_i,$ $U_{i+1}$; P) do not intersect if $(\delta_2^2-4\delta_1\delta_3)<0$. Furthermore, there is only one intersection point if $(\delta_2^2-4\delta_1\delta_3)=0$. When $(\delta_2^2-4\delta_1\delta_3)>0$ the intersection points are $R_1=(x_{q1}, y_{q1})$ and $R_2=(x_{q2}, y_{q2})$, where the coordinates $(x_{q1}, y_{q1})$ and $(x_{q2}, y_{q2})$ are obtained by substituting $i=t_1$ and $t=t_2$, respectively, into equations (4.8a) and (4.8b), provided that $0 \leq t_1 \leq 1$ and $0 \leq t_2 \leq 1$. If $t_1$ and $t_2$ are outside their respective regions the roots are rejected, since such points will not lie between $U_i$ and $U_{i+1}$ on the edge $_1{}^n\gamma_1(U_i, U_{i+1}; P)$.

Figure 27:
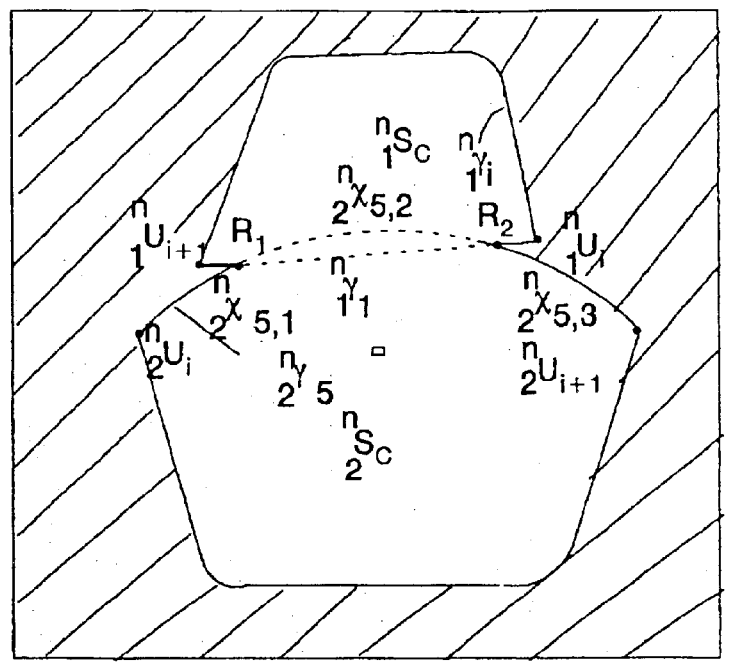
FIG. 27 shows the intersection of a straight edge and a quadric curve.

Referring to FIGS. 27, it is seen that an edge $_1{}^n\gamma_1(U_i, U_{i+1}; P)$ intersects a quadric curve $_2{}^n\gamma_5(U_i, U_{i+1}; P)$ and generates two intersection points $R_1$ and $R_2$. Thus, the edge is segmented into $_1{}^n\chi_{1,1}(U_i, R_1; P)$, $_1{}^n\chi_{1,2}(R_1, R_2; P)$ and $_1{}^n\chi_{1,3}(R_2, U_{i+1}; P)$. Similarly the quadric curve is segmented into $_2{}^n\chi_{5,1}(U_i, R_1; P)$, $_2{}^n\chi_{5,2}(R_1, R_2; P)$ and $_2{}^n\chi_{5,3}(R_2, U_{i+1}; P)$. It can be seen that the point $_1{}^nU_i$ of the edge is outside the intersecting cavity $_2{}^nS_C(P)$. Similarly the point $_2{}^nU_i$ of the quadric curve is outside the intersecting cavity $_1{}^nS_C(P)$. This is determined using the Vertex Inside algorithm described in the previous section. Hence, the straight edge $_1{}^n\gamma_1(U_i, U_{i+1}; P)$ and the quadric curve $_2{}^n\gamma_1(U_i, U_{i+1}; P)$ are given by, respectively, $$_1{}^n\gamma_1(U_i, U_{i+1}; P)=_1{}^n\chi_{1,1}(U_i, R_1; P)+_1{}^n\chi_{1,3}(R_2, U_{i+1}; P) \quad (4.10a)$$

$$_2{}^n\gamma_5(U_i, U_{i+1}; P)=_2{}^n\chi_{5,1}(U_i, R_1; P)+_2{}^n\chi_{5,3}(R_2, U_{i+1}; P) \quad (4.10b)$$

A general expression for a straight edge $_v{}^nK_1(U_i, U_{i+1}; P)$ that is subdivided into segments $_u{}^n\chi_{1,1}(\tilde{U}_{i-1}, \tilde{U}_i; P)$, $i=1, 2, \ldots, N_{se}$, is given by equation (4.6). It can be seen that there are two classes of intersections for $C_2$. For the first class the point $U_i$ of the quadric curve $_2{}^n\gamma_5(U_i, U_{i+1}; P)$ is inside the intersecting cavity, and for the second class the point $U_i$ of the quadric curve is outside the intersecting cavity. These two general expressions for these two classes can be written as follows.

A general expression for a quadric curve $_v{}^n\gamma_5(U_i, U_{i+1}; P)$, whose point $U_i$ is inside the intersecting profiles and is subdivided into the segments $_u{}^n\chi_{5,1}(\hat{U}_{i-1}, \hat{U}_i; P)$, $i=1, 2, \ldots, N_{sq}$, is given by $$_v^n\gamma_5(U_i, U_{i+1}; P) = \sum_{r=1}^{\tilde{N}_{sq}} {_v^n\chi_{5,2r}(\hat{U}_{2r-1}, \hat{U}_{2r}; P)} \quad (4.11a)$$

$$v = 1, 2$$

where $\tilde{N}_{sq}=N_{sq}/2$ if $N_{sq}$ is even and $\tilde{N}_{sq}=(N_{sq}-1)/2$ if $N_{sq}$ is odd. $N_{sq}$ is the number of segments the quadric curve $_v{}^n\gamma_5(U_i, U_{i+1}; P)$ is subdivided into, such that $N_{sq}=N_{pq+1}$ where $N_{pq}$ is total number of intersection points for the quadric curve. Furthermore, $\hat{U}_0U_i$, $\hat{U}_{N_{sq}}=U_{i+1}$ and $\hat{U}_t=R_t$, $t=1, 2, \ldots, N_{pq}$.

The general expression for a quadric curve $_v{}^n\gamma_5(U_i, U_{i+1}; P)$, whose point $U_i$ is outside the intersecting profiles and is subdivided into the segments $_u{}^n\chi_{5,1}(\hat{U}_{i-1}, \hat{U}_i; P)$, $i=1, 2, \ldots, N_{sq}$, is given by $$_v^n\gamma_5(U_i, U_{i+1}; P) = \sum_{r=1}^{\tilde{N}_{sq}} {_v^n\chi_{5,2r-1}(\hat{U}_{2r-2}, \hat{U}_{2r-1}; P)} \quad (4.11b)$$

$$v = 1, 2$$

where $\tilde{N}_{sq}=N_{sq}/2$ if $N_{sq}$ is even and $\tilde{N}_{sq}=(N_{sq}+1)/2$ if $N_{sq}$ is, odd.

Figure 28:
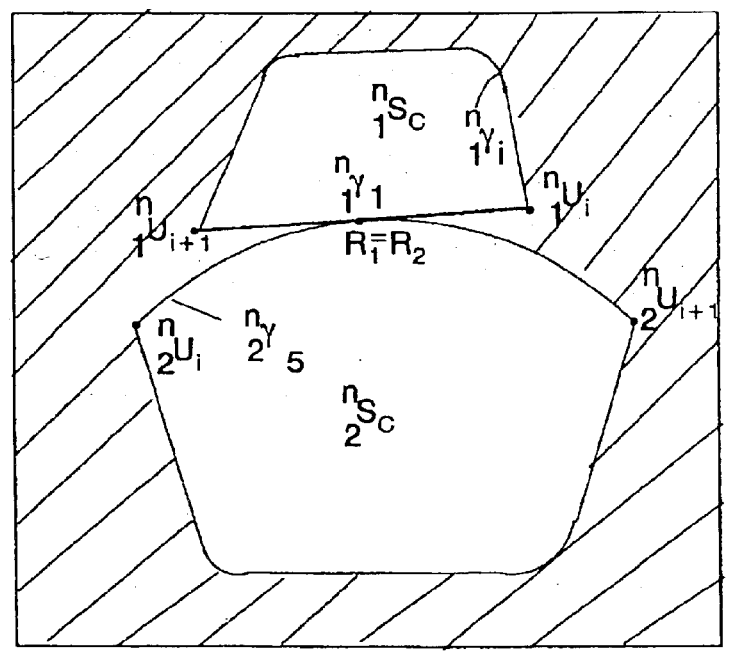
FIG. 28 shows the intersection of a straight edge and a quadric curve for the case when the straight edge is tangential to the quadric curve.

The special case when the straight edge $_1{}^n\gamma_1(U_i, U_{i+1}; P)$ is tangential to the quadric curve $_2{}^n\gamma_5(U_i, U_{i+1}; P)$ is shown in FIG. 28. In this case $R_1=R_2$ and equation (4.11) still holds; however, the segment $_2{}^n\chi_{5,2}(R_1, R_2; P)$ is removed from equation (4.11).

The combination $C_3$ denotes intersections between a straight edge $\gamma_1$ and one of the circular arcs $\gamma_{k+1}$, $k=1, 2, 3$. The combination $C_3$ is treated similarly to the combination $C_2$ discussed above. The implicit expressions for the edge $_1{}^n\gamma_1(U_i, U_{i+1}; P)$ and a circular arc $_2{}^n\gamma_{k+1}(U_i, U_{i+1}; P)$, $k=1, 2, 3$ on face n in the (x, y) coordinate system are given by $$_1{}^n\gamma_1(U_i, U_{i+1}; P)=2_1{}^nG_jx+2_1{}^nH_jy+_1{}^nK_j=0 \quad (4.12a)$$

$$_2{}^n\gamma_{k+1}(U_i, U_{i+1}; P)=x^2+y^2+2_2{}^nG_{jk}x+2_2{}^nH_{jk}y+2_2{}^nK_{jkp}=0 \quad (4.12b)$$

Substituting the equations (4.8a) and (4.8b) into equation (4.12b), results in equation (4.9) where now $\delta_1$, $\delta_2$ and $\delta_3$ are given by $$\delta_1=4_1{}^nH_j^2+4_1{}^nG_j^2$$

$$\delta_2=4_2{}^nG_{jk1}{}^nH_j-4_2{}^nH_{jk1}{}^nG_j$$

$$\delta_3=_1{}^nG_j^2\zeta^2+_1{}^nH_j^2\zeta^2+2_2{}^nG_{jk1}{}^nG_j\zeta+2_2{}^nH_{jk1}{}^nH_j\zeta+_2{}^nK_{jk}$$

Solving for t in equation (4.9) yields the roots $t_1$ and $t_2$. The straight edge $_1{}^n\gamma_1(U_i, U_{i+1}; P)$ and the circular arc $_2{}^n\gamma_{k+1}(U_i, U_{i+1}; P)$, $k=1, 2, 3$, do not intersect if $(\delta_2^2-4\delta_1\delta_3)<0$. Furthermore, there is only one intersection point if $(\delta_2^2-4\delta_1\delta_3)=0$. When $(\delta_2^2-4\delta_1\delta_3)>0$ the intersection points are $R_1=(x_{g1}, y_{g1})$ and $R_2=(x_{g2}, y_{g2})$, where the coordinates $(x_{g1}, y_{g1})$ and $(x_{g2}, y_{g2})$ are obtained by substituting $t=t_1$ and $t=t_2$, respectively, into equations (4.8a) and (4.8b), provided $0 \leq t_1 \leq 1$ and $0 \leq t_2 \leq 1$. If $t_1$ and $t_2$ are outside their respective regions the roots are rejected, since such points will not lie between $U_i$ and $U_{i+1}$ on the edge $_1{}^n\gamma_1(U_i, U_{i+1}; P)$.

A general expression for a straight edge $_1{}^n\gamma_1(U_i, U_{i+1}; P)$ that is subdivided into segments $_u{}^n\chi_{1,1}(\tilde{U}_{i-1}, \tilde{U}_i; P)$, $i=1, 2, \ldots, N_{se}$, is given by equation (4.6). It can be seen that there are two classes of intersections for $C_3$. For the first class the point $U_i$ of one of the circular arcs $_2{}^n\gamma_{k1}(U_i, U_{i+1}; P)$ is inside the intersecting cavity, and for the second class the point $U_i$ is outside the intersecting cavity. Thus two general expressions for the above two classes can be written as follows.

A general expression for a circular arc $_v{}^n\gamma_{k+1}(U_i, U_{i+1}; P)$, whose point $U_i$ is inside the intersecting profile and is subdivided into the segments $_u{}^n\chi_{k+1,1}(\hat{U}_{i-1}, \hat{U}_i; P)$, $i=1, 2, \ldots, N_{sg}$, is given by $$_v^n\gamma_{k+1}(U_i, U_{i+1}; P) = \sum_{r=1}^{\tilde{N}_{sg}} {_v^n\chi_{k+1,2r}(\hat{U}_{2r-1}, \hat{U}_{2r}; P)} \quad (4.13a)$$

$$v = 1, 2$$

$$k = 1, 2, 3$$

where $\tilde{N}_{sg}=N_{sg}/2$ if $N_{sg}$ is even and $\tilde{N}_{sg}=(N_{sg}-1)/2$ if $N_{sg}$ is odd. $N_{sg}$ is the number of segments the circular arc $_v{}^n\gamma_{k+1}(U_i, U_{i+1}; P)$ is subdivided into, such that $N_{sg}=N_{pg+1}$, where $N_{pg}$ is total number of intersection points for the circular arc. Furthermore, $\hat{U}_0=U_i$, $\hat{U}_{N_{sg}}=U_{i+1}$ and $\hat{U}_t=R_t$, $t=1, 2, \ldots, N_{pg}$.

The general expression for a circular arc $_v{}^n\gamma_{k+1}(U_i, U_{i+1}; P)$, whose point $U_i$ is outside the intersecting profiles and is subdivided into the segments $_u{}^n\chi_{k+1,1}(\tilde{U}_{i-1}, \tilde{U}_i; P)$, i=1, 2, ..., $N_{sg}$, is given by $$_v^n\gamma_{k+1}(U_i, U_{i+1}; P) = \sum_{r=1}^{\tilde{N}_{sg}} {}_v^n\chi_{k+1,2r-1}(\hat{U}_{2r-2}, \hat{U}_{2r-1}; P) \quad (4.13b)$$

$$v = 1, 2$$

$$k = 1, 2, 3$$

where $\tilde{N}_{sg}=N_{sg}/2$ if $N_{sg}$ is even and $\tilde{N}_{sg}=(N_{sg}+1)/2$ if $N_{sg}$ is odd.

The combination $C_4$ denotes the intersections of a quadric curve ${}_1^n\gamma_5(U_i, U_{i+1}; P)$ with one of the circular arcs ${}_2^n\gamma_{k+1}(U_i, U_{i+1}; P)$, k1, 2, 3. To determine whether or not these two curves intersect we use Sylvester's determinant. The implicit forms foe the quadric curve ${}_1^n\gamma_5(U_i, U_{i+1}; P)$ and the circular arc ${}_2^n\gamma_{k+1}(U_i, U_{i+1}; P)$ are given by, respectively, $${}_1^n\gamma_5(U_i, U_{i+1}; P) = {}_1^nB_jy^2+[2{}_1^nD_jx+2{}_1^n\tilde{H}_j]y+[{}_1^nA_jx^2+2{}_1^n\tilde{G}_jx+{}_1^n\tilde{K}_j]=0 \quad (414a)$$

$${}_2^n\gamma_{k+1}(U_i, U_{i+1}; P) = y^2+2{}_2^nH_{jk}y+[x^2+2{}_2^nG_{jk}x+2{}_2^nK_{jk}]=0 \quad (4.14b)$$

The determinant of Sylvestes matrix [Hoffman, 1989] for the above equations is $$(4.15)$$

$$|R_x|_4 = \begin{vmatrix} {}_1^nB_j & 2{}_1^nD_jx+2{}_1^n\tilde{H}_j & {}_1^nA_jx^2+2{}_1^n\tilde{G}_jx+{}_1^n\tilde{K}_j & 0 \\ 0 & {}_1^nB_j & 2{}_1^nD_jx+2{}_1^n\tilde{H}_j & {}_1^nA_jx^2+2{}_1^n\tilde{G}_jx+{}_1^n\tilde{K}_j \\ 1 & 2{}_2^nH_{jk} & x^2+2{}_2^nG_{jk}x+{}_2^nK_{jk} & 0 \\ 0 & 1 & 2{}_2^nH_{jk} & x^2+2{}_2^nG_{jk}x+{}_2^nK_{jk} \end{vmatrix}$$

The determinant $|R_x|_4$ vanishes when the two polynomials given by equations (4.14a) and (4.14b) have common roots; that is, when the quadric curve ${}_1^n\gamma_5(U_i, U_{i+1}; P)$ intersects the circular arc ${}_2^n\gamma_{k+1}(U_i, U_{i+1}; P)$.

The coordinates of the point $U_i$ are $(x_i, y_i)$ and that of point $U_{i+1}$ are $(x_{i+1}, y_{i+1})$ in the (x, y) system. The value of $|R_x|_4$ given by equation (4.15) is calculated at $x=x_i$ and its sign is noted. Then x is increased by a small value and the value of $|R_x|_4$ is again calculated. Any change in sign of the determinant $|R_x|_4$ indicates that $R_x$ is singular between the last value of x and the new value of x. When this is the case these two values of x are stored for use later to find the roots more exactly. If there is no sign change, x is incremented and the comparison process is repeated until the maximum value $x=x_{i+1}$ is reached. If th ere is no change in sign of $|R_x|_4$ throughout the range, then the quadric curve ${}_1^n\gamma_5(U_i, U_{i+1}; P)$ does not intersect the circular arc ${}_2^n\gamma_{k+1}(U_i, U_{i+1}; P)$. Each intersection for combination $C_4$ yields up to four intersection points $R^i$, i=1, 2, 3, 4. After the range of x has been evaluated all the intervals that indicated a sign change are re-evaluated using a standard numerical root finding procedure to determine the intersection points from equations (4.14a) and (4.14b).

Figure 29:
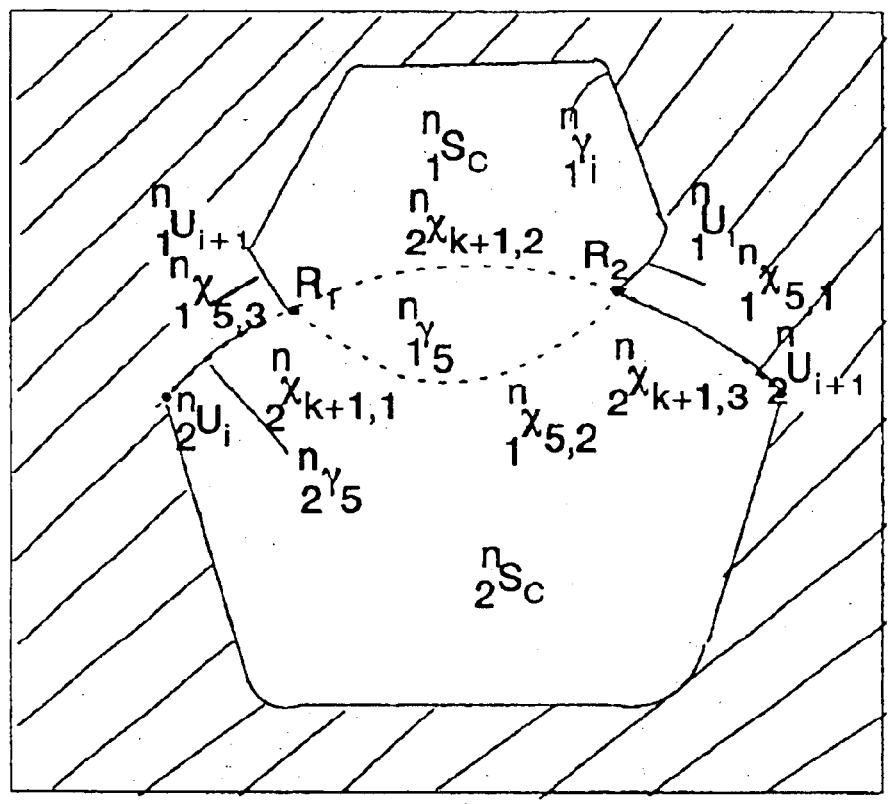
FIG. 29 shows the intersection of the quadric curve and the one of the circular arcs.

FIG. 29 shows that the intersection of the quadric curve ${}_1^n\gamma_5(U_i, U_{i+1}; P)$ with one of the circular arcs ${}_2^n\gamma_{k+1}(U_i, U_{i+1}; P)$ results in two intersection points, $R_1$ and $R_2$. FIG. 31 shows, however, a case where there are four intersection points. It should be realized that the quadric curve ${}_1^n\gamma_5(U_i, U_{i+1}; P)$ may intersect other curves ${}_2^n\gamma_i$ of the cavity profile ${}_2^nS_C(P)$, and that these intersections may yield an additional $N_{p1}$-$R_t$ intersection points. Similarly, the circular arc ${}_2^n\gamma_{k+}$ ${}_1(U_i, U_{i+1}; P)$ may intersect other curves ${}_1^n\gamma_i$, i=1, 2, 3, 4, and may have an additional $N_{p2}$-$R_t$ intersection points. This is illustrated in FIG. 30 where $R_2$ results from the intersection of the circular arc with another curve of the cavity profile ${}_1^nS_C(P)$.

The point ${}_1^nU_i$ of the quadric curve ${}_1^n\gamma_5(U_i, U_{i+1}; P)$ and the point ${}_2^nU_i$ of the circular arc ${}_2^n\gamma_{k+1}(U_i, U_{i+1}; P)$ are evaluated using the Vertex Inside algorithm to determine whether or not they are inside their respective intersecting profiles. If the point $U_i$ of either the quadric curve $\gamma_5$ or the circular arc $\gamma_{k+1}$ is within the intersecting profiles, then the odd segments $\chi_{1,1}, \chi_{1,3}, \chi_{1,5}, \ldots$ are removed, otherwise the even segments $\chi_{1,2}, \chi_{1,4}, \chi_{1,6}, \ldots$ are removed. Referring to FIG. 29, the quadric curve ${}_1^n\gamma_5(U_i, U_{i+1}; P)$ and the circular arc ${}_2^n\gamma_{k+1}(U_i, U_{i+1}; P)$ are subdivided into segments ${}_1^n\chi_{5,1}(U_{i, R2}; P)$, ${}_1^n\chi_{5,2}(R_2, R_1; P)$ and ${}_1^n\chi_{5,3}(R_1, U_{i+1}; P)$, and ${}_2^n\chi_{k+1,1}(U_i, R_1; P)$, ${}_2^n\chi_{k+1,2}(R_1, R_2; P)$ and ${}_2^n\chi_{k+1,3}(R_2, U_{i+1}; P)$, respectively. The point ${}_1^nU_i$ of the quadric curve ${}_1^n\gamma_5(U_i, U_{i+1}; P)$ is outside the intersecting cavity ${}_2^nS_C(P)$. Therefore, the even segments of the quadric curve, that is, ${}_1^n\chi_{5,2}(R_2, R_1; P)$ is removed. Similarly, the point ${}_2^nU_i$ of the circular arc ${}_2^n\gamma_{k+1}(U_i, U_{i+1}; P)$ is outside the intersecting cavity ${}_1^nS_C(P)$. Therefore, the even segments of the circular arc, that is, ${}_2^n\chi_{k+1,2}(R_1, R_2; P)$ is removed. The quadric curve and the circular arcs are then given by, respectively, $${}_1^n\gamma_5(U_i, U_{i+1}; P) = {}_1^n\chi_{5,1}(U_i, R_2; P)+{}_1^n\chi_{5,3}(R_1, U_{i+1}; P) \quad (4.16a)$$

$${}_2^n\gamma_{k+1}(U_i, U_{i+1}; P) = {}_2^n\chi_{k+1,1}(U_i, R_1; P)+{}_2^n\chi_{k+1,3}(R_2, U_{i+1}; P) k=1, 2, 3 \quad (4.16b)$$

Figure 30:
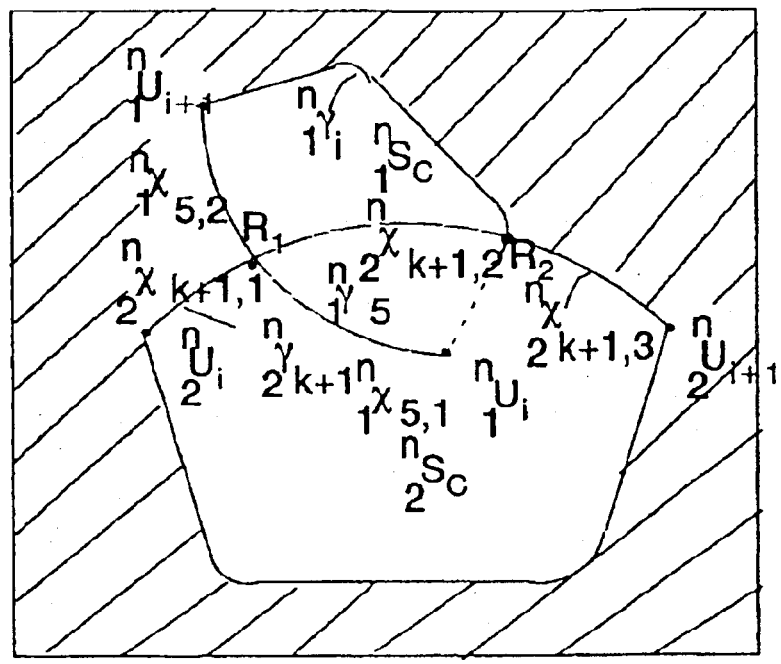
FIG. 30 shows the intersection of a circular arc of one cavity profile and a quadric curve of the other cavity profile and an intersection point results from it.
Figure 31:
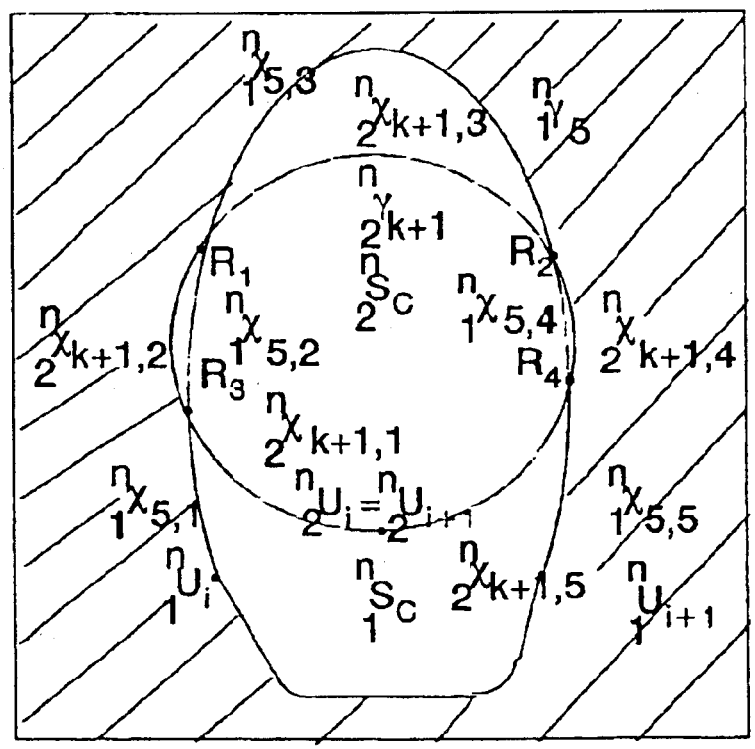
FIG. 31 shows the intersection of a circular arc of one cavity profile and a quadric curve of the other cavity profile and four intersection points result from it.

Referring to FIG. 30, the point ${}_1^nU_i$ of the quadric curve ${}_1^n\gamma_5(U_i, U_{i+1}; P)$ is inside the intersecting cavity ${}_2^nS_C(P)$ and the point ${}_2^nU_i$ of the circular arc ${}_2^n\gamma_{k+1}(U_i, U_{i+1}; P)$ is outside the intersecting cavity, ${}_1^nS_C(P)$. The quadric curve ${}_1^n\gamma5(U_i, U_{i+1}; P)$ and the circular arc ${}_2^n\gamma_{k+1}(U_i, U_{i+1}; P)$ are then given by, respectively, $${}_1^n\gamma_5(U_i, U_{i+1}; P) = {}_1^n\chi_{5,2}(R_1, U_{i+1}; P) \quad (4.16c)$$

$${}_2^n\gamma_{k+1}(U_i, U_{i+1}; P) = {}_2^n\chi_{k+1,1}(U_i, R_1; P)+{}_2^n\chi_{k+1,3}(R_2, U_{i+1}; P) k=1, 2, 3 \quad (4.16d)$$

FIG. 31 shows that there are four intersection points $R_t$, t=1, 2, 3, 4. The point ${}_1^nU_i$ of the quadric curve ${}_1^n\gamma_5(U_i, U_{i+1}; P)$ is outside the intersecting cavity ${}_2^nS_C(P)$. The quadric curve is divided into five segments ${}_1^n\chi_{5,1}(U_i, R_3; P)$, ${}_1^n\chi_{5,2}(R_3, R_1; P)$, ${}_1^n\chi_{5,3}(R_1, R_2; P)$, ${}_1^n\chi_{5,4}(R_2, R_4; P)$ and ${}_1^n\chi_{5,5}(R_4, U_{i+1}; P)$. The circular arc ${}_2^n\gamma_{k+1}(U_i, U_{i+1}; P)$ has its point ${}_2^nU_i$ inside the intersecting cavity ${}_1^nS_C(P)$ and is divided into the segments ${}_2^n\chi_{k+1,1}(U_i, R_3; P)$, ${}_2^n\chi_{k+1,2}(R_3, R_2; P)$, ${}_2^n\chi_{k+1,3}(R_1, R_2; P)$, ${}_2^n\chi_{k+1,4}(R_2, R_4; P)$ and ${}_2^n\chi_{k+1,5}(R_4, U_{i+1}; P)$. It can be seen that both the points, ${}_2^nU_i$ and ${}_2^nU_{i+1}$, of the circular arc are inside the intersecting cavity ${}_1^nS_C(P)$. This is a similar to the straight edge shown in FIG. 25, where the edge is completely removed because both of its end points are inside the intersecting cavity. However, in this case the circular arc is not removed because it satisfies the condition ${}_2^nU_i = {}_2^nU_{i+1}$. The quadric curve ${}_1^n\gamma_5(U_i, U_{i+1}; P)$ and the circular arc ${}_2^n\gamma_{k+1}(U_i, U_{i+1}; P)$ are then given by, respectively, $${}_1^n\gamma_5(U_i, U_{i+1}; P) = {}_1^n\chi_{5,1}(U_i, R_1; P)+{}_1^n\chi_{5,3}(R_1, R_2; P)+{}_1^n\chi_{5,5}(R_4, U_{i+1}; P) \quad (4.16e)$$

$${}_2^n\gamma_{k+1}(U_i, U_{i+1}; P) = {}_2^n\chi_{k+1,2}(R_3, R_1; P)+{}_2^n\chi_{k+1,4}(R_2, R_4; P) k=1, 2, 3 \quad (4.16f)$$

Figure 32:
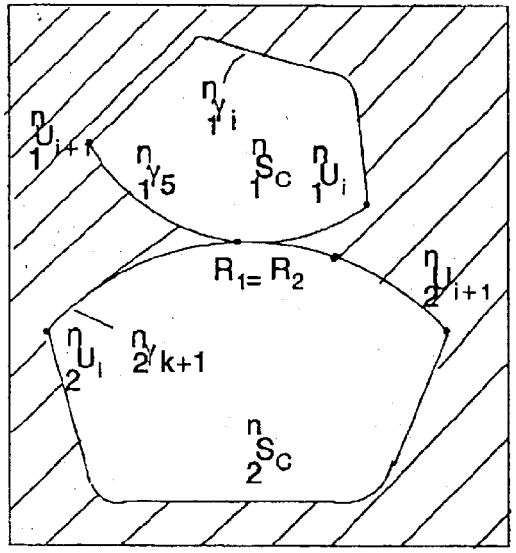
FIG. 32 shows the case when the quadric curve is tangential to the circular arc.
Figure 33:
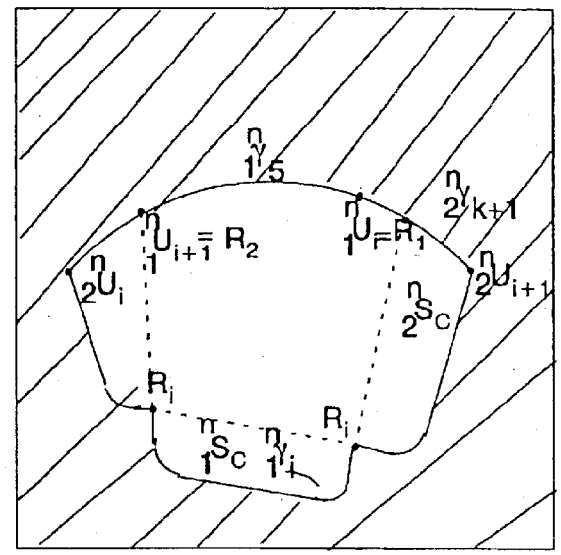
FIG. 33 shows the case when the quadric curve coincides with the circular arc.
Figure 34:
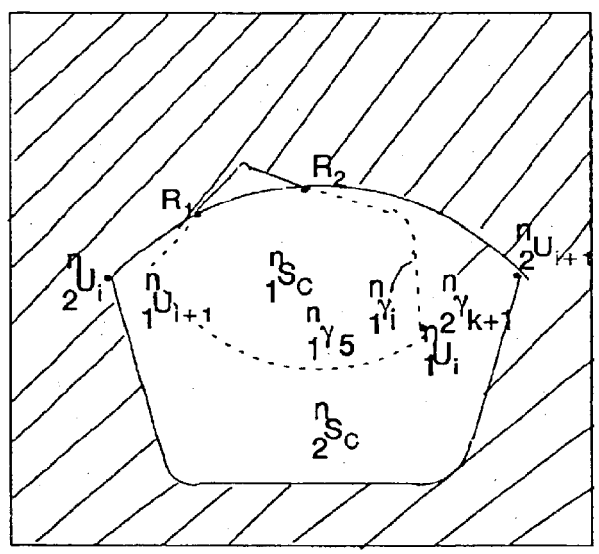
FIG. 34 shows the case when the quadric curve is completely surrounded by the intersecting cavity.

FIGS. 32 through 34 show three special cases of combination $C_4$. FIG. 32 shows the case when the quadric curve $_1{}^n\gamma_5(U_i, U_{i+1}; P)$ is tangential to one of the circular arcs $_2{}^n\gamma_{k+1}(U_i, U_{i+1}; P)$ and, therefore, $R_1=R_2$. To detect this case, the common tangent to both curves at $R_1$ is calculated. If a common tangent found, it is assumed that there are no intersection points. In FIG. 33 the quadric curve $_1{}^n\gamma_5(U_i, U_{i+1}; P)$ coincides with the circular arc $_2{}^n\gamma_{k+1}(U_i, U_{i+1}; P)$. In this case $_1{}^nT_5=_2{}^nT_{k+1}$, and it is assumed that $R_1=_1{}^nU_i$ and $R_2=_1{}^nU_{i+1}$ FIG. 34 shows the case where the quadric curve $_1{}^n\gamma_5(U_i, U_{i+1}; P)$ is completely surrounded by the intersecting cavity $_2{}^nS_C(P)$. In this case there are no intersections. However, the two points $_1{}^nU_i$ and $_1{}^nU_{i+1}$ are within the intersecting cavity $_2{}^nS_C(P)$. The quadric curve $_1{}^n\gamma_5(U_i, U_{i+1}; P)$ is removed when both of its end points are within the intersecting profile.

The combination $C_5$ denotes the intersection of two circular arcs $_1{}^n\gamma_{k+1}(U_i, U_{i+1}; P)$ and $_2{}^n\gamma_{k+1}(U_i, U_{i+1}; P)$, k=1, 2, 3. To determine whether or not these two curves intersect we use Sylvester's determinant. The implicit forms for the two arcs $_1{}^n\gamma_2(U_i, U_{i+1}; P)$ and $_2{}^n\gamma_3(U_i, U_{i+1}; P)$ are, respectively, $$_1{}^n\gamma_2(U_i, U_{i+1}; P) = y^2 + 2_1{}^nH_{jk}y + [x^2 + 2_1{}^nG_{jk}x + _1{}^nK_{jk}]0 \quad (4.17a)$$

$$_2{}^n\gamma_3(U_i, U_{i+1}; P) = y^2 + 2_2{}^nH_{jk}y + [x^2 + 2_2{}^nG_{jk}x + _2{}^nK_{jk}]0 \quad (4.17b)$$

The determinant of Sylvester's matrix for the above equations is $$|R_x|_5 = \begin{vmatrix} 1 & 2_1^nH_{jk} & x^2 + 2_1^nG_{jk}x + _1^nK_{jk} & 0 \\ 0 & 1 & 2_1^nH_{jk} & x^2 + 2_1^nG_{jk}x + _1^nK_{jk} \\ 1 & 2_2^nH_{jk} & x^2 + 2_2^nG_{jk}x + _2^nK_{jk} & 0 \\ 0 & 1 & 2_2^nH_{jk} & x^2 + 2_2^nG_{jk}x + _2^nK_{jk} \end{vmatrix} \quad (4.18)$$

The determinant $|R_x|_5$ vanishes when the two polynomials given by equations (4.17a) and (4.17b) have common roots: that is, when the circular arc $_1{}^n\gamma_2(U_i, U_{i+1}; P)$ intersects the circular arc $_2{}^n\gamma_3(U_i, U_{i+1}; P)$.

Each intersection for combination $C_5$ yields up to four intersection points $R_t$, t=1, 2, 3, 4. These intersection points are found in the same manner as those corresponding to combination $C_4$.

Figure 35:
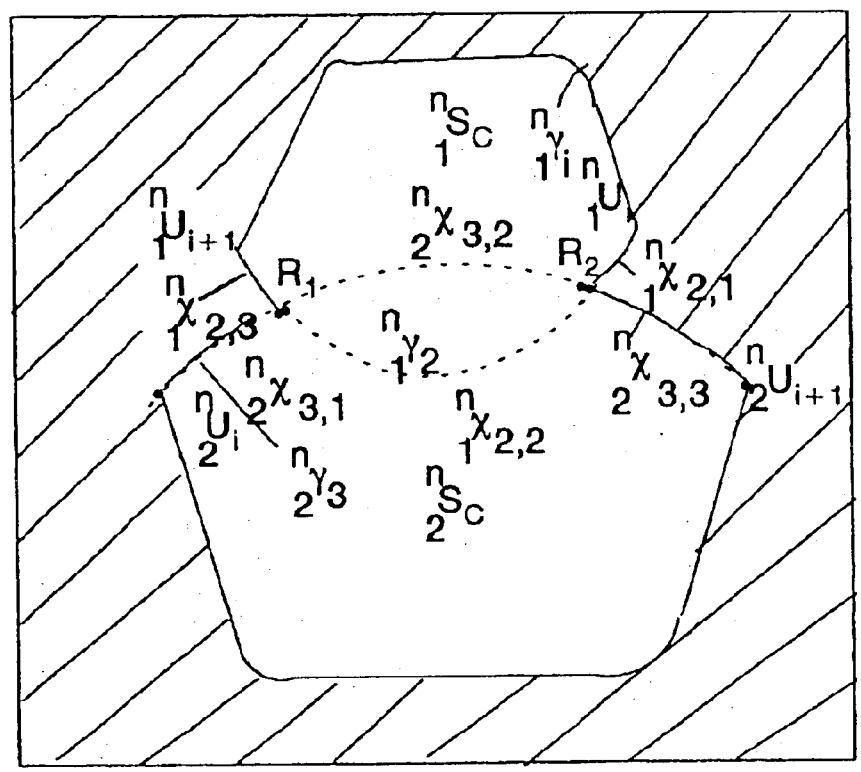
FIG. 35 illustrates the intersection of two circular arcs.

FIG. 35 shows the intersection of two circular arcs $_1{}^n\gamma_2(U_i, U_{i+1}; P)$ and $_2{}^n\gamma_3(U_i, U_{i+1}; P)$, which yields the two intersection points, $R_1$ and $R_2$.

The points $_1{}^nU_i$ and $_2{}^nU_i$ of the two respective circular arcs are evaluated using the Vertex Inside algorithm to determine whether or not they are inside of their respective intersecting profiles. If the point $U_i$ of either arc is within the intersecting profile, then the odd segments $\chi_{1,1}, \chi_{1,3}, \chi_{1,5}, \ldots$ are removed; otherwise, the even segments $\chi_{1,2}, \chi_{1,4}, \chi_{1,6}, \ldots$ are removed. Referring to FIG. 35, the circular arc $_1{}^n\gamma_2(U_i, U_{i+1}; P)$ is subdivided into segments $_1{}^n\chi_{2,1}(U_i, R_2; P)$, $_1{}^n\chi_{2,2}(R_2, R_1; P)$ and $_1{}^n\chi_{2,3}(R_1, U_{i+1}; P)$ and the circularly arc $_2{}^n\gamma_3(U_i, U_{i+1}; P)$ is subdivided into the segments $_2{}^n\chi_{3,1}(U_i, R_1; P)$, $_2{}^n\chi_{3,2}(R_1, R_2; P)$ and $_2{}^n\chi_{3,3}(R_2, U_{i+1}; P)$. The points $_1{}^nU_i$ of the arc $_1{}^n\gamma_2(U_i, U_{i+1}; P)$ is outside the intersecting cavity $_2{}^nS_C(P)$. Therefore, the even segment of the arc $_1{}^n\chi_{2,2}(R_2, R_1; P)$ is removed. Similarly, the starting end point $_2{}^nU_i$ of the circular arc $_2{}^n\gamma_3(U_i, U_{i+1}; P)$ is outside the intersecting cavity $_1{}^nS_C(P)$. Therefore, the even segment of the circular arc $_2{}^n\chi_{3,2}(R_1, R_2; P)$ is removed. The segmented arcs are then given by $$_1{}^n\gamma_2(U_i, U_{i+1}; P) = _1{}^n\chi_{2,1}(U_i, R_2; P) + _1{}^n\chi_{2,3}(R_1, U_{i+1}; P) \quad (4.19a)$$

$$_2{}^n\gamma_3(U_i, U_{i+1}; P) = _2{}^n\chi_{3,1}(U_i, R_1; P) + _2{}^n\chi_{3,3}(R_2, U_{i+1}; P) \quad (4.19b)$$

The combination $C_6$ denotes the intersections of two quadric curves. The determine whether or not these two curves intersect we use Sylvester's determinant The implicit forms for the two quadric curves $_1{}^n\gamma_5(U_i, U_{i+1}; P)$ and $_2{}^n\gamma_5(U_i, U_{i+1}; P)$ are, respectively, $$_1{}^n\gamma_5(U_i, U_{i+1}; P) = _1{}^nB_j y^2 + [2_1{}^nD_j x + 2_1{}^n\tilde{H}_j]y + [_1{}^nA_j x^2 + 2_1{}^n\tilde{G}_j x + _1{}^n\tilde{K}_j] = 0 \quad (4.20a)$$

$$_2{}^n\gamma_5(U_i, U_{i+1}; P) = _2{}^nB_j y^2 + [2_2{}^nD_j x + 2_2{}^n\tilde{H}_j]y + [_2{}^nA_j x^2 + 2_2{}^n\tilde{G}_j x + _2{}^n\tilde{K}_j] = 0 \quad (4.20b)$$

The determinant of Sylvester's matrix for the above equations is $$(4.21)$$

$$|R_x|_6 = \begin{vmatrix} _1^nB_j & 2_1^nD_j x + 2_1^n\tilde{H}_j & _1^nA_j x^2 + 2_1^n\tilde{G}_j x + _1^n\tilde{K}_j & 0 \\ 0 & _1^nB_j & 2_1^nD_j x + 2_1^n\tilde{H}_j & _1^nA_j x^2 + 2_1^n\tilde{G}_j x + _1^n\tilde{K}_j \\ _2^nB_j & 2_2^nD_j x + 2_2^n\tilde{H}_j & _1^nA_j x^2 + 2_1^n\tilde{G}_j x + _1^n\tilde{K}_j & 0 \\ 0 & _2^nB_j & 2_2^nD_j x + 2_2^n\tilde{H}_j & _1^nA_j x^2 + 2_1^n\tilde{G}_j x + _1^n\tilde{K}_j \end{vmatrix}$$

The determinant $|R_x|_6$ vanishes when the two polynomials given by equations (4.20a) and (4.20b) have common roots; that is, when the quadric curve $_1{}^n\gamma_5(U_i, U_{i+1}; P)$ intersects the quadric curve $_2{}^n\gamma_5(U_i, U_{i+1}; P)$. The determinant $|R_x|_6$ is used in the same manner as $|R_x|_4$ and $|R_x|_5$ were used for combinations $C_4$ and $C_5$, respectively.

Each intersection for combination $C_6$ yields up to four intersection points $R_t$, t=1, 2, 3, 4. These intersection points are found in the same manner as those corresponding to combination $C_4$.

Figure 36:
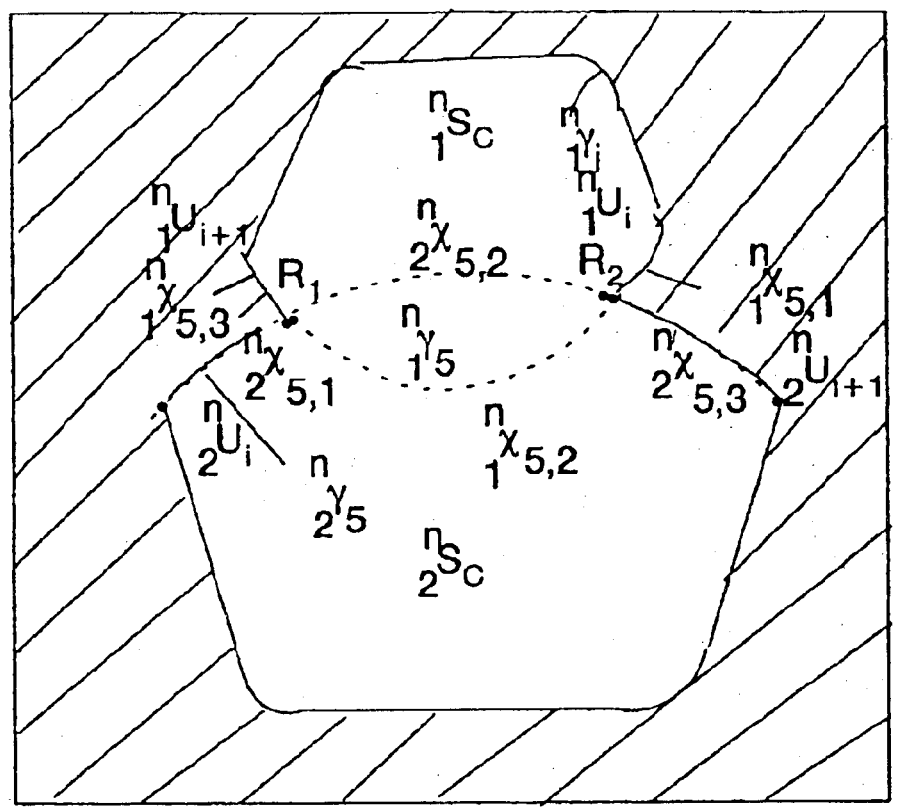
FIG. 36 illustrates the intersection of two quadric curves.

FIG. 36 shows the intersection of two quadric curves $_1{}^n\gamma_5(U_i, U_{i+1}; P)$ and $_2{}^n\gamma_5(U_i, U_{i+1}; P)$ which yields the two intersection points, $R_1$ and $R_2$.

The points $_1{}^nU_i$ and $_2{}^nU_i$ of the two respective quadric curves are evaluated using the Vertex Inside algorithm to determine whether or not they are inside of their respective intersecting profiles. If the point $U_i$ of either quadric curve is within the intersecting profile, then the odd segments $\chi_{1,1}, \chi_{1,3}, \chi_{1,5}, \ldots$ are removed; otherwise, the even segments $\chi_{1,2}, \chi_{1,4}, \chi_{1,6}, \ldots$ are removed. Referring to FIG. 36, the quadric curve $_1{}^n\gamma_n(U_i, U_{i+1}; P)$ is subdivided into segments $_1{}^n\chi_{5,1}(U_i, U_{i+1}; P)$, $_1{}^n\chi_{5,2}(R_2, R_1; P)$ and $_1{}^n\chi_{5,3}(R_1, U_{i+1}; P)$ and the other quadric curve $_2{}^n\gamma_5(U_i, U_{i+1}; P)$ is subdivided into the segments $_2{}^n\chi_{5,1}(U_i, R_1; P)$, $_2{}^n\chi_{5,2}(R_1, R_2; P)$ and $_2{}^n\chi_{5,3}(R_2, U_{i+1}; P)$. The points $_1{}^nU_i$ of the quadric curve $_1{}^n\gamma_5(U_i, U_{i+1}; P)$ is outside the intersecting cavity $_2{}^nS_C(P)$. Therefore, the even segment of the curve $_1{}^n\chi_{5,2}(R_2, R_1; P)$ is removed. Similarly, the point $_2{}^nU_i$ of the quadric curve $_2{}^n\gamma_5(U_i, U_{i+1}; P)$ is outside the intersecting cavity $_1{}^nS_C(P)$. Therefore, the even segment of the curve $_2{}^n\chi_{5,2}(R_1, R_2; P)$ is removed. The segmented curves are then given by $$_1{}^n\gamma_5(U_i, U_{i+1}; P) = _1{}^n\chi_{5,1}(U_i, R_2; P) + _1{}^n\chi_{5,3}(R_1, U_{i+1}; P) \quad (4.22a)$$

$$_2{}^n\gamma_5(U_i, U_{i+1}; P) = _2{}^n\chi_{5,1}(U_i, R_1; P) + _2{}^n\chi_{5,3}(R_2, U_{i+1}; P) \quad (4.22b)$$

As previously stated, there are three situations that have to be considered; either (a) the extents of profiles $F_\alpha$ and $F_\beta$ do not overlap with each other (denoted $\Omega_1$), (b) the extents $F_\alpha$ and $F_\beta$ overlap but the profiles $_\alpha{}^nS_C(P)$ and $_\beta{}^nS_C(P)$ do not intersect (denoted $\Omega_2$) or (c) the two extents $F_\alpha$ and $F_\beta$ overlap and the profiles $_{\beta n}S_C(P)$ and $_\beta{}^nS_C(P)$ intersect (denoted $\Omega_3$). The resulting profiles of case (a) are then given by equation (18). This case will not be discussed further. However, when two extents $F_\alpha$ and $F_\beta$ overlap each other they are surrounded by another extent $F_\omega$ such that the two profiles $_\alpha{}^nS_{C(P)}$ and $_\beta{}^nS_C(P)$ are contained in the new extent $F_\omega$. The new extent $F_\omega$ forms a new entity $(FMEM)_\omega$. The resulting profiles for cases (b) and (c) are now discussed.

Consider the case when the two profiles $_\alpha^n S_C(P)$ and $_\beta^n S_C(P)$, do not intersect $(\Omega_2)$ in $F_\omega$. In the most general case, the newly formed profile $_{\Omega_2}^n S_F(P)$, is given by $$_{\Omega_2}^n S_F(P) + _\alpha^n S_I(P) + _\alpha^n S_C(P) + _\beta^n S_I(P) + _\beta^n S_C(P) \; n=1,\ldots,6 \quad (4.23)$$

where the profiles $_\alpha^n S_I(P)$ and $_\alpha^n S_C(P)$ represent an island and its surrounding cavity, respectively, of $(FMEM)_\alpha$, and the profiles $_\beta^n S_I(P)$ and $_\beta^n S_C(P)$ represent an island and its surrounding cavity, respectively, of $(FMEM)_\beta$. Each of these profiles is given by the appropriate implementation of equation (3.19). The subscript F denotes that the resulting profile defines a profile and $\Omega_2$ indicates that none of the profiles in $F_\omega$ intersects.

There are three combinations of profile intersections on a face n. The first combination is when a cavity $_\beta^n S_C(P)$ intersects another cavity $_\beta^n S_C(P)$, and the second case is when a cavity $_\alpha^n S_C(P)$ intersects an island $_\beta^n S_I(P)$. However, an island does not exist without a surrounding cavity, therefore, the intersection of an island with another cavity cannot be described without also considering the intersection of its surrounding cavity. The case of an island $_\alpha^n S_I(P)$ intersecting another island $_\beta^n S_I(P)$ is not physically realizable. Mathematically, the case of an island $_\alpha^n S_I(P)$ intersecting a cavity $_\beta^n S_C(P)$ and the case of a cavity $_\alpha^n S_C(P)$ intersecting an island $_\beta^n S_I(P)$ are the same.

Figure 37:
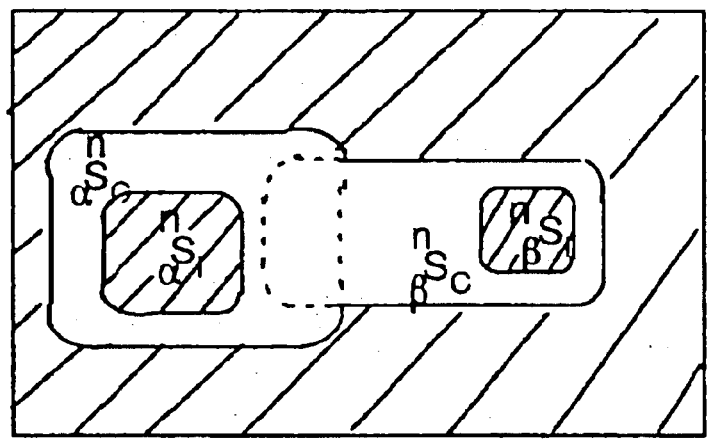
FIG. 37 illustrates the first combination when two cavity profiles intersect and the island profiles remain intact.

Referring to FIG. 37, the first combination of profile intersections is when a cavity $_\alpha^n S_C(P)$ intersects another cavity $_\beta^n S_C(P)$. The two intersecting cavity profiles form a new cavity $_\omega^n S_{CC}(P)$. The two island profiles $_\alpha^n S_I(P)$ and $_\beta^n S_I(P)$ are intact and are given in their general form by equation (3.18). The resultant profile $_{\Omega_3}^n S_F(P)$ is then $$_{\Omega_3}^n S_F(P) = _\omega^n S_{CC}(P) + _\alpha^n S_I(P) + _\beta^n S_I(P) \; n=1,\ldots,6 \quad (4.24)$$

Figure 41:
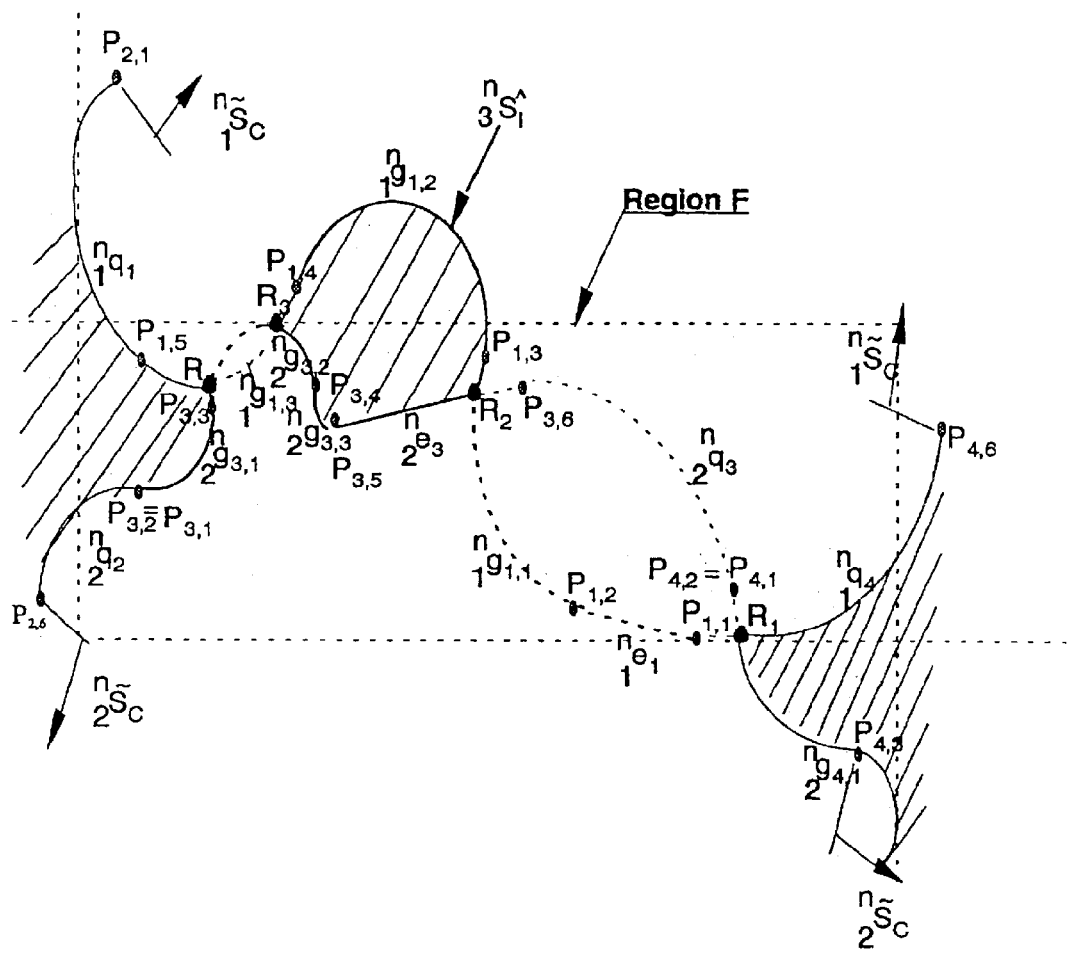
FIG. 41 shows an enlarged view of the intersection region of FIG. 27.

As will be shown in FIG. 41, it is possible for $\Omega_3$ intersections to form an island $_\omega^n S_I(P)$.

Figure 38:
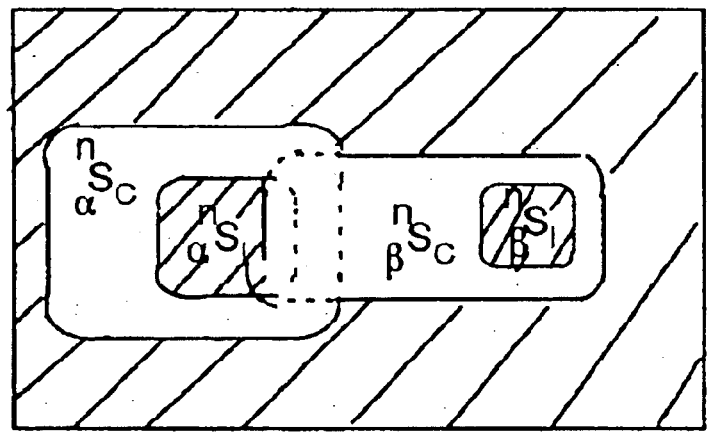
FIG. 38 illustrates the second combination when two cavity profiles intersect and one cavity profile intersects with an island profile.

Referring to FIG. 38, the second combination of profile intersections is when a cavity profile $_\beta^n S_C(P)$ intersects the cavity profile $_\alpha^n S_C(P)$ as well as the island profile $_\alpha^n S_I(P)$. The two intersecting cavity profiles again form a new cavity $_\omega^n S_{CC}(P)$. The modification to the island profile $_\alpha^n S_I(P)$ is denoted $_\alpha^n \tilde{S}_I(P)$. The island profile $_\beta^n S_I(P)$ is not affected. The resultant profile $_{\Omega_3}^n S_F(P)$ is then $$_{\Omega_3}^n S_F(P) = _\omega^n S_{CC}(P) + _\alpha^n \tilde{S}_I(P) + _\beta^n S_I(P) \; n=1,\ldots,6 \quad (4.25)$$

Figure 39:
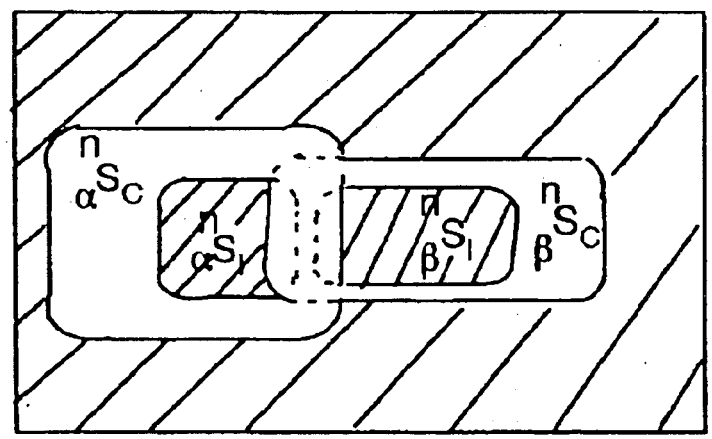
FIG. 39 illustrates the third combination when two cavity profiles intersect and two cavity profiles intersect with each other's island profile.

As shown in FIG. 39, the last combination of intersecting profiles again modifies the two cavity profiles $_\alpha^n S_C(P)$ and $_\beta^n S_C(P)$ to form a new cavity $_\omega^n S_{CC}(P)$. The two island profiles $_\alpha^n S_I(P)$ and $_\beta^n S_I(P)$ are modified to $_\alpha^n \tilde{S}_I(P)$ and $_\beta^n \tilde{S}_I(P)$, respectively. The resultant profile $_{\Omega_3}^n S_F(P)$ is then $$_{\Omega_3}^n S_F(P) = _\omega^n S_{CC}(P) + _\alpha^n \tilde{S}_I(P) + _\beta^n \tilde{S}_I(P) \; n=1,\ldots,6 \quad (4.26)$$

The modified island profiles $\alpha^n \tilde{S}_I(P)$ and $\beta^n \tilde{S}_I(P)$ are determined in the manner indicated in Sections 4.2.1 through 4.2.6.

Figure 40:
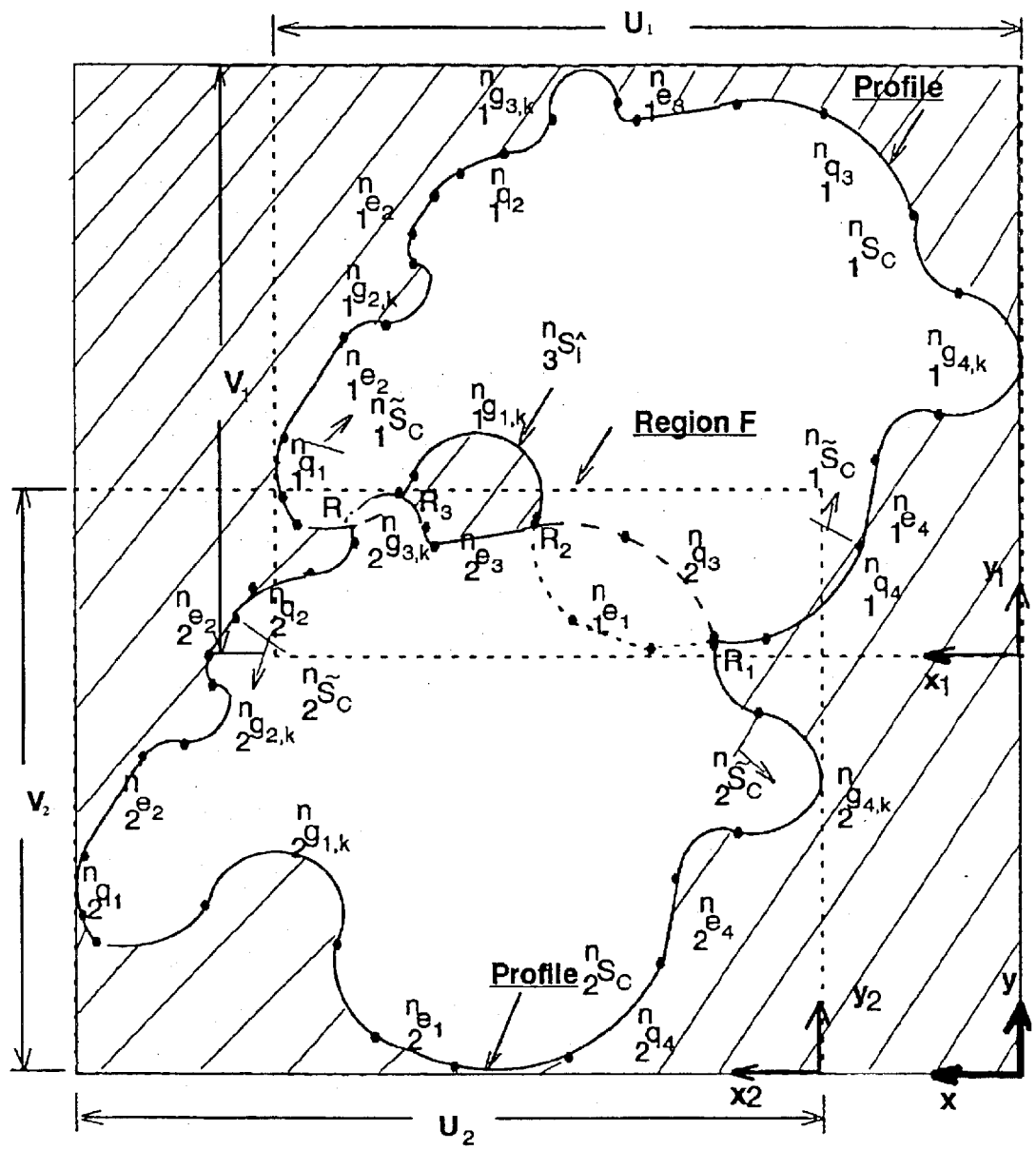
FIG. 40 illustrates an example of intersection of two cavity profiles.

The preceding results will now be illustrated for a very general case. Consider FIG. 40 where a cavity profile $_1^n S_C(P)$ intersects another cavity profile $_2^n S_C(P)$; that is, an $\Omega_3$ intersection. FIG. 41 shows an enlarged view of the region F. It can be seen that six curves of profile $_1^n S_C(P)$, $_1^n q_1$, $_1^n g_{1,k}$ k=1, 2, 3, $_1^n e_1$ and $_1^n q_4$, lie totally or partially within the region F Similarly, there are seven curves of profile $_2^n S_C(P)$, $_2^n q_2$, $_2^n g_{3,k}$ k=1,3, $_2^n e_3$, $_2^n q_3$ and $_2^n g_{4,1}$, that lie totally or partially within the region F, for a total of 13 curves in this region. It is also seen that both the end points of the edge $_1^n e_1$ and the quadric curve $_2^n q_3$ are inside the profiles $_1^n S_C(P)$ and $_1^n S_C(P)$, respectively. Hence, they are removed from the resulting profile $_{\Omega_3}^n S_F(P)$. In region F only three pairs of curves intersect each other: $_1^n g_{1,1}$ intersects $_2^n e_3$ at $R_2$, $_1^n g_{1,3}$ intersects $_2^n g_{3,2}$ at $R_3$ and $R_4$, and $_1^n q_4$ intersects $_2^n g_{4,1}$ at $R_1$. These three intersections form the combination types $C_3$, $C_6$ and $C_4$, respectively.

The remainder of the curves in $_1^n S_C(P)$, denoted $_1^n \tilde{S}_C(P)$, and in $_2^n S_C(P)$, denoted $_2^n \tilde{S}_C(P)$, are not affected by the intersection. The new cavity that is formed, $_3^n S_{CC}(P)$, therefore, is given by $$_3^n S_{CC}(P) = _1^n \tilde{S}_C(P) + _2^n \tilde{S}_C(P) + _1^n g_{1,3}(R_6, P_{1,5}) + \quad (4.27)$$
$$_1^n q_1(P_{1,5}, P_{2,1}) + _1^n q_4(P_{4,6} R_1) + _2^n g_{1,3}(P_{3,2}, P_{3,3}) +$$
$$_2^n g_{3,2}(P_{3,3}, R_4) + _2^n q_2(P_{2,6}, P_{3,1}) + _2^n g_{4,1}(R_1, P_{4,3})$$

Finally, it is noted that an island has been created by this intersection, and its profile is given by $$_3^n S_I(P) = \quad (4.28)$$
$$_1^n g_{1,1}(R_2, P_{1,3}) + _1^n g_{1,2}(P_{1,3}, P_{1,4}) + _1^n g_{1,3}(P_{1,4}, R_3) +$$
$$_2^n g_{3,2}(R_3, P_{3,4}) + _2^n g_{3,3}(P_{3,4}, P_{3,5}) + _2^n e_3(P_{3,5}, R_2)$$

Using equation (4.27) and (4.28) the resultant profile is $$_{\Omega_3}^n S_F(P) = _3^n S_{CC}(P) + _3^n S_I(P) \quad (4.29)$$

The treatment of multi-profile intersections on a common surface is based on the two-profile intersection procedure explained above. The process of determining the properties of a two-profile intersection on a surface consists of five steps. The first step is to determine whether or not the two extents overlap. Once it has been established that the two extents overlap, the second step is to determine whether or not any of the curves of the two profiles that lie within the overlapped region intersect. If they intersect, the points $R_t$, $t=1,\ldots,x$ are determined. The third step is to order the intersection points $R_t$ along each curve. The fourth step is to define the segments of each curve and determine which of the segments remain and which are removed. The fifth step is to arrange the segments and produce the final profile.

Figure 42:
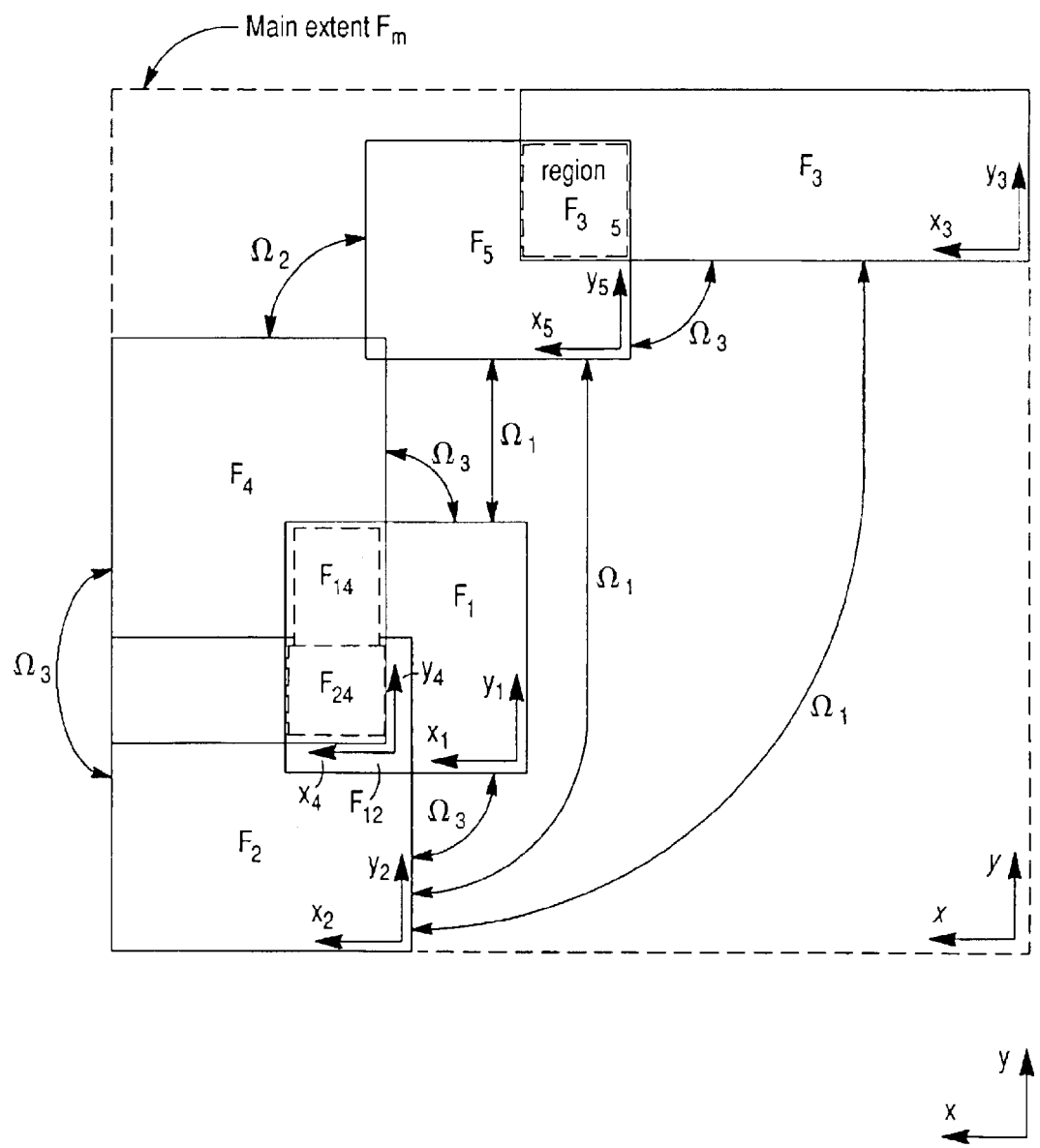
FIG. 42 illustrates the extents creation when there are several profile intersections.

When three or more profiles are involved, only a pair of profiles, $_\alpha^n S_o(P)$ and $_\beta^n S_o(P)$, are considered at one time. Referring to FIG. 42, we see that there are three situations that have to be considered: either (a) the extents of profiles $F_\alpha$ and $F_\beta$ do not overlap with each other $(\Omega_1)$; (b) the extents $F_\alpha$ and $F_\beta$ overlap but the profiles $_\alpha^n S_o(P)$ and $_\beta^n S_o(P)$ do not intersect $(\Omega_2)$; or (c) the two extents $F_\alpha$ and $F_\beta$ overlap and the profiles $_\alpha^n S_o(P)$ and $_\beta^n S_o(P)$ intersect $(\Omega_3)$. The resulting profiles of cases (a) and (b) are given by equations (3.18) and (4.23), respectively. For case (c), the two-profile intersection procedure is used. However, only the first two steps of the procedure are carried out, with the other three steps performed after the intersection points for all the intersecting profiles are known.

Referring to FIG. 42, there are five extents $F_1,\ldots,F_5$ enclosed in a main extent $F_m$. The extent $F_2$ has an $\Omega_1$ relationship with extents $F_3$ and $F_5$. Also extents $F_1$ and $F_5$ have an $\Omega_1$ relationship. The extents $F_4$ and $F_5$, however, form an $\Omega_2$ relationship, that is, the two extents overlap, but the profiles contained in them do not intersect. (This is an assumption for purpose of this example.) The extent $F_1$ is assumed to form an $\Omega_3$ relationship with extents $F_2$ and $F_4$; that is, the profile contained in $F_1$ intersects the profiles contained in $F_2$ and $F_4$ within the region $F_{12}$ and $F_{14}$, respectively. Similarly, the profiles in $F_3$ and $F_5$ are assumed to intersect within the region $F_{35}$, and the extents $F_2$ and $F_4$ are assumed to intersect within the region $F_{24}$. Within $F_{24}$ there are three intersecting profiles; however, the intersection within this region is evaluated by sequentially applying the two-profile intersection procedure in regions $F_{12}$, $F_{24}$ and $F_{14}$. Once the intersections of the two profiles $_1^n S_o(P)$ and $_2^n S_o(P)$ are known, the intersection of the third profile $_4^n S_o(P)$ with these two profiles is determined. The intersection points for all three sets of intersections are then stored, and the intersection points are evaluated using the Vertex Inside algorithm to determine whether or not they lie inside the cavity. The points that are found to be inside the cavity are deleted. The remaining intersection points are ordered on their respective curves and the segments of each curve are determined. Then the segments that are to be removed and the segments that are to remain are determined. The final profile for all intersecting profiles is then determined.

Consider a main extent $F_m$ that encloses $N_{f,m}$ profiles and $N_{e,m}$ overlapped extents. Each of these extents contains a profile within it. Let there be $N_{\Omega_2}$ profiles that have an $\Omega_2$ realtionship with each other in $F_m$. A general expression of the resulting profile is given by $$_{\Omega_2}^n S_F(P) = \sum_{v=1}^{N_{\Omega_2}} {_v^n S_C(P)} + \sum_{v=1}^{N_{\Omega_2}} {_v^n S_I(P)} \qquad (4.30)$$

$$n = 1, \ldots, 6$$

Let there are $N_{\Omega_2}$ profiles that have an $\Omega_3$ realtionship with each other in $F_m$. A general expression of the resulting profiles within $F_m$ is given by $$_{\Omega_3}^n S_F(P) = {_m^n S_{CC}(P)} + \sum_{v=1}^{N_{\Omega_3}} {_v^n \tilde{S}_I(P)} \qquad (4.31)$$

$$n = 1, \ldots, 6$$

where the $_v^n \tilde{S}_I(P) = {_v^n S_I(P)}$ if an island is not intersected by a cavity The general expression for the final profile is then given by $$_m^n S_F(P) = {_{\Omega_2}^n S_F(P)} + {_{\Omega_3}^n S_F(P)} + \sum_{v=1}^{N_{\Omega_1}} {_v^n S_C(P)} + \sum_{v=1}^{N_{\Omega_1}} {_v^n S_I(P)} \qquad (4.32)$$

where $N_{\Omega_1} = N_{f,m} - N_{\Omega_2} - N_{\Omega_3}$.

In order to determine the intersection of two or more profiles on the same plane, it is first necessary to determine if their respective extents overlap. A method is presented that determines whether or not the extents overlap, and if they overlap what that overlapped region is. This method is based on a standard clipping procedure (Foley, 1987).

Figure 43:
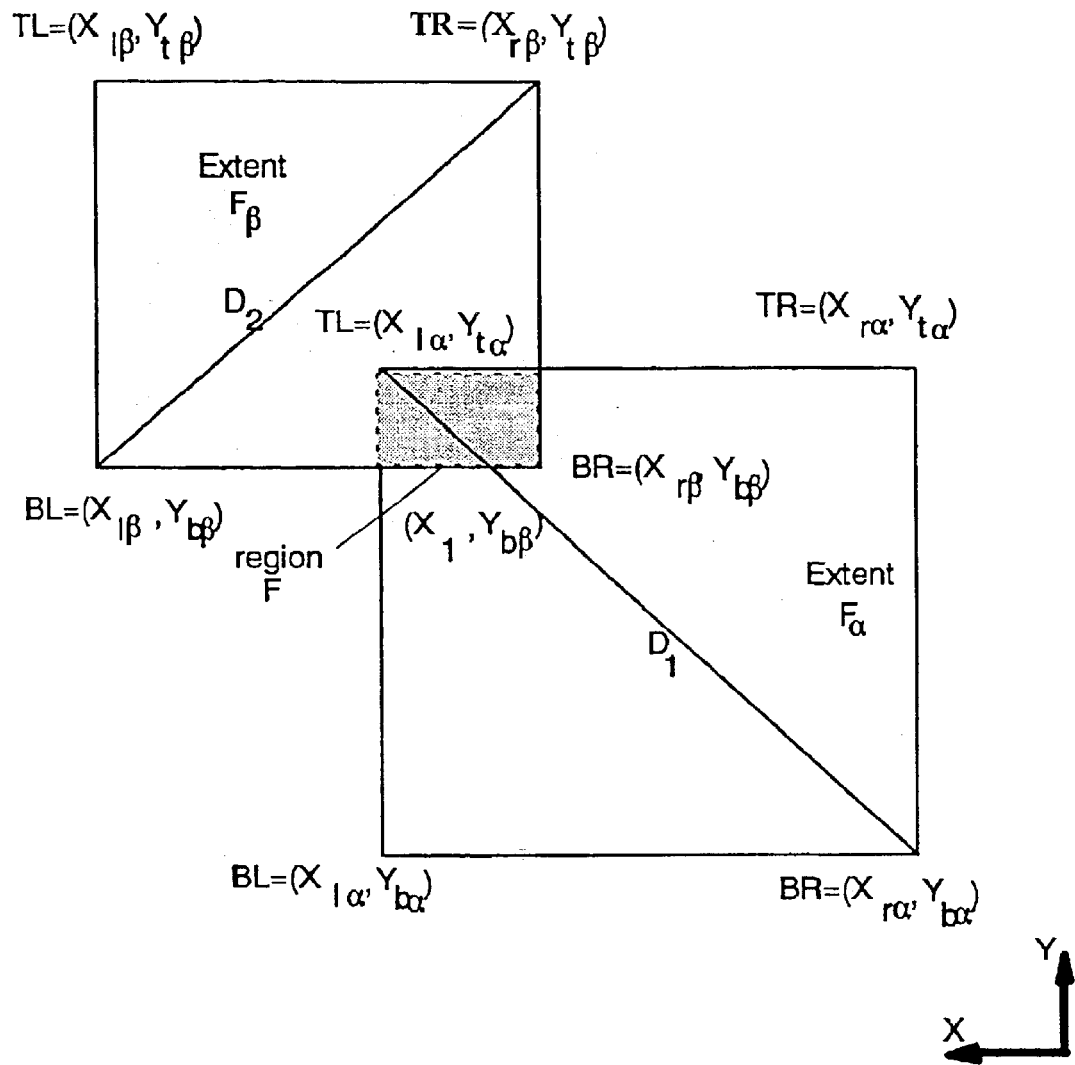
FIG. 43 illustrates global coordinates defining extents and their overlapped region.

Consider two extents $F_\alpha$ and $F_\beta$ as shown in FIG. 43. The four corners of each extent are denoted bottom right, BR, bottom left, BL, top right. TR and top left, TL The diagonals $D_1$ and $D_2$ of these extents are defined such that $D_1$ connects a BR corner to a TL corner of one extent and $D_2$ joins a BL corner to a TR corner of the other extent. The method requires that if diagonal $D_1$ is taken for the extent $F_\alpha$, then diagonal $D_2$ must be used for extent $f_\beta$. On the other hand, if $D_2$ is used for the first extent, then $D_1$ must be used for the second extent In FIG. 43 diagonal $D_1$ is used by extent $F_\alpha$ and diagonal $D_2$ is used by extent $F_\beta$. The equations for the diagonals $D_1$ and $D_2$ in the global coordinate system (X, Y, Z) are given by, respectively, $$(X_{l\alpha} - X_{r\alpha})Y + (Y_{b\alpha} - Y_{t\alpha})X + (X_{r\alpha}Y_{t\alpha} - X_{l\alpha}Y_{b\alpha}) = 0 \qquad (4.33a)$$

$$(X_\beta - X_{l\beta})Y + (Y_{b\beta} - Y_{t\beta})X + (X_{l\beta}Y_{t\beta} - X_{r\beta}Y_{b\beta}) = 0 \qquad (4.33b)$$

where, $(X_{r\gamma}, Y_{b\gamma})$ and $(X_{i\gamma}, Y_{r\gamma})$ are the global coordinates of the points BR and TL, respectively, and $\gamma = \alpha, \beta$. The subscript $\alpha$ is used to indicate that diagonal $D_1$ belongs to $F_\alpha$, and correspondingly, $\beta$ is used to indicate that $D_2$ belongs to $F_\beta$. It can be seen that the two horizontal sides of an extent are given by $Y = Y_{b\gamma}$ and $Y = Y_{r\gamma}$, respectively, and the two vertical sides are given by $X = X_{r\gamma}$ and $X = X_{l\gamma}$, respectively.

To determine if extent $F_\alpha$ overlaps extent $F_\beta$ we determine whether or not $D_1$ intersects any of the four sides of $F_\beta$, and whether or not $D_2$ intersects any of the four sides of $F_\alpha$. The equations of the four sides of the extent $F_\beta$ are given by $$X = X_{r\beta} \qquad (4.34a)$$

$$X = X_{l\beta} \qquad (4.34b)$$

$$Y = Y_{b\beta} \qquad (4.34c)$$

$$Y = Y_{t\beta} \qquad (4.34d)$$

First, equation (4.34a) is substituted into equation (4.33a) and the resulting equation is solved to get $Y = Y_1$. If $Y_{b\beta} \leq Y_1 \leq Y_{t\beta}$, then the diagonal $D_1$ intersects the right vertical side of the extent $F_\beta$ and the coordinates of the BR and TL corners of the overlapped region F are $(X_{r\beta}, Y_1)$ and $(X_{l\alpha}, Y_{t\alpha})$, respectively. Otherwise, $D_1$ does not intersect the right vertical side of the extent $F_\beta$. In that case, equation (4.34b) is substituted in equation (4.33a) and the solution $Y = Y_2$ is obtained. If $Y_{b\beta} \leq Y_2 \leq Y_{t\beta}$, then $D_1$ intersects the left vertical side of extent $F_\beta$. The region F in this case has for the coordinates of its TL corner $(X_{l\beta}, Y_2)$. However, the coordinates of its BR corner are determined after $D_1$ is evaluated to determine whether or not it intersects with the bottom horizontal side of extent $F_\beta$. If $D_1$ intersects only with right vertical side of $F_\beta$, the coordinates of the BR corner of region F are $(X_{r\alpha}, Y_{b\alpha})$. If $D_1$ also intersects with the right vertical side of $F_\beta$, the coordinates of the BR corner of region F are $(X_{r\beta}, Y_{b\beta})$. Furthermore, if $D_1$ also intersects with the bottom horizontal side of $F_\beta$, then the coordinates of the BR corner of region F are $(X_1, Y_{b\alpha})$. The procedure for determining the value of $X_1$ follows.

If $Y_{b\beta} \leq Y_2 \leq Y_{t\beta}$ then to determine $X_1$, equation (4,34c) is substituted in equation (4.33a). If $X_{r\beta} \leq X_1 \leq X_{l\beta}$, then $D_1$ intersects the bottom horizontal side of the extent $F_\beta$. The coordinates of the TL and BR corners of region F for this case are $(X_{l\alpha}, Y_{r\alpha})$ and $(X_1, Y_{b\beta})$, respectively. For the case of $D_1$ intersecting the bottom horizontal side, as well as the top horizontal side of extent $F_\beta$, the coordinates of the BR corner of region F are given by $(X_1, Y_{b\beta})$. If $X_{l\alpha} \leq X_{l\beta}$, then the coordinates of the TR corner of region F are given by $(X_2, Y_{r\alpha})$, otherwise they are given by $(X_{l\beta}, Y_{t\beta})$. The procedure for determining the value of $X_2$ follows.

If $X_{r\beta} \leq X_1 \leq X_{l\beta}$ then to determine $X_2$ equation (4.34d) is substituted in equation (4.33a). If $X_{r\beta} \leq X_2 \leq X_{l\beta}$, then $D_1$ intersects the bottom horizontal side of the extent $F_\beta$. The coordinates of the TL and BR corners of region F are then given by $(X_{l\beta}, Y_{t\beta})$ and $(X_{r\alpha}, Y_{b\alpha})$, respectively. For the case of $D_1$ intersecting the top horizontal side and the right vertical side of $F_\beta$, the coordinates of the BR corner of region F are given by $(X_{r\beta}, Y_1)$. If $X_{ra} \leq X_{l\beta}$, then the coordinates of the TR corner of region F are given by $(X_2, Y_{ra})$, otherwise they are given by $(X_{l\beta}, Y_{t\beta})$.

If $D_1$ does not intersect any of the four sides of $F_\beta$, then the above procedure is repeated to determine if diagonal $D_2$ of extent $F_\beta$ intersects with extent $F_\alpha$.

The pseudo code for determining the intersections of N profiles $_1{}^n S_o(P), \ldots, _N{}^n S_o(P)$ on a common surface is presented. These N profiles are enclosed by their respective extents, $F_1, \ldots, F_N$. The first part of the algorithm takes an extent from the total number of original N extents and determines whether or not it overlaps another extent. Each $F_\alpha$, $\alpha=1$, N is checked to determine whether or not it overlaps another extent, $F_\beta$, $\beta=\alpha+1$, N. The two logicals $O_\alpha$ and $I_\alpha$ indicate the status of the extent $F_\alpha$; the former indicates whether or not it overlaps another extent and the latter indicates whether or not the profiles within the overlapped extents intersect.

If two extents are not overlapping, that is, they have an $\Omega_1$ relationship, then the algorithm takes another extent and determines whether or not it overlaps with $F_\alpha$. If none of the extents overlaps an extent $F_\alpha$, then it remains an independent FMEM and the logicals $I_\alpha$ and $O_\alpha$ are set to false. However, if an overlapped extent $F_\beta$ is found, then the logical $O_\alpha$ is set to true and the overlapped region $F_{\alpha\beta}$ is determined. The curves of the two profiles $_\alpha{}^n S_o(P)$ and $_\beta{}^n S_o(P)$ are then evaluated to determine whether or not they intersect within $F_{\alpha\beta}$. If none of the curves intersects, that is, they have $\Omega_2$ relationship, then the resultant profile is given by $_{\Omega_2}{}^n S_F(P)$ [recall equation (4.23)]. If they do intersect, that is, they have an $\Omega_3$ relationship, then the algorithm sets the logical $I_\alpha$ to true and continues to determine the intersection properties of the two profiles within $F_{\alpha\beta}$.

Assume that it has been determined that $n_1$ curves of profile $_\alpha{}^n S_o(P)$ and $n_2$ curves of profile $_\beta{}^n S_o(P)$ are found to lie within region $F_{\alpha\beta}$. Then only those curves are considered. The end points, $U_i$ and $U_{i+1}$, of the curves $_\alpha{}^n \gamma_i(U_i, U_{i+1}; P)$ and $_\beta{}^n \gamma_i(U_i, U_{i+1}; P)$ are evaluated to determine whether or nor they are inside the intersecting cavities $_\beta{}^n S_o(P)$ and $_\alpha{}^n S_o(P)$, respectively. If both points $U_i$ and $U_{i+1}$ of a curve are inside one of the intersecting cavities, then that curve is removed. If both curves partially lie outside their intersecting cavities, the algorithm determines the combination type $C_k$, $k=1, \ldots, 6$, for the pair of intersecting curves $_\alpha{}^n \gamma_i(U_i, U_{i+1}; P)$ and $_\beta{}^n \gamma_i(U_i, U_{i+1}; P)$. For the combinations $C_4$, $C_5$ or $C_6$, the algorithm uses Sylvester's method to determine whether or not the curves intersect. If they intersect, the roots are found by a standard root finding method. For the combinations $C_1$, $C_2$ or $C_3$, the roots are found by solving the equations (4.3), (4.7) and (4.12), respectively. The roots are the intersection points $R_t$, $t=1, \ldots, x$, which are stored for later processing.

The second part of the algorithm retrieves and then groups the extents that have been found to overlap each other. An extent $F_m$ is then formed to surround the $N_{f,m}$ overlapping extents, where $m=N+1, \ldots$. The process then proceeds to search for the number of profiles denoted $N_{f,m}$, that intersect within $F_m$. A separate counter records the number of $F_m$ that has been found. The maximum value of this counter is M.

The third section of the algorithm takes each of the $F_\alpha$, $\alpha=1, \ldots, N_{e,m}$ that reside within $F_m$ and determines whether or not the profile within $F_\alpha$ has intersected other profiles. If the logical $I_\alpha$ is false, then the algorithm takes the next extent: otherwise it uses vertex inside algorithm to determine whether or not each of the intersection points $R_t$ lies inside an intersecting cavity $_\beta{}^n S_C(P)$. The intersection points that are found to reside inside a cavity are removed. The remaining intersection points are ordered on each curve and the segments that are removed and the ones that remain for each curve are determined. If a point $U_i$ of a curve $\gamma_i$ is inside an intersecting cavity, the odd segments are removed and the even segments remain; otherwise the even segments are removed and the odd segments remain. This is done using either equation (4.6), (4.11) or (4.13) as the case may be. The segments of each curve that remain are collected to define the profiles $_\alpha{}^n \tilde{S}_F(P)$ and $_\alpha{}^n \tilde{S}_C(P)$. Once all extents $F_\alpha$ are processed within each $F_m$, the resulting profiles $_{\Omega_3}{}^n S_F(P)$ are determined using equation (4.31). The resultant profile $_m{}^n S_F(P)$ for each $F_m$ is then determined using equation (4.32). The process is repeated for each $F_m$ that has been formed to enclose overlapping extents.

In the foregoing discussion, a composite FMEM was introduced which resulted from intersections of multiple profiles on a given surface. This FMEM is capable of representing a large family of 2½-D machinable shapes. During the design process the engineer may want to machine on more than one face. This requires that a means be developed whereby the orthogonal intersection of two FMEMs be evaluated. Identifying and determining these intersections require that a means first be developed to determine if an intersection of the orthogonal FMEMs has taken place, and if it has, to obtain all their spatial intersection curves.

Notation for a general profile was described above and was used to describe the intersections of multiple profiles on a given face it. This notation is now extended to include the orthogonal intersections of the associated very general profile shells in the following way. A shell is denoted by $_v{}^n S_{so}(\psi_p)$. The left superscript n indicates the face number of the part to which the profile shell is orthogonal, the left subscript v is reserved for the profile number, and the right subscript $\sigma$ identifies the type of shell surface, that is, either a cavity ($\sigma=C$) or an island ($\sigma=I$). A right subscript s indicates that the shell surface is topologically in a 3D space. A profile shell $_v{}^n S_{so}(\psi_p)$ can intersect orthogonally with a profile shell $_\mu{}^m S_{so}(\psi_p)$, when $n \neq m$ and face m is not parallel to face n. For example, if a profile shell exists on surface 1 then the orthogonal faces are 2, 3, 5 and 4 but not 6 because face 6 is parallel to face 1. The point $\psi_p$ is an arbitrary point on the profile surface.

A shell comprises of surfaces, curves and points in 3D space. The notation mentioned above is used for each individual profile surface. For example, a general surface is given by $_v{}^n \gamma_{si}(U_i, U_{i+1}, \hat{U}_i, \hat{U}_{i+1}; \psi_p)$. The right subscript i indicates the type of surface, that is, either a plane (i=1), a quadric surface (i=5) or a cylindrical surface (i=2, 3, 4). The first four points $U_i$, $U_{i+1}$, $\hat{U}_i$ and $\hat{U}_{i+1}$ that are enclosed in parentheses represent the end points of the surface, the first pair on the face n and the second pair on a plane parallel to n. Projections of points or curves on a surface that are located at a distance d, the profile depth, from face n and parallel to it, are specified by a "hat" (^) on the associated points or curves. For example, the points $\hat{U}_i$ and $\hat{U}_{i+1}$ are the projections of the points $U_i$ and $U_{i+1}$, respectively, on a surface parallel to face n. The projection of a curve $_v{}^n \gamma(U_i, U_{i+1}; P)$ is given by $_v{}^n \hat{\gamma}_i(\hat{U}_i, \hat{U}_{i+1}; P)$, where the former exists on face n and the latter exists on a plane parallel to the face n and a distance d from it An arbitrary point on a shell surface is given by $_v{}^n \psi_p(x_p, y_p, z_p)$, where $(x_p, y_p, z_p)$ are the coordinates in the (x, y, z) coordinate system. Each of these three coordinates of a point is denoted the same way. For example, the x-coordinate of a point $_v{}^n \psi_p$ is given by $_v{}^n X_p$. However, a point, when included within parentheses in order to define curves and surfaces, is used without the left subscript and superscript. For example, the end points $U_i$, $U_{i+1}$, $\hat{U}_i$, and $\hat{U}_{i+1}$ are used without left subscripts and superscripts to specify a surface $_v{}^n\gamma_{si}(U_i, U_{i+1}, \hat{U}_i, \hat{U}_{i+1}; \psi_p)$. The points $P_{j,i,\ j}=1, \ldots, 4$ and $i=1, \ldots, 8$, introduced in the last chapter, use the same notation. Similarly, the coordinates of a point when included within parentheses, in order to define the point, are used without left subscripts and superscripts. For example, the coordinates $x_p$, $y_p$ and $z_p$ are used within parentheses to specify the point $_v{}^n\psi_p(x_p, y_p; z_p,)$ have no left subscripts and superscripts. The coefficients $A_j$, $B_j$, $C_j$, $D_j$, $G_j$, $H_j$ and are specified in a similar manner. For example, the coefficient $_v{}^m G_j$ exists on face m and is used to define a curve that is part of a profile shell $_v{}^m S_{so}(\psi_p)$.

An additional right subscript s is added to indicate that the segment of a curve is a subset of that curve. The same notation is used for a patch of a surface. For example, $_v{}^n\chi_{si}(U_i, U_{i+1}, R_0, R_{k-1}; \psi_p)$ denotes a patch of a profile surface $_v{}^n\gamma_{si}(U_i, U_{i+1}, \hat{U}_i, \hat{U}_{i+1}; \psi_p)$.

In some instances, curves and surfaces are specified without the points within the parentheses when an explicit notation is not required. For example, a surface $_v{}^n\gamma_{si}(U_i, U_{i+1}, \hat{U}_i, \hat{U}_{i+1}; \psi_p)$ may be specified by $_v{}^n\gamma_{si}$ or a curve $_v{}^n\gamma_i(U_i, U_{i+1}; P)$ is given by $_v{}^n\gamma_i$. Similarly, a point is given without its coordinates. For example, the end points $U_i$ and $U_{i+1}$ are frequently used without the left subscripts and superscripts as well as without specifying their repective coordinates $(x_i, y_i, z_i)$ and $(x_{i+1}, y_{i+1}, z_{i+1})$.

Figure 44:
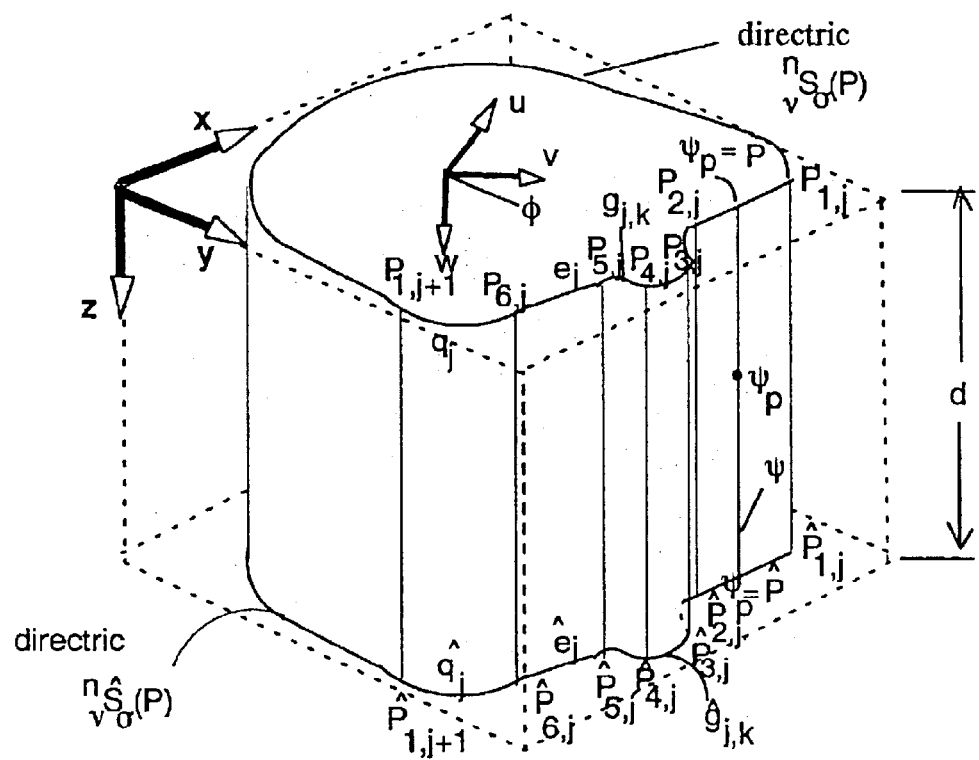
FIG. 44 illustrates a ruled quadric profile shell.

In order to obtain the orthogonal intersections of two FMEMs, a profile shell consisting of quadric ruled surfaces of a 2-D profile on face n is introduced. A quadric ruled surface is represented by a straight line generator p and the curves at the two ends of the generator, called directrics of the surface. A general profile shell $_v{}^n S_{so}(\psi_p)$, shown in FIG. 44, is a closed envelop such that its projection on face n is the profile $_v{}^n S_o(P)$, and its projection on a plane parallel to the surface n and at a distance d, the profile depth, is the profile $_v{}^n\hat{S}_o(\hat{P})$. The two profiles $_v{}^n S_o(P)$ and $_v{}^n\hat{S}_o(\hat{P})$ are exactly the same, except that they are a distance d from each other. Each of them is given by equation (3.18), where $_v{}^n\hat{S}_o(\hat{P})$ consists of four edges $\hat{e}_j$, four quadric curves $\hat{q}_j$ and four groups of circular arcs $\hat{g}_{j,k}$, $k=1, 2, 3$. The arbitrary point P lies on the profile $_v{}^n S_o(P)$ and the corresponding arbirary point $\hat{P}=(x, y, z+d)$ lies on the profile $_v{}^n\hat{S}_o(\hat{P})$. The point $\psi_p$ is an arbitrary point on the generator line $\psi$ such that at the two ends of the generator line $\psi$ it coincides with the points P and $\hat{P}$.

A general profile shell surface $_v{}^n S_{so}(\psi_p)$ consists of four sets of three types of quadric surfaces: a plane $_v{}^n e_{sj}(P_{j,1}, P_{j,6}, \hat{P}_{j,1}, \hat{P}_{j,6}; \psi_p)$ a quadric surface $_v{}^n q_{sj}(e_j, e_{j+1}, \hat{e}_j, \hat{e}_{j+1}; \psi_p)$ and a group of three cylindrical surfaces $_v{}^n g_{sj,k}(P_{j,k+1}, P_{j,k+2}, \hat{P}_{j,k+1}, \hat{P}_{j,k+2}; \psi_p)$, $k=1, 2, 3$. The directric for a surface of the shell $_v{}^n S_{so}(\psi_p)$ is the corresponding curve of the profile $_v{}^n S_o(P)$. Geometrically, an implicit quadric surface is given by a space occupied by points $\psi_p$ in the $(x, y, z)$ coordinate system. In parametric space it is given by the points (s,t), where the parameter s varies from 0 to 1 on the directric curve and the parameter t varies from 0 to 1 on the generator line. The directric curve for the plane $_v{}^n e_{sj}(P_{j,1}, P_{j,6}, \hat{P}_{j,1}, \hat{P}_{j,6}; \psi_p)$ is the edge $_v{}^n e_j(P_{j,1}, P_{j,6}, P)$; for the quadric surface $_v{}^n q_{sj}(e_j, e_{j+1}, \hat{e}_j, \hat{e}_{j+1}; \psi_p)$ it is the quadric curve $_v{}^n q_j(e_j, e_{j+1}; P)$; and for each of the three cylindrical surfaces $_v{}^n g_{sj,k}(P_{j,k+1}, P_{j,k+2}, \hat{P}_{j,k+1}, \hat{P}_{j,k+2}; \psi_p)$, $k=1, 2, 3$it is the corresponding circular arc $_v{}^n g_{j,k}(P_{j,k+1}, P_{j,k+2}, \hat{P}_{j,k+1}, \hat{P}_{j,k+2}; \psi_p)$, $k=1, 2, 3$.

The concept of minimum rectangular prismatic volume containing an FMEM was introduced above. This rectangular prismatic volume is now called a cavity container. A cavity container is the minimum prismatic volume that encloses the profile. The containers will be used to determine whether or not two orthogonal FMEMs intersect. If two containers intersect, the cavities and islands within them may or may not intersect. If the containers do not intersect, then the cavities and islands do not intersect.

Figure 45:
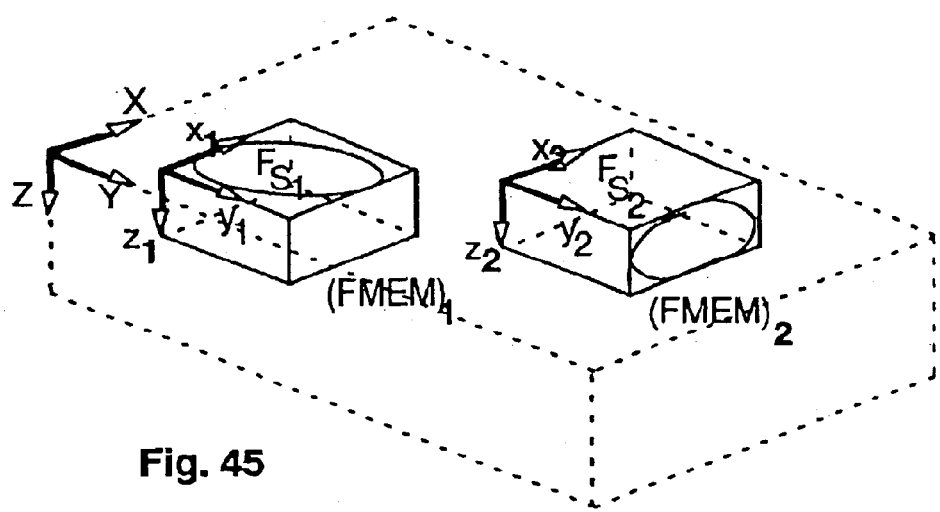
FIG. 45 illustrates two containers that do not intersect.
Figure 46:
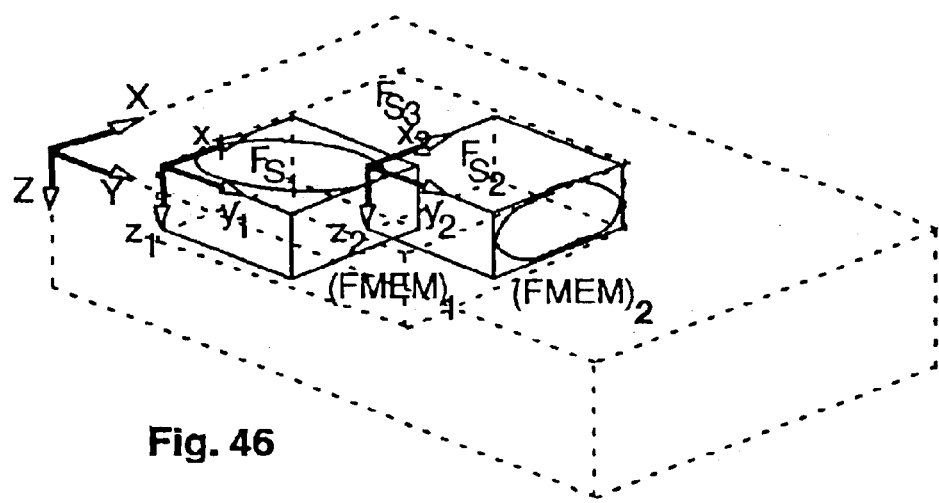
FIG. 46 illustrates two containers that intersect, but their surfaces do not intersect.
Figure 47:
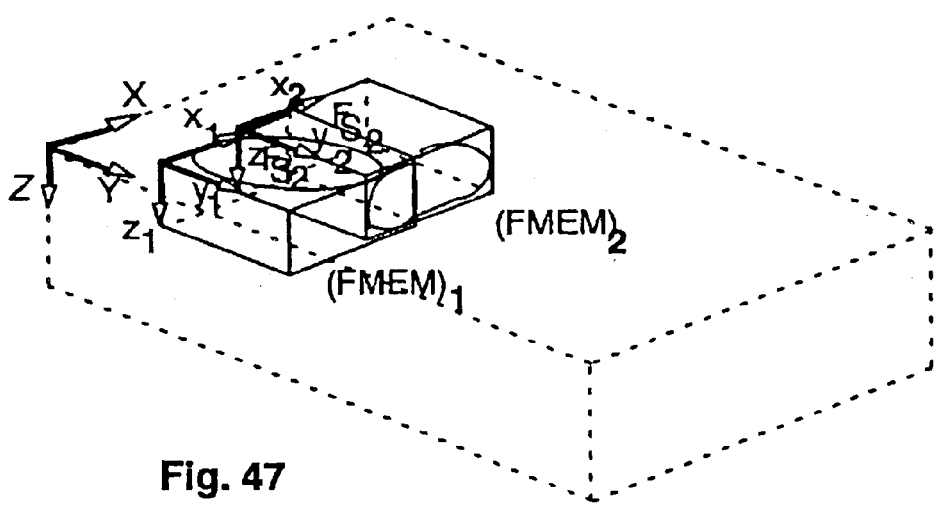
FIG. 47 illustrates two containers that intersect and one or more of their surfaces intersect.

Consider two orthogonal containers $F_{s_1}$ and $F_{s_2}$ shown in FIGS. 45 through 47. These two containers can be related to each other in one of three ways: (1) they do not intersect, denoted $\Omega_{s_1}$; (2) they intersect, but the profile surfaces do not intersect, denoted $\Omega_{s_2}$; and (3) they intersect and the profile surfaces intersect, denoted $\Omega_{s_3}$. FIG. 45 shows the case where the containers do not intersect. For this case the containers $F_{s_1}$ and $F_{s_2}$ contain two independent FMEMs, $(FMEM)_1$ and $(FMEM)_2$ respectively. The procedure used to define a profile of an FMEM above. FIG. 46 shows the case of two intersecting containers $F_{s_1}$ and $F_{s_2}$ in which the profile surfaces do not intersect. In this case a third container $F_{s_3}$ surrounds the two intersecting containers, and the container $F_{s_3}$ is a new container enclosing the two non-intersecting profile shells $_1{}^m S_{so}(\psi_p)$ and $_2{}^n S_{so}(\psi_p)$ on the m and n surfaces, respectively. The profiles $_1{}^m S_o(P)$ and $_2{}^n S_o(P)$ are the directric curves of the two shells $_1{}^m S_{so}(\psi_p)$ and $_2{}^n S_{so}(\psi_p)$ respectively. The surfaces of the shells $_1{}^m S_{so}(\psi_p)$ and $_2{}^n S_{so}(\psi_p)$ when contained in the same container, but do not intersect, are designated as combination $\Pi_0$.

FIG. 47 shows the case when the two containers $F_{s_1}$ and $F_{s_2}$ intersect, and one or more of the surfaces of the two profile shells $_1{}^m S_{so}(\psi_p)$ and $_2{}^n S_{so}(\psi_p)$ intersect. These intersections result in six combinations of intersecting surfaces, which are denoted $\Pi_1, \ldots, \Pi_6$, and are discussed in detail below.

Figure 48:
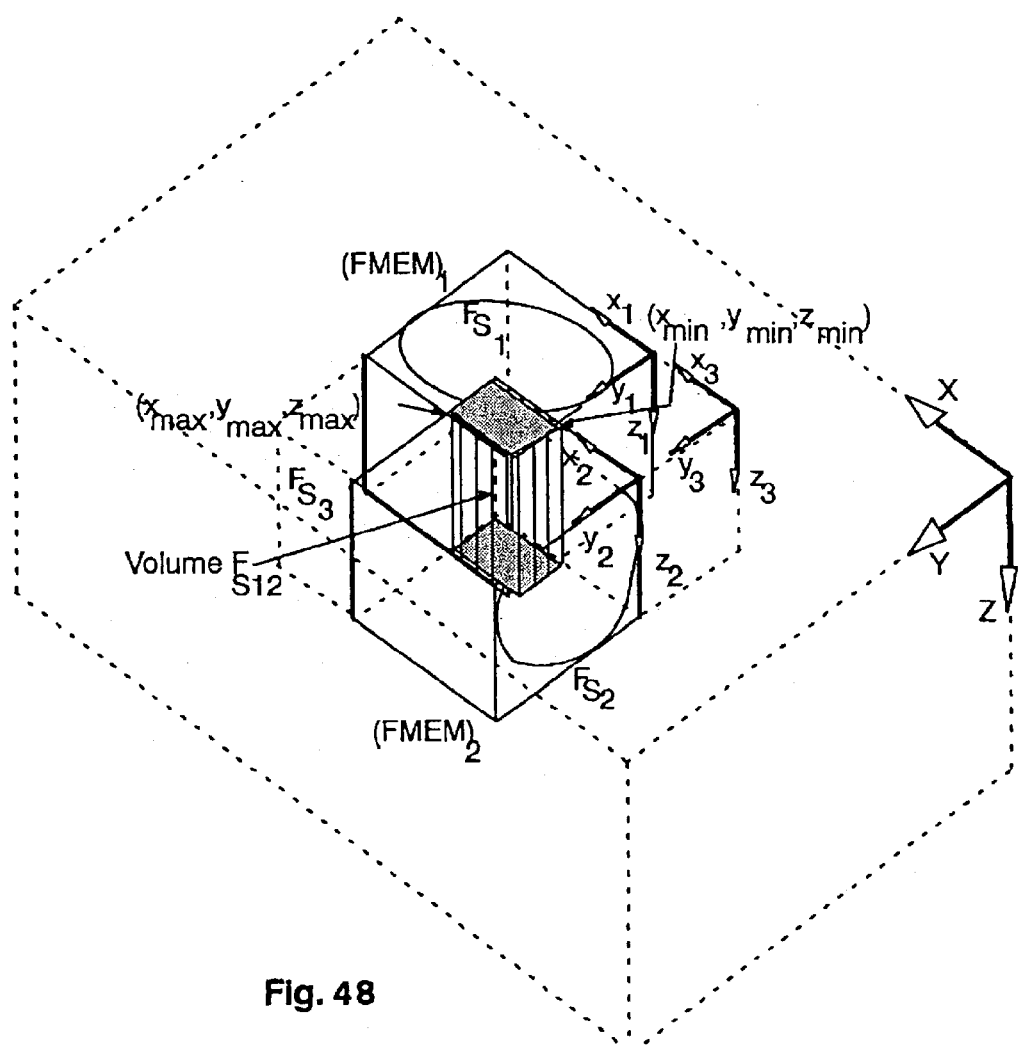
FIG. 48 illustrates the common volume formed by intersection of two containers.

The test to determine whether or not two FMEM profile shells intersect consists of two parts. The first part uses the containers of the individual FMEMs. Referring to FIG. 48, the two containers $F_{s_1}$ and $F_{s_2}$ are represented in their respective local FMEM coordinate systems $(x_1, y_1, z_1)$ and $(x_2, y_2, z_2)$ on the surfaces m and n, respectively, and each of which is oriented parallel to the global coordinate system $(X, Y, Z)$. However, the orientation of their respective surface shells are with respect to their respective individual coordinate system $(x, y, z)$. The intersecting volume $F_{s_{12}}$, which is the space common to both containers $F_{s_1}$ and $F_{s_2}$, is first identified. When two containers intersect they are surrounded by a third container $F_{s_3}$, which is the smallest rectangular prismatic volume that encloses both Fs1 and Fs2, and is expressed in the composite FMEM coordinate system $(x, y, z)$. The profile surfaces enclosed by the containers $F_{s_1}$ and $F_{s_2}$ can only intersect in the common volume $F_{s_{12}}$. The coordinates of the bottom right hand corner of the space $F_{s_{12}}$ in the $(x, y, z)$ coordinate system are $(x_{min}, y_{min}, z_{min})$ and the coordinates of the top left hand corner are $(x_{max}, y_{max}, z_{max})$.

Figure 49:
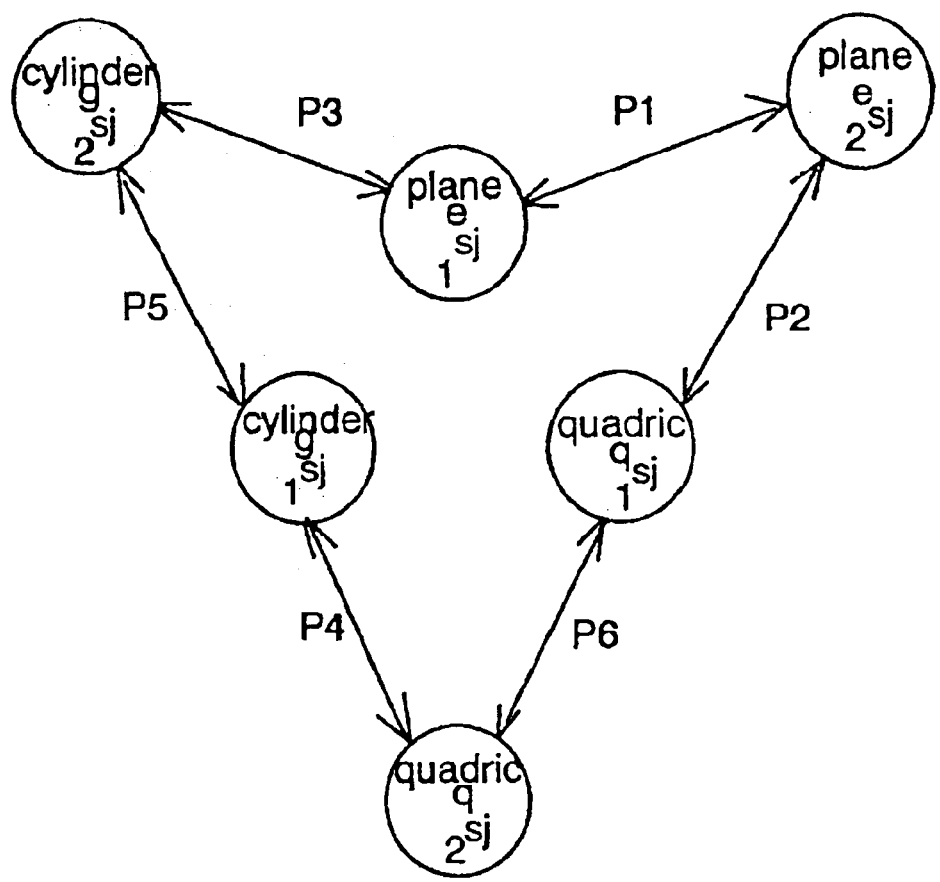
FIG. 49 the six unique combinations of surface intersections.

The second part of the test is applied only to the surfaces $e_{sj}$, $q_{sj}$, and $g_{s_{j,k}}$ of the two profile shells $_1{}^m S_{so}(\psi_p)$ and $_2{}^n S_{so}(\psi_p)$ that are present within the space $F_{s_{12}}$. The location of each surface of the two shells is used to determine whether or not it is within the space $F_{s_{12}}$. If it is within $F_{s_{12}}$, then it is marked for further processing. Referring to FIG. 49 it is seen that there are only six unique combinations of intersections among the surfaces $e_{sj}$, $q_{sj}$, and $g_{s_{j,k}}$ of the two shells $_1{}^m S_{so}(\psi_p)$ and $_2{}^n S_{so}(\psi_p)$. The combinations are denoted $\Pi_k$, $k=1, \ldots, 6$. The combinations $\Pi_1$, $\Pi_2$ and $\Pi_3$ represent interactions of a plane $e_{sj}$ with another plane $e_{sj}$, with a quadric surface $q_{sj}$ and with any one of the cylindrical surface $g_{s_{j,k}}$, respectively. The intersection curve resulting from a planar intersection lies in each of the intersecting planes. The combinations $\Pi_4$, $\Pi_5$ and $\Pi_6$ represent the intersections of two second order surfaces, and result in a higher order space curve. When the surfaces do not intersect in the space $F_{s_{12}}$ is denoted $\Pi_0$. Each intersection involving two second order orthogonal surfaces is tested using the Sylvester's resultant method, in which the Sylvester's determinant $|R_s|$ is expressed in terms of two of the three coordinate variables.

The six possible intersections $\Pi_k$, k=1, ..., 6 can be determined by using a general implicit surface $_v{}^n\gamma_{si}(U_i, U_{i+1}, \hat{U}_i, \hat{U}_{i+1}; \psi_p)$, i=1, 2, 3, 4, 5; n=1, ..., 6 and v=1, 2, ... of a profile shell $_v{}^nS_{s\sigma}(\psi_p)$ $\sigma$=C or I, on a face n. This surface is a ruled quadric surface, and is represented by its generator $_v{}^n\psi_i(P, \hat{P}; \psi_p)$ and the directric curve $_v{}^n\gamma_i(U_i, U_{i+1}; P)$ of the surface. The point P lies on the directric curve $_v{}^n\gamma_i(U_i, U_{i+1}; P)$, the point $\hat{P}$ lies on the directric curve $_v{}^n\gamma_i(\hat{U}_i, \hat{U}_{i+1}; P)$ and the point $\psi_p$ is any point on the generator line. A ruled surface $_v{}^n\gamma_{si}(U_i, U_{i+1}, \hat{U}_i, \hat{U}_{i+1}; \psi_p)$ is obtained by moving the generator along its directric $_v{}^n\gamma_i(U_i, U_{i+1}; P)$ from point $U_i$ to the point $U_{i+1}$. Mathematically, the implicit expression of a quadric ruled surface $_v{}^n\gamma_i(U_i, U_{i+1}, \hat{U}_i, \hat{U}_{i+1}; \psi_p)$ is same as the implicit representation of its directric curve $_v{}^n\gamma_i(U_i, U_{i+1}; P)$, which is given by equation (4.1). However, in the parametric space a point $\psi_p(x, y, z)$ on the surface $_v{}^n\gamma_{si}$ is represented by two parameters s and t as follows:

$$\psi_p(x, y, z)=(1-t)P(x, y, z)+t\hat{P}(x, y, z+d) \quad (5.1)$$

Equation (5.1) represents three equations, one for each of the three coordinates x, y and z. Each of these coordinates of either point P or $\hat{P}$ is function of the parameter s. Each of these expressions for each coordinate of P or $\hat{P}$ depends on the directric curve $_v{}^n\gamma_i(U_i, U_{i+1}; P)$. For i=1 it is linear in s; for i≠1 it is quadratic. The expressions for P and $\hat{P}$, which are substituted into equation (5.1), are given for a plane (i=1), a quadric surface (i=5) and for a cylindrical surface (i=2, 3 or 4) above. The parameter t varies from 0 to 1 along the generator line $\psi$, whereas the parameter s varies from 0 to 1 along the directric curve $_v{}^n\gamma_i(U_i, U_{i+1}; P)$ of the surface $_v{}^n\gamma_i(U_i, U_{i+1}, \hat{U}_i, \hat{U}_{i+1}; \psi_p)$. From equation (5.1), it is seen that $\psi_p$=P at t=0, whereas $\psi_p$=$\hat{P}$ at t=1.

For i=1, the surface $_v{}^n\gamma_{si}$ represents the plane $_v{}^ne_{sj}$; for i=2, 3, 4 $_v{}^n\gamma_{si}$ represents one of the cylindrical surfaces $_v{}^ng_{sj,k}$, k=1, 2, 3; and for i=5 $_v{}^n\gamma_{s5}$ represents a quadric surface $_v{}^nq_{sj}$. Furthermore, $U_i=P_{j,i}$, $\hat{U}_i=\hat{P}_j$ and $U_{i+1}=P_{j,i+1}$, $\hat{U}_{i+1}=\hat{P}_{j,i+1}$ except for i=5, where $U_i=P_{j,i+1}$, $\hat{U}_i=\hat{P}_{j,i+1}$ and $U_{i+1}=P_{j+1, i-4}$, $\hat{U}_{i+1}=\hat{P}_{j+1}$, j–4. The coordinates of the points $U_i$ and $U_{i+1}$ in the (x, y, z) coordinate system are given by ($x_i, y_i, z_i$) and ($x_{i+1}, y_{i+1}, z_{i+1}$), respectively. The coordinates of $\hat{U}_i$ and $\hat{U}_{i+1}$, are given by ($x_i, y_i, z_i+d$) and ($x_{i+1}, y_{i+1}, z_{i+1}+d$), respectively.

Consider an intersection of a cavity $_1{}^mS_{sC}(\psi_p)$ either with another cavity $_2{}^nS_{sC}(\psi_p)$ or with an island $_v{}^nS_{si}(\psi_p)$. Each of the six combinations $\Pi_k$; k=1, ..., 6 for the intersections of a cavity with another cavity and a cavity with an island are discussed in the following sections. It is shown how the intersection curves $\eta_t$, t=1, ..., x, where x is the total number of intersection curves, are obtained. Each curve consists of a series of intersection points $R_t$, t=0, ..., K–1, where K is the total number of points found for each intersection curve. The intersection points $R_t$ are the roots of the polynomials of the two intersecting surfaces $_1{}^m\gamma_{si}$ and $_2{}^n\gamma_{si}$. Hence, the problem is reduced to finding the roots of the two polynomials of the intersecting surfaces $_1{}^m\gamma_{si}$ and $_2{}^n\gamma$ for each of the six combinations.

The method used to determine $R_t$ is based on taking a parametric generator line $_1{}^m\psi_i(P, \hat{P}; t)$ of a parametric surface $_2{}^n\gamma_{si}(U_i, U_{i+1}, \hat{U}_i, \hat{U}_{i+1}; \psi_p)$ and finding its intersection with an orthogonal implicit surface $_2{}^n\gamma_{si}(U_i, U_{i+1}, \hat{U}_i, \hat{U}_{i+1}; \psi_p)$. The parametric generator line is first taken at s=0, that is, at $_1{}^m\psi_i(U_i, \hat{U}_i; t)$ which is on the surface $_1{}^m\gamma_{si}(U_i, U_{i+1}, \hat{U}_i, \hat{U}_{i+1}; \psi_p)$.

Intersections of the generator line with the other surface $_2{}^n\gamma_{si}(U_i, U_{i+1}, \hat{U}_i, \hat{U}_{i+1}; \psi_p)$ is then found. The generator line $_1{}^m\psi_i(P, \hat{P}; t)$ is moved by a small increment of s and the next intersection is found. This process is repeated until either the generator line $_1{}^m\psi_i(P, \hat{P}; t)$ reaches the final position or s=1; that is, the generator $_1{}^m\psi_i(U_i, \hat{U}_i; t)$. In this manner K intersection points $R_t$, t=0, ..., K–1 are found on the resulting intersection curve $\eta_t$. The intersection curve $\eta_t$ is then considered as a collection of curved segments. Each segment of the intersection curve $\eta_t$ is evaluated to determine whether or not it is within the bounds of the implicit surface $_2{}^n\gamma_{s1}$. If it is not, then it is rejected. If it is, then it is included as part of the intersection curve $\eta_t$. This process is repeated for all surfaces of the profile shell $_2{}^nS_{s\sigma}(\psi_p)$.

For the case of a cavity shell $_1{}^mS_{sC}(\psi_p)$ intersecting an island shell $_2{}^nS_{s1}(\psi_p)$, only the surfaces $_2{}^n\gamma_{s1}$ of the island are affected. The cavity $_1{}^mS_{sC}(\psi_p)$ removes the material from the island $_2{}^nS_{s1}(\psi_p)$. An island $_2{}^nS_{s1}(\psi_p)$ does not remove material from the cavity $_1{}^mS_{sC}(\psi_p)$. Thus, for such an intersection, the surfaces $_1{}^m\gamma_{s1}$ of the cavity shell $_1{}^mS_{sC}(\psi_p)$ are not considered and only the surfaces $_2{}^n\gamma_{s1}$ of the island shell $_2{}^nS_{s1}(\psi_p)$ in the region $F_{s_{12}}$ are considered.

The following sections explain in detail the six intersection combinations $\Pi_k$, k=1, ..., 6, for a cavity $_1{}^mS_{sC}(\psi_p)$ intersecting either another cavity $_2{}^nS_{sC}(\psi_p)$ or an island $_2{}^nS_{s1}(\psi_p)$.

Figure 50:
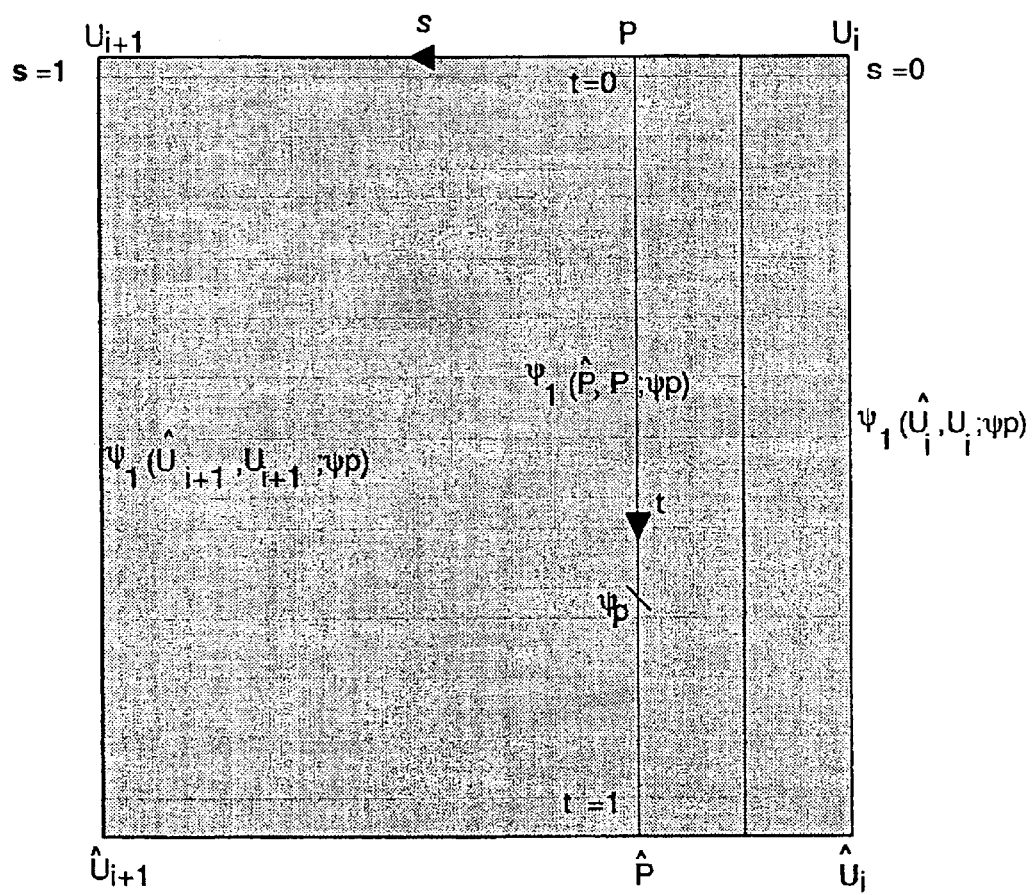
FIG. 50 illustrates a plane represented in parametric space.

The combination $\Pi_1$ denotes the intersection of the two planes $_1{}^m\gamma_{s1}(U_i, U_{i+1}, \hat{U}_i, \hat{U}_{i+1}; \psi_p)$ and $_2{}^n\gamma_{s1}(U_i, U_{i+1}, \hat{U}_i, \hat{U}_{i+1}; \psi_p)$, which are each described by equation (3.5). Expanding equation (3.5) for faces m and n, respectively, in the local coordinate system for (FMEM)$_3$ yields $$_1{}^m\gamma_{s1}(U_i, U_{i+1}, \hat{U}_i, \hat{U}_{i+1}; \psi_p)=2_1{}^mG_jx+2_1{}^mH_jy+2_1{}^mJ_jz+_1{}^mK_j=0 \quad (5.2a)$$

$$_2{}^n\gamma_{s1}(U_i, U_{i+1}, \hat{U}_i, \hat{U}_{i+1}; \psi_p)=2_2{}^nG_jx+2_2{}^nH_jy+2_2{}^nJ_jz+_2{}^nK_j=0 \quad (5.2b)$$

where, the coefficients $_1{}^mG_j$, $_1{}^mH_j$, $_1{}^mJ_j$ and $_1{}^mK_j$ for (FMEM)$_1$ and the coefficients $_2{}^nG_j$, $_2{}^nH_j$, $_2{}^nJ_j$ and $_2{}^nK_j$ for (FMEM)$_2$ are given by equation (3.7). To solve the above two equations, the plane $_1{}^m\gamma_{s1}$ is represented in parametric space (s,t) such that the surface $_1{}^m\gamma_{s1}(U_i, U_{i+1}, \hat{U}_i, \hat{U}_{i+1}; \psi_p)$ is given by a generator line $_1{}^m\psi_i(P, \hat{P}, t)$ and the directric edge $_1{}^m\gamma_1(U_i, U_{i+1}; s)$ as shown in FIG. 50. The intersections of the generator line $_1{}^m\psi_i(P, \hat{P}, t)$ with the plane $_2{}^n\gamma_{s1}(U_i, U_{i+1}, \hat{U}_i, \hat{U}_{i+1}; \psi_p)$ are considered for 0≦s≦1. An arbitrary point $_1{}^m\psi_p=(_1{}^mx_p, _1{}^my_p, _1{}^mz_p)$ on the generator line is related to the points P and $\hat{P}$ by equation (5.1). The point P is an arbitrary point that exists on the directric curve $_1{}^m\gamma_1(U_i, U_{i+1}; s)$ and the point $\hat{P}$ is another arbitrary point that exists on the other end of the generator $_1{}^m\psi_i(P, \hat{P}, t)$ on the other directric curve $_1{}^m\hat{\gamma}_i(\hat{U}_i, \hat{U}_{i+1}; s)$. The points P and $\hat{P}$ on an edge directric $_1{}^m\gamma_1$ are given by $$P=(1-s)U_i+sU_{i+1} \quad (5.3)$$

$$\hat{P}=(1-s)\hat{U}_i+s\hat{U}_{i+1} \quad (5.3)$$

For the case of P=$U_i$ and $\hat{P}$=$U_i$, the generator line is at its initial position of s=0; and for the case of P=$U_{i+1}$ and $\hat{P}$=$U_{i+1}$, the generator line is at its final position of s=1. Also, when t=0, $\psi_p$=P, and when t=1, $\psi_p$=$\hat{P}$.

The general plane $_1{}^m\gamma_{s1}$, m=1, ..., 6 represents a plane whose directric edge $_1{}^m\gamma_1$ exists on one of the six faces of (FMEM)$_1$. Substituting equations (5.3) and (5.4) in equation (5.1), and then simplifying for each of the six cases in the (x, y, z) coordinate system of (FMEM)$_3$, yields For $m = 1$ $$x = (1-s) \, {}^1_1x_i + s \, {}^1_1x_{i+1} \tag{5.5a}$$

$$x = (1-s) \, {}^1_1y_i + s \, {}^1_1y_{i+1}$$

$$z = z_0 + td_1$$

For $m = 2$ $$x = (1-s) \, {}^2_1x_i + s \, {}^2_1x_{i+1} \tag{5.5b}$$

$$y = y_0 + V - td_1$$

$$z = (1-s) \, {}^2_1z_i + s \, {}^2_1z_{i+1}$$

For $m = 3$ $$x = x_0 + U - td_1 \tag{5.5c}$$

$$y = (1-s) \, {}^3_1y_i + s \, {}^3_1y_{i+1}$$

$$z = (1-s) \, {}^3_1z_i + s \, {}^3_1z_{i+1}$$

For $m = 4$ $$x = (1-s) \, {}^4_1x_i + s \, {}^4_1x_{i+1} \tag{5.5d}$$

$$y = y_0 + td_1$$

$$z = (1-s) \, {}^4_1z_i + s \, {}^4_1z_{i+1}$$

For $m = 5$ $$x = x_0 + td_1 \tag{5.5e}$$

$$y = (1-s) \, {}^5_1y_i + s \, {}^5_1y_{i+1}$$

$$z = (1-s) \, {}^5_1z_i + s \, {}^5_1z_{i+1}$$

For $m = 6$ $$x = (1-s) \, {}^6_1x_i + s \, {}^6_1x_{i+1} \tag{5.5f}$$

$$x = (1-s) \, {}^6_1y_i + s \, {}^6_1y_{i+1}$$

$$z = z_0 + W - td_1$$

where, $(x_0, y_0, z_0)$ are the coordinates of the origin of the local (x, y, z) system of (FMEM)$_3$ in the global coordinate system (X, Y, Z), and $U=U_3+x_0$, $V=V_3+y_0$, and $W=W_3+z_0$. The dimensions $U_3$, $V_3$, and $W_3$ represent the size of (FMEM)$_3$ in the X, Y and Z directions, respectively. The coordinates $({}^m_1x_i, {}^m_1y_i, {}^m_1z_i)$ and $({}^m_1x_{i+1}, {}^m_1y_{i+1}, {}^m_1z_{i+1})$ represent the end points ${}^m_1U_i$ and ${}^m_1U_{i+1}$ of (FMEM)$_1$, respectively, in the (x, y, z) coordinate system, and $d_1$ is the depth of the profile shell of (FMEM)$_1$.

There are 24 combinations that fall into the classification $\Pi_1$. The plane ${}^n_2\gamma_{s1}$ may exist on one of the four faces orthogonal to face m. More explicitly these 24 cases are: for m=1, n=2, 3, 4, 5; for m=2, n=1, 3, 5, 6; for m=3, n=1, 2, 4, 6; for m=4, n=1, 3, 5, 6; for m=5, n=1, 2, 4, 6; and for m=6, n=2, 3, 4, 5. For each of these cases, the appropriate equation from the set of equations (55a) through (55f) is substituted into equation (5.2b) to yield a value of t. Specifically:

For the case of $m = 1$ and $n = 2$ or $n = 4$.

$$t = -\{{}^n_2 G_j[(1-s) \, {}^1_1x_i + s \, {}^1_1x_{i+1}] + {}^n_2 J_j z_0 + {}^n_2 K_j\}/{}^n_2 J_j d_1 \tag{5.6a}$$

For the case of $m = 1$ and $n = 3$ or $n = 5$.

$$t = -\{{}^n_2 H_j[(1-s) \, {}^1_1y_i + s \, {}^1_1y_{i+1}] + {}^n_2 J_j z_0 + {}^n_2 K_j\}/{}^n_2 J_j d_1 \tag{5.6b}$$

For the case of $m = 2$ and $n = 1$ or $n = 6$.

$$t = \{{}^n_2 G_j[(1-s) \, {}^2_1x_i + s \, {}^2_1x_{i+1}] + {}^n_2 H_j V + {}^n_2 K_j\}/{}^n_2 H_j d_1 \tag{5.6c}$$

For the case of $m = 2$ and $n = 3$ or $n = 5$.

$$t = \{{}^n_2 J_j[(1-s) \, {}^2_1z_i + s \, {}^2_1z_{i+1}] + {}^n_2 H_j V + {}^n_2 K_j\}/{}^n_2 H_j d_1 \tag{5.6d}$$

For the case of $m = 3$ and $n = 1$ or $n = 6$.

$$t = \{{}^n_2 H_j[(1-s) \, {}^3_1y_i + s \, {}^3_1y_{i+1}] + {}^n_2 G_j U + {}^n_2 K_j\}/{}^n_2 G_j d_1 \tag{5.6e}$$

For the case of $m = 3$ and $n = 2$ or $n = 4$.

$$t = \{{}^n_2 J_j[(1-s) \, {}^3_1z_i + s \, {}^3_1z_{i+1}] + {}^n_2 G_j U + {}^n_2 K_j\}/{}^n_2 G_j d_1 \tag{5.6f}$$

For the case of $m = 4$ and $n = 1$ or $n = 6$.

$$t = -\{{}^n_2 G_j[(1-s) \, {}^4_1x_i + s \, {}^4_1x_{i+1}] + {}^n_2 H_j y_0 + {}^n_2 K_j\}/{}^n_2 H_j d_1 \tag{5.6g}$$

For the case of $m = 4$ and $n = 3$ or $n = 5$.

$$t = -\{{}^n_2 J_j[(1-s) \, {}^4_1z_i + s \, {}^4_1z_{i+1}] + {}^n_2 H_j y_0 + {}^n_2 K_j\}/{}^n_2 H_j d_1 \tag{5.6h}$$

For the case of $m = 5$ and $n = 1$ or $n = 6$.

$$t = -\{{}^n_2 H_j[(1-s) \, {}^5_1y_i + s \, {}^5_1y_{i+1}] + {}^n_2 G_j x_0 + {}^n_2 K_j\}/{}^n_2 G_j d_1 \tag{5.6i}$$

For the case of $m = 5$ and $n = 2$ or $n = 4$.

$$t = -\{{}^n_2 J_j[(1-s) \, {}^5_1z_i + s \, {}^5_1z_{i+1}] + {}^n_2 G_j x_0 + {}^n_2 K_j\}/{}^n_2 G_j d_1 \tag{5.6j}$$

For the case of $m = 6$ and $n = 2$ or $n = 4$.

$$t = -\{{}^n_2 G_j[(1-s) \, {}^6_1x_i + s \, {}^6_1x_{i+1}] + {}^n_2 J_j W + {}^n_2 K_j\}/{}^n_2 J_j d_1 \tag{5.6k}$$

For the case of $m = 6$ and $n = 3$ or $n = 5$.

$$t = \{{}^n_2 H_j[(1-s) \, {}^6_1y_i + s \, {}^6_1y_{i+1}] + {}^n_2 J_j W + {}^n_2 K_j\}/{}^n_2 J_j d_1 \tag{5.6l}$$

It can be seen from the above equations that when the two planes ${}^m_1\gamma_{s1}(U_i, U_{i+1}, \hat{U}_i, \hat{U}_{i+1}; \psi_p)$ and ${}^n_2\gamma_{s1}(U_i, U_{i+1}, \hat{U}_i, \hat{U}_{i+1}; \psi_p)$ do not intersect, then for m=1 and m=6, ${}^n_2 J_j = 0$; for m=2 and m=4, ${}^n_2 H_j = 0$; and for m=3 and m=5, ${}^n_2 G_j = 0$. When these coefficients are non-zero for their respective cases, equations (5.6a) through (5.6l) yield the indicated value of t. Each intersection combination $\Pi_1$ yields only one value of t for a specific value of s, which corresponds to an implicit point $\psi_P$ on the generator lines ${}^m_1\psi_i(P, \hat{P}, t)$ and ${}^n_2\psi_i(P, \hat{P}, t)$. Each value of s corresponds to a point P on the directric line ${}^m_1\gamma_1(U_i, U_{i+1}; P)$ as well as a point $\hat{P}$ on the directric curve ${}^n_2\hat{\gamma}_1(\hat{U}_i, \hat{U}_{i+1}; \hat{P})$. The points P and $\hat{P}$ are obtained by substituting the value of s into equations (5.2) and (5.3), respectively. The process begins by positioning an imaginary generator line ${}^m_1\psi_i(U_i, \hat{U}_{i+1}; t)$ at s=0 and solving the appropriate equation in equations (5.6a) through (5.6l) for t to obtain $t_0$. If this value $t_0$ is between 0 and 1, it is accepted one of the roots, otherwise it is rejected. This provides the first intersection point in parametric space $(0, t_0)$. The imaginary generator line is then moved to the next value of s, say $s_1$, which in turn represents new values for the points P and $\hat{P}$ on the directric edge $_1{}^m\gamma_i(U_i, U_{i+1}; P)$. The appropriate equation from the set of equations (5.6a) through (5.6l) is then solved for next value of t, that is, $t_1$. This provides the second intersection point in parametric space $(s_1, t_1)$, provided that $t_1$ also lies between 0 and 1. This is repeated until all intersection points in parametric space (s, t) on the intersection line $\eta_1$ are determined by varying s from s=0 to s=1. The final point is $(1, t_{K-1})$ when s=1, and the calculated value $t_{K-1}$ is between 0 and 1. Each point (s, t) in parametric space represents a point on the intersection line $\eta_1$. These K parametric points $(0, t_0), (s_1, t_1) \ldots, (1, t_{K-1})$ are then transformed to the implicit points $R_t$, t=0, ..., K−1, given in the (x, y, z) system. The t and s values for each parametric intersection point are substituted into the appropriate set of equations (5.5a) through (55f), and yield the coordinates of the intersection point in the (x, y, z) coordinate system.

The next step is to determine whether or not the points $R_t$, t=0, ..., K−1 are within the boundaries of the other plane $_2{}^n\gamma_{s1}(U_i, U_{i+1}, \hat{U}_i, \hat{U}_{i+1}; \psi_p)$. This is achieved by taking each intersection point $R_t$ and determining the parameter s and t on the plane $_2{}^n\gamma_{s1}(U_i, U_{i+1}, \hat{U}_i, \hat{U}_{i+1}; \psi_p)$. The parameter t for a point $R_t(x, y, z)$ is obtained from the following equations:

For $n = 3$ or $n = 5$.

$$t = \frac{(x - x_i)}{(\hat{x}_i - x_i)} \quad (5.7a)$$

For $n = 2$ or $n = 4$.

$$t = \frac{(y - y_i)}{(\hat{y}_i - y_i)} \quad (5.7b)$$

For $n = 1$ or $n = 6$.

$$t = \frac{(z - z_i)}{(\hat{z}_i - z_i)} \quad (5.7c)$$

It can be seen from equations (5.7) that t=0 is the start point $_2{}^nU_i$ of the directric edge $_2{}^n\gamma_1(U_i, U_{i+1}; P)$ and that t=1 is the start point $_2{}^n\hat{U}_i$ of the other directric edge $_2{}^n\hat{\gamma}_1\hat{U}_i, \hat{U}_{i+1}; \hat{P})$. In fact, t=0 is point P of the directric edge $_2{}^n\gamma_1(U_i, U_{i+1}; P)$ and t=1 is point $\hat{P}$ of the directric edge $_2{}^n\hat{\gamma}_1(\hat{U}_i, \hat{U}_{i+1}; \hat{P})$. When the point lies between the two directrics $_2{}^n\gamma_1(U_i, U_{i+1}; P)$ and $_2{}^n\hat{\gamma}_1(\hat{U}_i, \hat{U}_{i+1}; \hat{P})$, then 0<t<1. The value $t(R_t)$ for each intersection point $R_t$, t=0, ..., K−1 is obtained by substituting $x=x_e$ when n=3 or 5, $y=y_e$ when n=2 or 4, and $z=z_e$ when n=1 or 6 into equations (5.7), where $(x_e, y_e, z_e)$ are the coordinates of the intersection point $R_t$. The points $R_t$ that are not within $0 \leq t \leq 1$ are rejected. For the remaining $R_t$, the parameter s is obtained from one of the following equations:

For $x_{i+1} \neq x_i$, $y_{i+1} = y_i$ and $z_{i+1} = z_i$, $$s(x) = \frac{(x - x_i)}{(x_{i+1} - x_i)} \quad (5.8a)$$

For $x_{i+1} = x_i$, $y_{i+1} \neq y_i$ and $z_{i+1} = z_i$, $$s(y) = \frac{(y - y_i)}{(y_{i+1} - y_i)} \quad (5.8b)$$

For $x_{i+1} = x_i$, $y_{i+1} = y_i$ and $z_{i+1} \neq z_i$, $$s(z) = \frac{(z - z_i)}{(z_{i+1} - z_i)} \quad (5.8c)$$

It can be seen from equations (5.8) that s=0 is the starting point $_2{}^nU_i$ and that s=1 is the terminating point $_2{}^nU_{i+1}$ of the edge $_2{}^n\gamma_1((U_i, U_{i+1}; P)$. When the point lies between points $U_i$ and $U_{i+1}$, then 0<s<1. However, a point that precedes $U_i$ will have s<0 and a point that follows $U_{i+1}$ will have s>1. The value $s(R_t)$ for each intersection point $R_t$, t=0, ..., K−1 is obtained by substituting $x=x_e$ when $x_{i+1} \neq x_i$, or $y=y_e$ when $x_i=x_{i+1}$ and $z_i=z_{i+1}$, or $z=z_e$ when $x_i=x_{i+1}$ and $y=y_{i+1}$ into equation (5.8). The $(x_e, y_e, z_e)$ are the coordinates of the intersection point $R_t$. The points $R_t$ that are not within $0 \leq s \leq 1$ are rejected.

Figure 51:
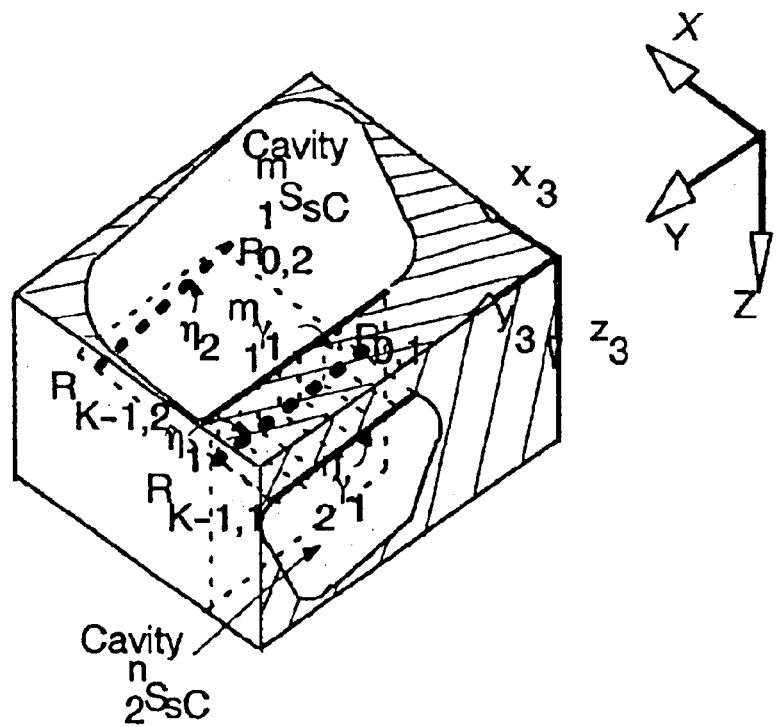
FIG. 51 illustrates a plane intersecting another plane when a cavity shell intersects with cavity shell.
Figure 52:
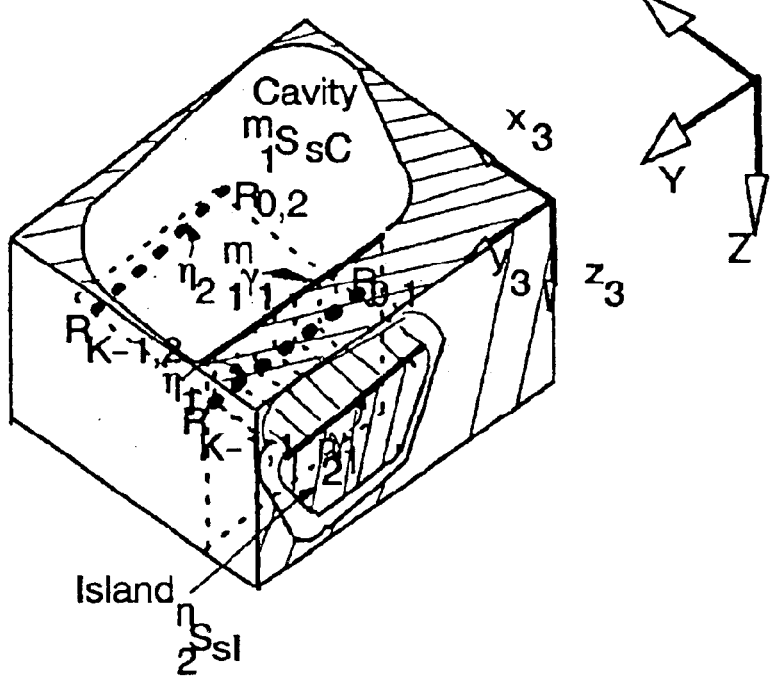
FIG. 52 illustrates a plane intersecting another plane when a cavity shell intersects with an island.

The plane $_1{}^m\gamma_{s1}(U_i, U_{i+1}\hat{U}_i, \hat{U}_{i+1}; \psi_p)$, however, may intersect with other surfaces $_2{}^n\gamma_{s1}(U_i, U_{i+1}\hat{U}_i, \hat{U}_{i+1}; \psi_p)$ (i=2, 3, 4, 5, and n≠m) of the shell $_2{}^nS_{sC}(\psi_p)$ and may have $N_1$ intersection curves $\eta_t$, t=1, ..., $N_1$. Similarly, the plane $_2{}^n\gamma_{s1}(U_i, U_{i+1}\hat{U}_i, \hat{U}_{i+1}; \psi_p)$ may intersect with other surfaces $_1{}^m\gamma_{s1}(U_i, U_{i+1}\hat{U}_i, \hat{U}_{i+1}\psi_p)$ (i=2, 3, 4, 5, and n≠m) of the shell $_1{}^mS_{sC}(\psi_p)$ and may have $N_2$ intersection curves $\eta_t$, t=1, ..., $N_2$. This is illustrated in FIGS. 51 and 52. FIG. 51 shows the intersection of two planes $_1{}^m\gamma_{s1}(U_i, U_{i+1}\hat{U}_i, \hat{U}_{i+1}; \psi_p)$ and $_2{}^n\gamma_{s1}(U_i, U_{i+1}\hat{U}_i, \hat{U}_{i+1}; \psi_p)$ when a cavity shell $_1{}^mS_{sC}(\psi_p)$ intersects with cavity shell $_2{}^nS_{sC}(\psi_p)$. FIG. 52 shows the intersection of two planes $_1{}^m\gamma_{s1}(U_i, U_{i+1}\hat{U}_i, \hat{U}_{i+1}; \psi_p)$ and $_2{}^n\gamma_{s1}(U_i, U_{i+1}\hat{U}_i, \hat{U}_{i+1}; \psi_p)$ when a cavity shell $_1{}^mS_{sC}(\psi_p)$ intersects with an island shell $_2{}^n\gamma_{s1}(\psi_p)$ The points on the intersection curve $\eta_1$ that results from the intersection of the two planes is obtained from equations (5.6a) through (5.6l). Another intersection curve $\eta_2$, shown in FIG. 51, results from the intersection of the plane $_2{}^n\gamma_{s1}(U_i, U_{i+1}\hat{U}_i, \hat{U}_{i+1}; \psi_p)$ with one of the surfaces $_1{}^m\gamma_{s1}$, (i=2, 3, 4, 5, of the cavity shell $_1{}^mS_{sC}(\psi_p)$. The procedure for obtaining $\eta_2$ is explained subsequently.

Figure 53:
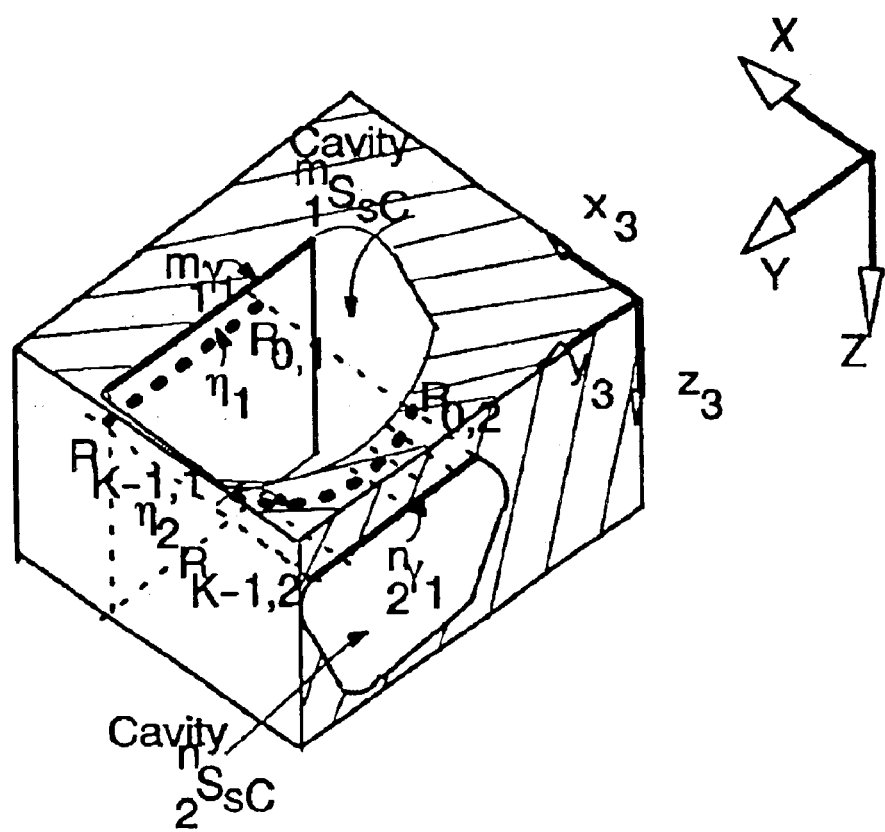
FIG. 53 illustrates a cavity shell intersecting another cavity shell when the order for the intersection curves is reversed.

FIG. 51 shows that the plane $_1{}^m\gamma_{s1}(U_i, U_{i+1}\hat{U}_i, \hat{U}_{i+1}; \psi_p)$ has only one intersection curve $\eta_1$, whereas the plane $_2{}^n\gamma_{s1}(U_i, U_{i+1}\hat{U}_i, \hat{U}_{i+1}; \psi_p)$ has two intersection curves $\eta_1$ and $\eta_2$. Therefore, the plane $_1{}^m\gamma_{s1}(U_i, U_{i+1}\hat{U}_i, \hat{U}_{i+1}; \psi_p)$ can be divided into two patches $_1{}^m\chi_{s1,1}(U_i, U_{i+1}, R_{0,1}, R_{K-1,1}; \psi_p)$ and $_1{}^m\chi_{s1,2}(R_{0,1}, R_{K-1,1}, \hat{U}_i, \hat{U}_{i+1}; \psi_p)$ where $R_{0,1}$ and $R_{K-1,1}$ are the first and the last intersection points on the intersection curve $\eta_1$. The plane $_2{}^n\gamma_{s1}(U_i, U_{i+1}, \hat{U}_i, \hat{U}_{i+1}; \psi_p)$ is subdivided into three patches; however, they cannot be identified until the relative positions of the intersection curves $\eta_1$ and $\eta_2$ with respect to each other and with respect to the two directric edges $_2{}^n\gamma_1(U_i, U_{i+1}; P)$ and $_2{}^n\hat{\gamma}_1(\hat{U}_i, \hat{U}_{i+1}; \hat{P})$ are determined. In other words, the intersection points $R_{t,1}$ of $\eta_1$ and $R_{t,2}$ of $\eta_2$ need to be ordered along the generator line $_2{}^n\psi_1(P, \hat{P}; \psi_p)$. This ordering is done only if there is more than one intersection curve for the plane, and is achieved by comparing the values of the parameter t for each intersection point $R_{t,1}$, t=0, ..., K−1, and $R_{t,2}$, t=0, ..., K−1, of the two intersection curves $\eta_1$ and $\eta_2$, respectively. The value $t(R_{t,1})$ is obtained from equation (5.7). Similarly, $t(R_{t,2})$ is calculated by substituting the appropriate coordinates into equation (5.7). The intersection points are then ordered in ascending order for the parameter t. If $t(R_{t,1}) < t(R_{t,2})$ then the order is $(P, R_{t,1}, R_{t,2}, \hat{P})$; otherwise the order is $(\hat{P}, R_{t,2}, R_{t,1}, \hat{P})$. The former order is shown in FIG. 51, and the latter in FIG. 53. Once the order is known, the patches for the plane $_2{}^n\gamma_{s1}$ can be identified. For the order $(P, R_{t,1}, R_{t,2}, \hat{P})$ the patches are $_2{}^n\chi_{s1,1}(U_i, U_{i+1}, (R_{0,1}, R_{K-1,1}; \psi_p)$, $_2{}^n\chi_{s1,2}(R_{0,1}, R_{K-1,1}, (R_{0,2}, R_{K-1,2}; \psi_p)$ and $_2{}^n\chi_{s1,3}(R_{0,2}, R_{K-1,2}(\hat{U}_i, \hat{U}_{i+1}; \psi_p)$. For the reverse situation the order of the points is $(P, R_{t,2}, R_{t,1}, \hat{P})$ and the three patches are $_2{}^n\chi_{s1,1}(U_i, U_{i+1}, (R_{0,2}, R_{K-1,2}; \psi_p)$, $_2{}^n\chi_{s1,2}(R_{0,2}, R_{K-1,2}, (R_{0,1}, R_{K-1,1}; \psi_p)$ and $_3{}^n\chi_{s1,3}(R_{0,1}, R_{K-1,1}, \hat{U}_i, \hat{U}_{i+1}; \psi_p)$.

Figure 54:
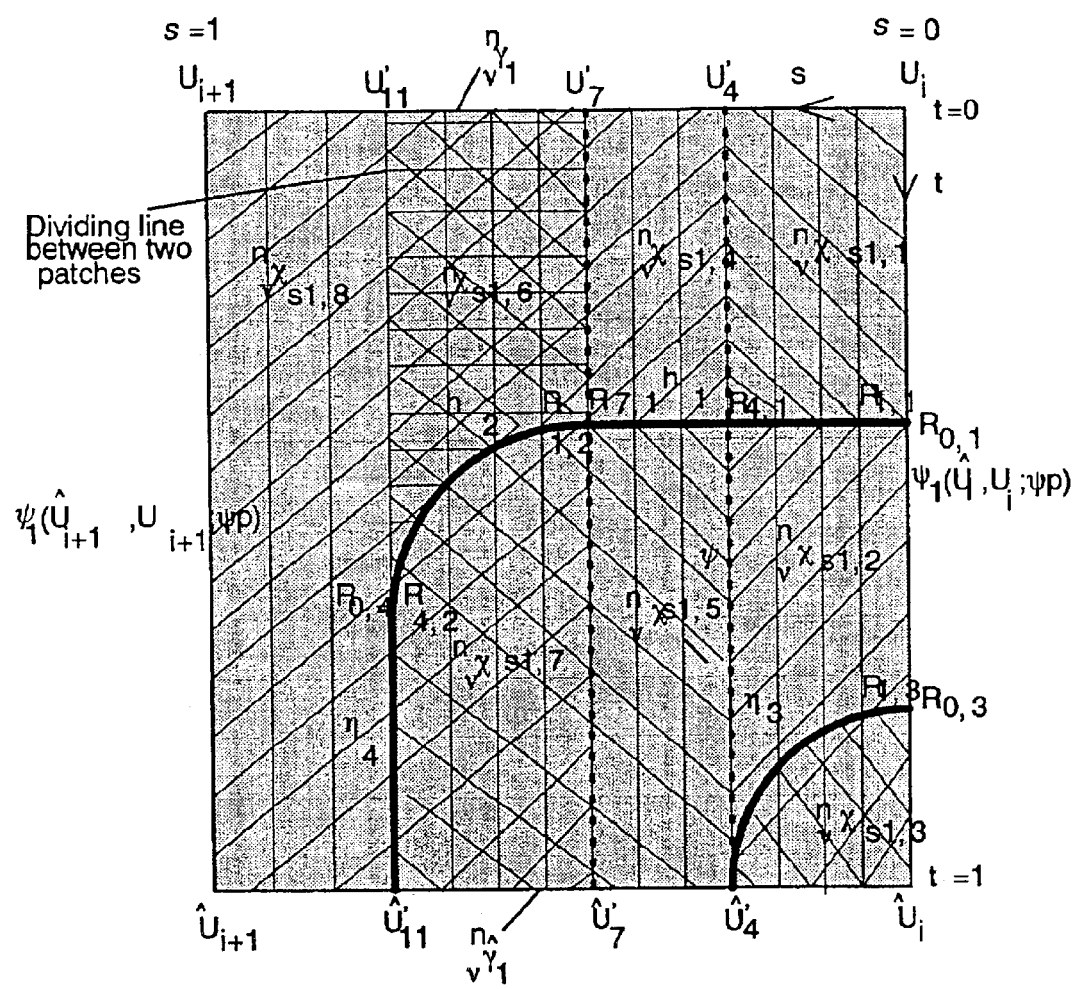
FIG. 54 illustrates a plane that has been dissected into eight patches because of the resulting four curves.

The patches are determined by dissecting the plane. However, there is no direct and well defined relation between the number of patches and the number of intersection curves on a plane. As shown in FIG. 54, when a plane $_v^n\gamma_{s1}U_i, U_{i+1}, \hat{U}_i, \hat{U}_{i+1}; \psi_p)$ intersects an orthogonal surface $_\mu^m\gamma_{s1}$(i=1, 2, 3, 4, 5, $\mu \neq n$ and n⊥m), there are four intersection cases. In this case, two combination $\Pi_1$ intersection lines $\eta_1$ and $\eta_4$, and two combination $\Pi_3$ intersection curves $\eta_2$ and $\eta_3$. The intersection points $R_{t,1}$, t=0, 1, . . . , 7, lie on $\eta_1$; points $R_{t,2}$, t=0, 1, . . . 4, lie on $\eta_2$; and points $R_{t,3}$, t=0, 1, . . . 4, lie on $\eta_3$. Line $\eta_4$ coincides with a generator line. The dissecting procedure assumes that the directric curve $_v^n\gamma_1U_i, U_{i+1}; P)$ is divided into small segments using the points $U'_1$ through $U'_{13}$. Similarly, the directric curve $_v^n\gamma_1\hat{U}_i, \hat{U}_{i+1}; \hat{P})$ is divided by the points $\hat{U}'_1$ through $\hat{U}'_{13}$ such that each of the points $\hat{U}'_1, \ldots, \hat{U}'_{13}$ is a projection on the directric $_v^n\hat{\gamma}_1$ of the points $U'_1, \ldots, U'_{13}$, respectively. There are 13 generator lines $_v^n\psi_{1,1}, \ldots, _v^n\psi_{1,3}$, each of which starts from a corresponding point U' and ends at its projection Û'. For example, line $_v^n\psi_{1,1}$ connects the points $U'_1$ and $\hat{U}'_1$ whereas the line $_v^n\psi_{1,3}$ connects the points $U'_{13}$ and $\hat{U}'_{13}$. Each of these 13 generator lines either intersects or does not intersect the intersection curves. If a generator line does not intersect an intersection curve, it is concluded that the line resides in a single patch. However, if it intersects N curves, it is considered as residing in N+1 patches. However, the generator line $_v^n\psi_{1,11}$ includes the intersection curve $\eta_4$. In this case the plane is dissected by line $\eta_4$ into two patches. Besides this special case, any generator line that passes through the first intersection point $R_{0i}$ and any line that passes through the last point $R_{K-1i}$ of an intersection curve $\eta_j$ dissects the plane into two patches in the direction of the parametric t axis. In addition to the dissection in the direction of the parametric t axis, each intersection curve $\eta_j$ dissects the plane in the direction of the parametric s axis into two patches. As shown in FIG. 54, there are eight patches $_v^n\chi_{s1,1}, \ldots, _v^n\chi_{s1,8}$ that result from the four intersection curves $\eta_1, \ldots, \eta_4$.

Once the patches for a plane are determined, the patches that are removed and the patches that remain are identified. This is done by retaining the patch closest to the directric curve in the t direction, and then removing the next closest patch. This sequence of removing and retaining patches is repeated in the t direction until the last patch is reached. The patches $_v^n\chi_{s1,1}, _v^n\chi_{s1,4}, _v^n\chi_{s1,6}$ and $_v^n\chi_{s1,8}$ are retained as they are closest to the directric curve (have lower values of t). The patches $_v^n\chi_{s1,2}, _v^n\chi_{s1,5}$, and $_v^n\chi_{s1,7}$, however, are removed as these are the next patches after the closest patches. The patch $_v^n\chi_{s1,3}$ is also retained as it is the third closest patch to the directric curve. The plane $_v^n\gamma_{s1}U_i, U_{i+1}\hat{U}_i, \hat{U}_{i+1}; \psi_p)$ is then specified as a collection of patches that is given by $$_v^n\gamma_{si}(U_i, U_{i+1}, \hat{U}_i, \hat{U}_{i+1}; \psi_p) = _v^n\chi_{si,1}(U_i, U'_4, R_{0,1}, R_{4,1}; \chi_p) + \quad (5.9)$$
$$_v^n\chi_{si,3}(R_{0,3}, R_{4,3}, U'_i, \hat{U}'_4; \psi_p) + _v^n\chi_{si,4}(U'_4, U'_7, R_{4,1}, R_{7,1}; \psi_p) +$$
$$_v^n\chi_{xi,6}(U'_4, U'_7, R_{7,1}, R_{0,4}; \psi_p) + _v^n\chi_{si,8}(U'_{11}, U_{i+1}, \hat{U}'_{11}, \hat{U}_{i+1}; \psi_p)$$

Figure 55:
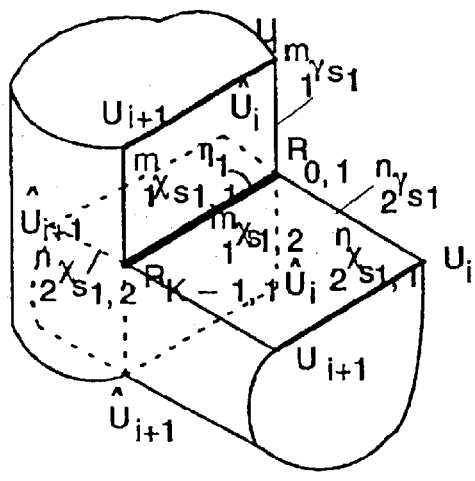
FIG. 55 illustrates the case of the intersection of two orthogonal planes when a cavity shell intersects another cavity shell and when the intersection is full.

FIG. 55 through 58 shows some of the ways in which two planes $_1^m\gamma_{s1}U_i, U_{i+1}, \hat{U}_i, \hat{U}_{i+1}; \psi_p)$ and $_1^m\gamma_{s1}U_i, U_{i+1}, \hat{U}_i, \hat{U}_{i+1}; \psi_p)$ may intersect. FIG. 55 shows the case when both planes share a full intersection line $\eta_1$. The plane $_1^m\gamma_{s1}U_i, U_{i+1}, \hat{U}_i, \hat{U}_{i+1}; \psi_p)$ is dissected into the patches $_v^n\chi_{s1,1}U_i, U_{i+1}R_{0,1}, R_{K-1,1}; \psi_p)$ and $_1^m\chi_{s1,2}(R_{0,1}, R_{K-1,1}, \hat{U}_i, \hat{U}_{i+1}; \psi_p)$ whereas the plane $_2^n\gamma_{s1}U_i, U_{i+1}\hat{U}_i, \hat{U}_{i+1}; \psi_p)$ is dissected into the patches $_2^n\chi_{s1,1}U_i, U_{i+1}(R_{0,1}, R_{K-1,1}; \psi_p)$ and are removed since they lie inside a cavity. The dissected planes are therefore given by, respectively, $$_1^m\gamma_{s1}(U_i, U_{i+1}\hat{U}_i, \hat{U}_{i+1}; \psi_p) = _1^m\chi_{s1,1}(U_i, U_{i+1}, R_{0,1}, R_{K-1,1}; \psi_p) \quad (5.10a)$$

$$_2^n\gamma_{s1}(U_i, U_{i+1}\hat{U}_i, \hat{U}_{i+1}; \psi_p) = _2^n\chi_{s1,1}(U_i, U_{i+1}R_{0,1}, R_{K-1,1}; \psi_p) \quad (5.10b)$$

Figure 56:
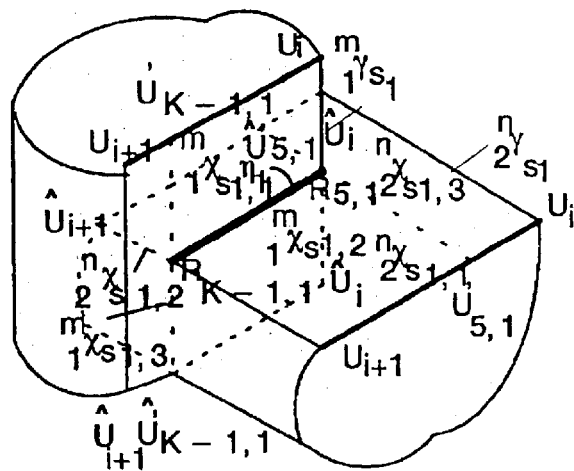
FIG. 56 illustrates the case of the intersection of two orthogonal planes when a cavity shell intersects another cavity shell and when the intersection is partial.

FIG. 56 shows the case when the planes $_1^m\gamma_{s1}(U_i, U_{i+1}, \hat{U}_i, \hat{U}_{i+1}; \psi_p)$ and $_2^n\gamma_{s1} U_i, U_{i+1}, \hat{U}_i, \hat{U}_{i+1}; \psi_p)$ intersect partially and share the intersection line $\eta_1$. The plane $_2^n\gamma_{s1}U_i, U_{i+1}, \hat{U}_i, \hat{U}_{i+1}; \psi_p)$ is dissected into three patches and the plane $_1^m\chi_{s1,1}U_i, U'_{K-1,1}, R_{5,1}, R_{K-1,1}; \psi_p), _1^m\chi_{s1,2}(R_{5,1}, R_{K-1,1}, \hat{U}_i, \hat{U}'_{K-1,1}; \psi_p)$ is dissected into three patches $_2^n\chi_{s1,1}(U_{i+1}, U'_{5,1}, R_{K-1,1}, R_{5,1}; \psi_p), _2^n\chi_{s1,2}(R_{5,1}, R_{K-1,1}, \hat{U}'_{5,1}, \hat{U}_{i+1}; \psi_p)$ and $_2^n\chi_{s1,3}(U_{i+1}, U'_{5,1}, \hat{U}_i, \hat{U}'_{5,1}; \psi_p)$. It can be seen that the five intersection points $R_{0,1}, \ldots, R_{4,1}$ are removed using the dissecting method discussed previously. The patches $_1^m\chi_{s1,2}$ and $_2^n\chi_{s1,2}$ are removed as they lie inside the cavity. The dissected planes $_1^m\gamma_{s2}$ and $_2^n\gamma_{s2}$ are therefore given by, respectively, $$_1^m\gamma_{s1}(U_i, U_{i+1}, \hat{U}_i, \hat{U}_{i+1}; \psi_p) = \quad (5.11a)$$
$$_1^m\chi_{s1,1}(U_i, U'_{K-1,1}, R_{5,1}, R_{K-1,1}; \psi_p) +$$
$$_1^m\chi_{si,3}(U'_{K-1,1}, U_{i+1}, \hat{U}'_{k-1,1}, \hat{U}_{i+1}; \psi_p)$$

$$_2^n\gamma_{s1}(U_i, U_{i+1}, \hat{U}_i, \hat{U}_{i+1}; \psi_p) = \quad (5.11b)$$
$$_2^n\chi_{s1,1}(U_{i+1}, U'_{5,1}, R_{K-1,1}, R_{5,1}; \psi_p) +$$
$$_2^n\chi_{si,3}(U_i, U'_{5,1}, \hat{U}_i, \hat{U}'_{5,1}; \psi_p)$$

Figure 57:
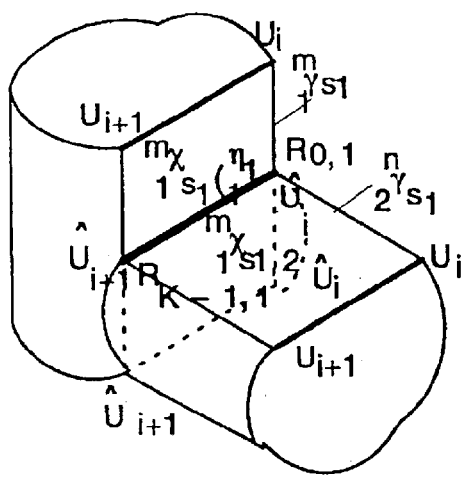
FIG. 57 illustrates the case of the intersection of two orthogonal planes when a cavity shell intersects another cavity shell and when the directric edge of a plane touches the intersecting plane.

FIG. 57 shows the case when the plane $_2^n\gamma_{s1}(U_i, U_{i+1}\hat{U}_i, \hat{U}_{i+1}; \psi_p)$ touches the orthogonal plane $_1^m\gamma_{s1}(U_i, U_{i+1}\hat{U}_i, \hat{U}_{i+1}; \psi_p)$ such that its directric $_2^n\gamma_1(U_i, U_{i+1}; P)$ lies entirely on the intersecting plane $_1^m\gamma_{s1}$; that is, the intersection line $\eta_1$ is either part of, or is equal to, the directric curve. In this case, only plane $_1^m\gamma_{s1}(U_i, U_{i+1}\hat{U}_i, \hat{U}_{i+1}; \psi_p)$ is dissected into the patches $_1^m\chi_{s1,1}(U_i, U_{i+1}, R_{0,1}, R_{K-1,1}; \psi_p)$ and $_1^m\chi_{s1,2}R_{0,1}, R_{K-1,1}, \hat{U}_i, \hat{U}_{i+1}; \psi_p)$ whereas the plane $_2^n\gamma_{s1}(U_i, U_{i+1}\hat{U}_i, \hat{U}_{i+1}; \psi_p)$ is not dissected. The patch $_1^m\chi_{s1,2}$ is removed since it lies inside a cavity. The plane $_2^n\gamma_{s1}$ is intact and the plane $_2^n\gamma_{s1}$ is given by, $$_1^m\gamma_{s1}(U_i, U_{i+1}\hat{U}_i, \hat{U}_{i+1}; \psi_p) = _1^m\chi_{s1,1}(U_i, U_{i+1}, R_{0,1}, R_{K-1,1}; \psi_p) \quad (5.11c)$$

Figure 58:
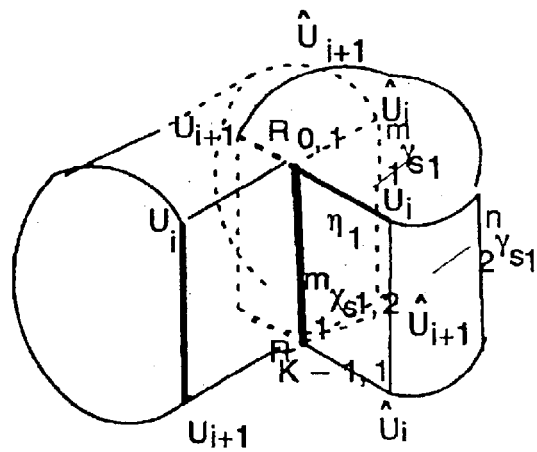
FIG. 58 illustrates the case of the intersection of two orthogonal planes when a cavity shell intersects another cavity shell and when the directric edge of a plane is parallel to the generator line of the intersecting plane.

The last combination $\Pi_1$ is the case in which the intersection line $\eta_1$ coincides with one of the generator lines of either of the intersecting planes $_1^m\gamma_{s1}(U_i, U_{i+1}\hat{U}_i, \hat{U}_{i+1}; \psi_p)$ and $_2^n\gamma_{s1}(U_i, U_{i+1}\hat{U}_i, \hat{U}_{i+1}; \psi_p)$. As shown in FIG. 58, the generator line $_1^m\psi_1(P, \hat{P}; t)$ is coincident to the intersection line $\eta_1$; that is, every point $\psi_p$ of line $_1^m\psi_1$ corresponds to one of the intersection points Rt, t=0, . . . , K−1. However, these points Rt cannot be determined using equation (5.6). In this case, the generator line $_1^m\psi_1$ is parallel to the directric edge $_2^n\gamma_1(U_{1, Ui+1}; P)$. Therefore, the intersection line $\eta_1$ is simply the projection of the edge $_2^n\gamma_1(U_{1, Ui+1}; P)$ on the plane $_1^m\gamma_{s1}(U_{1, Ui+1}, \hat{U}_i, \hat{U}_{i+1}; \psi_p)$ that is coincident with the generator line $_1^m\psi_1(P, \hat{P}; \psi_p)$.

A general expression for a plane $_v^n\gamma_{s1}U_i, U_{i+1}\hat{U}_i, \hat{U}_{i+1}; \psi_p)$ that is dissected into the patches $\psi_{s1,1}(A_{i-1}, A_i, \hat{A}'_i; \psi_p)$ i=1, 2, . . . , $N_{se}$, is given by $$_v^n\gamma_{s1}(U_i, U_{i+1}, \hat{U}_i, \hat{U}_{i+1}; \psi_p) = \sum_{t=1}^{\tilde{N}_{se}} \chi_{s1,i}(A'_{t-1}, A'_t, \hat{A}'_{t-1}\hat{A}'_t; \psi_p) \quad (5.12)$$

$$v = 1, 2$$

where $\tilde{N}_{se}$ is the number of patches that are retained. Also, $A_o=U_i, \hat{A}'_o=\hat{U}_i, A_{\tilde{N}sq}=U_{i+1}$, and $\hat{A}_{\tilde{N}sq}=\hat{U}_{i+1}$.

Figure 59:
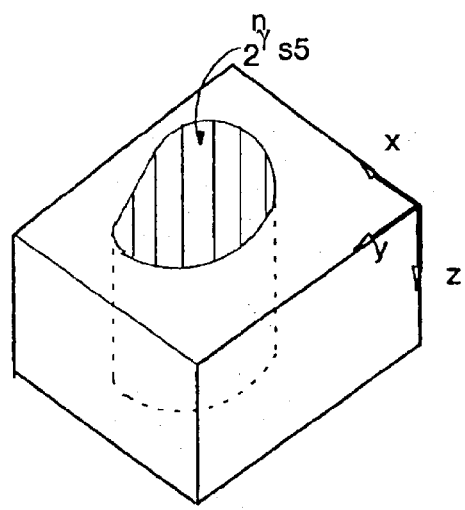
FIG. 59 illustrates a quadric surface oriented parallel to the z-axis of the local coordinate system.
Figure 60:
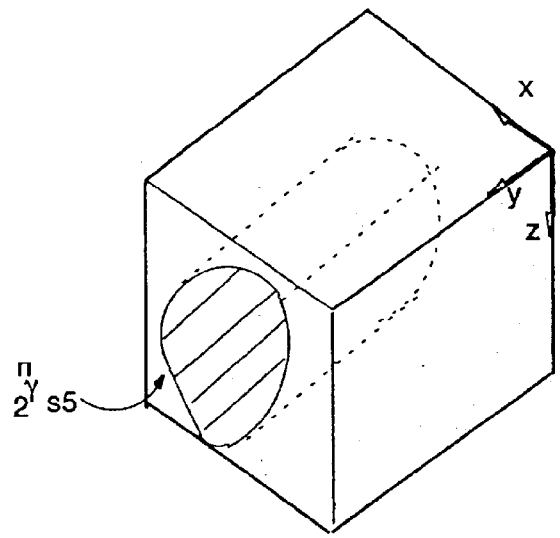
FIG. 60 illustrates a quadric surface oriented parallel to the y-axis of the local coordinate system.
Figure 61:
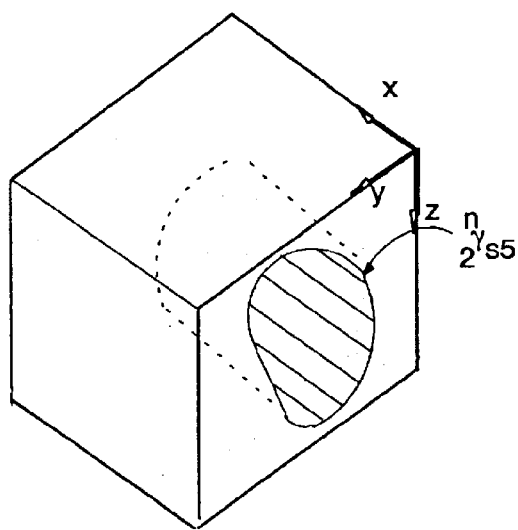
FIG. 61 illustrates a quadric surface oriented parallel to the x-axis of the local coordinate system.

The combination $\Pi_2$ denotes intersections between a plane $_1^m\gamma_{s1}(U_{1, Ui+1}, \hat{U}_i, \hat{U}_{i+1}; \psi_p)$ and a second order quadric surface $_2^n\gamma_{s5}(U_{i, Ui+1}, \hat{U}_i, \hat{U}_{i+1}; \psi_p)$. The implicit expressions for the plane $_1^m\gamma_{s1}$ on face m is given by equation (5.2a), whereas the quadric surface $_2^n\gamma_{s5}$ on face n in the local (x, y, z) coordinate system of $(FMEM)_3$ is given by $$_2^n\gamma_{ss}(U_i, U_{i+1}, \hat{U}_i, \hat{U}_{i+1}; \psi_p) = \qquad (5.13)$$
$$_2^nA_j x^2 + {}_2^nB_j y^2 + {}_2^nC_j z^2 + {}_2^nD_j xy + {}_2^nE_j yz +$$
$$_2^nF_j xz + 2{}_2^n\tilde{G}_j x + 2{}_2^n\tilde{H}_j y + 2{}_2^n\tilde{J}_j z + {}_2^n\tilde{K}_j = 0$$

where, the coefficients ${}_2^nA_j$, ${}_2^nB_j$, ${}_2^nC_j$, ${}_2^nD_j$, ${}_2^nE_j$, ${}_2^nF_j$, ${}_2^n\tilde{G}_j$, ${}_2^n\tilde{H}_j$, ${}_2^n\tilde{J}_j$ and are given by equation (3.13). Equation (5.13) describes a general implicit quadric surface in space with respect to the (x, y, z) coordinate system. This equation is considerably simplified when the quadric surface is oriented parallel to one of the three axes of the (x, y, z) coordinate system. FIGS. 59 through 61 show the three cases in which each of the quadric surfaces is oriented parallel to one of the three axes. The simplified equations for the three cases are given below.

When the surface is parallel to the z-axis ($n = 1$ or $n = 6$):

$$_2^n\gamma_{ss}(U_i, U_{i+1}, \hat{U}_i, \hat{U}_{i+1}; \psi_p) = \qquad (5.14a)$$
$$_2^nA_j x^2 + {}_2^nB_j y^2 + {}_2^nD_j xy + 2{}_2^n\tilde{G}_j x + 2{}_2^n\tilde{H}_j y + {}_2^n\tilde{K}_j = 0$$

When the surface is parallel to the y-axis ($n = 2$ or $n = 4$):

$$_2^n\gamma_{ss}(U_i, U_{i+1}, \hat{U}_i, \hat{U}_{i+1}; \psi_p) = \qquad (5.14b)$$
$$_2^nA_j x^2 + {}_2^nC_j z^2 + {}_2^nF_j xy + 2{}_2^n\tilde{G}_j x + 2{}_2^n\tilde{J}_j z + {}_2^n\tilde{K}_j = 0$$

When the surface is parallel to the x-axis ($n = 3$ or $n = 5$):

$$_2^n\gamma_{ss}(U_i, U_{i+1}, \hat{U}_i, \hat{U}_{i+1}; \psi_p) = \qquad (5.14c)$$
$$_2^nB_j y^2 + {}_2^nC_j z^2 + {}_2^nE_j xy + 2{}_2^n\tilde{H}_j y + 2{}_2^n\tilde{J}_j z + {}_2^n\tilde{K}_j = 0$$

Substituting an appropriate set of equations from equations (5.5a) through (5.5f) into the correspondingly appropriate equation from equations (5.14a) through (5.14c) yields the following quadratic equation in t:

$$\delta_1 t^2 + \delta_2 t + \delta_3 = 0 \qquad (5.15)$$

When $m = 1$ and $n = 2$ or $n = 4$, $$\delta_1 = {}_2^nC_j d_1^2$$
$$\delta_2 = 2\{{}_2^nC_j d_1 z_0 + {}_2^nF_j[{}_1^1x_i(1-s) + {}_1^1x_{i+1}s]d_1 + {}_2^nJ_j d_1\}$$
$$\delta_3 =$$
$$_2^nA_j[{}_1^1x_i(1-s) + {}_1^1x_{i+1}s]^2 + {}_2^nC_j z_0^2 + 2{}_2^nF_j[{}_1^1x_i(1-s) + {}_1^1x_{i+1}s]z_0 +$$
$$2{}_2^n\tilde{G}_j[{}_1^1x_i(1-s) + {}_1^1x_{i+1}s] + 2{}_2^n\tilde{J}_j z_0 + {}_2^n\tilde{K}_j$$

When $m = 1$ and $n = 3$ or $n = 5$, $$\delta_1 = {}_2^nC_j d_1^2$$
$$\delta_2 = 2\{{}_2^nC_j d_1 z_0 + {}_2^nE_j[{}_1^1y_i(1-s) + {}_1^1y_{i+1}s]d_1 + {}_2^nJ_j d_1\}$$
$$\delta_3 =$$
$$_2^nB_j[{}_1^1y_i(1-s) + {}_1^1y_{i+1}s]^2 + {}_2^nC_j z_0^2 + 2{}_2^nE_j[{}_1^1y_i(1-s) + {}_1^1y_{i+1}s]z_0 +$$
$$2{}_2^n\tilde{H}_j[{}_1^1y_i(1-s) + {}_1^1y_{i+1}s] + 2{}_2^n\tilde{J}_j z_0 + {}_2^n\tilde{K}_j$$

When $m = 2$ and $n = 1$ or $n = 6$, $$\delta_1 = {}_2^nB_j d_1^2$$

-continued $$\delta_2 = -2\{{}_2^nB_j d_1 V + {}_2^nD_j[{}_1^2x_i(1-s) + {}_1^2x_{i+1}s]d_1 + {}_2^nH_j d_1\}$$
$$\delta_3 =$$
$$_2^nA_j[{}_1^2x_i(1-s) + {}_1^2x_{i+1}s]^2 + {}_2^nB_j V^2 + 2{}_2^nD_j[{}_1^2x_i(1-s) + {}_1^2x_{i+1}s]V +$$
$$2{}_2^n\tilde{G}_j[{}_1^2x_i(1-s) + {}_1^2x_{i+1}s] + 2{}_2^n\tilde{H}_j V + {}_2^n\tilde{K}_j$$

When $m = 2$ and $n = 3$ or $n = 5$, $$\delta_1 = {}_2^nB_j d_1^2$$
$$\delta_2 = -2\{{}_2^nB_j d_1 V + {}_2^nE_j[{}_1^2z_i(1-s) + {}_1^2z_{i+1}s]d_1 + {}_2^nH_j d_1\}$$
$$\delta_3 =$$
$$_2^nC_j[{}_1^2z_i(1-s) + {}_1^2z_{i+1}s]^2 + {}_2^nB_j V^2 + 2{}_2^nE_j[{}_1^2z_i(1-s) + {}_1^2z_{i+1}s]V +$$
$$2{}_2^n\tilde{J}_j[{}_1^2z_i(1-s) + {}_1^2z_{i+1}s] + 2{}_2^n\tilde{H}_j V + {}_2^n\tilde{K}_j$$

When $m = 3$ and $n = 1$ or $n = 6$, $$\delta_1 = {}_2^nA_j d_1^2$$
$$\delta_2 = -2\{{}_2^nA_j d_1 U + {}_2^nD_j[{}_1^3y_i(1-s) + {}_1^3y_{i+1}s]d_1 + {}_2^n\tilde{G}_j d_1\}$$
$$\delta_3 =$$
$$_2^nA_j U^2 + {}_2^nB_j[{}_1^3y_i(1-s) + {}_1^3y_{i+1}s]^2 + 2{}_2^nD_j[{}_1^3y_i(1-s) + {}_1^3y_{i+1}s]U +$$
$$2{}_2^n\tilde{G}_j U + 2{}_2^n\tilde{H}_j[{}_1^3y_i(1-s) + {}_1^3y_{i+1}s] + {}_2^n\tilde{K}_j$$

When $m = 3$ and $n = 2$ or $n = 4$, $$\delta_1 = {}_2^nA_j d_1^2$$
$$\delta_2 = -2\{{}_2^nA_j d_1 U + {}_2^nF_j[{}_1^3z_i(1-s) + {}_1^3z_{i+1}s]d_1 + {}_2^n\tilde{G}_j d_1\}$$
$$\delta_3 =$$
$$_2^nA_j U^2 + {}_2^nC_j[{}_1^3z_i(1-s) + {}_1^3z_{i+1}s]^2 + 2{}_2^nF_j[{}_1^3z_i(1-s) + {}_1^3z_{i+1}s]U +$$
$$2{}_2^n\tilde{G}_j U + 2{}_2^n\tilde{J}_j[{}_1^3z_i(1-s) + {}_1^3z_{i+1}s] + {}_2^n\tilde{K}_j$$

When $m = 4$ and $n = 1$ or $n = 6$, $$\delta_1 = {}_2^nB_j d_1^2$$
$$\delta_2 = 2\{{}_2^nB_j d_1 y_0 + {}_2^nD_j[{}_1^4x_i(1-s) + {}_1^4x_{i+1}s]d_1 + {}_2^nH_j d_1\}$$
$$\delta_3 =$$
$$_2^nA_j[{}_1^4x_i(1-s) + {}_1^4x_{i+1}s]^2 + {}_2^nB_j y_0^2 + 2{}_2^nD_j[{}_1^4x_i(1-s) + {}_1^4x_{i+1}s]y_0 +$$
$$2{}_2^n\tilde{G}_j[{}_1^4x_i(1-s) + {}_1^4x_{i+1}s] + 2{}_2^n\tilde{H}_j y_0 + {}_2^n\tilde{K}_j$$

When $m = 4$ and $n = 3$ or $n = 5$, $$\delta_1 = {}_2^nB_j d_1^2$$
$$\delta_2 = 2\{{}_2^nB_j d_1 y_0 + {}_2^nE_j[{}_1^4z_i(1-s) + {}_1^4z_{i+1}s]d_1 + {}_2^nH_j d_1\}$$
$$\delta_3 =$$
$$_2^nC_j[{}_1^4z_i(1-s) + {}_1^4z_{i+1}s]^2 + {}_2^nB_j y_0^2 + 2{}_2^nE_j[{}_1^4z_i(1-s) + {}_1^4z_{i+1}s]y_0 +$$
$$2{}_2^n\tilde{J}_j[{}_1^4z_i(1-s) + {}_1^4z_{i+1}s] + 2{}_2^n\tilde{H}_j y_0 + {}_2^n\tilde{K}_j$$

When $m = 5$ and $n = 1$ or $n = 6$, $$\delta_1 = {}_2^nA_j d_1^2$$
$$\delta_2 = 2\{{}_2^nA_j d_1 x_0 + {}_2^nD_j[{}_1^5y_i(1-s) + {}_1^5y_{i+1}s]d_1 + {}_2^n\tilde{G}_j d_1\}$$
$$\delta_3 =$$
$$_2^nA_j x_0^2 + {}_2^nB_j[{}_1^5y_i(1-s) + {}_1^5y_{i+1}s]^2 + 2{}_2^nD_j[{}_1^5y_i(1-s) + {}_1^5y_{i+1}s]x_0 +$$
$$2{}_2^n\tilde{G}_j x_0 + 2{}_2^n\tilde{H}_j[{}_1^5y_i(1-s) + {}_1^5y_{i+1}s] + {}_2^n\tilde{K}_j$$

When $m = 5$ and $n = 2$ or $n = 4$, $$\delta_1 = {}_2^nA_j d_1^2$$
$$\delta_2 = 2\{{}_2^nA_j d_1 x_0 + {}_2^nF_j[{}_1^5z_i(1-s) + {}_1^5z_{i+1}s]d_1 + {}_2^n\tilde{G}_j d_1\}$$

-continued $$\delta_3 = {}^n_2 A_j x_0^2 + {}^n_2 C_j [{}^5_1 z_i(1-s) + {}^5_1 z_{i+1} s]^2 + 2 {}^n_2 F_j [{}^5_1 z_i(1-s) + {}^5_1 z_{i+1} s] x_0 +$$
$$2 {}^n_2 \tilde{G}_j x_0 + 2 {}^n_2 \tilde{J}_j [{}^5_1 z_i(1-s) + {}^5_1 z_{i+1} s] + {}^n_2 \tilde{K}_j$$

When $m = 6$ and $n = 2$ or $n = 4$, $$\delta_1 = {}^n_2 C_j d_1^2$$

$$\delta_2 = -2 \{ {}^n_2 C_j d_1 W + {}^n_2 F_j [{}^6_1 x_i(1-s) + {}^6_1 x_{i+1} s] d_1 + {}^n_2 \tilde{J}_j d_1 \}$$

$$\delta_3 = {}^n_2 A_j [{}^6_1 x_i(1-s) + {}^6_1 x_{i+1} s]^2 + {}^n_2 C_j W^2 + 2 {}^n_2 F_j [{}^6_1 x_i(1-s) + {}^6_1 x_{i+1} s] W +$$
$$2 {}^n_2 \tilde{G}_j [{}^6_1 x_i(1-s) + {}^6_1 x_{i+1} s] + 2 {}^n_2 \tilde{J}_j W + {}^n_2 \tilde{K}_j$$

When $m = 6$ and $n = 3$ or $n = 5$, $$\delta_1 = {}^n_2 C_j d_1^2$$

$$\delta_2 = -2 \{ {}^n_2 C_j d_1 W + {}^n_2 E_j [{}^6_1 y_i(1-s) + {}^6_1 y_{i+1} s] d_1 + {}^n_2 \tilde{J}_j d_1 \}$$

$$\delta_3 = {}^n_2 B_j [{}^6_1 y_i(1-s) + {}^6_1 y_{i+1} s]^2 + {}^n_2 C_j W^2 + 2 {}^n_2 E_j [{}^6_1 y_i(1-s) + {}^6_1 y_{i+1} s] W +$$
$$2 {}^n_2 \tilde{H}_j [{}^6_1 y_i(1-s) + {}^6_1 y_{i+1} s] + 2 {}^n_2 \tilde{J}_j W + {}^n_2 \tilde{K}_j$$

where $(x_0, y_0, z_0)$ are the coordinates of the origin of the local $(x, y, z)$ system of $(FMEM)_3$ in the global coordinate system $(X, Y, Z)$, and $U = U_3 + x_0$, $V = V_3 + y_0$ and $W = W_3 + z_0$. The dimensions $U_3$, $V_3$, and $W_3$ represent the size of the $(FMEM)_3$ in the X, Y and Z directions, respectively. The coordinates $({}_1^m x_i, {}_1^m y_i, {}_1^m z_i)$ and $({}_1^m x_{i+1}, {}_1^m y_{i+1}, {}_1^m z_{i+1})$ represent the end points ${}_1^m U_i$ and ${}_1^m U_{i+1}$ of $(FMEM)_1$, respectively, in the $(x, y, z)$ coordinate system, and $d_1$ is the depth of the profile shell $(FMEM)_1$.

Solving for t in equation (5.15) gives the values $t_1$ and $t_2$ for a specific value of s. The plane ${}_1^m \gamma_{s1}(U_i, U_{i+1}, \hat{U}_i, \hat{U}_{i+1}; \psi_p)$ and the quadric surface ${}_2^n \gamma_{s5}(U_{i, U_{i+1}}, \hat{U}_i, \hat{U}_{i+1}; \psi_p)$ do not intersect at that value of parameter s if $\delta_2^2 - 4\delta_1 \delta_3 < 0$. Furthermore, there is only one root $t_1$ for that value of the parameter s when $\delta_2^2 - 4\delta_1 \delta_3 = 0$. When $\delta_2^2 - 4\delta_1 \delta_3 > 0$ the intersection points are $R_1 = (x_{q1}, y_{q1}, z_{q1})$ and $R_2 = (x_{q2}, y_{q2}, z_{q2})$. The implicit intersection points $R_1$ and $R_2$ are obtained by substituting $t_1$ and $t_2$ into the appropriate equation from equations (55a) through (5.5f), provided $0 \leq t_1 \leq 1$ and $0 \leq t_2 \leq 1$. If $t_1$ and $t_2$ are outside their respective regions the roots are rejected, since such points will not lie between P and $\hat{P}$ on the generator line ${}_1^m \psi_1(P, \hat{P}; \psi_p)$.

The next step is to determine whether or not the points $R_t$, $t = 0, \ldots, K-1$ lie either on the intersecting quadric surface ${}_2^n \gamma_{s5} U_i, U_{i+1} \hat{U}_i, \hat{U}_{i+1}; \psi_p)$. This is achieved by taking each intersection point $R_t$ and finding the corresponding values of the parameters s and t on the quadric surface ${}_2^n \gamma_{s5} U_i, U_{i+1}, \hat{U}_i, \hat{U}_{i+1}; \psi_p)$. The parameter t is obtained from equation (5.7). When the point lies between the two directrics ${}_2^n \gamma_{s5}(U_i, U_{i+1}; P)$ and ${}_2^n \gamma_5(\hat{U}_i, \hat{U}_{i+1}; \hat{P})$, then $0 < t < 1$. The value $t(R_t)$ for each intersection point $R_t$, $t = 1, \ldots, K$ is obtained by substituting $x = x_q$ when $n = 3$ or $5$, $y = y_q$ when $n = 2$ or $4$, and $z = z_q$ when $n = 1$ or $6$ into equation (5.7), where $(x_q, y_q, z_q)$ are the coordinates of the intersection point $R_t$. The points $R_t$ that produce a t that is not within $0 \leq t \leq 1$ are rejected.

For the remaining points $R_t$ the parameter s is obtained from the quadratic equation $$\hat{\delta}_1 s^2 + \hat{\delta}_2 s + \hat{\delta}_3 = 0 \qquad (5.16a)$$

For $n = 1$ or $n = 6$, $$\hat{\delta}_1 = \mu_0(x_i - x_q) - 2\mu_1(x_{i+1} - x_q) + \mu_2(x_{j,8} - x_q)$$

$$\hat{\delta}_2 = -2\mu_0(x_i - x_q) + 2\mu_1(x_{i+1} - x_q)$$

$$\hat{\delta}_3 = \mu_0(x_i - x_q)$$

For $n = 3$ or $n = 5$, $$\hat{\delta}_1 = \mu_0(y_i - y_q) - 2\mu_1(y_{i+1} - y_q) + \mu_2(y_{j,8} - y_q)$$

$$\hat{\delta}_2 = -2\mu_0(y_i - y_q) + 2\mu_1(y_{i+1} - y_q)$$

$$\hat{\delta}_3 = \mu_0(y_i - y_q)$$

For $n = 2$ or $n = 4$, $$\hat{\delta}_1 = \mu_0(z_i - z_q) - 2\mu_1(z_{i+1} - z_q) + \mu_2(z_{j,8} - z_q)$$

$$\hat{\delta}_2 = -2\mu_0(z_i - z_q) + 2\mu_1(z_{i+1} - z_q)$$

$$\hat{\delta}_3 = \mu_0(z_i - z_q)$$

where $(x_{j,8}, y_{j,8}, z_{j,8})$ are the coordinates of the shoulder point $P_{j,8}$, which was defined above The coordinates $(x_i, y_i, z_i)$ and $(x_{i+1}, y_{i+1}, z_{i+1})$ represent the points $U_i$ and $U_{i+1}$, respectively. The weights $\mu_0$, $\mu_1$, and $\mu_2$ are obtained by taking a tangent at point P on the quadric curve and finding the arbitrary points A and B on the lines connecting $U_i$ and $P_{j,8}$ and $U_{i+1}$ and $P_{j,8}$, respectively. The weights are determined from the geometry and given by the following equations:

$$\mu_1 = 1 \qquad (5.16b)$$

$$\mu_0 = \frac{\sqrt{(x_{j,8} - x_A)^2 + (y_{j,8} - y_A)^2 + (z_{j,8} - z_A)^2}}{\sqrt{(x_i - x_A)^2 + (y_i - y_A)^2 + (z_i - z_A)^2}}$$

$$\mu_2 = \frac{\sqrt{(x_{j,8} - x_B)^2 + (y_{j,8} - y_B)^2 + (z_{j,8} - z_B)^2}}{\sqrt{(x_{i+1} - x_B)^2 + (y_{i+1} - y_B)^2 + (z_{i+1} - z_B)^2}}$$

where $(x_A, y_A, z_A)$ and $(x_B, y_B, z_B)$ are the coordinates in the $(x, y, z)$ coordinate system of the points A and B, respectively. It is seen from equation (5.16a) that when $(\hat{\delta}_2^2 - 4\hat{\delta}_1 \hat{\delta}_3) < 0$ there is no solution; when $(\hat{\delta}_2^2 - 4\hat{\delta}_1 \hat{\delta}_3) < 0$ there is one root $s_1$; and when $(\hat{\delta}_2^2 - 4\hat{\delta}_1 \hat{\delta}_3) < 0$ there are two roots $s_1$ and $s_2$. In case there are two roots only one of them represents the s parameter value for the point $R_t$. To accept one of the two roots, each of them is substituted into the following equation:

$$\tilde{\delta}_1 s^2 + \tilde{\delta}_2 s + \tilde{\delta}_3 = 0 \qquad (5.16c)$$

For $n = 1$ or $n = 6$, $$\tilde{\delta}_1 = \mu_0(y_i - y_q) - 2\mu_1(y_{i+1} - y_q) + \mu_2(y_{j,8} - y_q)$$

$$\tilde{\delta}_2 = -2\mu_0(y_i - y_q) + 2\mu_1(y_{i+1} - y_q)$$

$$\tilde{\delta}_3 = \mu_0(y_i - y_q)$$

For $n = 2$ or $n = 4$, $$\tilde{\delta}_1 = \mu_0(x_i - x_q) - 2\mu_1(x_{i+1} - x_q) + \mu_2(x_{j,8} - x_q)$$

-continued $$\tilde{\delta}_2 = -2\mu_0(x_i - x_q) + 2\mu_1(x_{i+1} - x_q)$$

$$\tilde{\delta}_3 = \mu_0(x_i - x_q)$$

For $n = 3$ or $n = 5$, $$\tilde{\delta}_1 = \mu_0(z_i - z_q) - 2\mu_1(z_{i+1} - z_q) + \mu_2(z_{j,8} - z_q)$$

$$\tilde{\delta}_2 = -2\mu_0(z_i - z_q) + 2\mu_1(z_{i+1} - z_q)$$

$$\tilde{\delta}_3 = \mu_0(z_i - z_q)$$

One of the roots, either $s_1$ or $s_2$, satisfies equation (5.16c). The root that does not satisfy equation (5.16c) is rejected. The root that is accepted provides the parameter s for the intersection point. When the point lies between $U_i$ and $U_{i+1}$, then $0<s<1$. However, a point that precedes $U_i$ will have $s<0$ and a point that follows $U_{i+1}$ will have $s>1$. The value $s(R_t)$ for each intersection point $R_t$, $t=0, \ldots K-1$ is obtained from equation (5.16a). The points $R_t$ that are not within $0 \leq s \leq 1$ are rejected.

Figure 62:
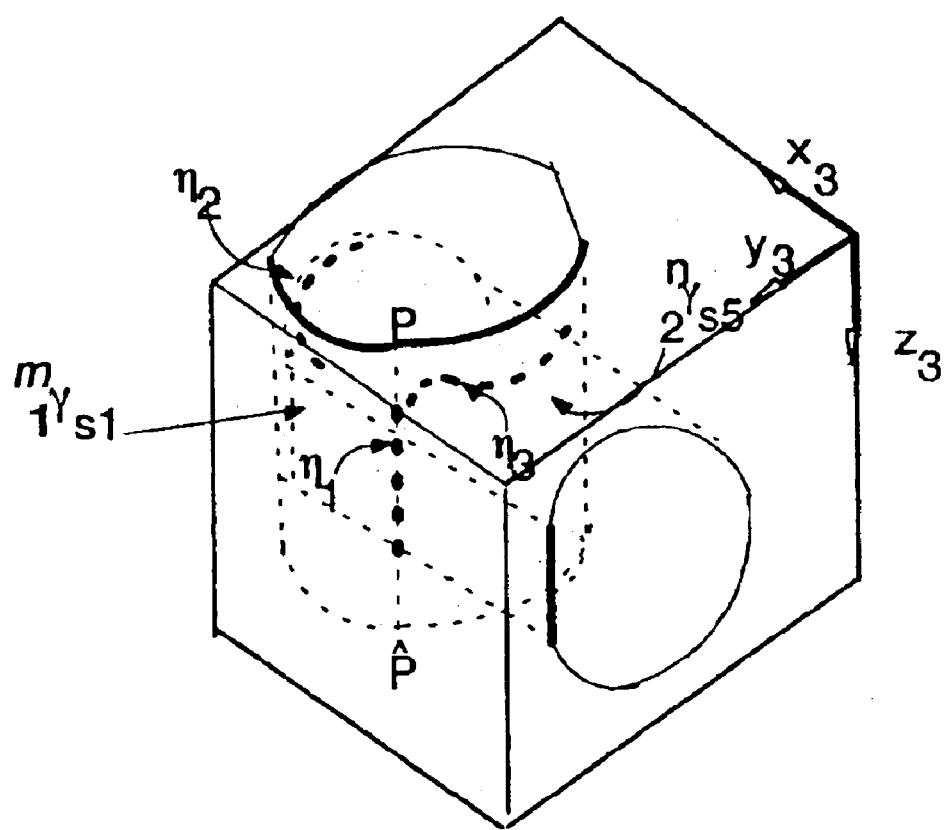
FIG. 62 shows a plane intersecting a quadric surface.

FIG. 62 shows a plane $_1{}^m\gamma_{s1}(U_i, U_{i+1}, \hat{U}_i, \hat{U}_{i+1}; \psi_p)$ that intersects a quadric surface $_2{}^n\gamma_{s5}(U_i, U_{i+1}, \hat{U}_i, \hat{U}_{i+1}; \psi_p)$ and shares a full intersection line $\eta_1$. The plane $_1{}^m\gamma_{s1}(U_i, U_{i+1}, \hat{U}_i, \hat{U}_{i+1}; \psi_p)$ is dissected into the patches $_1{}^m\chi_{s1,1}(U_i, U_{i+1}, R_{0,1}, R_{K-1,1}; \psi_p)$ and $_1{}^m\chi_{s1,2}(R_{0,1}, R_{K-1,1}, \hat{U}_i, \hat{U}_{i+1}; \psi_p)$. The quadric surface $_2{}^n\gamma_{s5}(U_i, U_{i+1}, \hat{U}_i, \hat{U}_{i+1}; \psi_p)$ is dissected into the patches $_2{}^n\chi_{s5,1}(U_i, U_{i+1}, R_{0,2}, R_{K-1,2}; \psi_p)$ and $_2{}^n\chi_{s5,2}(R_{0,2}, R_{K-1,2}, \hat{U}_i, \hat{U}_{i+1}; \psi_p)$. The patches $_1{}^m\chi_{s1,2}(R_{0,1}, R_{K-1,1}, \hat{U}_i, \hat{U}_{i+1}; \psi_p)$ and $_2{}^n\chi_{s5,2}(R_{0,2}, R_{K-1,2}, \hat{U}_i, \hat{U}_{i+1}; \psi_p)$ are removed since they are inside the cavity. The plane and the intersecting quadric surface are then given by, respectively, $$_1{}^m\gamma_{s1}(U_i, U_{i+1}, \hat{U}_i, \hat{U}_{i+1}; \psi_p) = {_1{}^m\chi_{s1,1}}(U_i, U_{i+1}, R_{0,1}, R_{K-1,1}; \psi_p) \quad (5.17a)$$

$$_2{}^n\gamma_{s5}(U_i, U_{i+1}, \hat{U}_i, \hat{U}_{i+1}; \psi_p) = {_2{}^n\chi_{s5,1}}(U_i, U_{i+1}, R_{0,2}, R_{K-1,2}; \psi_p) \quad (5.17b)$$

A general expression for a plane $_v{}^n\gamma_{s1}(U_i, U_{i+1}, \hat{U}_i, \hat{U}_{i+1}; \psi_p)$ that is dissected into the patches $\chi_{s5,i}(A'_{i-1}, A'_i, \hat{A}'_{i-1}, \hat{A}'_i; \psi_p)$, $i=1, 2, \ldots N_{se}$, is given by equation (5.12). A general expression for a quadric surface $_v{}^n\gamma_{s5}(U_i, U_{i+1}, \hat{U}_i, \hat{U}_{i+1}; \psi_p)$ that is dissected into the patches $\chi_{s5,i}(A'_{i-1}, A'_i, \hat{A}'_{i-1}, \hat{A}'_i; \psi_p)$, $i=1, 2, \ldots N_{sq}$, is given by $$_v^n\gamma_{s5}(U_i, U_{i+1}, \hat{U}_i, \hat{U}_{i+1}; \psi_p) = \sum_{\tau=1}^{\tilde{N}_{sq}} \chi_{s5,i}(A'_{\tau-1}, A'_\tau, \hat{A}'_{\tau-1}, \hat{A}'_\tau; \psi_p) \quad (5.18)$$

$$v = 1, 2$$

where $\tilde{N}_{sq}$ is the number of patches that are retained. Also, $A'_o = U_i$, $\hat{A}'_o = \hat{U}_i$, $A'_{\tilde{N}sq} = U_{i+1}$, and $\hat{A}'_{\tilde{N}sq} = \hat{U}_{i+1}$.

Figure 63:
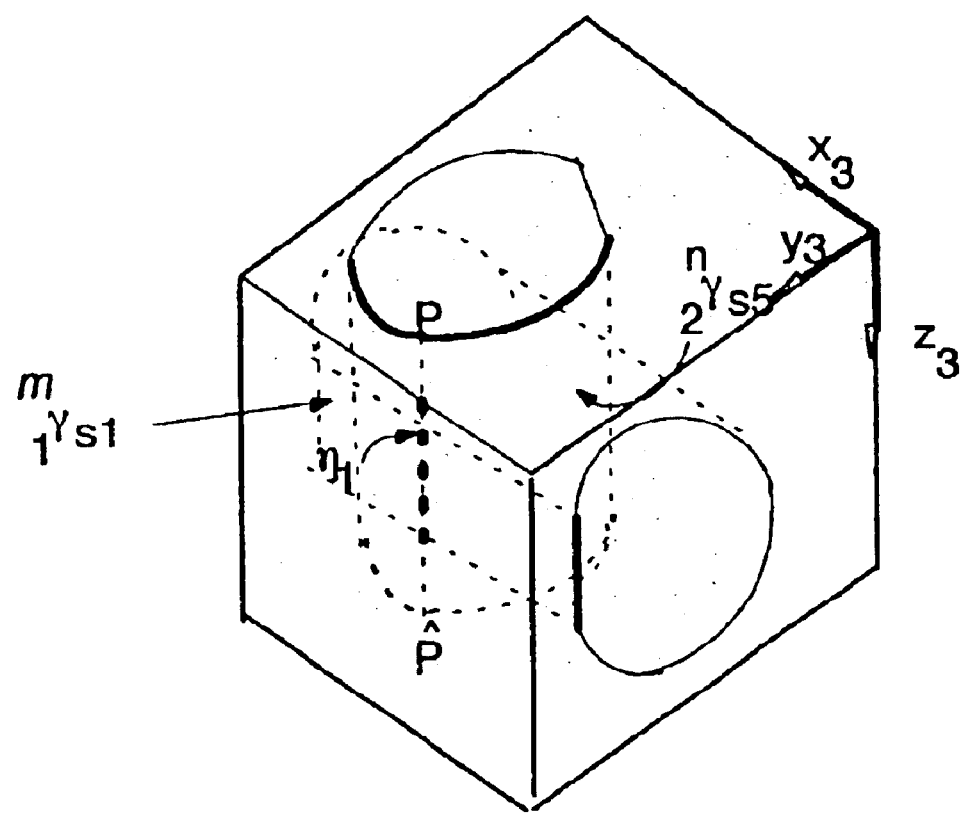
FIG. 63 shows the case when the plane is tangent to the quadric surface.

The special case when the plane $_1{}^m\gamma_{s1}(U_i, U_{i+1}, \hat{U}_i, \hat{U}_{i+1}; \psi_p)$ is tangential to the quadric surface $_2{}^n\gamma_{s5}(U_i, U_{i+1}, \hat{U}_i, \hat{U}_{i+1}; \psi_p)$ is shown in FIG. 63. In this case the intersection curve $\eta_1$ is the tangent line that is parallel to a generator line $_2{}^n\psi_1$. A tangential intersection curve is rejected. For each intersection curve a comparison is made to determine whether or not it is tangent to the intersecting surface. If it is tangent, it is rejected. However, the quadric surface $_2{}^n\gamma_{s5}(U_i, U_{i+1}, \hat{U}_i, \hat{U}_{i+1}; \psi_p)$ intersects with other surfaces $_1{}^m\gamma_{si}$ and has other intersection curves $\eta_2$ and $\eta_3$.

The combination $\Pi_3$ denotes intersections between a plane $\gamma_{s1}$ and one of the cylindrical surfaces $\gamma_{sk}$, $k=2, 3, 4$. The combination $\Pi_3$ is treated in a manner similar to that used for the combination $\Pi_2$. The implicit expressions for the plane $_1{}^m\gamma_{s1}$ on face m is given by equation (5.2a), whereas one of the cylindrical surface $_2{}^n\gamma_{sk}$ on face n in the (x, y, z) coordinate system is given by $$_2^n\gamma_{sk}(U_i, U_{i+1}, \hat{U}_i, \hat{U}_{i+1}; \psi_p) = \quad (5.19)$$
$$x^2 + y^2 + z^2 + 2{_2^nG_{jk}}x + 2{_2^nH_{jk}}y + 2{_2^nJ_{jk}}z + {_2^nK_{jk}} = 0$$

$$k = 2, 3, 4$$

The coefficients $_2{}^nG_{jk}$, $_2{}^nH_{jk}$, $_2{}^n\tilde{J}_{jk}$ and $_2{}^nK_{jk}$ are given by equations (3.16). Equation (5.19) describes a general implicit cylindrical surface in the (x, y, z) system of (FMEM)$_3$. This equation is considerably simplified when the cylindrical surface is oriented parallel to one of the three axes of the (x, y, z) coordinate system. The simplified equations for the three cases are given below.

When the surface is parallel to the z-axis (n=1 or n=6):

$$_2^n\gamma_{sk}(U_i, U_{i+1}, \hat{U}_i, \hat{U}_{i+1}; \psi_p) = x^2+y^2+2{_2^nG_{jk}}x+2{_2^nH_{jk}}y+2{_2^nK_{jk}}=0 \quad (5.20a)$$

When the surface is parallel to the v-axis (n=2 or n=4):

$$_2^n\gamma_{sk}(U_i, U_{i+1}, \hat{U}_i, \hat{U}_{i+1}; \psi_p) = x^2+z^2+2{_2^nG_{jk}}x+2{_2^nJ_{jk}}z+2{_2^nK_{jk}}=0 \quad (5.20b)$$

When the surface is parallel to the x-axis (n=3 or n=5):

$$_2^n\gamma_{sk}(U_i, U_{i+1}, \hat{U}_i, \hat{U}_{i+1}; \psi_p) = y^2+z^2+2{_2^nH_{jk}}y+2{_2^nJ_{jk}}z+2{_2^nK_{jk}}=0 \quad (5.20c)$$

Substituting the appropriate equation from the set of equations (5.5a) through (5.5f) into the correspondingly appropriate equation from equations (5.20a) through (5.20c) yields the quadratic equation (5.15), where the coefficients are now given by When $m = 1$ and $n = 2$ or $n = 4$, $$\delta_1 = d_1^2$$

$$\delta_2 = 2\{d_1 z_0 + {_2^nJ_{jk}}d_1\}$$

$$\delta_3 = [{_1^1x_i}(1-s) + {_1^1x_{i+1}}s]^2 + z_0^2 + 2{_2^nG_{jk}}[{_1^1x_i}(1-s) + {_1^1x_{i+1}}s] + 2{_2^nJ_{jk}}z_0 + {_2^nK_{jk}}$$

When $m = 1$ and $n = 3$ or $n = 5$, $$\delta_1 = d_1^2$$

$$\delta_2 = 2\{d_1 z_0 + {_2^nJ_{jk}}d_1\}$$

$$\delta_3 = [{_1^1y_i}(1-s) + {_1^1y_{i+1}}s]^2 + z_0^2 + 2{_2^nH_{jk}}[{_1^1x_i}(1-s) + {_1^1x_{i+1}}s] + 2{_2^nJ_{jk}}z_0 + {_2^nK_{jk}}$$

When $m = 2$ and $n = 1$ or $n = 6$, $$\delta_1 = d_1^2$$

$$\delta_2 = -2\{d_1 V + {_2^nH_{jk}}d_1\}$$

$$\delta_3 = [{_1^2x_i}(1-s) + {_1^2x_{i+1}}s]^2 + V^2 + 2{_2^nG_{jk}}[{_1^2x_i}(1-s) + {_1^2x_{i+1}}s] + 2{_2^nH_{jk}}V + {_2^nK_{jk}}$$

When $m = 2$ and $n = 3$ or $n = 5$, $$\delta_1 = d_1^2$$

$$\delta_2 = -2\{d_1 V + {_2^nH_{jk}}d_1\}$$

$$\delta_3 = [{_1^2z_i}(1-s) + {_1^2z_{i+1}}s]^2 + V^2 + 2{_2^nJ_{jk}}[{_1^2z_i}(1-s) + {_1^2z_{i+1}}s] + 2{_2^nH_{jk}}V + {_2^nK_{jk}}$$

When $m = 3$ and $n = 1$ or $n = 6$, $$\delta_1 = d_1^2$$

-continued $$\delta_2 = -2\{d_1 U + {}_2^n G_{jk} d_1\}$$

$$\delta_3 = U^2 + [{}_1^3 y_i(1-s) + {}_1^3 y_{i+1} s]^2 + 2_2^n G_{jk} U + 2_2^n H_{jk} [{}_1^3 y_i(1-s) + {}_1^3 y_{i+1} s] + {}_2^n K_{jk}$$

When $m = 3$ and $n = 2$ or $n = 4$, $$\delta_1 = d_1^2$$

$$\delta_2 = -2\{d_1 U + {}_2^n G_{jk} d_1\}$$

$$\delta_3 = U^2 + [{}_1^3 z_i(1-s) + {}_1^3 z_{i+1} s]^2 + 2_2^n G_{jk} U + 2_2^n \tilde{J}_{jk} [{}_1^3 z_i(1-s) + {}_1^3 z_{i+1} s] + {}_2^n K_{jk}$$

When $m = 4$ and $n = 1$ or $n = 6$, $$\delta_1 = d_1^2$$

$$\delta_2 = 2\{d_1 y_0 + {}_2^n H_{jk} d_1\}$$

$$\delta_3 = [{}_1^4 x_i(1-s) + {}_1^4 x_{i+1} s]^2 + y_0^2 + 2_2^n G_{jk} [{}_1^4 x_i(1-s) + {}_1^4 x_{i+1} s] + 2_2^n H_{jk} y_0 + {}_2^n K_{jk}$$

When $m = 4$ and $n = 3$ or $n = 5$, $$\delta_1 = d_1^2$$

$$\delta_2 = 2\{d_1 y_0 + {}_2^n H_{jk} d_1\}$$

$$\delta_3 = [{}_1^4 z_i(1-s) + {}_1^4 z_{i+1} s]^2 + y_0^2 + 2_2^n \tilde{J}_{jk} [{}_1^4 z_i(1-s) + {}_1^4 z_{i+1} s] + 2_2^n H_{jk} y_0 + {}_2^n K_{jk}$$

When $m = 5$ and $n = 1$ or $n = 6$, $$\delta_1 = d_1^2$$

$$\delta_2 = 2\{d_1 x_0 + {}_2^n G_{jk} d_1\}$$

$$\delta_3 = x_0^2 + [{}_1^5 y_i(1-s) + {}_1^5 y_{i+1} s]^2 2_2^n G_{jk} x_0 + 2_2^n H_{jk} [{}_1^5 y_i(1-s) + {}_1^5 y_{i+1} s] + {}_2^n K_{jk}$$

When $m = 5$ and $n = 2$ or $n = 4$, $$\delta_1 = d_1^2$$

$$\delta_2 = 2\{d_1 x_0 + {}_2^n G_{jk} d_1\}$$

$$\delta_3 = x_0^2 + [{}_1^5 z_i(1-s) + {}_1^5 z_{i+1} s]^2 2_2^n G_{jk} x_0 + 2_2^n \tilde{J}_{jk} [{}_1^5 z_i(1-s) + {}_1^5 z_{i+1} s] + {}_2^n K_{jk}$$

When $m = 6$ and $n = 2$ or $n = 4$, $$\delta_1 = d_1^2$$

$$\delta_2 = -2\{d_1 W + {}_2^n \tilde{J}_{jk} d_1\}$$

$$\delta_3 = [{}_1^6 x_i(1-s) + {}_1^6 x_{i+1} s]^2 + W^2 + 2_2^n G_{jk} [{}_1^6 x_i(1-s) + {}_1^6 x_{i+1} s] + 2_2^n \tilde{J}_{jk} W + {}_2^n K_{jk}$$

When $m = 6$ and $n = 3$ or $n = 5$, $$\delta_1 = d_1^2$$

$$\delta_2 = -2\{d_1 W + {}_2^n \tilde{J}_{jk} d_1\}$$

$$\delta_3 = [{}_1^6 y_i(1-s) + {}_1^6 y_{i+1} s]^2 + W^2 + 2_2^n H_{jk} [{}_1^6 y_i(1-s) + {}_1^6 y_{i+1} s] + 2_2^n \tilde{J}_{jk} W + {}_2^n K_{jk}$$

Solving for t for a specific value of s in equation (5.15) gives the values $t_1$ and $t_2$. The plane ${}_1^m \gamma_{s1}(U_i, U_{i+1}, \hat{U}_i, \hat{U}_{i+1}; \psi_p)$ and the cylindrical surface ${}_2^n \gamma_{sk}(U_i, U_{i+1}, \hat{U}_i, \hat{U}_{i+1}; \psi_p)$ do not intersect at that value of the parameter s where $\delta_2^2 - 4\delta_1 \delta_3 < 0$. Furthermore, there is only one root $t_1$ for that value of the parameter s when $\delta_2^2 - 4\delta_1 \delta_3 = 0$. When $\delta_2^2 - 4\delta_1 \delta_3 > 0$ the intersection points are $R_1 = (x_{g1}, y_{g1}, z_{g1})$ and $R_2 = (x_{g1}, y_{g1}, z_{g1})$. The implicit intersection points $R_1$ and $R_2$ are obtained by substituting $t_1$ and $t_2$ into the appropriate equation from equations (5.5a) through (5.5f), provided that $0 \le t_1 \le 1$ and $0 \le t_2 \le 1$. If $t_1$ and $t_2$ are outside their respective regions, then the roots are rejected since such points will not lie between P and $\hat{P}$ on the generator line ${}_1^m \psi_i(P, \hat{P}; \psi_p)$.

The next step is to determine whether or not the points $R_t$, $t = 0, \ldots, K-1$ are on the intersecting cylindrical surface ${}_2^n \gamma_{sk}(U_i, U_{i+1}, \hat{U}_i, \hat{U}_{i+1}; \psi_p)$. This is achieved by taking each intersection point $R_t$ and finding the values of the parameters s and t for that point on the cylindrical surface ${}_2^n \gamma_{sk}(U_i, U_{i+1}, \hat{U}_i, \hat{U}_{i+1}; \psi_p)$. The parameter t is obtained from equation (5.7). When the point lies between the two directrics ${}_2^n \gamma_k(U_i, U_{i+1}; P) {}_2^n \hat{\gamma}_{sk}(\hat{U}_i, \hat{U}_{i+1}; \hat{P})$, then $0 < t < 1$. The value $t(R_t)$ for each intersection point $R_t$, $t = 0, \ldots K-1$ is obtained by substituting $x = x_g$ when $n = 3$ or 5, $y = y_g$ when $n = 2$ or 4, and $z = z_g$ when n 1 or 6 into equation (5.7), where $(x_g, y_g, z_g)$ are the coordinates of the intersection point $R_t$. The points $R_t$ that produce a t that is not within $0 < t < 1$ are rejected.

Figure 64:
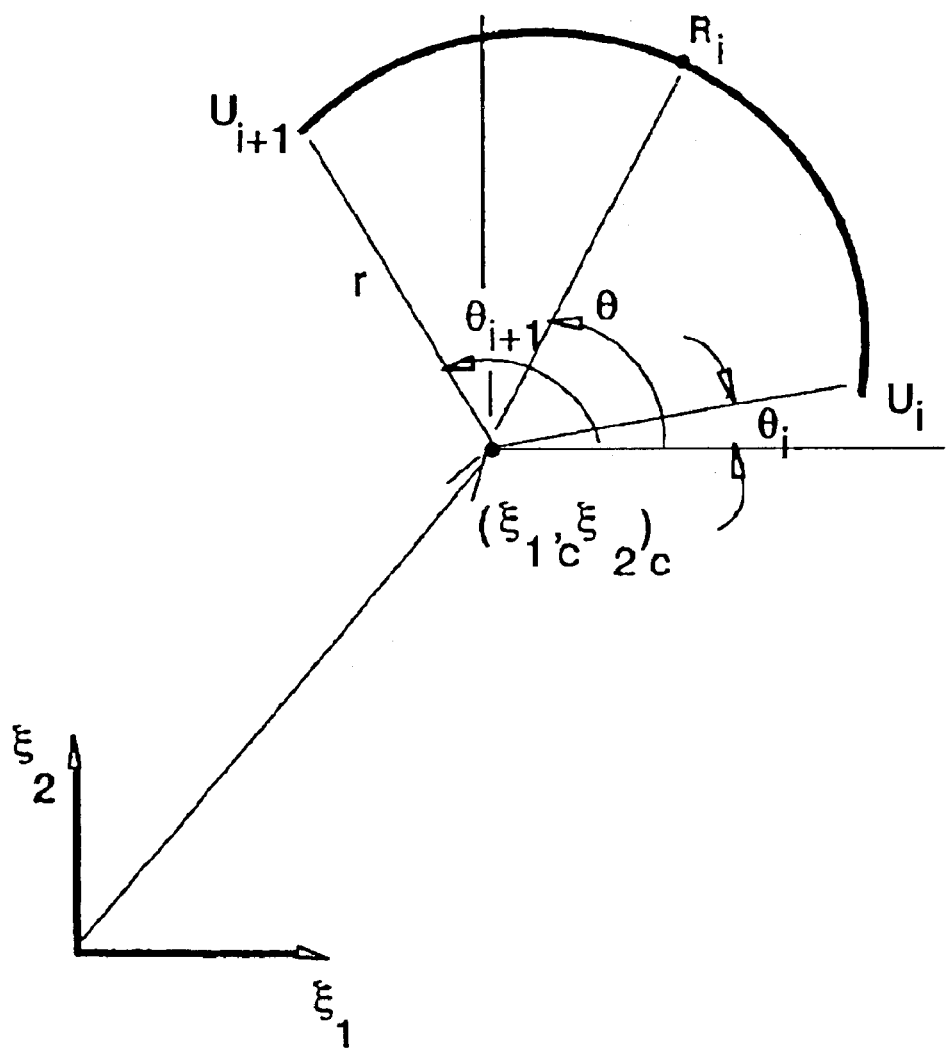
FIG. 64 is a schematic determination of the angle for an intersection point.

For the remaining points $R_t$, as shown in FIG. 64, the angle $\theta$ from the $\xi_1$-axis to the point $R_t$ is calculated using the following parametric relations:

$$\xi_1 = \xi_{c1} + r \cos \theta \quad (5.21a)$$

$$\xi_1 = \xi_{c1} + r \sin \theta \quad (5.21b)$$

For $n = 1$ or $n = 6$, $$\xi_1 = x_g$$

$$\xi_2 = y_g$$

For $n = 3$ or $n = 5$, $$\xi_1 = y_g$$

$$\xi_2 = z_g$$

For $n = 2$ or $n = 4$, $$\xi_1 = z_g$$

$$\xi_2 = x_g$$

Using equations (5.21), the angles $\theta_i$ and $\theta_{i+1}$ are calculated at points $U_i$ and $U_{i+1}$, respectively. When the point lies between $U_i$ and $U_{i+1}$, then $\theta_i < \theta < \theta_{i+1}$. A point that precedes $U_i$ will have $\theta < \theta_i$ and a point that follows $U_{i+1}$ will have $\theta > \theta_{i+1}$. The value $\theta(R_t)$ for each intersection point $R_t$, $t = 1, \ldots, K$ is obtained from equations (5.21). The points $R_t$ that are not within $\theta_i \le \theta \le \theta_{i+1}$ are rejected.

Figure 65:
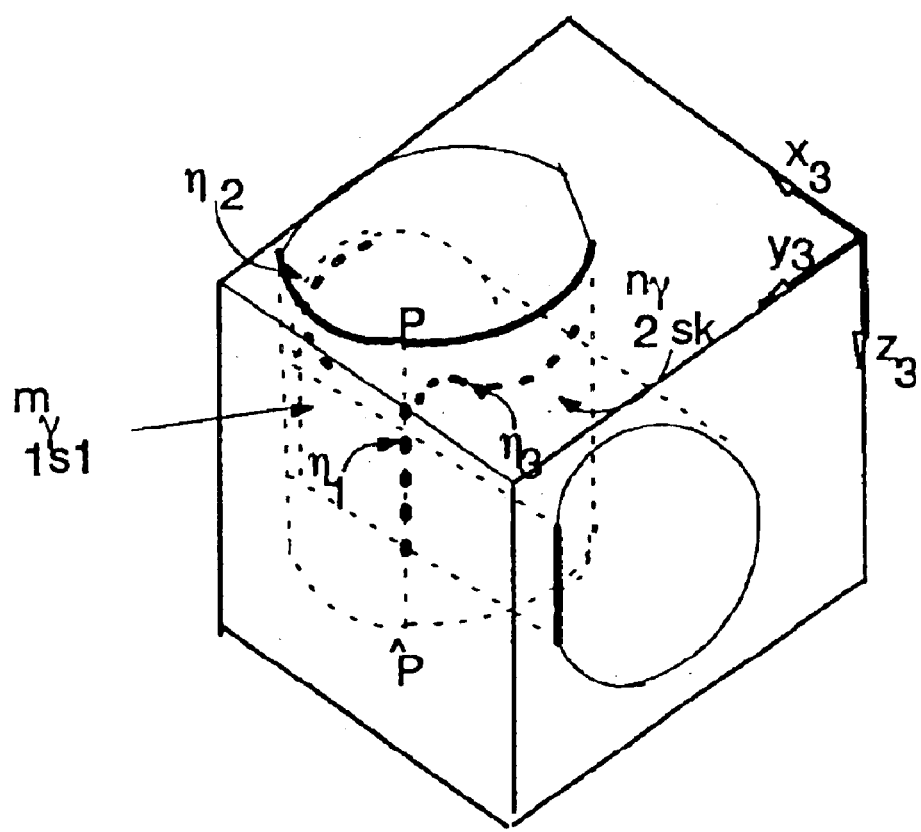
FIG. 65 illustrates a plane intersecting a cylindrical surface.

FIG. 65 shows a plane ${}_1^m \gamma_{s1}(U_i, U_{i+1}, \hat{U}_i, \hat{U}_{i+1}; \psi_p)$ that intersects a cylindrical surface ${}_2^n \gamma_{sk}(U_i, U_{i+1}, \hat{U}_i, \hat{U}_{i+1}; \psi_p)$ and shares a full intersection liner $\eta_1$. The plane ${}_1^m \gamma_{s1}(U_i, U_{i+1}, \hat{U}_i, \hat{U}_{i+1}; \psi_p)$ is dissected into the patches ${}_1^m \chi_{s1,1}(U_i, U_{i+1}, R_{0,1}, R_{K-1,1}; \psi_p)$ and ${}_1^m \chi_{s1,2}(R_{0,1}, R_{K-1,1}, \hat{U}_i, \hat{U}_{i+1}; \psi_p)$. The cylindrical surface ${}_2^n \gamma_{sk}(U_i, U_{i+1}, \hat{U}_i, \hat{U}_{i+1}; \psi_p)$ is dissected into the patches ${}_2^n \chi_{sk,1}(U_i, U_{i+1}, R_{0,2}, R_{K-1,2}; \psi_p)$ and ${}_2^n \chi_{sk,2}(R_{0,2}, R_{K-1,2}, \hat{U}_i, \hat{U}_{i+1}; \psi_p)$. The patches ${}_1^m \chi_{s1,2}$ and ${}_2^n \chi_{sk,2}$ are removed since they are inside the cavity. The plane and the cylindrical surfaces are given by, respectively, $${}_1^m \gamma_{s1}(U_i, U_{i+1}, \hat{U}_i, \hat{U}_{i+1}; \psi_p) = {}_1^m \chi_{s1,1}(U_i, U_{i+1}, R_{0,1}, R_{K-1,1}; \psi_p) \quad (5.22a)$$

$${}_2^n \gamma_{sk}(U_i, U_{i+1}, \hat{U}_i, \hat{U}_{i+1}; \psi_p) = {}_2^n \chi_{sk,1}(U_i, U_{i+1}, R_{0,2}, R_{K-1,2}; \psi_p) \quad (5.22b)$$

A general, expression for a plane ${}_v^n \gamma_{s1}(U_i, U_{i+1}, \hat{U}_i, \hat{U}_{i+1}; \psi_p)$ and a quadric surface ${}_2^n \gamma_{s5}(U_i, U_{i+1}, \hat{U}_i, \hat{U}_{i+1}; \psi_p)$ that are dissected into the patches $\chi_{s1,i}(A'_{i-1}, A'_i, \hat{A}'_{i-1}, \hat{A}'_i; \psi_p)$, $i = 1, 2, \ldots, N_{se}$ and $\chi_{s5,i}(A'_{i-1}, A'_i, \hat{A}'_{i-1}, \hat{A}'_i; \psi_p)$, $i = 1, 2, \ldots, N_{sq}$ are given by equations (5.12) and (5.18), respectively. A general expression for a cylindrical surface ${}_v^n \gamma_{sk}(U_i, U_{i+1}, \ldots)$ $\hat{U}_i$, $\hat{U}_{i+1}$; $\psi_p$) that is dissected into the patches $\chi_{sk,i}$(A'$_{i-1}$, A'$_i$, Â'$_{i-1}$, Â'$_i$; $\psi_p$), i=1, 2, . . . , N$_{sg}$, is given by $$\,_v^n\gamma_{sk}(U_i, U_{i+1}, \hat{U}_i, \hat{U}_{i+1}; \psi_p) = \sum_{\tau=1}^{\tilde{N}_{sg}} \chi_{sk,i}(A'_{\tau-1}, A'_\tau, \hat{A}'_{\tau-1}, \hat{A}'_\tau; \psi_p) \quad (5.23)$$

$$v = 1, 2$$

where $\tilde{N}_{sg}$ is the number of patches that are retained. Also, A'$_o$=U$_i$, Â'$_o$=$\hat{U}_i$, A'$_{\tilde{N}sg}$=U$_{i+1}$, and Â'$_{\tilde{N}sg}$=$\hat{U}_{i+1}$. The combination $\Pi_4$ denotes the orthogonal intersection of a quadric surface $\,_1^m\gamma_{s5}(U_i, U_{i+1}, \hat{U}_i, \hat{U}_{i+1}; \psi_p)$ with one of the cylindrical surfaces $\,_2^n\gamma_{sk}(U_i, U_{i+1}, \hat{U}_i, \hat{U}_{i+1}; \psi_p)$, k=2, 3, 4. To determine whether or not these two surfaces intersect we use Sylvester's determinant. The quadric surface $\,_1^m\gamma_{s5}$ is given by equation (5.13) and each of the cylindrical surfaces $\,_2^n\gamma_{sk}$ is given by equation (5.19). Equations (5.13) and (5.19) are simplified for various cases, and are given by equations (5.14) and (5.20), respectively. Rearranging these equations and writing Sylvester's determinants for each case, we get:

For $m = 1$ or 6 and $n = 2$ or 4:

$$|R_{12,x}|_4 = \begin{vmatrix} \,_1^m A_j & 2\,_1^m D_j y + 2\,_1^m \tilde{G}_j & \,_1^m B_j y^2 + 2\,_1^m \tilde{H}_j y + \,_1^m \tilde{K}_j & 0 \\ 0 & \,_1^m A_j & 2\,_1^m D_j y + 2\,_1^m \tilde{G}_j & \,_1^m B_j y^2 + 2\,_1^m \tilde{H}_j y + \,_1^m \tilde{K}_j \\ 1 & 2\,_2^n G_{jk} & z^2 + 2\,_2^n J_{jk} z + \,_2^n K_{jk} & 0 \\ 0 & 1 & 2\,_2^n G_{jk} & z^2 + 2\,_2^n J_{jk} z + \,_2^n K_{jk} \end{vmatrix} \quad (5.24a)$$

For $m = 1$ or 6 and $n = 3$ or 5:

$$|R_{13,y}|_4 = \begin{vmatrix} \,_1^m B_j & 2\,_1^m D_j x + 2\,_1^m \tilde{H}_j & \,_1^m A_j x^2 + 2\,_1^m \tilde{G}_j x + \,_1^m \tilde{K}_j & 0 \\ 0 & \,_1^m B_j & 2\,_1^m D_j x + 2\,_1^m \tilde{H}_j & \,_1^m A_j x^2 + 2\,_1^m \tilde{G}_j x + \,_1^m \tilde{K}_j \\ 1 & 2\,_2^n H_{jk} & z^2 + 2\,_2^n J_{jk} z + \,_2^n K_{jk} & 0 \\ 0 & 1 & 2\,_2^n H_{jk} & z^2 + 2\,_2^n J_{jk} z + \,_2^n K_{jk} \end{vmatrix} \quad (5.24b)$$

For $m = 2$ or 4 and $n = 1$ or 6:

$$|R_{21,x}|_4 = \begin{vmatrix} \,_1^m A_j & \,_1^m F_j z + 2\,_1^m \tilde{G}_j & \,_1^m C_j z^2 + 2\,_1^m \tilde{J}_j z + \,_1^m \tilde{K}_j & 0 \\ 0 & \,_1^m A_j & \,_1^m F_j z + 2\,_1^m \tilde{G}_j & \,_1^m C_j z^2 + 2\,_1^m \tilde{J}_j z + \,_1^m \tilde{K}_j \\ 1 & 2\,_2^n G_{jk} & y^2 + 2\,_2^n H_{jk} y + \,_2^n K_{jk} & 0 \\ 0 & 1 & 2\,_2^n G_{jk} & y^2 + 2\,_2^n H_{jk} y + \,_2^n K_{jk} \end{vmatrix} \quad (5.24c)$$

For $m = 2$ or 4 and $n = 3$ or 5:

$$|R_{13,y}|_4 = \begin{vmatrix} \,_1^m C_j & \,_1^m F_j x + 2\,_1^m \tilde{J}_j & \,_1^m A_j x^2 + 2\,_1^m \tilde{G}_j x + \,_1^m \tilde{K}_j & 0 \\ 0 & \,_1^m C_j & \,_1^m F_j x + 2\,_1^m \tilde{J}_j & \,_1^m A_j x^2 + 2\,_1^m \tilde{G}_j x + \,_1^m \tilde{K}_j \\ 1 & 2\,_2^n J_{jk} & y^2 + 2\,_2^n H_{jk} y + \,_2^n K_{jk} & 0 \\ 0 & 1 & 2\,_2^n J_{jk} & y^2 + 2\,_2^n H_{jk} y + \,_2^n K_{jk} \end{vmatrix} \quad (5.24d)$$

For $m = 3$ or 5 and $n = 1$ or 6:

$$|R_{31,y}|_4 = \begin{vmatrix} \,_1^m B_j & \,_1^m E_j z + 2\,_1^m \tilde{H}_j & \,_1^m C_j z^2 + 2\,_1^m \tilde{J}_j z + \,_1^m \tilde{K}_j & 0 \\ 0 & \,_1^m B_j & \,_1^m E_j z + 2\,_1^m \tilde{H}_j & \,_1^m C_j z^2 + 2\,_1^m \tilde{J}_j z + \,_1^m \tilde{K}_j \\ 1 & 2\,_2^n H_{jk} & x^2 + 2\,_2^n G_{jk} x + \,_2^n K_{jk} & 0 \\ 0 & 1 & 2\,_2^n H_{jk} & x^2 + 2\,_2^n G_{jk} x + \,_2^n K_{jk} \end{vmatrix} \quad (5.24e)$$

For $m = 3$ or 5 and $n = 2$ or 4:

$$|R_{32,z}|_4 = \begin{vmatrix} \,_1^m C_j & \,_1^m E_j y + 2\,_1^m \tilde{J}_j & \,_1^m B_j y^2 + 2\,_1^m \tilde{H}_j y + \,_1^m \tilde{K}_j & 0 \\ 0 & \,_1^m C_j & \,_1^m E_j y + 2\,_1^m \tilde{J}_j & \,_1^m B_j y^2 + 2\,_1^m \tilde{H}_j y + \,_1^m \tilde{K}_j \\ 1 & 2\,_2^n J_{jk} & x^2 + 2\,_2^n G_{jk} x + \,_2^n K_{jk} & 0 \\ 0 & 1 & 2\,_2^n J_{jk} & x^2 + 2\,_2^n G_{jk} x + \,_2^n K_{jk} \end{vmatrix} \quad (5.24f)$$

It is noted that $|R_{12,x}|_4=|R_{64,x}|_4$, $|R_{13,y}|_4=|R_{65,y}|_4$, $|R_{21,x}|_4=|R_{46,x}|_4$, $|R_{23,z}|_4=|R_{45,z}|_4$, $|R_{31,y}|_4=|R_{56,y}|_4$ and $|R_{32,z}|_4=|R_{54,z}|_4$. Each of these twelve determinants has been denoted by $|R_{ij,\xi}|_4$, i=1, ..., 6, j=1, ... 6, ξ=x, y or z and i≠j. The coordinate ξ is one of the three coordinates, and the determinant $|R_{ij,\xi}|_4$ is a function of the remaining two coordinates. For example, the determinant $|R_{12,x}|_4$ is expressed as a function of y and z, whereas the determinant $|R_{23,z}|_4$ is a function of x and y. One of these two remaining coordinates indicates the depth of the quadric surface $_1^m\gamma_{s5}(U_i, U_{i+1}, \hat{U}_i, \hat{U}_{i+1}; \psi_p)$ and the other represents the depth of the cylindrical surface $_2^n\gamma_{sk}(U_i, U_{i+1}, \hat{U}_i, \hat{U}_{i+1}; \psi_p)$. Which coordinate goes with which surface depends on the values of m and n.

The determinant $|R_{ij,\xi}|_4$ vanishes when the two polynomials given by equations (5.13) and (5.19) have common roots, that is, when the quadric surface $_1^m\gamma_{s5}(U_i, U_{i+1}, \hat{U}_i, \hat{U}_{i+1}; \psi_p)$ intersects the cylindrical surface $_2^n\gamma_{sk}(U_i, U_{i+1}, \hat{U}_i, \hat{U}_{i+1}; \psi_p)$. The determinant $|R_{ij,\xi}|_4$ is, therefore, used to determine whether or not the quadric surface and the cylindrical surface intersect.

Consider the case when the quadric surface $_1^1\gamma_{s5}(U_i, U_{i+1}, \hat{U}_i, \hat{U}_{i+1}; \psi_p)$, which exists on face m=1 (the xy-plane), is intersected by an orthogonal cylindrical surface $_2^2\gamma_{sk}(U_i, U_{i+1}, \hat{U}_i, \hat{U}_{i+1}; \psi_p)$, where the cylindrical surface exists on face n=2 (the xz-plane). The appropriate determinant for this case is $|R_{12,x}|_4$, and is given by equation (5.24a). Note that the determinant $|R_{12,x}|_4$ is a function of y and z only, and is independent of x. The coordinate z indicates the depth of the quadric surface $_1^1\gamma_{s5}(U_i, U_{i+1}, \hat{U}_i, \hat{U}_{i+1}; \psi_p)$, whereas the coordinate y represents the depth of the cylindrical surface $_2^2\gamma_{sk}(U_i, U_{i+1}, \hat{U}_i, \hat{U}_{i+1}; \psi_p)$. The points $_1^1U_i$ and $_1^1U_{i+1}$ are the end points of the directric curve $_1^1\gamma_{s5}(U_i, U_{i+1}; P)$ of the quadric surface $_1^1\gamma_{s5}$. The coordinates of the point $_1^1U_i$ are $(x_i, y_i, 0)$ and that of point $_1^1U_{i+1}$ are $(x_{i+1}, y_{i+1}, 0)$ in the (x, y, z) system. The value of $|R_{12,x}|_4$ given by equation (5.24a) is calculated at $y=y_i$, and its sign is noted. Then y is increased by a small value and the value of $|R_{12,x}|_4$ is again calculated. Any change in sign of the determinant $|R_{12,x}|_4$ indicates that it is singular between the last value of y and the new value of y. When this is the case these two values of y are stored for use later to find the roots more precisely. If there is no sign change, y is incremented and the comparison process is repeated until the maximum value $y=y_{i+1}$ is reached. If there is no change in sign of $|R_{12,x}|_4$ throughout the range $y_i \leq y \leq y_{i+1}$, the value of $|R_{12,x}|_4$ is calculated at $z=z_i$ and its sign is noted. Then z is increased by a small value and the value of $|R_{12,x}|_4$ is again calculated. Any change in sign of the determinant $|R_{12,x}|_4$ indicates that it is singular between the last value of z and the new value of z. When this is the case these two values of z are stored for use later to find the roots more precisely. If there is no sign change, z is incremented and the comparison process is repeated until the maximum value $z=z+1$ is reached. If there is no change in sign of $|R_{12,x}|_4$ throughout the range $z_i \leq z \leq z_{i+1}$, then the quadric surface $_1^1\gamma_{s5}(U_i, U_{i+1}, \hat{U}_i, \hat{U}_{i+1}; \psi_p)$, does not intersect the cylindrical surface $_2^2\gamma_{sk}(U_i, U_{i+1}, \hat{U}_i, \hat{U}_{i+1}; \psi_p)$.

Figure 66:
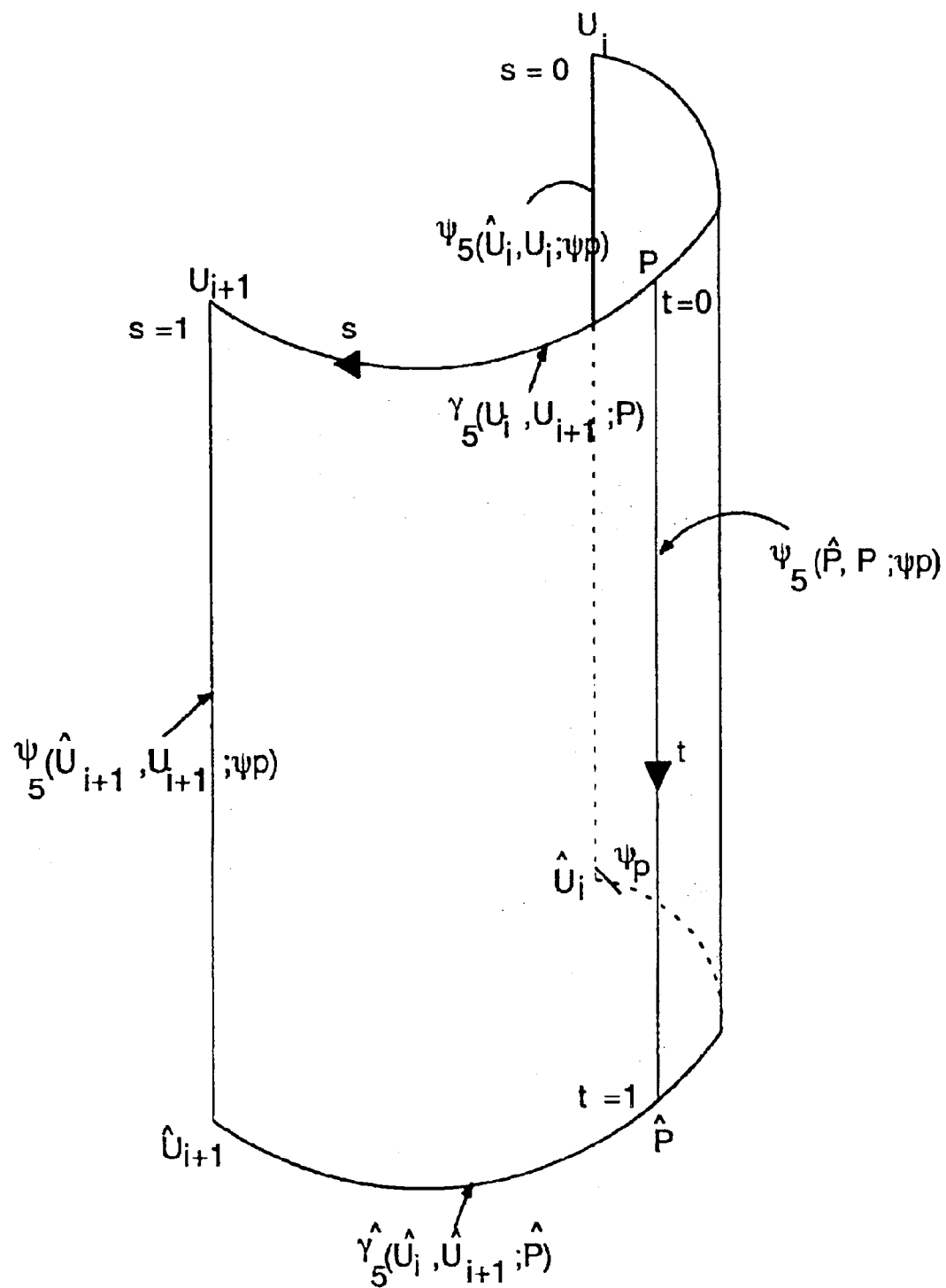
FIG. 66 illustrates the relationship of points on a quadric surface.

Once the range of intersection is determined, the intersection points are determined by solving equations (5.13) and (5.19). To solve these two equations, the quadric surface $_1^m\gamma_{s5}$ is represented in parametric space (s, t) such that the surface $_1^m\gamma_{s5}(U_i, U_{i+1}, \hat{U}_i, \hat{U}_{i+1}; \psi_p)$ is given by a generator line $_1^m\psi_5(P, \hat{P}; t)$ and the directric quadric curve $_1^m\gamma_5(U_i, U_{i+1}; s)$ as shown in FIG. 66. The intersections of the generator line $_1^m\psi_5(P, \hat{P}; t)$ with the cylindrical surface $_2^n\gamma_{sk}(U_i, U_{i+1}, \hat{U}_i, \hat{U}_{i+1}; \psi_p)$ are considered over the range $0 \leq s \leq 1$. An arbitrary point $_1^m\psi_p=(x_p, y_p, z_p)$ on the generator line is related to the points P and $\hat{P}$ by equation (5.1). The point P is an arbitrary point that exists on the directric curve $_1^m\gamma_5(U_i, U_{i+1}; s)$, and the point $\hat{P}$ is another arbitrary point that exists on the other end of the generator $_1^m\psi_5(P, \hat{P}; t)$ on the other directric curve $_1^m\gamma_5(U_i, U_{i+1}; s)$. The points P and $\hat{P}$ on the quadric curve are given by, respectively, $$P = \frac{\mu_0(1-s)^2 U_i + 2\mu_1 U_{i+1} s(1-s) + \mu_2 P_{j,8} s^2}{\mu_0(1-s)^2 + 2\mu_1 s(1-s) + \mu_2 s^2} \quad (5.25)$$

$$\hat{P} = P + d_1 \quad (5.26)$$

The weights $\mu_0$, $\mu_1$, and $\mu_2$ are given by, equation (5.16b). The shoulder point $P_{j,8}=(x_{j,8}, y_{j,8}, z_{j,8})$ was defined above. The depth $d_1$ is the depth of the profile. When $P=U_i$ and $\hat{P}=\hat{U}_i$, the generator line is at its initial position of s=0; and when $P=U_{i+1}$ and $\hat{P}=\hat{U}_{i+1}$, the generator line is at its final position s=1. Also, when t=0, $\psi_p=P$, and when t=1, $\psi_p=\hat{P}$.

The general quadric surface $_1^m\gamma_{s5}$, m=1, ..., 6 represents a surface whose directric curve $_1^m\gamma_5$ exists on one of the six faces of the $(FMEM)_1$. Substituting equations (5.25) and (5.26) into equation (5.1), and then simplifying the results for each of the six cases in the (x, y, z) coordinate system of $(FMEM)_3$, yields:

For m = 1

$$x = \frac{\mu_0(1-s)^2 {_1^1}x_i + 2\mu_1 {_1^1}x_{i+1} s(1-s) + \mu_2 x_{j,8} s^2}{\mu_0(1-s)^2 + 2\mu_1 s(1-s) + \mu_2 s^2} \quad (5.27a)$$

$$y = \frac{\mu_0(1-s)^2 {_1^1}y_i + 2\mu_1 {_1^1}y_{i+1} s(1-s) + \mu_2 y_{j,8} s^2}{\mu_0(1-s)^2 + 2\mu_1 s(1-s) + \mu_2 s^2}$$

$$z = z_0 + td_1$$

For m = 2

$$x = \frac{\mu_0(1-s)^2 {_1^2}x_i + 2\mu_1 {_1^2}x_{i+1} s(1-s) + \mu_2 x_{j,8} s^2}{\mu_0(1-s)^2 + 2\mu_1 s(1-s) + \mu_2 s^2} \quad (5.27b)$$

$$y = y_0 + V - td_1$$

$$z = \frac{\mu_0(1-s)^2 {_1^2}z_i + 2\mu_1 {_1^2}z_{i+1} s(1-s) + \mu_2 z_{j,8} s^2}{\mu_0(1-s)^2 + 2\mu_1 s(1-s) + \mu_2 s^2}$$

For m = 3

$$x = x_0 + U - td_1 \quad (5.27c)$$

$$y = \frac{\mu_0(1-s)^2 {_1^3}y_i + 2\mu_1 {_1^3}y_{i+1} s(1-s) + \mu_2 y_{j,8} s^2}{\mu_0(1-s)^2 + 2\mu_1 s(1-s) + \mu_2 s^2}$$

$$z = \frac{\mu_0(1-s)^2 {_1^3}z_i + 2\mu_1 {_1^3}z_{i+1} s(1-s) + \mu_2 z_{j,8} s^2}{\mu_0(1-s)^2 + 2\mu_1 s(1-s) + \mu_2 s^2}$$

For m = 4

$$x = \frac{\mu_0(1-s)^2 {_1^4}x_i + 2\mu_1 {_1^4}x_{i+1} s(1-s) + \mu_2 x_{j,8} s^2}{\mu_0(1-s)^2 + 2\mu_1 s(1-s) + \mu_2 s^2} \quad (5.27d)$$

$$y = y_0 + td_1$$

$$z = \frac{\mu_0(1-s)^2 {_1^4}z_i + 2\mu_1 {_1^4}z_{i+1} s(1-s) + \mu_2 z_{j,8} s^2}{\mu_0(1-s)^2 + 2\mu_1 s(1-s) + \mu_2 s^2}$$

For m = 5

$$x = x_0 + td_1 \quad (5.27e)$$

$$y = \frac{\mu_0(1-s)^2 {_1^5}y_i + 2\mu_1 {_1^5}y_{i+1} s(1-s) + \mu_2 y_{j,8} s^2}{\mu_0(1-s)^2 + 2\mu_1 s(1-s) + \mu_2 s^2}$$

$$z = \frac{\mu_0(1-s)^2 {_1^5}z_i + 2\mu_1 {_1^5}z_{i+1} s(1-s) + \mu_2 z_{j,8} s^2}{\mu_0(1-s)^2 + 2\mu_1 s(1-s) + \mu_2 s^2}$$

-continued

For m = 6

$$x = \frac{\mu_0(1-s)^2 {}_1^6 x_i + 2\mu_1 {}_1^6 x_{i+1} s(1-s) + \mu_2 x_{j,8} s^2}{\mu_0(1-s)^2 + 2\mu_1 s(1-s) + \mu_2 s^2} \quad (5.27f)$$

$$y = \frac{\mu_0(1-s)^2 {}_1^6 y_i + 2\mu_1 {}_1^6 y_{i+1} s(1-s) + \mu_2 y_{j,8} s^2}{\mu_0(1-s)^2 + 2\mu_1 s(1-s) + \mu_2 s^2}$$

$$z = z_0 + W - td_1$$

where, $(x_0, y_0, z_0)$ are the coordinates of the origin of the local $(x, y, z)$ system of $(FMEM)_3$ in the global coordinate system $(X, Y, Z)$, and $U=U_3+x_0$, $V=V_3+y_0$ and $W=W_3+z_0$. The dimensions $U_3$, $V_3$, and $W_3$ are the size of $(FMEM)_3$ in the $X$, $Y$ and $Z$ directions, respectively. The coordinates $({}_1^m x_i, {}_1^m y_i, {}_1^m z_i)$ and $({}_1^m x_{i+1}, {}_1^m y_{i+1}, {}_1^m z_{i+1})$ represent the end points ${}_1^m U_i$ and ${}_1^m U_{i+1}$ of a quadric curve ${}_1^m \gamma_5(U_i, U_{i+1}; P)$, respectively, in the $(x, y, z)$ coordinate system, and $d_1$ is the depth of the profile shell ${}_1^m S_{so(\psi p)}$.

Substituting an appropriate set of equations from equations (5.27a) through (5.27f) into the correspondingly appropriate equation from equations (5.20a) through (5.20c) yields the following quadratic equation in t:

$$\delta_1 t^2 + \delta_2 t + \delta_3 = 0 \quad (5.28)$$

When $m = 1$ and $n = 2$ or $n = 4$, $$\delta_1 = d_1^2$$

$$\delta_2 = 2\{d_1 z_0 + {}_2^n \tilde{J}_{jk} d_1\}$$

$$\delta_3 = [\{\mu_0 {}_1^1 x_i(1-s)^2 + 2\mu_1 {}_1^1 x_{i+1} s(1-s) + \mu_2 x_{j,8} s^2\}/$$
$$\{\mu_0(1-s)^2 + 2\mu_1 s(1-s) + \mu_2 s^2\}]^2 + z_0^2 + 2{}_2^n G_{jk}[\{\mu_0 {}_1^1 x_i(1-s)^2 +$$
$$2\mu_1 {}_1^1 x_{i+1} s(1-s) + \mu_2 x_{j,8} s^2\}/\mu_0(1-s)^2 +$$
$$2\mu_1 s(1-s) + \mu_2 s^2\}] + 2{}_2^n \tilde{J}_{jk} z_0 + {}_2^n K_{jk}$$

When $m = 1$ and $n = 3$ or $n = 5$, $$\delta_1 = d_1^2$$

$$\delta_2 = 2\{d_1 z_0 + {}_2^n \tilde{J}_{jk} d_1\}$$

$$\delta_3 = [\{\mu_0 {}_1^1 y_i(1-s)^2 + 2\mu_1 {}_1^1 y_{i+1} s(1-s) + \mu_2 y_{j,8} s^2\}/$$
$$\{\mu_0(1-s)^2 + 2\mu_1 s(1-s) + \mu_2 s^2\}]^2 + z_0^2 +$$
$$2{}_2^n H_{jk}[\{\mu_0 {}_1^1 y_i(1-s)^2 + 2\mu_1 {}_1^1 y_{i+1} s(1-s) + \mu_2 y_{j,8} s^2\}/$$
$$\{\mu_0(1-s)^2 + 2\mu_1 s(1-s) + \mu_2 s^2\}] + 2{}_2^n \tilde{J}_{jk} z_0 + {}_2^n K_{jk}$$

When $m = 2$ and $n = 1$ or $n = 6$, $$\delta_1 = d_1^2$$

$$\delta_2 = -2\{d_1 V + {}_2^n H_{jk} d_1\}$$

$$\delta_3 = [\{\mu_0 {}_1^2 x_i(1-s)^2 + 2\mu_1 {}_1^2 x_{i+1} s(1-s) + \mu_2 x_{j,8} s^2\}/$$
$$\{\mu_0(1-s)^2 + 2\mu_1 s(1-s) + \mu_2 s^2\}]^2 + V^2 +$$
$$2{}_2^n G_{jk}[\{\mu_0 {}_1^2 x_i(1-s)^2 + 2\mu_1 {}_1^2 x_{i+1} s(1-s) + \mu_2 x_{j,8} s^2\}/$$
$$\{\mu_0(1-s)^2 + 2\mu_1 s(1-s) + \mu_2 s^2\}] + 2{}_2^n H_{jk} V + {}_2^n K_{jk}$$

When $m = 2$ and $n = 3$ or $n = 5$, $$\delta_1 = d_1^2$$

$$\delta_2 = -2\{d_1 V + {}_2^n H_{jk} d_1\}$$

$$\delta_3 = [\{\mu_0 {}_1^2 z_i(1-s)^2 + 2\mu_1 {}_1^2 z_{i+1} s(1-s) + \mu_2 z_{j,8} s^2\}/$$
$$\{\mu_0(1-s)^2 + 2\mu_1 s(1-s) + \mu_2 s^2\}]^2 + V^2 +$$
$$2{}_2^n \tilde{J}_{jk}[\{\mu_0 {}_1^2 z_i(1-s)^2 + 2\mu_1 {}_1^2 z_{i+1} s(1-s) + \mu_2 z_{j,8} s^2\}/$$

-continued $$\{\mu_0(1-s)^2 + 2\mu_1 s(1-s) + \mu_2 s^2\}] + 2{}_2^n H_{jk} V + {}_2^n K_{jk}$$

When $m = 3$ and $n = 1$ or $n = 6$, $$\delta_1 = d_1^2$$

$$\delta_2 = -2\{d_1 U + {}_2^n G_{jk} d_1\}$$

$$\delta_3 = U^2 + [\{\mu_0 {}_1^3 y_i(1-s)^2 + 2\mu_1 {}_1^3 y_{i+1} s(1-s) + \mu_2 y_{j,8} s^2\}/$$
$$\{\mu_0(1-s)^2 + 2\mu_1 s(1-s) + \mu_2 s^2\}]^2 +$$
$$2{}_2^n H_{jk}[\{\mu_0 {}_1^3 y_i(1-s)^2 + 2\mu_1 {}_1^3 y_{i+1} s(1-s) + \mu_2 y_{j,8} s^2\}/$$
$$\{\mu_0(1-s)^2 + 2\mu_1 s(1-s) + \mu_2 s^2\}] + 2{}_2^n G_{jk} U + {}_2^n K_{jk}$$

When $m = 3$ and $n = 2$ or $n = 4$, $$\delta_1 = d_1^2$$

$$\delta_2 = -2\{d_1 U + {}_2^n G_{jk} d_1\}$$

$$\delta_3 = U^2 + [\{\mu_0 {}_1^3 z_i(1-s)^2 + 2\mu_1 {}_1^3 z_{i+1} s(1-s) + \mu_2 z_{j,8} s^2\}/$$
$$\{\mu_0(1-s)^2 + 2\mu_1 s(1-s) + \mu_2 s^2\}]^2 +$$
$$2{}_2^n \tilde{J}_{jk}[\{\mu_0 {}_1^3 z_i(1-s)^2 + 2\mu_1 {}_1^3 z_{i+1} s(1-s) + \mu_2 z_{j,8} s^2\}/$$
$$\{\mu_0(1-s)^2 + 2\mu_1 s(1-s) + \mu_2 s^2\}] + 2{}_2^n G_{jk} U + {}_2^n K_{jk}$$

When $m = 4$ and $n = 1$ or $n = 6$, $$\delta_1 = d_1^2$$

$$\delta_2 = 2\{d_1 y_0 + {}_2^n H_{jk} d_1\}$$

$$\delta_3 = [\{\mu_0 {}_1^4 x_i(1-s)^2 + 2\mu_1 {}_1^4 x_{i+1} s(1-s) + \mu_2 x_{j,8} s^2\}/$$
$$\{\mu_0(1-s)^2 + 2\mu_1 s(1-s) + \mu_2 s^2\}]^2 + y_0^2 +$$
$$2{}_2^n G_{jk}[\{\mu_0 {}_1^4 x_i(1-s)^2 + 2\mu_1 {}_1^4 x_{i+1} s(1-s) + \mu_2 x_{j,8} s^2\}/$$
$$\{\mu_0(1-s)^2 + 2\mu_1 s(1-s) + \mu_2 s^2\}] + 2{}_2^n H_{jk} y_0 + {}_2^n K_{jk}$$

When $m = 4$ and $n = 3$ or $n = 5$, $$\delta_1 = d_1^2$$

$$\delta_2 = 2\{d_1 y_0 + {}_2^n H_{jk} d_1\}$$

$$\delta_3 = [\{\mu_0 {}_1^4 z_i(1-s)^2 + 2\mu_1 {}_1^4 z_{i+1} s(1-s) + \mu_2 z_{j,8} s^2\}/$$
$$\{\mu_0(1-s)^2 + 2\mu_1 s(1-s) + \mu_2 s^2\}]^2 + y_0^2 +$$
$$2{}_2^n \tilde{J}_{jk}[\{\mu_0 {}_1^4 z_i(1-s)^2 + 2\mu_1 {}_1^4 z_{i+1} s(1-s) + \mu_2 z_{j,8} s^2\}/$$
$$\{\mu_0(1-s)^2 + 2\mu_1 s(1-s) + \mu_2 s^2\}] + 2{}_2^n H_{jk} y_0 + {}_2^n K_{jk}$$

When $m = 5$ and $n = 1$ or $n = 6$, $$\delta_1 = d_1^2$$

$$\delta_2 = 2\{d_1 x_0 + {}_2^n G_{jk} d_1\}$$

$$\delta_3 = x_0^2 + [\{\mu_0 {}_1^5 y_i(1-s)^2 + 2\mu_1 {}_1^5 y_{i+1} s(1-s) + \mu_2 y_{j,8} s^2\}/$$
$$\{\mu_0(1-s)^2 + 2\mu_1 s(1-s) + \mu_2 s^2\}]^2 +$$
$$2{}_2^n H_{jk}[\{\mu_0 {}_1^5 y_i(1-s)^2 + 2\mu_1 {}_1^5 y_{i+1} s(1-s) + \mu_2 y_{j,8} s^2\}/$$
$$\{\mu_0(1-s)^2 + 2\mu_1 s(1-s) + \mu_2 s^2\}] + 2{}_2^n G_{jk} x_0 + {}_2^n K_{jk}$$

When $m = 5$ and $n = 2$ or $n = 4$, $$\delta_1 = d_1^2$$

$$\delta_2 = 2\{d_1 x_0 + {}_2^n G_{jk} d_1\}$$

$$\delta_3 = x_0^2 + [\{\mu_0 {}_1^5 z_i(1-s)^2 + 2\mu_1 {}_1^5 z_{i+1} s(1-s) + \mu_2 z_{j,8} s^2\}/$$
$$\{\mu_0(1-s)^2 + 2\mu_1 s(1-s) + \mu_2 s^2\}]^2 +$$
$$2{}_2^n \tilde{J}_{jk}[\{\mu_0 {}_1^5 z_i(1-s)^2 + 2\mu_1 {}_1^5 z_{i+1} s(1-s) + \mu_2 z_{j,8} s^2\}/$$
$$\{\mu_0(1-s)^2 + 2\mu_1 s(1-s) + \mu_2 s^2\}] + 2{}_2^n G_{jk} x_0 + {}_2^n K_{jk}$$

-continued

When $m = 6$ and $n = 2$ or $n = 4$, $$\delta_1 = d_1^2$$

$$\delta_2 = -2\{d_1 W + {}_2^n \tilde{J}_{jk} d_1\}$$

$$\delta_3 = [\{\mu_0 {}_1^6 x_i(1-s)^2 + 2\mu_1 {}_1^6 x_{i+1} s(1-s) + \mu_2 x_{j,8} s^2\}/\{\mu_0(1-s)^2 + 2\mu_1 s(1-s) + \mu_2 s^2\}]^2 + W^2 +$$

$$2_2^n G_{jk}[\{\mu_0 {}_1^6 x_i(1-s)^2 + 2\mu_1 {}_1^6 x_{i+1} s(1-s) + \mu_2 x_{j,8} s^2\}/\{\mu_0(1-s)^2 + 2\mu_1 s(1-s) + \mu_2 s^2\}] + 2_2^n \tilde{J}_{jk} W + {}_2^n K_{jk}$$

When $m = 6$ and $n = 3$ or $n = 5$, $$\delta_1 = d_1^2$$

$$\delta_2 = -2\{d_1 W + {}_2^n \tilde{J}_{jk} d_1\}$$

$$\delta_3 = [\{\mu_0 {}_1^6 y_i(1-s)^2 + 2\mu_1 {}_1^6 y_{i+1} s(1-s) + \mu_2 y_{j,8} s^2\}/\{\mu_0(1-s)^2 + 2\mu_1 s(1-s) + \mu_2 s^2\}]^2 + W^2 +$$

$$2_2^n H_{jk}[\{\mu_0 {}_1^6 y_i(1-s)^2 + 2\mu_1 {}_1^6 y_{i+1} s(1-s) + \mu_2 y_{j,8} s^2\}/\{\mu_0(1-s)^2 + 2\mu_1 s(1-s) + \mu_2 s^2\}] + 2_2^n \tilde{J}_{jk} W + {}_2^n K_{jk}$$

Solving for t in equation (5.28) gives the values $t_1$ and $t_2$ for a specific value of s. The quadric surface ${}_1^m\gamma_{s5}(U_i, U_{i+1}, \hat{U}_i, \hat{U}_{i+1}; \psi_p)$ and the cylindrical surface ${}_2^n\gamma_{sk}(U_i, U_{i+1}, \hat{U}_i, \hat{U}_{i+1}; \psi_p)$ do not intersect at that value of parameter s when $\delta_2^2 - 4\delta_1\delta_3 < 0$. Furthermore, there is only one root $t_1$ for that value of the parameter s when $\delta_2^2 - 4\delta_1\delta_3 < 0$. When $\delta_2^2 - 4\delta_1\delta_3 < 0$ the intersection points are $R_1 = (x_{qg1}, y_{qg1}, z_{qg1})$ and $R_2 = (x_{qg2}, y_{qg2}, z_{qg2})$. The implicit intersection points, $R_1$ and $R_2$ are obtained by substituting $t_1$ and $t_2$ into the appropriate equation from the set of equations (5.27a) through (5.27f), provided that $0 < t_1 < 1$ and $0 < t_2 < 1$. If $t_1$ and $t_2$ are outside their respective regions, then the roots are rejected, since such points will not lie between P and $\hat{P}$ on the generator line ${}_1^m\psi_i(P, \hat{P}; \psi_p)$.

The next step is to determine whether or not the points $R_t$, $t=0, \ldots, K-1$ are on the intersecting cylindrical surface ${}_2^n\gamma_{sk}(U_i, U_{i+1}, \hat{U}_i, \hat{U}_{i+1}; \psi_p)$.

Figure 67:
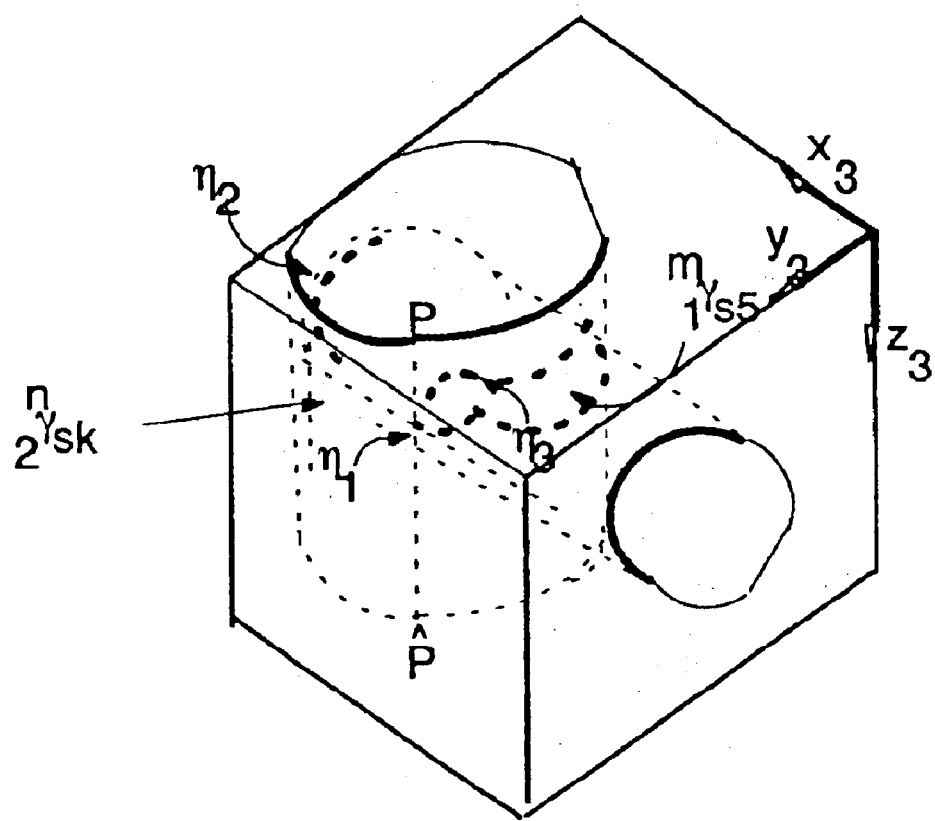
FIG. 67 shows the intersection of a quadric surface and one of the cylindrical surfaces.

FIG. 67 shows the intersection of the quadric surface ${}_1^m\gamma_{s5}(U_i, U_{i+1}, \hat{U}_i, \hat{U}_{i+1}; \psi_p)$ with one of the cylindrical surfaces ${}_2^n\gamma_{sk}(U_i, U_{i+1}, \hat{U}_i, \hat{U}_{i+1}; \psi_p)$. The two surfaces share a full intersection curve $\eta_1$, which is a fourth order curve. The quadric surface ${}_1^m\gamma_{s5}(U_i, U_{i+1}, \hat{U}_i, \hat{U}_{i+1}; \psi_p)$ is dissected into the patches ${}_1^m\chi_{s5,1}(U_i, U_{i+1}, R_{0,1}, R_{K-1,1}; \psi_p)$ and ${}_1^m\chi_{s5,2}(R_{0,2}, R_{K-1,2}, \hat{U}_i, \hat{U}_{i+1}; \psi_p)$. The cylindrical surface ${}_2^n\gamma_{sk}(U_i, U_{i+1}, \hat{U}_i, \hat{U}_{i+1}; \psi_p)$ is dissected into the pa and ${}_2^n\chi_{sk,1}(U_i, U_{i+1}, R_{0,2}, R_{K-1,2}; \psi_p)$ ${}_2^n\chi_{sk,2}(R_{0,2}, R_{K-1,2}, \hat{U}_i, \hat{U}_{i+1}; \psi_p)$ The patches ${}_2^n\chi_{s5,2}$ and ${}_2^n\chi_{sk,2}$ are removed since they are inside the cavity. The quadric and the intersecting cylindrical surfaces are then given by, respectively, $${}_1^m\gamma_{s5}(U_i, U_{i+1}, \hat{U}_i, \hat{U}_{i+1}; \psi_p) = {}_1^m\chi_{s5,1}(U_i, U_{i+1}, R_{0,1}, R_{K-1,1}; \psi_p) \quad (5.29a)$$

$${}_2^n\gamma_{sk}(U_i, U_{i+1}, \hat{U}_i, \hat{U}_{i+1}; \psi_p) = {}_2^n\chi_{sk,1}(U_i, U_{i+1}, R_{0,2}, R_{K-1,2}; \psi_p) \quad (5.29b)$$

A general expression for a quadric surface ${}_v^m\gamma_{s5}(U_i, U_{i+1}, \hat{U}_i, \hat{U}_{i+1}; \psi_p)$ that is dissected into the patches $\chi_{s1,i}(A'_{i-1}, A'_i, \hat{A}'_{i-1}, \hat{A}'_i; \psi_p)$, $i=1, 2, \ldots N_{sq}$ is given by equation (5.18). A general expression for a cylindrical surface ${}_v^n\gamma_{sk}(U_i, U_{i+1}, \hat{U}_i, \hat{U}_{i+1}; \psi_p)$ that is dissected into the patches $\chi_{sk,i}(A'_{i-1}, A'_i, \hat{A}'_{i-1}, \hat{A}'_i; \psi_p)$, $i=1, 2, \ldots N_{sg}$ is given by equation (5.23).

The combination $\Pi_5$ denotes the orthogonal intersection of two cylindrical surfaces ${}_1^m\gamma_{sk}$, and ${}_2^n\gamma_{sk}$, $k=2, 3, 4$. To determine whether or not these two surfaces intersect we use Sylvester's determinant The implicit forms for each of the two surfaces ${}_1^m\gamma_{sk}$ and ${}_2^n\gamma_{sk}$ is given by equation (5.19). The simplified forms of the equation for various cases are given by equations (5.20a) through (5.20c). Rearranging these equations and writing Sylvester's determinant for each case, we get For $m = 1$ or $6$ and $n = 2$ or $4$:

$$|R_{12,x}|_5 = \begin{vmatrix} 1 & 2_1^m G_{jk} & y^2 + 2_1^m H_{jk} y + {}_1^m K_{jk} & 0 \\ 0 & 1 & 2_1^m G_{jk} & y^2 + 2_1^m H_{jk} y + {}_1^m K_{jk} \\ 1 & 2_2^n G_{jk} & z^2 + 2_2^n J_{jk} z + {}_2^n K_{jk} & 0 \\ 0 & 1 & 2_2^n G_{jk} & z^2 + 2_2^n J_{jk} z + {}_2^n K_{jk} \end{vmatrix} \quad (5.30a)$$

For $m = 1$ or $6$ and $n = 3$ or $5$:

$$|R_{13,y}|_5 = \begin{vmatrix} 1 & 2_1^m H_{jk} & x^2 + 2_1^m G_{jk} x + {}_1^m K_{jk} & 0 \\ 0 & 1 & 2_1^m H_{jk} & x^2 + 2_1^m G_{jk} x + {}_1^m K_{jk} \\ 1 & 2_2^n J_{jk} & z^2 + 2_2^n J_{jk} z + {}_2^n K_{jk} & 0 \\ 0 & 1 & 2_2^n H_{jk} & z^2 + 2_2^n J_{jk} z + {}_2^n K_{jk} \end{vmatrix} \quad (5.30b)$$

For $m = 2$ or $4$ and $n = 3$ or $5$:

$$|R_{23,z}|_5 = \begin{vmatrix} 1 & 2_1^m J_{jk} & x^2 + 2_1^m G_{jk} x + {}_1^m K_{jk} & 0 \\ 0 & 1 & 2_1^m J_{jk} & x^2 + 2_1^m G_{jk} x + {}_1^m K_{jk} \\ 1 & 2_2^n J_{jk} & y^2 + 2_2^n H_{jk} y + {}_2^n K_{jk} & 0 \\ 0 & 1 & 2_2^n J_{jk} & y^2 + 2_2^n H_{jk} y + {}_2^n K_{jk} \end{vmatrix} \quad (5.30c)$$

It is noted that $|R_{21,x}|_5 = |R_{12,x}|_5$, $|R_{31,y}|_5 = |R_{13,y}|_5$, $|R_{32,z}|_5 = |R_{23,z}|_5$, since the surfaces are cylindrical surfaces. It is also noted that $|R_{12,x}|_5 = |R_{64,x}|_5$, $|R_{13,y}|_5 = |R_{65,y}|_5$, $|R_{21,x}|_5 = |R_{46,x}|_5$, $|R_{23,z}|_5 = |R_{45,z}|_5$, $|R_{31,y}|_5 = |R_{56,y}|_5$ and $|R_{32,z}|_5 = |R_{54,z}|_5$. Each of these twelve has been denoted by $|R_{ij,\xi}|_5$, $i=1, \ldots, 6, j=1, \ldots 6$, $\xi = x, y$ or $z$ and $i \neq j$. The coordinate $\xi$ is one of the three coordinates and the determinant $|R_{ij,\xi}|_5$ is a function of the remaining two coordinates. Each of the two remaining coordinates indicates the depth of one of the two cylindrical surfaces.

The determinant $|R_{ij,\xi}|_5$ vanishes when the two polynomials for two surfaces have common roots, that is, when the cylindrical surface ${}_1^m\gamma_{sk}(U_i, U_{i+1}, \hat{U}_i, \hat{U}_{i+1}; \psi_p)$ intersects the other cylindrical surface ${}_2^n\gamma_{sk}(U_i, U_{i+1}, \hat{U}_i, \hat{U}_{i+1}; \psi_p)$. The determinant $|R_{ij,\xi}|_5$ is used to determine whether or not the two cylindrical surfaces intersect.

Once the range of intersections is determined, the intersection points are determined by solving the equation (5.19) for the two intersecting cylindrical surfaces. To do that, the first cylindrical surface ${}_1^m\gamma_{sk}(U_i, U_{i+1}, \hat{U}_i, \hat{U}_{i+1}; \psi_p)$ is represented in parametric space (s, t). The intersections of the generator line ${}_1^m\psi_k(P, \hat{P}; t)$ with the cylindrical surface ${}_2^n\gamma_{sk}(U_i, U_{i+1}, \hat{U}_i, \hat{U}_{i+1}; \psi_p)$ are determined for $0 \leq s \leq 1$. An arbitrary point ${}_1^m\psi_p = ({}_1^m x_p, {}_1^m y_p, {}_1^m z_p)$ on the generator line is related to the points P and $\hat{P}$ by equation (5.1). Referring to FIG. 64, the point P on a circular curve is given by $$\xi_1 = \xi_{c1} + {}_1^m r \cos(2\pi s + {}_1^m \theta_i) \quad (5.31a)$$

$$\xi_1 = \xi_{c1} + {}_1^m r \sin(2\pi s + {}_1^m \theta_i) \quad (5.21b)$$

For $n=1$ or $n=6$, $$\xi_1 = x$$

$$\xi_2 = y$$

For n=3 or n=5, $\xi_1 = y$ $\xi_2 = z$

For n=2 or n=4, $\xi_1 = z$ $\xi_2 = x$

The angle $_1^m\theta_i$ is the angle from the $\xi_1$-axis to the point $U_i$. The coordinates $_1^m\xi_{c1}$ and $_1^m\xi_{c2}$ are the coordinates of the circular arc $_1^m\gamma_k$. The point $\hat{P}$ is given by $$\hat{P} = P + d_1 \quad (5.32)$$

The general cylindrical surface $_1^m\gamma_{sk}$, m=1, ..., 6 represents a surface whose directric curve $_1^m\gamma_k$ exists on one of the six faces of $(FMEM)_1$. Substituting equations (5.31) and (5.32) into equation (5.1), and then simplifying for each of the six cases in the (x, y, z) coordinate system of $(FMEM)_3$, yields:

For $m = 1$ $$x = {}_1^1x_c + {}_1^1r\cos(2\pi s + {}_1^1\theta_i) \quad (5.33a)$$

$$y = {}_1^1y_c + {}_1^1r\sin(2\pi s + {}_1^1\theta_i)$$

$$z = z_0 + td_1$$

For $m = 2$ $$x = {}_1^2x_c + {}_1^2r\sin(2\pi s + {}_1^2\theta_i) \quad (5.33b)$$

$$y = y_0 + V - td_1$$

$$z = {}_1^2z_c + {}_1^2r\cos(2\pi s + {}_1^2\theta_i)$$

For $m = 3$ $$x = x_0 + U - td_1 \quad (5.33c)$$

$$y = {}_1^3y_c + {}_1^3r\cos(2\pi s + {}_1^3\theta_i)$$

$$z = {}_1^3z_c + {}_1^3r\sin(2\pi s + {}_1^3\theta_i)$$

For $m = 4$ $$x = {}_1^4x_c + {}_1^4r\sin(2\pi s + {}_1^4\theta_i) \quad (5.33d)$$

$$y = y_0 + td_1$$

$$z = {}_1^4z_c + {}_1^4r\cos(2\pi s + {}_1^4\theta_i)$$

For $m = 5$ $$x = x_0 + td_1 \quad (5.33e)$$

$$y = {}_1^5y_c + {}_1^5r\cos(2\pi s + {}_1^5\theta_i)$$

$$z = {}_1^5z_c + {}_1^5r\sin(2\pi s + {}_1^5\theta_i)$$

For $m = 6$ $$x = {}_1^6x_c + {}_1^6r\cos(2\pi s + {}_1^6\theta_i) \quad (5.33f)$$

$$y = {}_1^6y_c + {}_1^6r\sin(2\pi s + {}_1^6\theta_i)$$

$$z = z_0 + W - td_1$$

where, $(x_0, y_0, z_0)$ are the coordinates of the origin of the local (x, y, z) system of $(FMEM)_3$ in the global coordinate system (X, Y, Z), and $U = U_3 + x_0$, $V = V_3 + y_0$ and $W = W_3 + z_0$. The dimensions $U_3$, $V_3$, and $W_3$ represent the size of the $(FMEM)_3$ in the X, Y and Z directions, respectively. The coordinates $({}_1^mx_c, {}_1^my_c, {}_1^mz_c)$ represent the center point of the cylindrical surface $_1^m\gamma_{sk}$ in the (x, y, z) coordinate system, and $d_1$ is the depth of the profile shell $_1^mS_{so}(\psi_p)$.

Substituting an appropriate set of equations from equations (5.33a) through (5.33f) into the correspondingly appropriate equation from equations (5.20a) through (5.20c) yields the following quadratic equations in t:

$$\delta_1 t^2 + \delta_2 t + \delta_3 = 0 \quad (5.34)$$

When $m = 1$ and $n = 2$ or $n = 4$, $$\delta_1 = d_1^2$$

$$\delta_2 = 2\{d_1 z_0 + {}_2^n\tilde{J}_{jk} d_1\}$$

$$\delta_3 = [{}_1^1x_c + {}_1^1r\cos(2\pi s + {}_1^1\theta_i)]^2 + z_0^2 +$$

$$2{}_2^nG_{jk}[{}_1^1x_c + {}_1^1r\cos(2\pi s + {}_1^1\theta_i)] + 2{}_2^n\tilde{J}_{jk} z_0 + {}_2^nK_{jk}$$

When $m = 1$ and $n = 3$ or $n = 5$, $$\delta_1 = d_1^2$$

$$\delta_2 = 2\{d_1 z_0 + {}_2^n\tilde{J}_{jk} d_1\}$$

$$\delta_3 = [{}_1^1y_c + {}_1^1r\sin(2\pi s + {}_1^1\theta_i)]^2 + z_0^2 +$$

$$2{}_2^nH_{jk}[{}_1^1y_c + {}_1^1r\sin(2\pi s + {}_1^1\theta_i)] + 2{}_2^n\tilde{J}_{jk} z_0 + {}_2^nK_{jk}$$

When $m = 2$ and $n = 1$ or $n = 6$, $$\delta_1 = d_1^2$$

$$\delta_2 = -2\{d_1 V + {}_2^nH_{jk} d_1\}$$

$$\delta_3 = [{}_1^2x_c + {}_1^2r\sin(2\pi s + {}_1^2\theta_i)]^2 + V^2 +$$

$$2{}_2^nG_{jk}[{}_1^2x_c + {}_1^2r\sin(2\pi s + {}_1^2\theta_i)] + 2{}_2^nH_{jk} V + {}_2^nK_{jk}$$

When $m = 2$ and $n = 3$ or $n = 5$, $$\delta_1 = d_1^2$$

$$\delta_2 = -2\{d_1 V + {}_2^nH_{jk} d_1\}$$

$$\delta_3 = [{}_1^2z_c + {}_1^2r\cos(2\pi s + {}_1^2\theta_i)]^2 + V^2 +$$

$$2{}_2^n\tilde{J}_{jk}[{}_1^2z_c + {}_1^2r\cos(2\pi s + {}_1^2\theta_i)] + 2{}_2^nH_{jk} V + {}_2^nK_{jk}$$

When $m = 3$ and $n = 1$ or $n = 6$, $$\delta_1 = d_1^2$$

$$\delta_2 = -2\{d_1 U + {}_2^nG_{jk} d_1\}$$

$$\delta_3 = U^2 + [{}_1^3y_c + {}_1^3r\cos(2\pi s + {}_1^3\theta_i)]^2 +$$

$$2{}_2^nG_{jk} U + 2{}_2^nH_{jk}[{}_1^3y_c + {}_1^3r\cos(2\pi s + {}_1^3\theta_i)] + {}_2^nK_{jk}$$

When $m = 3$ and $n = 2$ or $n = 4$, $$\delta_1 = d_1^2$$

$$\delta_2 = -2\{d_1 U + {}_2^nG_{jk} d_1\}$$

$$\delta_3 = U^2 + [{}_1^3z_c + {}_1^3r\sin(2\pi s + {}_1^3\theta_i)]^2 +$$

$$2{}_2^nG_{jk} U + 2{}_2^n\tilde{J}_{jk}[{}_1^3z_c + {}_1^3r\sin(2\pi s + {}_1^3\theta_i)] + {}_2^nK_{jk}$$

When $m = 4$ and $n = 1$ or $n = 6$, $$\delta_1 = d_1^2$$

$$\delta_2 = 2\{d_1 y_0 + {}_2^nH_{jk} d_1\}$$

$$\delta_3 = [{}_1^4x_c + {}_1^4r\sin(2\pi s + {}_1^4\theta_i)]^2 + y_0^2 +$$

$$2{}_2^nG_{jk}[{}_1^4x_c + {}_1^4r\sin(2\pi s + {}_1^4\theta_i)] + 2{}_2^nH_{jk} y_0 + {}_2^nK_{jk}$$

When $m = 4$ and $n = 3$ or $n = 5$,

-continued $$\delta_1 = d_1^2$$

$$\delta_2 = 2\{d_1 y_0 + {}_2^n H_{jk} d_1\}$$

$$\delta_3 = [{}_1^4 z_c + {}_1^4 r\cos(2\pi s + {}_1^4 \theta_i)]^2 + y_0^2 +$$

$$2 {}_2^n \tilde{J}_{jk} [{}_1^4 z_c + {}_1^4 r\cos(2\pi s + {}_1^4 \theta_i)] + 2 {}_2^n H_{jk} y_0 + {}_2^n K_{jk}$$

When $m = 5$ and $n = 1$ or $n = 6$, $$\delta_1 = d_1^2$$

$$\delta_2 = 2\{d_1 x_0 + {}_2^n G_{jk} d_1\}$$

$$\delta_3 = x_0^2 + [{}_1^5 y_c + {}_1^5 r\cos(2\pi s + {}_1^5 \theta_i)]^2 +$$

$$2 {}_2^n G_{jk} x_0 + 2 {}_2^n H_{jk} [{}_1^5 y_c + {}_1^5 r\cos(2\pi s + {}_1^5 \theta_i)] + {}_2^n K_{jk}$$

When $m = 5$ and $n = 2$ or $n = 4$, $$\delta_1 = d_1^2$$

$$\delta_2 = 2\{d_1 x_0 + {}_2^n G_{jk} d_1\}$$

$$\delta_3 = x_0^2 + [{}_1^5 z_c + {}_1^5 r\sin(2\pi s + {}_1^5 \theta_i)]^2 +$$

$$2 {}_2^n G_{jk} x_0 + 2 {}_2^n \tilde{J}_{jk} [{}_1^5 z_c + {}_1^5 r\sin(2\pi s + {}_1^5 \theta_i)] + {}_2^n K_{jk}$$

When $m = 6$ and $n = 2$ or $n = 4$, $$\delta_1 = d_1^2$$

$$\delta_2 = -2\{d_1 W + {}_2^n \tilde{J}_{jk} d_1\}$$

$$\delta_3 = [{}_1^6 x_c + {}_1^6 r\cos(2\pi s + {}_1^6 \theta_i)]^2 + W^2 +$$

$$2 {}_2^n G_{jk} [{}_1^6 x_c + {}_1^6 r\cos(2\pi s + {}_1^6 \theta_i)] + 2 {}_2^n \tilde{J}_{jk} W + {}_2^n K_{jk}$$

When $m = 6$ and $n = 3$ or $n = 5$, $$\delta_1 = d_1^2$$

$$\delta_2 = -2\{d_1 W + {}_2^n \tilde{J}_{jk} d_1\}$$

$$\delta_3 = [{}_1^6 y_c + {}_1^6 r\sin(2\pi s + {}_1^6 \theta_i)]^2 + W^2 +$$

$$2 {}_2^n H_{jk} [{}_1^6 y_c + {}_1^6 r\sin(2\pi s + {}_1^6 \theta_i)] + 2 {}_2^n \tilde{J}_{jk} W + {}_2^n K_{jk}$$

Solving for t in equation (5.34) gives the values $t_1$ and $t_2$ for a specific value of s. The cylindrical surfaces ${}_1^m\gamma_{sk}(U_i, U_{i+1}, \hat{U}_i, \hat{U}_{i+1}; \psi_p)$ and ${}_2^n\gamma_{sk}(U_i, U_{i+1}, \hat{U}_i, \hat{U}_{i+1}; \psi_p)$ do not intersect at that value of the parameter s when $\delta_2^2 - 4\delta_1\delta_3 < 0$. Furthermore, there is only one root $t_1$ for that value of the parameter s when $\delta_2^2 - 4\delta_1\delta_3 = 0$. When $\delta_2^2 - 4\delta_1\delta_3 > 0$ the intersection points are $R_1 = (x_{gg1}, y_{gg1}, z_{gg1})$ and $R_2 = (x_{gg2}, y_{gg2}, z_{gg2})$. The implicit intersection points $R_1$ and $R_2$ are obtained by substituting $t_1$ and $t_2$ into the appropriate equation from equations (5.33a) through (5.33f), provided that $0 \leq t_1 \leq 1$ and $0 \leq t_2 \leq 1$. If $t_1$ and $t_2$ are outside their respective regions, then the roots are rejected, since such points will not lie between P and $\hat{P}$ on the generator line ${}_1^m\psi_t(P, \hat{P}; \psi_p)$.

The next step is to determine whether or not the points $R_t$, t=0, ... K−1 are on or the intersecting cylindrical surface ${}_2^n\gamma_{sk}(U_i, U_{i+1}, \hat{U}_i, \hat{U}_{i+1}; \psi_p)$.

Figure 68:
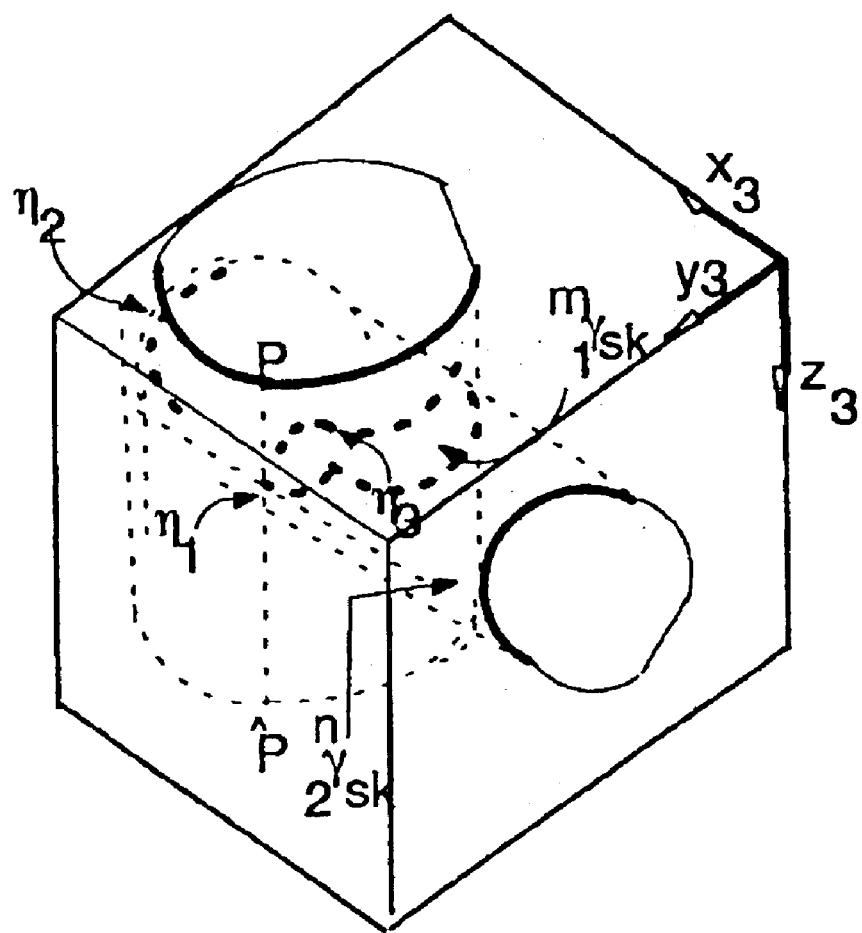
FIG. 68 shows the intersection of two cylindrical surfaces.

FIG. 68 shows the intersection of cylindrical surface ${}_1^m\gamma_{sk}(U_i, U_{i+1}, \hat{U}_i, \hat{U}_{i+1}; \psi_p)$ with cylindrical surface ${}_2^n\gamma_{sk}(U_i, U_{i+1}, \hat{U}_i, \hat{U}_{i+1}; \psi_p)$. The two surfaces share a full intersection curve $\eta_1$, which is a fourth order curve. The surface ${}_1^m\gamma_{sk}(U_i, U_{i+1}, \hat{U}_i, \hat{U}_{i+1}; \psi_p)$ is dissected into the patches ${}_1^m\chi_{sk,1}(U_i, U_{i+1}, R_{0,1}, R_{K-1,1}; \psi_p)$ and ${}_1^m\chi_{sk,2}(R_{0,1}, R_{K-1,1}, \hat{U}_i, \hat{U}_{i+1}; \psi_p)$. The cylindrical surface ${}_2^n\gamma_{sk}(U_i, U_{i+1}, \hat{U}_i, \hat{U}_{i+1}; \psi_p)$ is dissected into the patches ${}_2^n\chi_{sk,1}(U_i, U_{i+1}, R_{0,2}, R_{K-1,2}; \psi_p)$ and ${}_2^n\chi_{sk,2}(R_{0,2}, R_{K-1,2}, \hat{U}_i, \hat{U}_{i+1}; \psi_p)$. The patches ${}_1^m\chi_{sk,2}$ and ${}_2^n\chi_{sk,2}$ are removed since they are inside the cavity. The two intersecting cylindrical surfaces are then given by, respectively, $${}_1^m\gamma_{sk}(U_i, U_{i+1}, \hat{U}_i, \hat{U}_{i+1}; \psi_p) = {}_1^m\chi_{sk,1}(U_i, U_{i+1}, R_{0,1}, R_{K-1,1}; \psi_p) \quad (5.35a)$$

$${}_2^n\gamma_{sk}(U_i, U_{i+1}, \hat{U}_i, \hat{U}_{i+1}; \psi_p) = {}_2^n\chi_{sk,1}(U_i, U_{i+1}, R_{0,2}, R_{K-1,2}; \psi_p) \quad (5.35b)$$

A general expression for a cylindrical surface ${}_\nu^n\gamma_{sk}(U_i, U_{i+1}, \hat{U}_i, \hat{U}_{i+1}; \psi_p)$ that is dissected into the patches $\chi_{sk,i}(A'_{i-1}, A'_i, \hat{A}'_{i-1}, \hat{A}'_i; \psi_p)$, i=1, 2, ..., $N_{sg}$, is given by equation (5.23).

The combination $\Pi_6$ denotes the orthogonal intersections of the quadric surface ${}_1^m\gamma_{s5}$ with the quadric surface ${}_2^n\gamma_{s5}$. To determine whether or not these two surfaces intersect we use Sylvester's determinant Each of the orthogonal quadric surfaces is given by equation (5.13). Equation (5.13) is simplified for various cases and these simplifications are given by equations (5.14a) through (5.14c). Rearranging equations (5.14a) through (5.14c) and writing Sylvester's determinants for each case, we get:

For $m = 1$ or 6 and $n = 2$ or 4:

(5.36a)

$$|R_{12,x}|_6 =$$

$$\begin{vmatrix} {}_1^m A_j & 2{}_1^m D_j y + 2{}_1^m \tilde{G}_j & {}_1^m B_j y^2 + 2{}_1^m \tilde{H}_j y + {}_1^m \tilde{K}_j & 0 \\ 0 & {}_1^m A_j & 2{}_1^m D_j y + 2{}_1^m \tilde{G}_j & {}_1^m B_j y^2 + 2{}_1^m \tilde{H}_j y + {}_1^m \tilde{K}_j \\ {}_2^n A_j & {}_2^n F_j z + 2{}_2^n \tilde{G}_j & {}_2^n C_j z^2 + 2{}_2^n \tilde{J}_j z + {}_2^n \tilde{K}_j & 0 \\ 0 & {}_2^n A_j & {}_2^n F_j z + 2{}_2^n \tilde{G}_j & {}_2^n C_j z^2 + 2{}_2^n \tilde{J}_j z + {}_2^n \tilde{K}_j \end{vmatrix}$$

For $m = 1$ or 6 and $n = 3$ or 5:

(5.36b)

$$|R_{13,y}|_6 =$$

$$\begin{vmatrix} {}_1^m B_j & 2{}_1^m D_j x + 2{}_1^m \tilde{G}_j & {}_1^m A_j x^2 + 2{}_1^m \tilde{G}_j x + {}_1^m \tilde{K}_j & 0 \\ 0 & {}_1^m B_j & 2{}_1^m D_j x + 2{}_1^m \tilde{H}_j & {}_1^m A_j x^2 + 2{}_1^m \tilde{G}_j x + {}_1^m \tilde{K}_j \\ {}_2^n B_j & {}_2^n E_j + 2{}_2^n \tilde{H}_j & {}_2^n C_j z^2 + 2{}_2^n \tilde{J}_j z + {}_2^n \tilde{K}_j & 0 \\ 0 & {}_2^n B_j & {}_2^n E_j + 2{}_2^n \tilde{H}_j & {}_2^n C_j z^2 + 2{}_2^n \tilde{J}_j z + {}_2^n \tilde{K}_j \end{vmatrix}$$

For case of $m = 2$ or 4 and $n = 3$ or 5:

(5.36c)

$$|R_{23,z}|_6 =$$

$$\begin{vmatrix} {}_1^m C_j & 2{}_1^m F_j x + 2{}_1^m \tilde{J}_j & {}_1^m A_j x^2 + 2{}_1^m \tilde{G}_j x + {}_1^m \tilde{K}_j & 0 \\ 0 & {}_1^m C_j & 2{}_1^m F_j x + 2{}_1^m \tilde{J}_j & {}_1^m A_j x^2 + 2{}_1^m \tilde{G}_j x + {}_1^m \tilde{K}_j \\ {}_2^n C_j & {}_2^n E_j + 2{}_2^n \tilde{J}_j & {}_2^n B_j y^2 + 2{}_2^n \tilde{H}_j y + {}_2^n \tilde{K}_j & 0 \\ 0 & {}_2^n C_j & {}_2^n E_j + 2{}_2^n \tilde{J}_j & {}_2^n B_j y^2 + 2{}_2^n \tilde{H}_j y + {}_2^n \tilde{K}_j \end{vmatrix}$$

It is noted that $|R_{21,x}|_6 = |R_{12,x}|_6$, $|R_{31,y}|_6 = |R_{13,y}|_6$, $|R_{32,z}|_6 = |R_{23,z}|_6$, since the surfaces are cylindrical surfaces. It is also noted that $|R_{12,x}|_6 = |R_{64,x}|_6$, $|R_{13,y}|_6 = |R_{65,y}|_6$, $|R_{21,x}|_6 = |R_{46,x}|_6$, $|R_{23,z}|_6 = |R_{45,z}|_6$, $|R_{31,y}|_6 = |R_{66,y}|_6$ and $|R_{32,z}|_6 = |R_{64,z}|_6$. Each of these twelve has been denoted by $|R_{ij,\xi}|_6$, i=1,...,6, j=1,...6, $\xi$=x, y or z and i≠j. The coordinate $\xi$ is one of the three coordinates and the determinant $|R_{ij,\xi}|_6$ is a function of the remaining two coordinates. One of these two remaining coordinates indicates the depth of the quadric surface ${}_1^m\gamma_{s5}$ $(U_i, U_{i+1}, \hat{U}_i, \hat{U}_{i+1}; \psi_p)$ and the other represents the depth of the other quadric surface ${}_2^n\gamma_{s5}(U_i, U_{i+1}, \hat{U}_i, \hat{U}_{i+1}; \psi_p)$. Which coordinate goes with which surface depends on the values m and n.

The determinant $|R_{ij,\leq}|_6$ vanishes when the two polynomials for two surfaces have common roots, that is, when the quadric surface ${}_1^m\gamma_{s5}(U_i, U_{i+1}, \hat{U}_i, \hat{U}_{i+1}; \psi_p)$ intersects the other quadric surface ${}_2^n\gamma_{s5}(U_i, U_{i+1}, \hat{U}_i, \hat{U}_{i+1}; \psi_p)$. The determinant $|R_{ij,\leq}|_6$ is used to determine whether or not the two quadric surfaces intersect.

To determine the intersection points, the quadric surface ${}_1^m\gamma_{s5}(U_i, U_{i+1}, \hat{U}_i, \hat{U}_{i+1}; \psi_p)$ is represented in parametric space (s, t) such that the surface ${}_1^m\gamma_{s5}(U_i, U_{i+1}, \hat{U}_i, \hat{U}_{i+1}; \psi_p)$ is given by a generator line ${}_1^m\psi_5(P, \hat{P}; t)$ and the directric quadric curve by ${}_1^m\gamma_5(U_i, U_{i+1}; \psi_p)$ as shown in FIG. 66. The intersections of the generator line ${}_1^m\psi_5(P, \hat{P}; t)$ with the other quadric surface ${}_2^n\gamma_{s5}(U_i, U_{i+1}, \hat{U}_i, \hat{U}_{i+1}; \psi_p)$ are determined for $0 \leq s \leq 1$. An arbitrary point ${}_1^m\psi_p = ({}_1^m x_p, {}_1^m y_p, {}_1^m z_p)$ on the generator line is related to the points P and $\hat{P}$ by equation (5.1). The points P and $\hat{P}$ on each end of the generator line ${}_1^m\psi_5(P, \hat{P}; t)$ are given by equations (5.25) and (5.26), respectively.

The general quadric surface ${}_1^m\gamma_{s5}(U_i, U_{i+1}, \hat{U}_i, \hat{U}_{i+1}; \psi_p)$, $m = 1, \ldots, 6$ represents a surface whose directric curve ${}_1^m\gamma_5(U_i, U_{i+1}; \psi_p)$ exists on one of the six faces of $(FMEM)_1$. Substituting equations (5.25) and (5.26) into equation (5.1) and then simplifying the result for each of the six cases in the (x, y, z) coordinate system of $(FMEM)_3$, yields equations (5.27a) through (5.27f).

Substituting an appropriate set of equations from equations (5.27a) through (5.27f) into the correspondingly appropriate equation from equations (5.14a) through (5.14c) yields the following quadratic equation in t:

$$\delta_1 t^2 + \delta_2 t + \delta_3 = 0 \qquad (5.37)$$

When $m = 1$ and $n = 2$ or $n = 4$, $$\delta_1 = {}_n^2 C_j d_1^2$$

$$\delta_2 = 2_2^n F_j d_1 [\{\mu_0{}_1^1 x_i(1-s)^2 + 2\mu_1{}_1^1 x_{i+1} s(1-s) + \mu_2 x_{j,8} s^2\}/$$
$$\{\mu_0(1-s)^2 + 2\mu_1 s(1-s) + \mu_2 s^2\}] +$$
$$2_2^n C_j d_1 z_0 + 2_2^n \tilde{J}_j d_1$$

$$\delta_3 = {}_2^n A_j [\{\mu_0{}_1^1 x_i(1-s)^2 + 2\mu_1{}_1^1 x_{i+1} s(1-s) + \mu_2 x_{j,8} s^2\}/$$
$$\{\mu_0(1-s)^2 + 2\mu_1 s(1-s) + \mu_2 s^2\}]^2 + {}_2^n C_j z_0^2 +$$
$$2_2^n F_j z_0 [\{\mu_0{}_1^1 x_i(1-s)^2 + 2\mu_1{}_1^1 x_{i+1} s(1-s) + \mu_2 x_{j,8} s^2\}/$$
$$\{\mu_0(1-s)^2 + 2\mu_1 s(1-s) + \mu_2 s^2\}] +$$
$$2_2^n \tilde{G}_j [\{\mu_0{}_1^1 x_i(1-s)^2 + 2\mu_1{}_1^1 x_{i+1} s(1-s) + \mu_2 x_{j,8} s^2\}/$$
$$\{\mu_0(1-s)^2 + 2\mu_1 s(1-s) + \mu_2 s^2\}] + 2_2^n \tilde{J}_j z_0 + {}_2^n \tilde{K}_j$$

When $m = 1$ and $n = 3$ or $n = 5$, $$\delta_1 = {}_n^2 C_j d_1^2$$

$$\delta_2 = 2_2^n E_j d_1 [\{\mu_0{}_1^1 y_i(1-s)^2 + 2\mu_1{}_1^1 y_{i+1} s(1-s) + \mu_2 y_{j,8} s^2\}/$$
$$\{\mu_0(1-s)^2 + 2\mu_1 s(1-s) + \mu_2 s^2\}] + 2_2^n C_j d_1 z_0 + 2_2^n \tilde{J}_j d_1$$

$$\delta_3 = {}_2^n B_j [\{\mu_0{}_1^1 y_i(1-s)^2 + 2\mu_1{}_1^1 y_{i+1} s(1-s) + \mu_2 y_{j,8} s^2\}/$$
$$\{\mu_0(1-s)^2 + 2\mu_1 s(1-s) + \mu_2 s^2\}]^2 + {}_2^n C_j z_0^2 +$$
$$2_2^n E_j z_0 [\{\mu_0{}_1^1 y_i(1-s)^2 + 2\mu_1{}_1^1 y_{i+1} s(1-s) + \mu_2 y_{j,8} s^2\}/$$
$$\{\mu_0(1-s)^2 + 2\mu_1 s(1-s) + \mu_2 s^2\}] +$$
$$2_2^n \tilde{H}_j [\{\mu_0{}_1^1 y_i(1-s)^2 + 2\mu_1{}_1^1 y_{i+1} s(1-s) + \mu_2 y_{j,8} s^2\}/$$
$$\{\mu_0(1-s)^2 + 2\mu_1 s(1-s) + \mu_2 s^2\}] + 2_2^n \tilde{J}_j z_0 + {}_2^n \tilde{K}_j$$

-continued

When $m = 2$ and $n = 1$ or $n = 6$, $$\delta_1 = {}_n^2 B_j d_1^2$$

$$\delta_2 = -2_2^n D_j d_1 [\{\mu_0{}_1^2 x_i(1-s)^2 + 2\mu_1{}_1^2 x_{i+1} s(1-s) + \mu_2 x_{j,8} s^2\}/$$
$$\{\mu_0(1-s)^2 + 2\mu_1 s(1-s) + \mu_2 s^2\}] - 2_2^n B_j d_1 V - 2_2^n \tilde{H}_j d_1$$

$$\delta_3 = {}_2^n A_j [\{\mu_0{}_1^2 x_i(1-s)^2 + 2\mu_1{}_1^2 x_{i+1} s(1-s) + \mu_2 x_{j,8} s^2\}/$$
$$\{\mu_0(1-s)^2 + 2\mu_1 s(1-s) + \mu_2 s^2\}]^2 + {}_2^n B_j V^2 +$$
$$2_2^n D_j V [\{\mu_0{}_1^2 x_i(1-s)^2 + 2\mu_1{}_1^2 x_{i+1} s(1-s) + \mu_2 x_{j,8} s^2\}/$$
$$\{\mu_0(1-s)^2 + 2\mu_1 s(1-s) + \mu_2 s^2\}] +$$
$$2_2^n \tilde{G}_j [\{\mu_0{}_1^2 x_i(1-s)^2 + 2\mu_1{}_1^2 x_{i+1} s(1-s) + \mu_2 x_{j,8} s^2\}/$$
$$\{\mu_0(1-s)^2 + 2\mu_1 s(1-s) + \mu_2 s^2\}] + 2_2^n \tilde{H}_j V + {}_2^n \tilde{K}_j$$

When $m = 2$ and $n = 3$ or $n = 5$, $$\delta_1 = {}_n^2 B_j d_1^2$$

$$\delta_2 = -2_2^n E_j d_1 [\{\mu_0{}_1^2 z_i(1-s)^2 + 2\mu_1{}_1^2 z_{i+1} s(1-s) + \mu_2 z_{j,8} s^2\}/$$
$$\{\mu_0(1-s)^2 + 2\mu_1 s(1-s) + \mu_2 s^2\}] - 2_2^n B_j d_1 V - 2_2^n \tilde{H}_j d_1$$

$$\delta_3 = {}_2^n C_j [\{\mu_0{}_1^2 z_i(1-s)^2 + 2\mu_1{}_1^2 z_{i+1} s(1-s) + \mu_2 z_{j,8} s^2\}/$$
$$\{\mu_0(1-s)^2 + 2\mu_1 s(1-s) + \mu_2 s^2\}]^2 + {}_2^n B_j V^2 +$$
$$2_2^n E_j V [\{\mu_0{}_1^2 z_i(1-s)^2 + 2\mu_1{}_1^2 z_{i+1} s(1-s) + \mu_2 z_{j,8} s^2\}/$$
$$\{\mu_0(1-s)^2 + 2\mu_1 s(1-s) + \mu_2 s^2\}] +$$
$$2_2^n \tilde{J}_j [\{\mu_0{}_1^2 z_i(1-s)^2 + 2\mu_1{}_1^2 z_{i+1} s(1-s) + \mu_2 z_{j,8} s^2\}/$$
$$\{\mu_0(1-s)^2 + 2\mu_1 s(1-s) + \mu_2 s^2\}] + 2_2^n \tilde{H}_j V + {}_2^n \tilde{K}_j$$

When $m = 3$ and $n = 1$ or $n = 6$, $$\delta_1 = {}_n^2 A_j d_1^2$$

$$\delta_2 = -2_2^n D_j d_1 [\{\mu_0{}_1^3 y_i(1-s)^2 + 2\mu_1{}_1^3 y_{i+1} s(1-s) + \mu_2 y_{j,8} s^2\}/$$
$$\{\mu_0(1-s)^2 + 2\mu_1 s(1-s) + \mu_2 s^2\}] - 2_2^n A_j d_1 U - 2_2^n \tilde{G}_j d_1$$

$$\delta_3 = {}_2^n B_j [\{\mu_0{}_1^3 y_i(1-s)^2 + 2\mu_1{}_1^3 y_{i+1} s(1-s) + \mu_2 y_{j,8} s^2\}/$$
$$\{\mu_0(1-s)^2 + 2\mu_1 s(1-s) + \mu_2 s^2\}]^2 + {}_2^n A_j U^2 +$$
$$2_2^n D_j U [\{\mu_0{}_1^3 y_i(1-s)^2 + 2\mu_1{}_1^3 y_{i+1} s(1-s) + \mu_2 y_{j,8} s^2\}/$$
$$\{\mu_0(1-s)^2 + 2\mu_1 s(1-s) + \mu_2 s^2\}] +$$
$$2_2^n \tilde{H}_j [\{\mu_0{}_1^3 y_i(1-s)^2 + 2\mu_1{}_1^3 y_{i+1} s(1-s) + \mu_2 y_{j,8} s^2\}/$$
$$\{\mu_0(1-s)^2 + 2\mu_1 s(1-s) + \mu_2 s^2\}] + 2_2^n \tilde{G}_j U + {}_2^n \tilde{K}_j$$

When $m = 3$ and $n = 2$ or $n = 4$, $$\delta_1 = {}_n^2 A_j d_1^2$$

$$\delta_2 = -2_2^n F_j d_1 [\{\mu_0{}_1^3 z_i(1-s)^2 + 2\mu_1{}_1^3 z_{i+1} s(1-s) + \mu_2 z_{j,8} s^2\}/$$
$$\{\mu_0(1-s)^2 + 2\mu_1 s(1-s) + \mu_2 s^2\}] - 2_2^n A_j d_1 U - 2_2^n \tilde{G}_j d_1$$

$$\delta_3 = {}_2^n C_j [\{\mu_0{}_1^3 z_i(1-s)^2 + 2\mu_1{}_1^3 z_{i+1} s(1-s) + \mu_2 z_{j,8} s^2\}/$$
$$\{\mu_0(1-s)^2 + 2\mu_1 s(1-s) + \mu_2 s^2\}]^2 + {}_2^n A_j U^2 +$$
$$2_2^n F_j U [\{\mu_0{}_1^3 z_i(1-s)^2 + 2\mu_1{}_1^3 z_{i+1} s(1-s) + \mu_2 z_{j,8} s^2\}/$$
$$\{\mu_0(1-s)^2 + 2\mu_1 s(1-s) + \mu_2 s^2\}] +$$
$$2_2^n \tilde{J}_j [\{\mu_0{}_1^3 z_i(1-s)^2 + 2\mu_1{}_1^3 z_{i+1} s(1-s) + \mu_2 z_{j,8} s^2\}/$$
$$\{\mu_0(1-s)^2 + 2\mu_1 s(1-s) + \mu_2 s^2\}] + 2_2^n \tilde{G}_j U + {}_2^n \tilde{K}_j$$

-continued

When $m = 4$ and $n = 1$ or $n = 6$, $$\delta_1 = {}_2^n B_j d_1^2$$

$$\delta_2 = 2{}_2^n D_j d_1 \left[ \{\mu_0{}_1^4 x_i (1-s)^2 + 2\mu_1{}_1^4 x_{i+1} s(1-s) + \mu_2 x_{j,8} s^2 \} / \{\mu_0 (1-s)^2 + 2\mu_1 s(1-s) + \mu_2 s^2\} \right] + 2{}_2^n B_j d_1 y_0 + 2{}_2^n \tilde{H}_j d_1$$

$$\delta_3 = {}_2^n A_j \left[ \{\mu_0{}_1^4 x_i (1-s)^2 + 2\mu_1{}_1^4 x_{i+1} s(1-s) + \mu_2 x_{j,8} s^2 \} / \{\mu_0 (1-s)^2 + 2\mu_1 s(1-s) + \mu_2 s^2\} \right]^2 + {}_2^n B_j y_0^2 +$$

$$2{}_2^n D_j y_0 \left[ \{\mu_0{}_1^4 x_i (1-s)^2 + 2\mu_1{}_1^4 x_{i+1} s(1-s) + \mu_2 x_{j,8} s^2 \} / \{\mu_0 (1-s)^2 + 2\mu_1 s(1-s) + \mu_2 s^2\} \right] +$$

$$2{}_2^n \tilde{G}_j \left[ \{\mu_0{}_1^4 x_i (1-s)^2 + 2\mu_1{}_1^4 x_{i+1} s(1-s) + \mu_2 x_{j,8} s^2 \} / \{\mu_0 (1-s)^2 + 2\mu_1 s(1-s) + \mu_2 s^2\} \right] + 2{}_2^n \tilde{H}_j y_0 + {}_2^n \tilde{K}_j$$

When $m = 4$ and $n = 3$ or $n = 5$, $$\delta_1 = {}_2^n B_j d_1^2$$

$$\delta_2 = 2{}_2^n E_j d_1 \left[ \{\mu_0{}_1^4 z_i (1-s)^2 + 2\mu_1{}_1^4 z_{i+1} s(1-s) + \mu_2 z_{j,8} s^2 \} / \{\mu_0 (1-s)^2 + 2\mu_1 s(1-s) + \mu_2 s^2\} \right] + 2{}_2^n B_j d_1 y_0 + 2{}_2^n \tilde{H}_j d_1$$

$$\delta_3 = {}_2^n C_j \left[ \{\mu_0{}_1^4 z_i (1-s)^2 + 2\mu_1{}_1^4 z_{i+1} s(1-s) + \mu_2 z_{j,8} s^2 \} / \{\mu_0 (1-s)^2 + 2\mu_1 s(1-s) + \mu_2 s^2\} \right]^2 + {}_2^n B_j y_0^2 +$$

$$2{}_2^n E_j y_0 \left[ \{\mu_0{}_1^4 z_i (1-s)^2 + 2\mu_1{}_1^4 z_{i+1} s(1-s) + \mu_2 z_{j,8} s^2 \} / \{\mu_0 (1-s)^2 + 2\mu_1 s(1-s) + \mu_2 s^2\} \right] +$$

$$2{}_2^n \tilde{J}_j \left[ \{\mu_0{}_1^4 z_i (1-s)^2 + 2\mu_1{}_1^4 z_{i+1} s(1-s) + \mu_2 z_{j,8} s^2 \} / \{\mu_0 (1-s)^2 + 2\mu_1 s(1-s) + \mu_2 s^2\} \right] + 2{}_2^n \tilde{H}_j y_0 + {}_2^n \tilde{K}_j$$

When $m = 5$ and $n = 1$ or $n = 6$, $$\delta_1 = {}_n^2 A_j d_1^2$$

$$\delta_2 = 2{}_2^n D_j d_1 \left[ \{\mu_0{}_1^5 y_i (1-s)^2 + 2\mu_1{}_1^5 y_{i+1} s(1-s) + \mu_2 y_{j,8} s^2 \} / \{\mu_0 (1-s)^2 + 2\mu_1 s(1-s) + \mu_2 s^2\} \right] + 2{}_2^n A_j d_1 x_0 + 2{}_2^n \tilde{G}_j d_1$$

$$\delta_3 = {}_2^n B_j \left[ \{\mu_0{}_1^5 y_i (1-s)^2 + 2\mu_1{}_1^5 y_{i+1} s(1-s) + \mu_2 y_{j,8} s^2 \} / \{\mu_0 (1-s)^2 + 2\mu_1 s(1-s) + \mu_2 s^2\} \right]^2 + {}_2^n A_j x_0^2 +$$

$$2{}_2^n D_j x_0 \left[ \{\mu_0{}_1^5 y_i (1-s)^2 + 2\mu_1{}_1^5 y_{i+1} s(1-s) + \mu_2 y_{j,8} s^2 \} / \{\mu_0 (1-s)^2 + 2\mu_1 s(1-s) + \mu_2 s^2\} \right] +$$

$$2{}_2^n \tilde{H}_j \left[ \{\mu_0{}_1^5 y_i (1-s)^2 + 2\mu_1{}_1^5 y_{i+1} s(1-s) + \mu_2 y_{j,8} s^2 \} / \{\mu_0 (1-s)^2 + 2\mu_1 s(1-s) + \mu_2 s^2\} \right] + 2{}_2^n \tilde{G}_j x_0 + {}_2^n \tilde{K}_j$$

When $m = 5$ and $n = 2$ or $n = 4$, $$\delta_1 = {}_n^2 A_j d_1^2$$

$$\delta_2 = 2{}_2^n F_j d_1 \left[ \{\mu_0{}_1^5 z_i (1-s)^2 + 2\mu_1{}_1^5 z_{i+1} s(1-s) + \mu_2 z_{j,8} s^2 \} / \{\mu_0 (1-s)^2 + 2\mu_1 s(1-s) + \mu_2 s^2\} \right] + 2{}_2^n A_j d_1 x_0 + 2{}_2^n \tilde{G}_j d_1$$

$$\delta_3 = {}_2^n C_j \left[ \{\mu_0{}_1^5 z_i (1-s)^2 + 2\mu_1{}_1^5 z_{i+1} s(1-s) + \mu_2 z_{j,8} s^2 \} / \{\mu_0 (1-s)^2 + 2\mu_1 s(1-s) + \mu_2 s^2\} \right]^2 + {}_2^n A_j x_0^2 +$$

$$2{}_2^n F_j x_0 \left[ \{\mu_0{}_1^5 z_i (1-s)^2 + 2\mu_1{}_1^5 z_{i+1} s(1-s) + \mu_2 z_{j,8} s^2 \} / \{\mu_0 (1-s)^2 + 2\mu_1 s(1-s) + \mu_2 s^2\} \right] +$$

$$2{}_2^n \tilde{J}_j \left[ \{\mu_0{}_1^5 z_i (1-s)^2 + 2\mu_1{}_1^5 z_{i+1} s(1-s) + \mu_2 z_{j,8} s^2 \} / \{\mu_0 (1-s)^2 + 2\mu_1 s(1-s) + \mu_2 s^2\} \right] + 2{}_2^n \tilde{G}_j x_0 + {}_2^n \tilde{K}_j$$

-continued

When $m = 6$ and $n = 2$ or $n = 4$, $$\delta_1 = {}_n^2 C_j d_1^2$$

$$\delta_2 = -2{}_2^n F_j d_1 \left[ \{\mu_0{}_1^6 x_i (1-s)^2 + 2\mu_1{}_1^6 x_{i+1} s(1-s) + \mu_2 x_{j,8} s^2 \} / \{\mu_0 (1-s)^2 + 2\mu_1 s(1-s) + \mu_2 s^2\} \right] - 2{}_2^n C_j d_1 W - 2{}_2^n \tilde{J}_j d_1$$

$$\delta_3 = {}_2^n A_j \left[ \{\mu_0{}_1^6 x_i (1-s)^2 + 2\mu_1{}_1^6 x_{i+1} s(1-s) + \mu_2 x_{j,8} s^2 \} / \{\mu_0 (1-s)^2 + 2\mu_1 s(1-s) + \mu_2 s^2\} \right]^2 + {}_2^n C_j W^2 +$$

$$2{}_2^n F_j W \left[ \{\mu_0{}_1^6 x_i (1-s)^2 + 2\mu_1{}_1^6 x_{i+1} s(1-s) + \mu_2 x_{j,8} s^2 \} / \{\mu_0 (1-s)^2 + 2\mu_1 s(1-s) + \mu_2 s^2\} \right] +$$

$$2{}_2^n \tilde{G}_j \left[ \{\mu_0{}_1^6 x_i (1-s)^2 + 2\mu_1{}_1^6 x_{i+1} s(1-s) + \mu_2 x_{j,8} s^2 \} / \{\mu_0 (1-s)^2 + 2\mu_1 s(1-s) + \mu_2 s^2\} \right] + 2{}_2^n \tilde{J}_j W + {}_2^n \tilde{K}_j$$

When $m = 6$ and $n = 3$ or $n = 5$, $$\delta_1 = {}_n^2 C_j d_1^2$$

$$\delta_2 = -2{}_2^n E_j d_1 \left[ \{\mu_0{}_1^6 y_i (1-s)^2 + 2\mu_1{}_1^6 y_{i+1} s(1-s) + \mu_2 y_{j,8} s^2 \} / \{\mu_0 (1-s)^2 + 2\mu_1 s(1-s) + \mu_2 s^2\} \right] - 2{}_2^n C_j d_1 W - 2{}_2^n \tilde{J}_j d_1$$

$$\delta_3 = {}_2^n B_j \left[ \{\mu_0{}_1^6 y_i (1-s)^2 + 2\mu_1{}_1^6 y_{i+1} s(1-s) + \mu_2 y_{j,8} s^2 \} / \{\mu_0 (1-s)^2 + 2\mu_1 s(1-s) + \mu_2 s^2\} \right]^2 + {}_2^n C_j W^2 +$$

$$2{}_2^n E_j W \left[ \{\mu_0{}_1^6 y_i (1-s)^2 + 2\mu_1{}_1^6 y_{i+1} s(1-s) + \mu_2 y_{j,8} s^2 \} / \{\mu_0 (1-s)^2 + 2\mu_1 s(1-s) + \mu_2 s^2\} \right] +$$

$$2{}_2^n \tilde{H}_j \left[ \{\mu_0{}_1^6 y_i (1-s)^2 + 2\mu_1{}_1^6 y_{i+1} s(1-s) + \mu_2 y_{j,8} s^2 \} / \{\mu_0 (1-s)^2 + 2\mu_1 s(1-s) + \mu_2 s^2\} \right] + 2{}_2^n \tilde{J}_j W + {}_2^n \tilde{K}_j$$

where, $(x_0, y_0, z_0,)$ are the coordinates of the origin of the local $(x, y, z)$ system of $(FMEM)_3$ in the global coordinate system $(X, Y, Z)$, and $U=U_3+x_0$, $V=V_3+y_0$ and $W=W_3+z_0$. The dimensions $U_3$, $V_3$, and $W_3$ are the size of $(FMEM)_3$ in the X, Y and Z directions, respectively. The coordinates $({}_1^m x_i, {}_1^m y_i, {}_1^m z_i)$ and $({}_1^m x_{i+1}, {}_1^m y_{i+1}, {}_1^m z_{i+1})$ represent the end points ${}_1^m U_i$ and ${}_1^m U_{i+1}$ of the quadric curve ${}_1^m \gamma_{s5}(U_i, U_{i+1}; P)$, respectively, in the $(x, y, z)$ coordinate system, and $d_1$ is the depth of the profile shell ${}_1^m S_\alpha(\psi_p)$.

Solving for t in equation (5.37) gives the values $t_1$ and $t_2$ for a specific value of s. The quadric surfaces ${}_1^m \gamma_{s5}(U_i, U_{i+1}, \hat{U}_i, \hat{U}_{i+1}; \psi_p)$ and ${}_2^n \gamma_{s5}(U_i, U_{i+1}, \hat{U}_i, \hat{U}_{i+1}; \psi_p)$ do not intersect at that value of parameter s when $\delta_2^2 - 4\delta_1 \delta_3 < 0$. Furthermore, there is only one root $t_1$ for that value of the parameter s when $\delta_2^2 - 4\delta_1 \delta_3 = 0$. When $\delta_2^2 - 4\delta_1 \delta_3 > 0$ the intersection points are $R_1 = (x_{qq1}, y_{qq1}, z_{qq1})$ and $R_2 = (x_{qq2}, y_{qq2}, z_{qq2})$. The implicit intersection points $R_1$ and $R_2$ are obtained by substituting $t_1$ and $t_2$ into the appropriate equation from equations (5.27a) through (5.27f), provided that $0 \leq t_1 \leq 1$ and $0 \leq t_2 < 1$. If $t_1$ and $t_2$ are outside their respective regions, then the roots are rejected, since such points will not lie between P and $\hat{P}$ on the generator line ${}_1^m \psi_i(P, \hat{P}; \psi_p)$.

The next step is to determine whether or not the points $R_i$, $i=0, \ldots, K-1$ are on the intersecting quadric surface ${}_2^n \gamma_{s5}(U_i, U_{i+1}, \hat{U}_i, \hat{U}_{i+1}; \psi_p)$.

Figure 69:
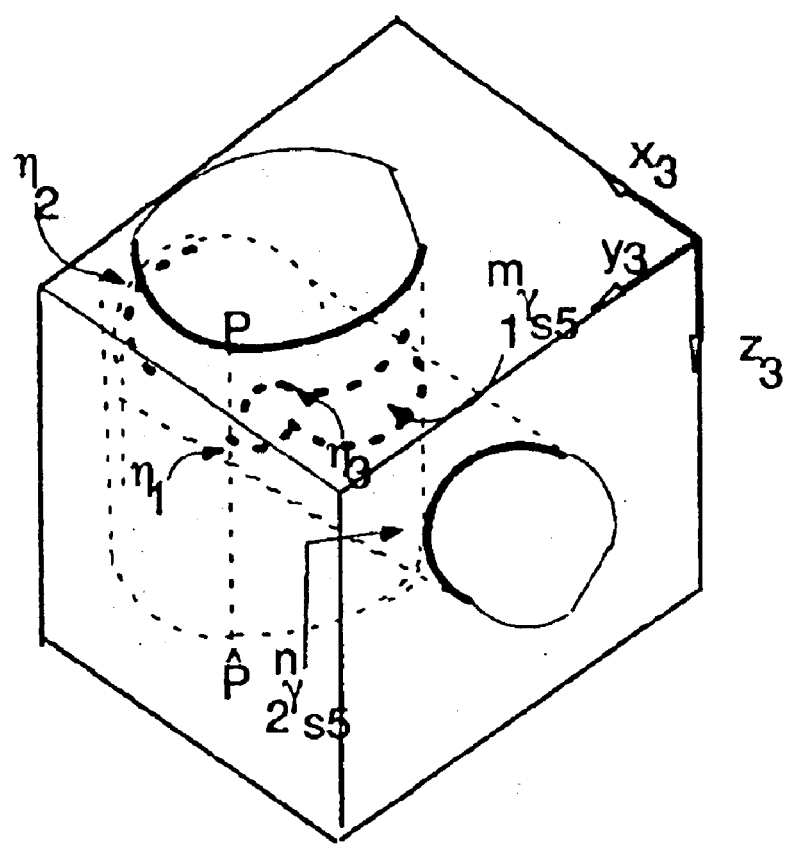
FIG. 69 shows the intersection of two quadric surfaces.

FIG. 69, shows the intersection of two quadric surfaces ${}_1^m \gamma_{s5}(U_i, U_{i+1}, \hat{U}_i, \hat{U}_{i+1}; \psi_p)$ and ${}_2^n \gamma_{s5}(U_i, U_{i+1}, \hat{U}_i, \hat{U}_{i+1}; \psi_p)$. The two surfaces share a full intersection curve $\eta_1$, which is a fourth order curve. The surface ${}_1^m \gamma_{s5}(U_i, U_{i+1}, \hat{U}_i, \hat{U}_{i+1}; \psi_p)$ is dissected into the patches ${}_1^m \chi_{s5,1}(U_i, U_{i+1}, R_{0,1}, R_{K-1,1}; \psi_p)$ and ${}_1^m \chi_{s5,2}(R_{0,1}, R_{K-1,1}; \hat{U}_i, \hat{U}_{i+1}; \psi_p)$. The quadric surface ${}_2^n \gamma_{s5}(U_i, U_{i+1}, \hat{U}_i, \hat{U}_{i+1}; \psi_p)$ is dissected into the patches ${}_2^n \chi_{s5,1}(U_i, U_{i+1}, R_{0,2}, R_{K-1,2}; \psi_p)$ and ${}_2^n \chi_{s5,2}$ ($R_{0,2}$, $R_{K-1,2}$; $\hat{U}_i$, $\hat{U}_{i+1}$; $\psi_p$). The patches $_1{}^m\chi_{s5,2}$ and $_1{}^m\chi_{s5,2}$ are removed since they are inside the cavity. The two intersecting quadric surfaces are then given by, respectively, $$_1{}^m\gamma_{s5}(U_i, U_{i+1}, \hat{U}_i, \hat{U}_{i+1}; \psi_p) = _1{}^m\chi_{s5,1}(U_i, U_{i+1}, R_{0,1}, R_{K-1,1}; \psi_p) \quad (5.38a)$$

$$_2{}^n\gamma_{s5}(U_i, U_{i+1}, \hat{U}_i, \hat{U}_{i+1}; \psi_p) = _2{}^n\chi_{s5,2}(R_{0,2}, R_{K-1,2}, \hat{U}_i, \hat{U}_{i+1}; \psi_p) \quad (5.38b)$$

A general expression for a quadric surface $_2{}^n\gamma_{s5}(U_i, U_{i+1}, \hat{U}_i, \hat{U}_{i+1}; \psi_p)$ that is dissected into the patches $\chi_{s5,i}(A'_{i-1}, A'_i, \hat{A}'_{i-1}, \hat{A}'_i; \psi_p)$ i=1,2, ..., $N_{sq}$ is given by equation (5.18).

There are three situations that have to be considered, either: (a) the orthogonal containers of profile shells $F_{s\alpha}$ and $F_{s\beta}$ do not intersect with each other (denoted $\Omega_{s1}$); (b) the containers $F_{s\alpha}$ and $F_{s\beta}$ intersect but the profile shells $_\alpha{}^mS_o(\psi_p)$ and $_\beta{}^mS_o(\psi_p)$ do not intersect (denoted $\Omega_{s2}$); or (c) the containers $F_{s\alpha}$ and $F_{s\beta}$ intersect and the profile shells $_\alpha{}^mS_o(\psi_p)$ and $_\beta{}^mS_o(\psi_p)$ intersect (denoted $\Omega_{s3}$). The resulting profiles of case (a) are then given by equation (3.18). This case will not be discussed further. When two containers $F_{s\alpha}$ and $F_{s\beta}$ intersect each other in a common volume $F_{s\alpha\beta}$ they are surrounded by another container $F_{s\omega}$ such that the two shells $_\alpha{}^mS_o(\psi_p)$ and $_\beta{}^nS_o(\psi_p)$ are included in the new container $F_{s\omega}$. The new container $F_{s\omega}$ forms a new entity (FMEM)$_\omega$. The resulting profiles for cases (b) and (c) are now discussed.

Consider the case when the two shells $_\alpha{}^mS_o(\psi_p)$ and $_\beta{}^nS_o(\psi_p)$, $\sigma$=I or C, do not intersect in $F_{s\omega}$. In the most general case, the profile of the newly formed profile $_{\Omega_{s2}}{}^{mn}S_{sF}(\psi_p)$, is given by $$_{\Omega_{s2}}^{mn}S_{sF}(\psi_p) = {}_\alpha^m S_{sI}(\psi_p) + {}_\alpha^m S_{sC}(\psi_p) + {}_\beta^n S_{sI}(\psi_p) + {}_\beta^n S_{sC}(\psi_p) \quad (5.39)$$

$m = 1, ..., 6$ $n = 1, ..., 6$ $n \ne m$ where the shells $_\alpha{}^mS_{s1}(\psi_p)$ and $_\alpha{}^mS_{sC}(\psi_p)$ represent an island and its surrounding cavity, respectively, of (FMEM)$_\alpha$ and the shells $_\alpha{}^mS_{s1}(\psi_p)$ and $_\beta{}^mS_{sC}(\psi_p)$ represent an island and its surrounding cavity, respectively, of (FMEM)$_\beta$. Each of these profile shells is given by the appropriate implementation of equation (3.18). The subscript F denotes that the resulting profile defines a profile, and $\Omega_{s2}$ indicates that none of the surfaces in $F_{s\omega}$ intersects.

There are three cases of intersections of two orthogonal cavities. The first case is when a cavity $_\alpha{}^mS_{sC}(\psi_p)$ intersects another cavity $_\beta{}^mS_{sC}(\psi_p)$. The second case is when a cavity $_\alpha{}^mS_{sC}(\psi_p)$ intersects an island $_\beta{}^mS_{s1}(\psi_p)$. The case of an island $_\alpha{}^mS_{s1}(\psi_p)$ intersecting another island $_\beta{}^mS_{s1}(\psi_p)$ is not physically realizable. Mathematically, the case of an island $_\alpha{}^mS_{s1}(\psi_p)$ intersecting a cavity $_\beta{}^mS_{sC}(\psi_p)$ and the case of a cavity $_\alpha{}^mS_{sC}(\psi_p)$ intersecting an island $_\beta{}^mS_{s1}(\psi_p)$ are the same. However, an island does not exist without a surrounding cavity; therefore, the intersection of an island with another cavity cannot be described without also considering the intersection of its surrounding cavity. Consequently, there are a total of three combinations of intersections possible. These are described below.

Figure 70:
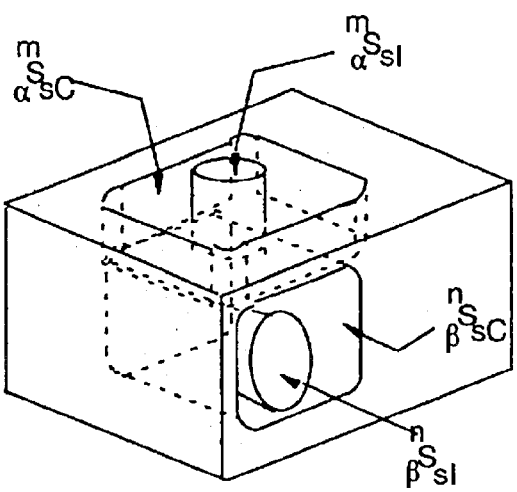
FIG. 70 shows two cavity surfaces intersect each other but not the island shells.

Referring to FIG. 70, the first combination of intersections is when a cavity $_\alpha{}^mS_{sC}(\psi_p)$ intersects cavity $_\beta{}^mS_{s1}(\psi_p)$. The two intersecting cavity surfaces form a new cavity $_\omega{}^{mn}S_{sCC}(\psi_p)$. The two island shells $_\alpha{}^mS_{s1}(\psi_p)$ and $_\beta{}^mS_{s1}(\psi_p)$ remain intact and are given in their general form by equation (3.18). The resulting profile $_{\Omega_{s3}}{}^{mn}S_{sF}(\Omega_p)$ is $$_{\Omega_{s3}}{}^{mn}S_{sF}(\Omega_p) = {}_\omega^{mn}S_{sCC}(\psi_p) + {}_\alpha^m S_{s1}(\psi_p) + {}_\beta^n S_{s1}(\psi_p) \quad (5.40)$$

Figure 71:
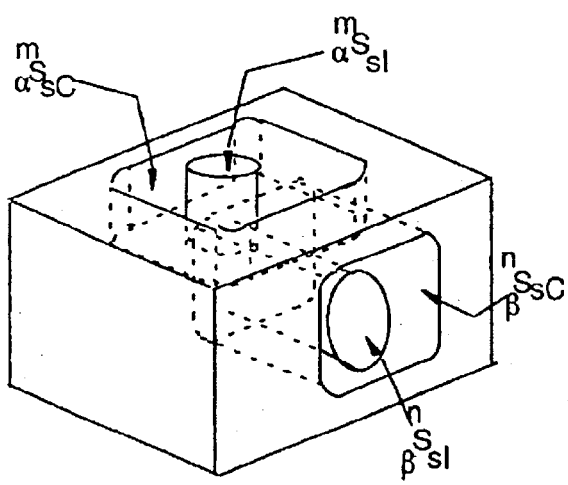
FIG. 71 shows two cavity shells intersect each other and with one island shell.

Referring to FIG. 71, the second combination of intersections is when a cavity $_\beta{}^nS_{sC}(\psi_p)$ intersects the cavity $_\alpha{}^mS_{sC}(\psi_p)$ as well as the island $_\alpha{}^mS_{s1}(\psi_p)$. The two intersecting cavities again form a new cavity $_\omega{}^{mn}S_{sCC}(\psi_p)$ and the modification to the island shell $_\alpha{}^mS_{s1}(\psi_p)$ is denoted $_\alpha{}^m\tilde{S}_{s1}(\psi_p)$. The island shell $_\beta{}^nS_{s1}(\psi_p)$ is not affected. The resultant profile $_{\Omega_{s3}}{}^{mn}S_{sF}(\psi_p)$ is then $$_{\Omega_{s3}}{}^{mn}S_{sF}(\psi_p) = {}_\omega^{mn}S_{sCC}(\psi_p) + {}_\alpha^m \tilde{S}_{s1}(\psi_p) + {}_\beta^n S_{s1}(\psi_p) \quad (5.40)$$

When the cavity $_\beta{}^nS_{sC}(\psi_p)$ eliminates the island $_\alpha{}^mS_{s1}(\psi_p)$. In that case, equation (5.41) is reduced to $$_{\Omega_{s3}}{}^{mn}S_{sF}(\psi_p) = {}_\omega^{mn}S_{sCC}(\psi_p) + {}_\beta^n S_{s1}(\psi_p) \quad (5.42)$$

Figure 72:
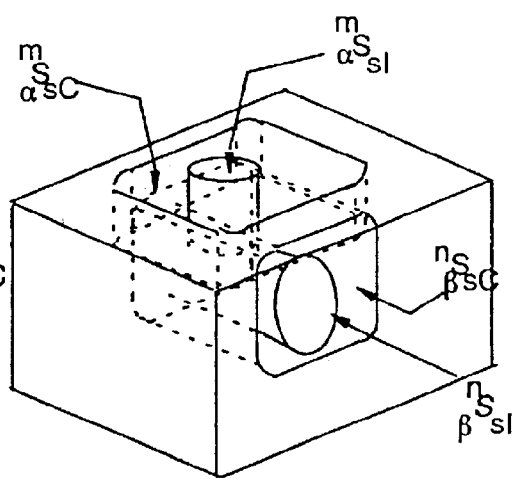
FIG. 72 shows two cavity shells intersect each other and with both islands.

As shown in FIG. 72, the last combination modifies the two cavities $_\alpha{}^mS_{sC}(\psi_p)$ and $_\beta{}^nS_{sC}(\psi_p)$ to form a new cavity $_\omega{}^{mn}S_{sCC}(\psi_p)$. The two islands $_\alpha{}^mS_{s1}(\psi_p)$ and $_\beta{}^nS_{s1}(\psi_p)$ are modified to a $_\alpha{}^m\tilde{S}_{sC}(\psi_p)$ and $_\beta{}^n\tilde{S}_{s1}(\psi_p)$, respectively. The resultant profile $_{\Omega_{s3}}{}^{mn}S_{sF}(\psi_p)$ is then $$_{\Omega_{s3}}{}^{mn}S_{sF}(\psi_p) = {}_\omega^{mn}S_{sCC}(\psi_p) + {}_\alpha^m \tilde{S}_{s1}(\psi_p) + {}_\beta^n \tilde{S}_{s1}(\psi_p) \quad (5.43)$$

The modified island shells $_\alpha{}^m\tilde{S}_{sC}(\psi_p)$ and $_\alpha{}^n\tilde{S}_{s1}(\psi_p)$ are determined in the manner discussed above.

In order to determine the resulting shape of the cavities after the orthogonal intersection of two cavities, it is first necessary to form a maximum rectangular prismatic volume, called the greatest volume (GV). This volume contains maximum of three pairs of orthogonally oriented cavities (FMEMs) that are either intersecting or not intersecting. The algorithm for the determination of the orthogonally intersecting cavities determines the resulting intersection curves from the intersection of pairs of orthogonally positioned cavities. However, the algorithm does not evaluate the intersection of any three orthogonally intersecting cavities. The extension of the algorithm to determine the intersection of three orthogonally intersecting cavities is left for future work. In this section we illustrate how the greatest volumes can be used to determine the orthogonal intersections of FIEMs.

Figure 73:
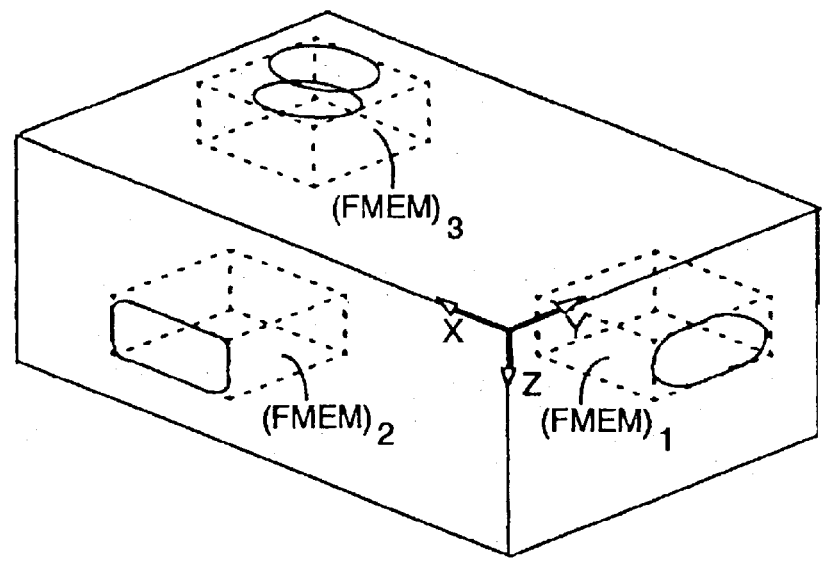
FIG. 73 shows an example of a greatest volume that coincide with the part boundaries.
Figure 74:
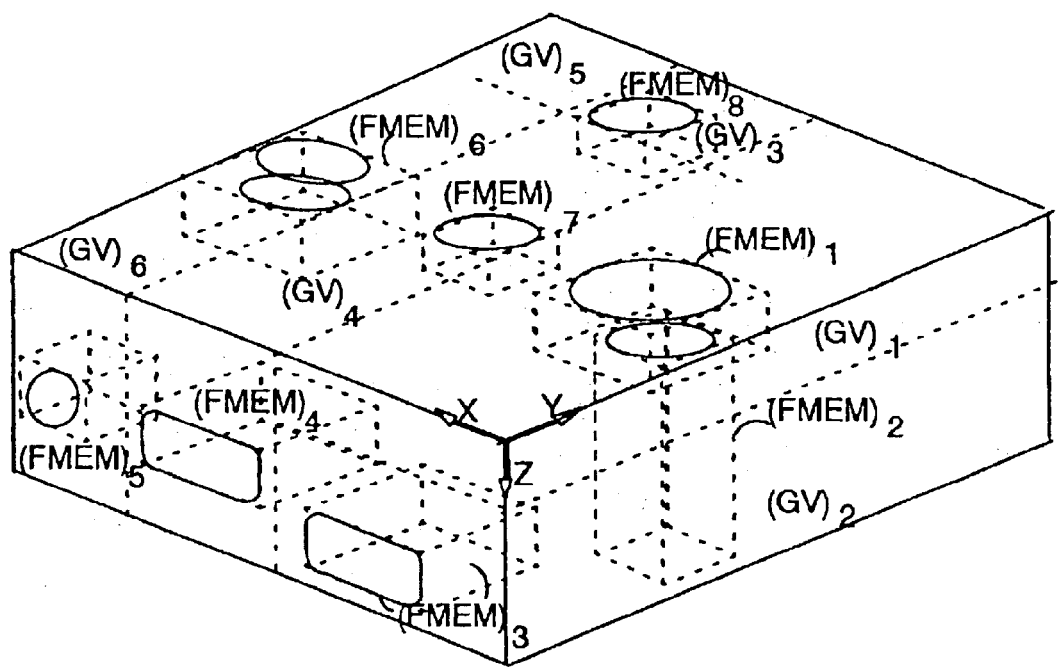
FIG. 74 shows an example of six greatest volumes in a part.

FIGS. 73 shows examples of the greatest volumes containing several orthogonally positioned FMEMs. FIG. 73 shows three FMEMs on three orthogonal faces of a part. The cavity (FMEM)$_3$ is orthogonal to the XY-plane, and is assumed to be resulted from a 2D intersection of two FMEMs on this plane. For this case, some of the boundaries of the greatest volume that contains the three FMEMs coincide with the boundaries of the part. The part is comprised of only one greatest volume, which in turn contains three pairs of orthogonal FMEMs, each of which resides on a different face of the GV. FIG. 74 shows eight FMEMs, (FMEM)$_1$, . . . , (FMEM)$_8$ on a part. There are six greatest volumes (GV)$_1$, . . . , (GV)$_6$ for this case, such that only one FMEM resides on each face of a greatest volume. The volume (FMEM)$_6$ is comprised of multiple profiles that resulted from their 2D intersections on a plane. However, (FMEM)$_6$ is considered a single FMEM for determination of greatest volume (GV)$_6$. The volume (FMEM)$_2$ exists on a plane Z=$d_1$, where $d_1$ is the depth of (FMEM)$_1$. Volumes (GV)$_4$ and (GV)$_6$ contain a pair of orthogonal FMEMs, whereas (GV)$_3$ contains only (FMEM)$_8$ and (GV)$_5$ contains no FMEM.

Once determined, the greatest volumes are used in the algothirmn of orthogonal intersection of FMEMs. A part is considered as a collection of the greatest volumes. Each greatest volume may contain only one FMEM on each of its six faces. This FMEM may intersect other FMEMs on two orthogonal faces of the greatest volume. The intersection of each pair of orthogonal FMEMs within each greatest volume is determined. The pseudo code for determining such intersections in a greatest volume is described in the following section.

The pseudo code for determining the orthogonal intersections of pairs of orthogonal profile shells on $N_{GV}$ greatest volumes (GVs) is presented. The algorithm takes a greatest volume from a total number of $N_{GV}$ greatest volumes and determines the number of FMEMs it contains. If a greatest volume contains one or no FMEM, the algorithm looks at the next greatest volume until it finds a greatest volume that contains more than one FMEM It then proceeds to determine the planes on which two of the FMEMs exist. The pair (FMEM)$_\alpha$ and (FMEM)$_\beta$ are further processed only if they are orthogonal to each other.

The orthogonal intersections of the profile shells $_\alpha^m S_o(\psi_p)$, $\alpha=1, \ldots N_V$ on a plane m with profile shell $_\beta^n S_o(\psi_p)$, $\beta=\alpha+1, \ldots N_V$ on an orthogonal plane n are then determined. Each of the $N_V$ profile shells is enclosed by their respective containers. The first part of the algorithm takes a container from the total number of $N_c$ containers on a plane m and determines if it intersects a container $F_{s\beta}$ from the remaining containers on an orthogonal plane n. Each container $F_{s\alpha}$ is checked to determine whether or not it intersects another container $F_{s\beta}$. The logicals $O_\alpha$ and $I_\alpha$ indicate the status of $F_{s\alpha}$; the former indicates whether or not the containers intersect and the latter indicates whether or not the profile shell $_\alpha^m S_o(\psi_p)$ orthogonally intersect shell $_\beta^n S_o(\psi_p)$.

If two containers are not intersecting, that is, they have an $\Omega_{s1}$ relationship, then the algorithm takes another container from the $N_V$ containers and determines if it intersects $F_{s\alpha}$. If none of the containers from the $N_V$ containers intersects the container $F_{s\alpha}$, it remains an independent FMEM, and the logicals $I_\alpha$ and $O_\alpha$ are set to false. However, if an intersected container $F_{s\beta}$ is found, then the logical $O_\alpha$ is set to true and the two intersecting containers are enclosed by another container $F_{s\omega}$, $\omega>N_V$. Then a common volume $F_{s\alpha\beta}$ is determined within $F_{s\omega}$. The surfaces of the two profile shells $_\alpha^m S_o(\psi_p)$ and $_\beta^n S_o(\psi_p)$ are examined to determine whether or not they lie within $F_{s\alpha\beta}$. If none of the surfaces lie within $F_{s\alpha\beta}$, that is, they have an $\Omega_{s2}$ relationship, then the resultant profile is given by $_{\Omega_{s2}}^{mn} S_{sF}(\psi_p)$ [recall equation (5.39)]. If they do intersect, that is, they have an $\Omega_{s3}$ relationship, then the algorithm sets the logical $I_\alpha$ to true and proceeds to determine the intersection curves of the two profile shells within $F_{s\alpha\beta}$.

Assume that it has been determined that $n_1$ surfaces of the shell $_\alpha^m S_o(\psi_p)$ and $n_2$ surfaces of shell $_\beta^n S_o(\psi_p)$ are within the common volume $F_{s\alpha\beta}$. Then, only these surfaces are considered. The algorithm determines the combination type $\Pi k, k=1, \ldots, 6$, for the pair of intersecting surfaces $_\alpha^m \gamma_n(U_i, U_{i+1}, \hat{U}_i, \hat{U}_{i+1}; \psi_p)$ and $_\beta^n \gamma_n(U_i, U_{i+1}, \hat{U}_i, \hat{U}_{i+1}; \psi_p)$. For combinations $\Pi_4, \Pi_5$ and $\Pi_6$ the algorithm uses the Sylyester's method to determine whether or not the surfaces intersect. If they intersect the roots of (s, t) are found for combinations $\Pi_4, \Pi_5$, and $\Pi_6$ by solving equations (5.28), (5.34) and (5.37), respectively. For combinations $\Pi_1, \Pi_2$ and $\Pi_3$ the roots are found by solving the equations (5.6), (5.15) and (5.15), respectively. A parametric root that does not lie within the range $0 \leq t \leq 0$ is rejected. The remaining roots are then converted into implicit intersection points $R_i$, $i-1, \ldots, x$ by solving either equation (5.5) for combination $\Pi_1, \Pi_2$ and $\Pi_3$, equation (5.27) for $\Pi_4$ and $\Pi_6$ or equation (5.33) for $\Pi_5$. The algorithm then calculates the parameter $t_\beta$ by solving equation (5.7) for each intersection point $R_t$ on the surface $_\beta^m \gamma_{si}$. A point that does not satisfy $0 \leq t_\beta \leq 1$ is rejected. For the remaining points the parameter $s_\beta$ is calculated using either equation (5.8) or (5.16) for a plane or a quadric surface, respectively. The intersection point $R_t$ is accepted only if $0 \leq s_\beta \leq 1$. When $_\beta^m \gamma_{si}$ is a cylindrical surface a parameter $\theta$ is calculated using equation (5.21). The value of $\theta$ is then compared with the previously calculated values of $\theta_i$ and $\theta_{i+1}$. The intersection point is only accepted if $0_i \leq 0 \leq 0_{i+1}$. The remaining intersection points for each pair of surfaces $_\alpha^m \gamma_{si}$ and $_\beta^m \gamma_{si}$ are then represented by an intersection curve $\eta_1$. The intersection curves are stored for later processing.

The second part of the algorithm processes each $F_{s\alpha}$, $\alpha=1, \ldots, N_V$, and determines whether or not the shell within $F_{s\alpha}$ has intersected other shells. If the logical $I_\alpha$ is false, the algorithm takes the next container; otherwise it orders the intersection curves on each shell and determines the patches that are to be removed and the ones that are to remain for each surface. The patches of each surface that remain are collected to define the profiles $_\alpha^m \tilde{S}_{s1}(\psi_p)$ and $_\alpha^m \tilde{S}_{sC}(\psi_p)$. Once all containers $F_{s\alpha}$ are examined the resulting profiles $_{\Omega_{s3}}^{mn} S_{sF}(\psi_p)$ are determined using either equation (5.40), (5.41), (5.42) or (5.43). The process is repeated for each greatest volume that has been formed.

The objective of the algorithm described below is to determine the minimum number of GVs for a given part. The goal is to divide the part into these GVs such that each GV has either no FMEM profile or one FMEM profile on at least one of its surfaces. This goal guarantees that the orthogonal intersection of two FMEMs cavities as detailed in the previous chapter can be determined. These goals are achieved by observing that: (i) each FMEM is represented by its extent, (ii) a through hole is represented by a single extent only on the face where its profile was originally placed, (iii) two or more overlapping extents on the same plane are surrounded by a larger extent and only the larger extent has to be considered, and (iv) either one or no extent will exist on each of the six faces of a GV.

Each extent represents an FMEM. If two FMEMs intersect on a common face of a part then the two extents are enclosed by a larger extent and only the larger extent is considered for this algorithm. An FMEM with a through hole cavity is still represented by a single extent only on the face where its profile was initially considered. It is deduced from these facts that if a through hole cavity intersects with two other cavity profiles on opposite faces of the part then the two FMEMs are represented by two extents on the two opposite faces. The GV determination algorithm relies on extents rather than the profiles contained within the extents. The algorithm processes the extents in a way such that a face of each GV contains one or no extent.

The GVs are determined using bands, which are imaginary strips that surround the part. Each band can be visualized as a ribbon wrapped around the part. The common regions formed by two orthogonal bands on each face of the part will represent the faces of the GVs. It is shown how the bands are formed for a given part and how the bands are used to determine the minimum number of GVs.

Figure 75:
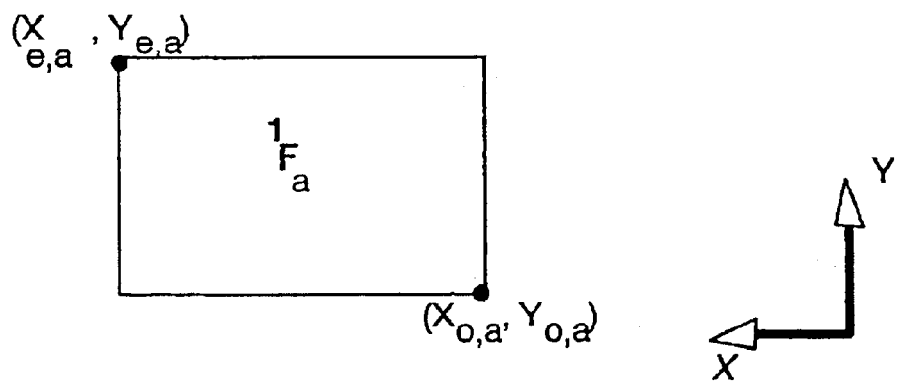
FIG. 75 illustrates extents and their distances shown on an XY face (n=1 or n=6).
Figure 76:
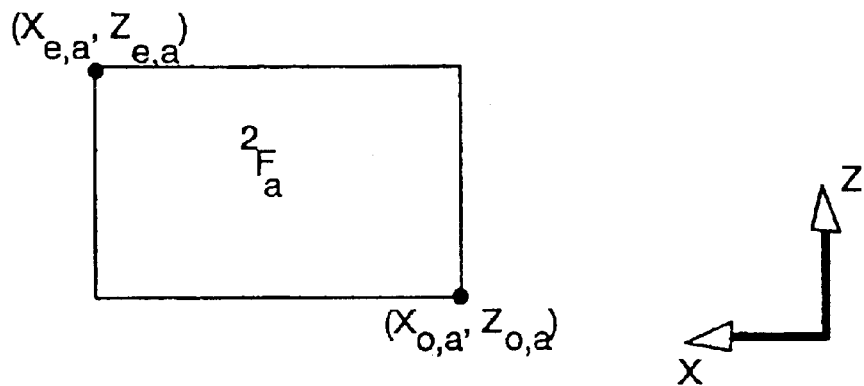
FIG. 76 illustrates extents and their distances shown on a XZ face (n=2 or n=4).
Figure 77:
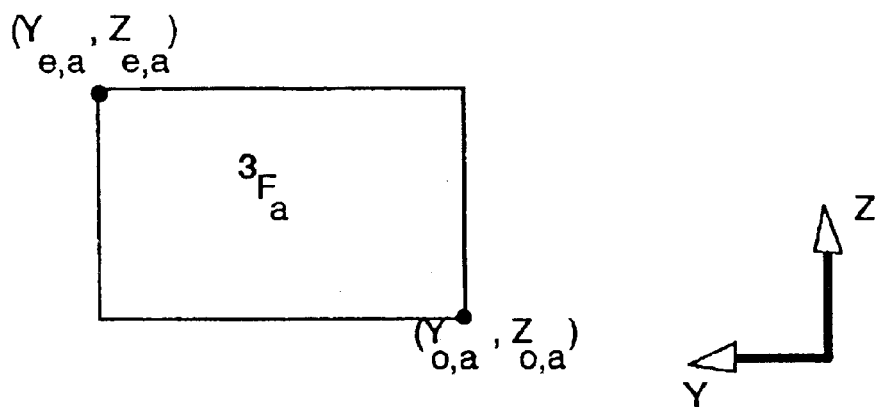
FIG. 77 illustrates extents and their distances shown on a YZ face (n=3 or n=5).

An extent is defined by the coordinates of two of its diagonal corners. Consider an extent $^n F_\alpha$ on face n of the part shown in FIGS. 75 through 77. If n=1 or n=6, then its diagonal corners are given by $(X_{o,\alpha}, Y_{o,\alpha})$ and $(X_{e,\alpha}, Y_{e,\alpha})$ in the global coordinate system. The point $(X_{o,\alpha}, Y_{o,\alpha})$ is closest to the origin of the (X, Y, Z) coordinate system, and the point $(X_{e,\alpha}, Y_{e,\alpha})$ is the farthest. Thus, $X_{o,\alpha}$ and $Y_{o,\alpha}$ are the shortest distances from the Y- and X-axes, respectively, and $X_{e,\alpha}$ and $Y_{e,\alpha}$ are the longest distances from Y- and X-axes, respectively. Similarly, on either face n=2 or n=4

$X_{o,\alpha}$ and $Z_{o,\alpha}$ are the shortest distances and $X_{e,\alpha}$ and $Z_{e,\alpha}$ are the longest distances from Z- and X-axes, respectively; on face n=3 or n=5 $Y_{o,\alpha}$ and $Z_{o,\alpha}$ are the shortest distances, and $Y_{e,\alpha}$ and $Z_{e,\alpha}$ are the longest distances from Z- and Y-axes, respectively. In each of these six cases we use the shorthand notation of calling the shortest distance $\partial_{o,\alpha}$ to represent either $X_{o,\alpha}$, $Y_{o,\alpha}$ or $Z_{o,\alpha}$, and the longest distance $\partial_{e,\alpha}$, to represent either $X_{e,\alpha}$, $Y_{e,\alpha}$ or $Z_{e,\alpha}$.

To determine the greatest volumes requires that the extents on each plane of the part first be sorted in ascending order, starting with the extent with the smallest value of the distance $\partial_{e,\alpha}$ and ending with the extent with the largest value of $\partial_{e,\alpha}$. The distances $\partial_{e,\alpha}$ and $\partial_{o,\alpha}$ for each extent $^n F_\alpha$ are then used to determine the position of the extent relative to other extents on each face n. The extents on each face n are sorted twice, once for each axis. These ordered extents for each face n and for each axis $\partial$ are stored in the sorted lists $L_\partial$, where $\partial$=X, Y and Z, and corresponding to each $\partial$ is the set $\{n_p\}$ where for $\varrho = X$:

$$\{n_X\} = \{1, 2, 4, 6\} \tag{6.1a}$$

for $\varrho = Y$:

$$\{n_Y\} = \{1, 3, 5, 6\} \tag{6.1b}$$

for $\varrho = Z$:

$$\{n_Z\} = \{2, 3, 4, 5\} \tag{6.1c}$$

For the two XY faces, n=1 and 6, the sorted lists $L_\partial$, $\partial$=X and Y, store the extents $^n F_\alpha$ in ascending order according to the distances $X_{e,\alpha}$ and $Y_{e,\alpha}$, respectively; for the two XZ faces, n=2 and 4, the sorted lists $L_\partial$, $\partial$=X and Z, store the extents in ascending order according to the distances $X_{e,\alpha}$ and $Z_{e,\alpha}$, respectively; and for the YZ faces, n=3 and 5, the sorted lists $L_\partial$, $\partial$=Y and Z, store the extents in ascending order according to the distances $Y_{e,\alpha}$ and $Z_{e,\alpha}$, respectively.

Figure 78:
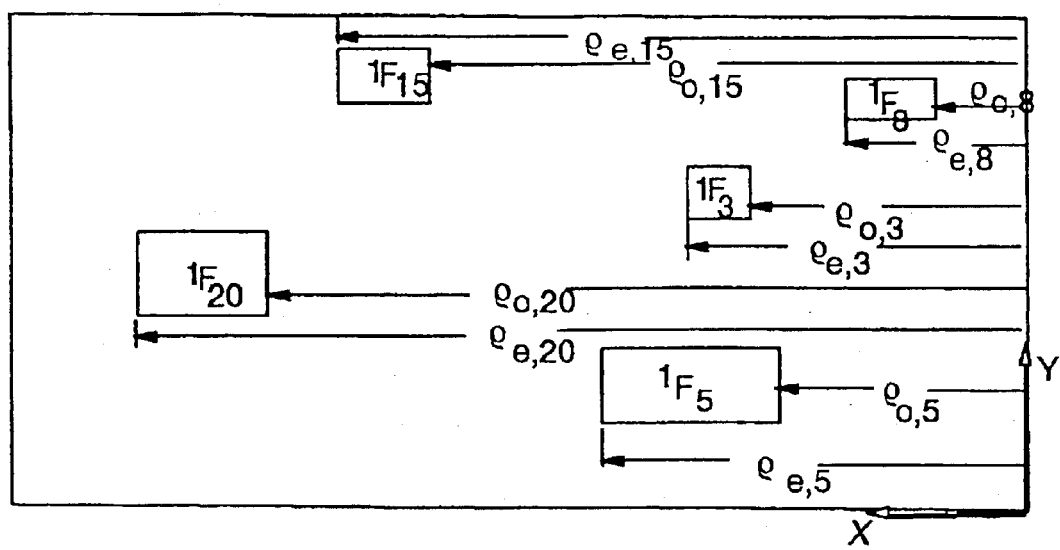
FIG. 78 shows the extents and their distances from the Y-axis on the XY-plan e for sorting in the X-direction.

FIG. 78 shows several extents and their corresponding distances $\partial_{e,\alpha}$ on the XY-plane (n=1). For this case the distances $\partial_{e,\alpha}$ are measured from the Y-axis. The smallest value of $\partial_{e,\alpha}$ is $\partial_{e,8}$ for extent $^1 F_8$, and the largest value is $\partial_{e,20}$ for extent $^1 F_{20}$. In the sorted list $L_X$ for the extents for the X-axis, $^1 F_8$ is the first member and $^1 F_{20}$ is the last member of the list. The position of each extent in the list is specified by a superscript in parenthesis. Thus, for this example, the sorted list $L_X$ is given by, $$L_X = [{}^1 F_8^{(1)}, {}^1 F_3^{(2)}, {}^1 F_5^{(3)}, {}^1 F_{15}^{(4)}, {}^1 F_{20}^{(5)}] \tag{6.2a}$$

Figure 79:
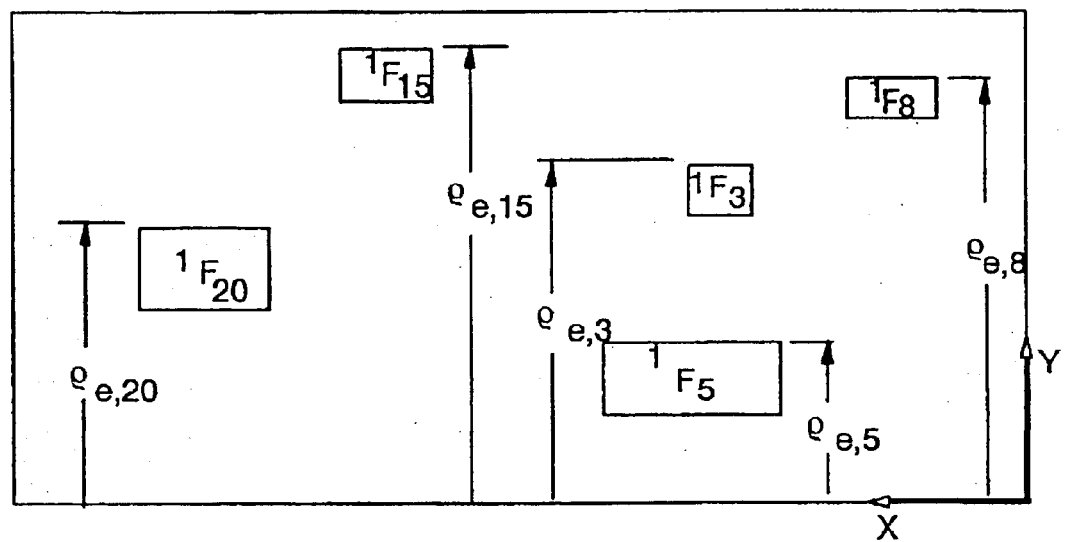
FIG. 79 shows the extents and their distances from the X-axis on the XY-plane for sorting in the Y-direction.

FIG. 79 shows the same extents with their corresponding distances $\partial_{e,\alpha}$, which are now measured from the X-axis. The largest value of $\partial_{e,\alpha}$ is $\partial_{e,15}$, for extent $^1 F_{15}$, and the smallest value is $\partial_{e,5}$ for extent $^1 F_5$. In the sorted list $L_Y$ for the extents measured from the Y-axis, $^1 F_5$ is the first member and $^1 F_{15}$ is the last member of the list. Thus, $$L_Y = [{}^1 F_5^{(1)}, {}^1 F_{20}^{(2)}, {}^1 F_3^{(3)}, {}^1 F_8^{(4)}, {}^1 F_{15}^{(5)}] \tag{6.2b}$$

It is noted that an extent may hold different positions in the arrays $L_X$ and $L_Y$. For example, the extent $^1 F_5$ is the third member of $L_X$, whereas it appears first in $L_Y$.

Figure 80:
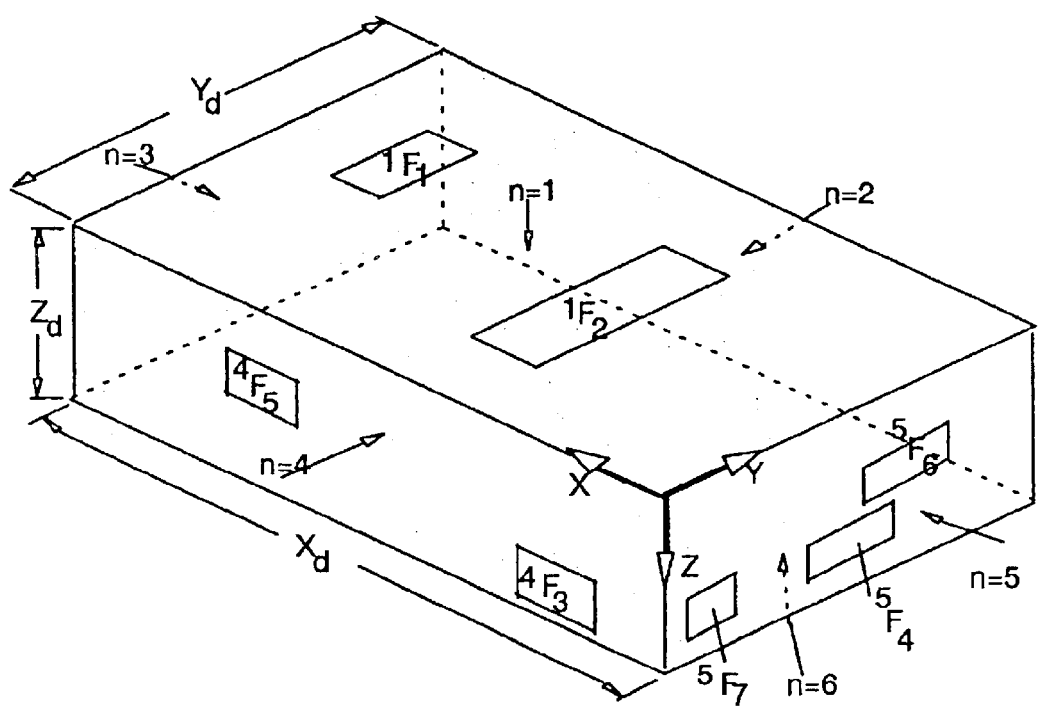
FIG. 80 shows extents on the various surfaces of a part.
Figure 81:
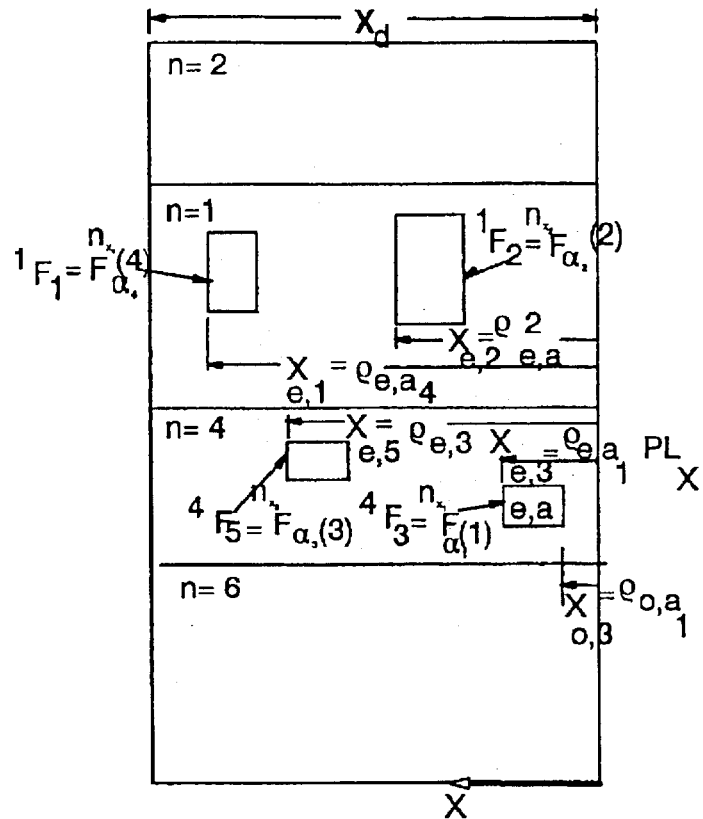
FIG. 81 shows the common planes and the extents for the X array.
Figure 82:
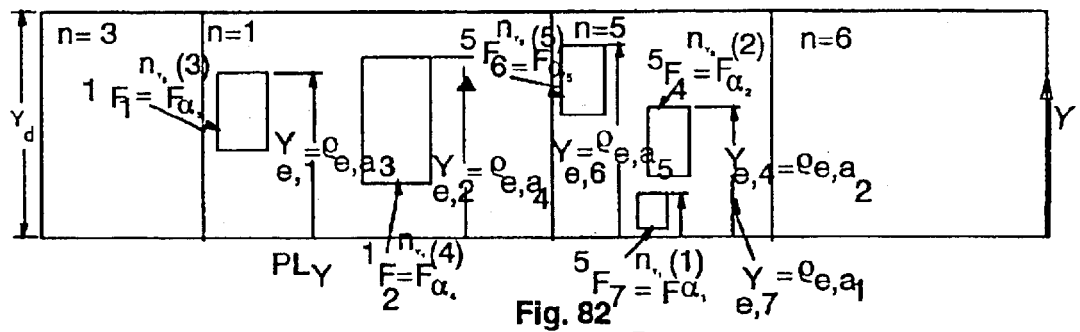
FIG. 82 shows the common planes and the extents for the Y array.
Figure 83:
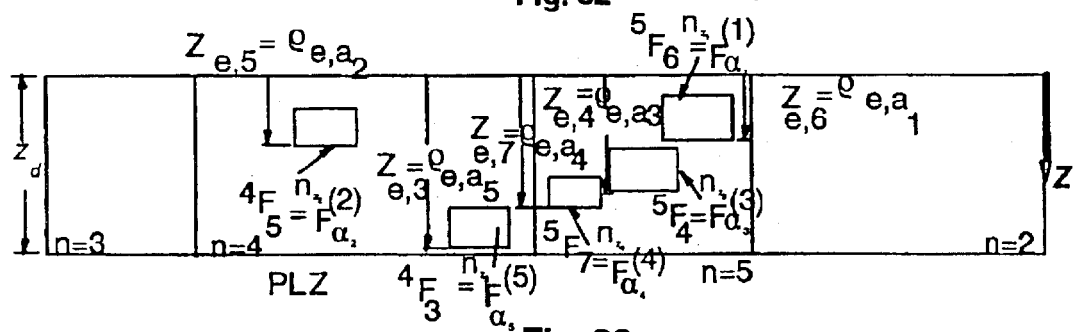
FIG. 83 shows the common planes and the extents for the Z array.

We now extend this notation. Consider a part with extents on the three different faces shown in FIG. 80. The extents $^1 F_1$ and $^1 F_2$ exist on face 1, the extents $^4 F_3$ and $^4 F_5$ on face 4 and the extents $^5 F_4$, $^5 F_6$ and $^5 F_7$ on face 5. Imagine that four sides of the part whose planes are perpendicular to one plane are unfolded onto a common plane. Consider the set $\{n_X\}$, which is unfolded onto a common plane $PL_X$. The array $L_X$ can then be visualized as an array of the sorted extents that lie on this common plane such that the corresponding $\partial_{e,\alpha}$ of each extent appears in ascending order irrespective of the value of n within $\{n_X\}$. Similarly, the sets $\{n_Y\}$ and $\{n_Z\}$ can be unfolded onto the common planes $PL_Y$ and $PL_e$, respectively. FIGS. 81 through 83 show the extents in FIG. 80 unfolded onto these three common planes. FIG. 81 shows $PL_X$, which is obtained by unfolding the set $\{n_X\}$. The sorted list $L_X$ is then an array of extents that lies on the common plane $PL_X$ and is given by $$L_X = [{}^4 F_3^{(1)}, {}^1 F_2^{(2)}, {}^4 F_5^{(3)}, {}^1 F_1^{(4)}] \tag{6.3a}$$
$$= [{}^{n_{x_1}} F_{\alpha_1}^{(1)}, {}^{n_{x_2}} F_{\alpha_2}^{(2)}, {}^{n_{x_3}} F_{\alpha_3}^{(3)}, {}^{n_{x_4}} F_{\alpha_4}^{(4)}]$$

where the superscript $n_{X_k}$ is any member of the set $\{n_X\}$, the subscript $\alpha_k$ assumes the appropriate subscript of the extent whose $X_e$ has a magnitude that places it in its position in $L_X$, and the superscript (k) indicates the extent's location in $L_X$. The maximum value of $\alpha_k$ is $\alpha_N$ where N is the total number of extents on all six sides. The value of k ranges from 1 to $K_\partial$, where 1 is the position of the first extent and $K_\partial$ is the position of the last extent in the array $L_\partial$.

In a similar manner we find from FIGS. 82 and 83 that $$L_Y = [{}^5 F_7^{(1)}, {}^5 F_4^{(2)}, {}^1 F_1^{(3)}, {}^1 F_2^{(4)}, {}^5 F_6^{(5)}] \tag{6.3b}$$
$$= [{}^{n_{x_1}} F_{\alpha_1}^{(1)}, {}^{n_{x_2}} F_{\alpha_2}^{(2)}, {}^{n_{x_3}} F_{\alpha_3}^{(3)}, {}^{n_{x_4}} F_{\alpha_4}^{(4)}, {}^{n_{x_5}} F_{\alpha_5}^{(5)}]$$

$$L_Z = [{}^5 F_6^{(1)}, {}^4 F_5^{(2)}, {}^5 F_4^{(3)}, {}^5 F_7^{(4)}, {}^4 F_3^{(5)}] \tag{6.3c}$$
$$= [{}^{n_{x_1}} F_{\alpha_1}^{(1)}, {}^{n_{x_2}} F_{\alpha_2}^{(2)}, {}^{n_{x_3}} F_{\alpha_3}^{(3)}, {}^{n_{x_4}} F_{\alpha_4}^{(4)}, {}^{n_{x_5}} F_{\alpha_5}^{(5)}]$$

In order to determine the greatest volumes, we introduce the bands $B_{\partial\zeta}$. The bands $B_{\partial\zeta}$ are determined in the following manner from each $L_\partial$ which contains extents $^{neg} F_{\alpha_1}^{(k)}$ for the corresponding set $\{n_\partial\}$. Consider two adjacent extents $^{neg} F_{\alpha_i}^{(i)}$ and $^{neg+1} F_{\alpha_{i+1}}^{(i+1)}$ in array $L_\partial$ ($\alpha_i = \alpha_{i+1}$) The respective positions of $^{neg} F_{\alpha_i}^{(i)}$ and $^{neg+1} F_{\alpha_{i+1}}^{(i+1)}$ on the unfolded plane $PL_\partial$ are such that $\partial_{e,\alpha_i} \leq \partial_{e,\alpha_{i+1}}$. The corresponding values of $\partial_{o,\alpha_k}$ for the extents $^{neg} F_{\alpha_i}^{(i)}$ and $^{neg+1} F_{\alpha_{i+1}}^{(i+1)}$ are $\partial_{o,\alpha_i}$ and $\partial_{o,\alpha_{i+1}}$, respectively. Let $^{neg} F_{\alpha_p}^{(P)}$ be the last extent included in the previous band $B_{\partial\zeta_{-1}}$, for $\zeta > 1$, such that the boundary of the band $B_{\partial\zeta_{-1}}$ is set to $\partial_{e,\alpha_{p+1}}$. With this notation in mind let there be two groups of extents $^{neg} F_{\alpha_1}^{(P)}$ $1 < p < i+1$, and $^{neg} F_{\alpha_1}^{(q)}$ $i+1 < q < K_\partial$. Thus, is $\partial_{e,\alpha_{i+1}}$ is larger than any of the values $\partial r, \alpha_p$ and smaller than or equal to any of the values $\partial r, \alpha_p$. There are two rules that are applied to determine the boundaries of the bands $B_{\partial\zeta}$. These rules are a function of the relative magnitude of $\partial_{e,\alpha_i}$ and $\partial_{e,\alpha_k}$, $k = i+1, \ldots, K_\partial$ and are detailed in Table 6.1. Rule 1 is for the case where $\partial_{e,\alpha_i} < \partial_{o,\alpha_k}$, $i=1, \ldots, K_\partial - 1$, $k=i+1, \ldots, K_\partial$. It sets the final boundary of the band $B_{\partial\zeta}$ to $\partial_{o,\alpha_{i+1}}$ and includes the extent $^{neg+1} F_{\alpha_{p+1}}^{(P+1)}, \ldots, ^{neg} F_{\alpha_i}^{(i)}$ in the band. Rule 2 applies when $\partial_{e,\alpha_i} \geq \partial_{o,\alpha_k}$, $i=1, \ldots, K_\partial - 1$, $k=i+1, \ldots, K_\partial$. It sets the final boundary of the band $B_{\partial\zeta}$ to $\partial_{o,\alpha_{k+1}}$ and includes the and includes the extent $^{neg+1} F_{\alpha_{p+1}}^{(P+1)}, \ldots, ^{neg} F_{\alpha_k}^{(k)}$ in the band $B_{\partial\zeta}$.

Figure 84:
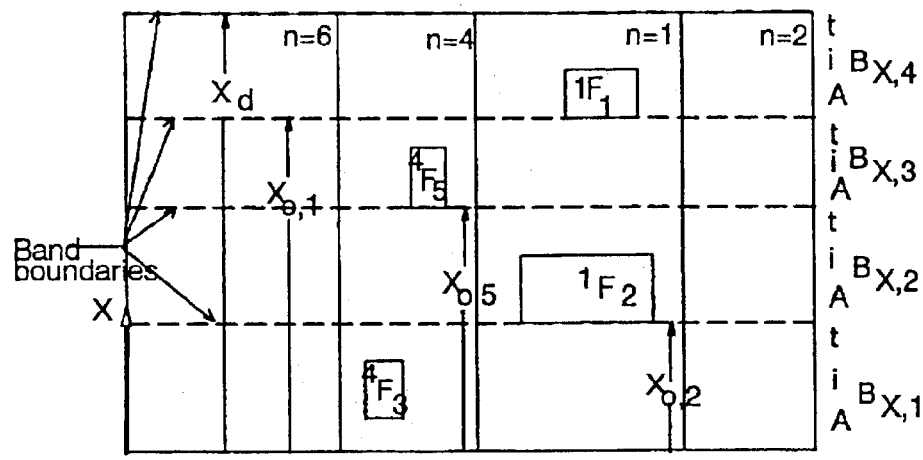
FIG. 84 shows the bands on X common plane.
Figure 85:
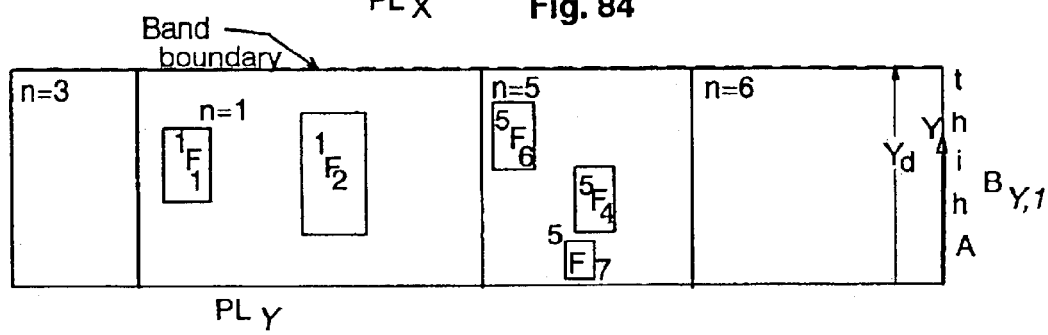
FIG. 85 shows the bands on Y common plane.
Figure 86:
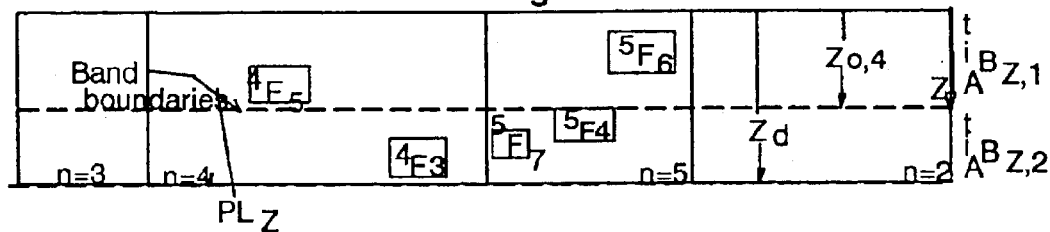
FIG. 86 shows the bands on Z common plane.

We now illustrate these two rules on the part shown in FIGS. 80 through 83. FIGS. 84 through 86 show the three sets of bands $B_{\partial\zeta}$ on the three unfolded surfaces $PL_\partial$, $\partial$=X, Y, Z. FIG. 84 shows four bands $B_{X,1}$ through $B_{X,4}$ on $PL_X$.

These bands were determined in the following manner. From equation 6.3(a) the extent closest to the Y-axis on $PL_X$ is $^4F_3^{(1)}$, with $^1F_2^{(2)}$ being the next closest In this case, the first rule is applicable since $X_{e,3} < X_{o,\alpha_k}$, $\alpha_k = 2$, 5 and 1. Also, since $X_{e,3} \leq X_{o,2} \leq X_{o,\alpha_q}$, $\alpha_q = 5$ and 1, the band $B_{X,1}$ is formed at $X = X_{o,2}$ and the extent $^4F_3^{(1)}$ is included in the band $B_{X,1}$. Therefore, the width of the band $B_{X,1}$ is $X_{o,2}$ Similarly, the other three bands $B_{X,2}$, $B_{X,3}$ and $B_{X,4}$ are formed using Rule 1 in a similar manner. It is found that the widths of these bands are given by $X_{q,5} - X_{o,2}$, $X_{o,1} - X_{o,5}$ and $X_d - X_{o,1}$, respectively. The extent $^1F_2^{(2)}$ is in band $B_{X,2}$, extent $^4F_5^{(3)}$ is in band $B_{X,3}$ and extent $^1F_1^{(4)}$ is in band $B_{X,4}$.

FIG. 85 shows the extents on the common plane $PL_Y$. The corresponding array $L_Y$ for $PL_Y$ is given by equation 6.3(b). Rule 1 is again applied since $Y_{e,7} < Y_{o,\alpha_k}$, $\alpha_k = 4$, 1 and 2. The second part of Rule 1 requires that a band be formed only when $Y_{o,4} > Y_{e,7}$ and $Y_{o,4} \leq Y_{o,\alpha_q}$, $\alpha_q = 1$, 2 and 6. However, in this case the latter is not true since $Y_{o,4} > Y_{o,2}$. Therefore, no band is formed at $Y = Y_{o,4}$. The next extent in $L_Y$ is $^5F_6^{(5)}$, which is the array's last member. Thus, the location of the end of the band $B_{Y,1}$ is $Y = Y_d$, and the width of $B_{Y,1}$, the only band, is $Y_d$.

FIG. 86 shows the common plane $PL_Z$. In this case Rule 2 is applicable, since $Z_{e,6} > Z_{o,5}$. The extents $^5F_6^{(1)}$ and $^4F_5^{(2)}$ are included in the band $B_{Z,1}$. The next extent is $^5F_4^{(3)}$. In this case the width of $B_{Z,1}$ is set to $Z = Z_{o,4}$, since $Z_{e,\alpha_p} \leq Z_{o,4} \leq Z_{o,\alpha_q}$, where $\alpha_p = 6$ and 5 and $\alpha_q = 7$ and 3. The next band $B_{Z,2}$ is also determined using Rule 2, since $Z_{e,4} > Z_{o,7}$. The extents $^5F_4^{(3)}$ and $^5F_7^{(4)}$ are included in band $B_{Z,2}$. The next extent is $^4F_3^{(5)}$. However, no band is formed at $Z = Z_{o,3}$ since $Z_{o,4} < Z_{e,7}$. Instead, the end of the band $B_{Z,2}$ is at $Z = Z_d$. Therefore, the width of band $B_{Z,2}$ is $Z_d - Z_{o,4}$.

Figure 87:
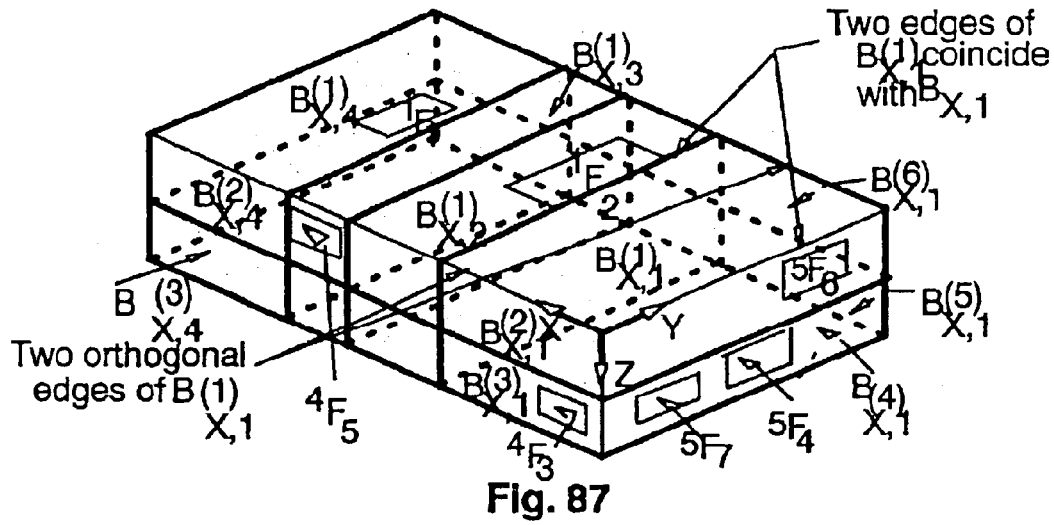
FIG. 87 shows the bands on X common plane create a checker board effect and results in rectangular panels for the X-bands.
Figure 88:
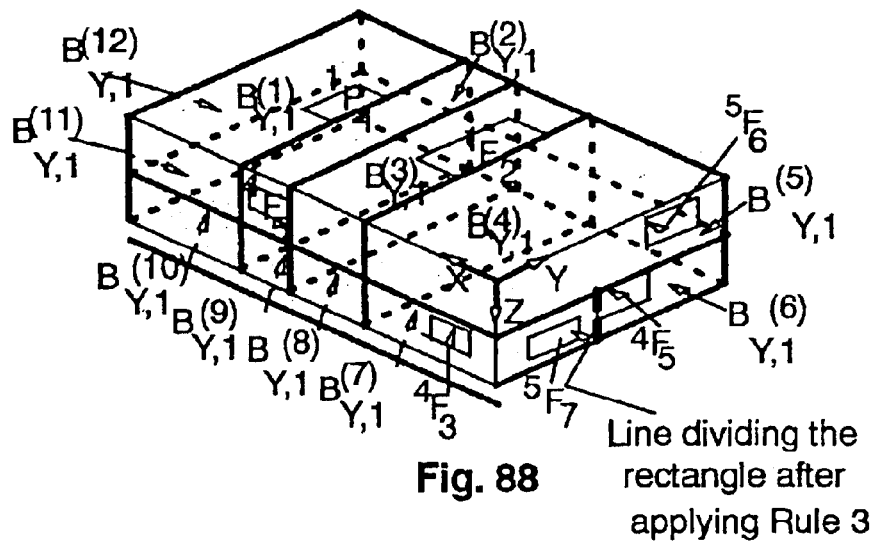
FIG. 88 shows the bands Y common plane create a checker board effect and results in rectangular panels for the Y-bands.
Figure 89:
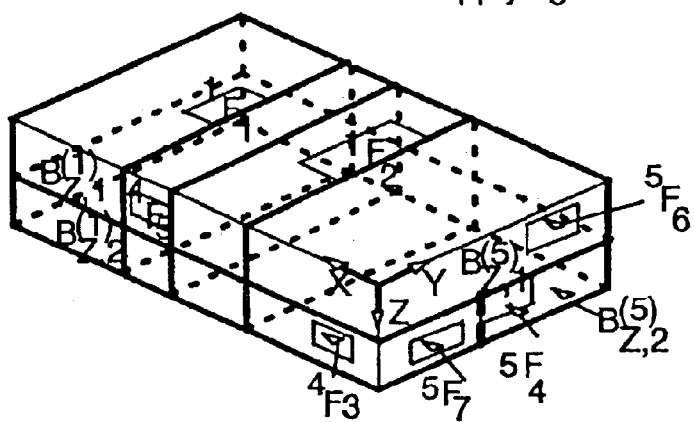
FIG. 89 shows the bands on Z common plane create a checker board effect and results in rectangular panels for the Z-bands.

We now fold back the three common planes of FIGS. 84 through 86 to form the original part FIGS. 87 through 89 show the part with its corresponding bands in the X, Y and Z-directions. Each face now becomes a checker board created when the two sets of bands cross each other orthogonally. Each band $B_{\partial\zeta}$ is then further broken up into a collection of rectangles $B_{\partial\zeta}^{(i)}$ such that $$B_{\rho\zeta} = \sum_{j=1}^{M_{\rho\zeta}} B_{\rho\zeta}^{(j)} \tag{6.4}$$

where, $M_{\partial\zeta}$ is the total number of rectangles comprising $B_{\partial\zeta}$. It is noted that the rectangles $B_{\partial\zeta}^{(i)}$ exist on the same four faces of the set $\{n_\partial\}$ as the corresponding band $B_{\partial\zeta}$. Each band $B_{\partial\zeta}$ is crossed orthogonally by a set of bands on each face n of the set $\{n_\partial\}$. The total number of rectangles $M_{\partial\zeta}$ in $B_{\partial\zeta}$ is then equal to the sum of the number of the orthogonally intersecting bands on each of the four faces in the set $\{n_\partial\}$. Thus, for $\rho = X$:

$$M_{X,\zeta} = 2[N_{B,Y} + N_{B,Z}] \tag{6.5a}$$

for $\rho = Y$:

$$M_{Y,\zeta} = 2[N_{B,X} + N_{B,Z}] \tag{6.5b}$$

for $\rho = Z$:

$$M_{Z,\zeta} = 2[N_{B,X} + N_{B,Y}] \tag{6.5c}$$

where, $N_{B,X}$, $N_{B,Y}$ and $N_{B,Z}$ are the total number of X-, Y- and Z-bands, respectively.

Consider $B_{X,1}$ shown in FIG. 87. The corresponding set $\{n_X\}$ is given by equation 6.1(a) and contains the faces 1, 2, 4 and 6. The band $B_{Y,1}$ is orthogonal to $B_{X,1}$ on faces 1 and 6, whereas $B_{Z,1}$ and $B_{Z,2}$ are the orthogonal bands on faces 2 and 4. From equation (6.5a) $M_{X,1} = 6$. Similarly, it is found that $M_{X,2}$, $M_{X,3}$ and $M_{X,4}$ are also equal to 6. Now consider $B_{Y,1}$, which is intersected by $B_{X,1}$, $B_{X,2}$, $B_{X,3}$ and $B_{X,4}$ on faces 1 and 6 of set $\{n_Y\}$ and by $B_{Z,1}$ and $B_{Z,2}$ on faces 3 and 5. Therefore, $M_{Y,1}$ is 12. From equation (6.5c) it is found that $M_{Z,1} = M_{Z,2} = 10$. FIG. 87 shows the six rectangles in each of the four X-bands $B_{X,\zeta}$, $\zeta = 1, \ldots, 4$. These rectangles are given by $B_{\partial\zeta}^{(j)}$, $j = 1, \ldots, 6$. Similarly, FIG. 88 and FIG. 89 show twelve rectangles in $B_{Y,1}$, and ten rectangles in each of the two Z-bands $B_{Z,1}$ and $B_{Z,2}$, respectively. Each rectangle is defined two ways, one from each of the two orthogonal directions. For example, the rectangle $B_{X,1}^{(1)}$ is the first rectangle of the band $B_{X,1}$, and is the same rectangle as the fourth rectangle $B_{Y,1}^{(4)}$ of the band $B_{Y,1}$.

Two edges of the rectangle $B_{\partial\zeta}^{(i)}$ coincide with the band $B_{\partial\zeta}$, whereas the other two edges are orthogonal to $B_{\partial\zeta}$ and are given by the width of the band that crosses $B_{\partial\zeta}$ orthogonally to form the rectangle $B_{\partial\zeta}^{(i)}$. FIG. 87 shows the two edges of the rectangle $B_{X,1}^{(1)}$ which coincide with the band $B_{X,1}$. The two orthogonal edges of $B_{X,1}^{(i)}$ are also shown, and are determined by the width of $B_{Y,1}$. The distances to the two orthogonal edges are used to determine the number of extents $N_{\partial\zeta}^{(i)}$ in each rectangle $B_{\partial\zeta}^{(i)}$. If the distance to the nearest boundary of an extent $^nF_a$ from the Q-axis is greater than the distance to the nearest orthogonal edge of the rectangle $B_{\partial\zeta}^{(i)}$ and is smaller than the distance to the farthest edge, then the extent $^nF_a$ is inside the rectangle, otherwise it is not. Only those extents that lie within the band $B_{\partial\zeta}$ are used to determine $N_{\partial\zeta}^{(i)}$.

Since the overall objective of the method is to insure that no more than one extent resides in each surface of a GV, an additional rule is now required for each rectangle for which $N_{\partial\zeta}^{(i)} > 1$. The goal is to divide the rectangle into smaller rectangles $B_{\partial\zeta}^{(j,m)}$, $m = 1, \ldots, N_{\partial\zeta}^{(i)}$, such that only one extent remains in each of the smaller rectangles. Rule 3 is detailed in Table 6.1.

Consider again the rectangles shown in FIGS. 87 through 89. The rectangle $B_{Y,1}^{(6)}$ is common with $B_{Z,2}^{(5)}$ and contains the two extents $^5F_7$ and $^5F_4$. Rule 3 is used to split this rectangle into two smaller rectangles such that $^5F_4$ is in one of them and $^5F_7$ in the other. The values of the width of the new rectangles $B_{y,1}^{(6.1)}$ and $B_{Y,1}^{(6.2)}$ are then set to $Y_{o,4}$ and $Y_d - Y_{o,4}$, respectively.

Figure 90:
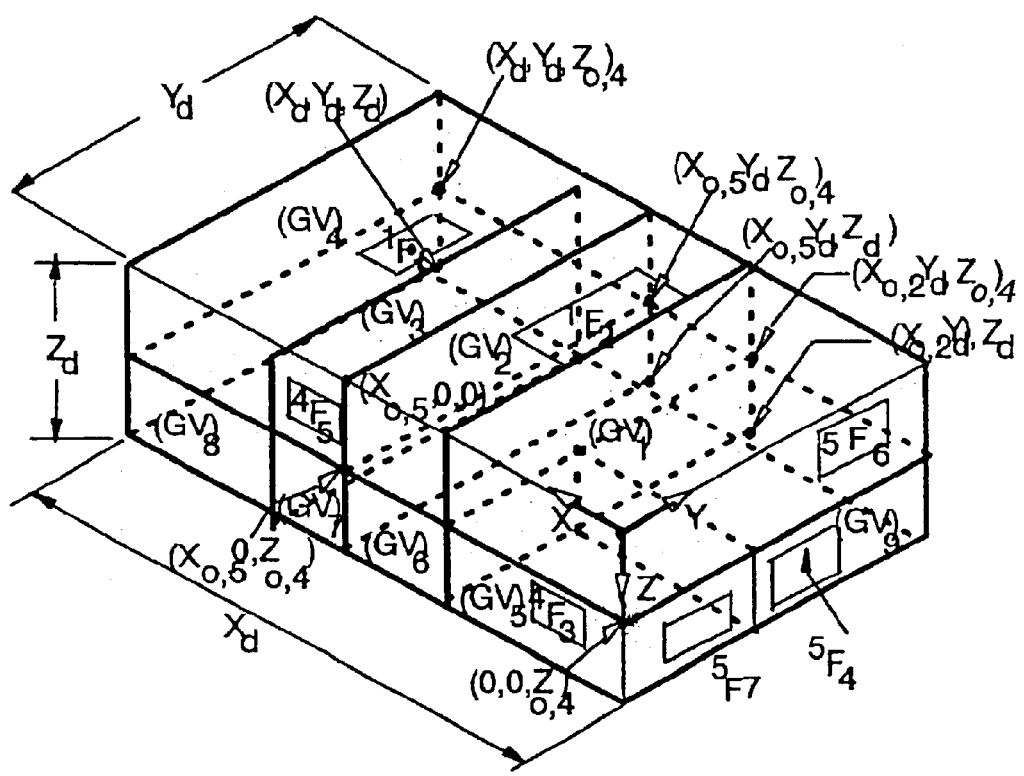
FIG. 90 shows the determination of the greatest volumes.
Figure 91:
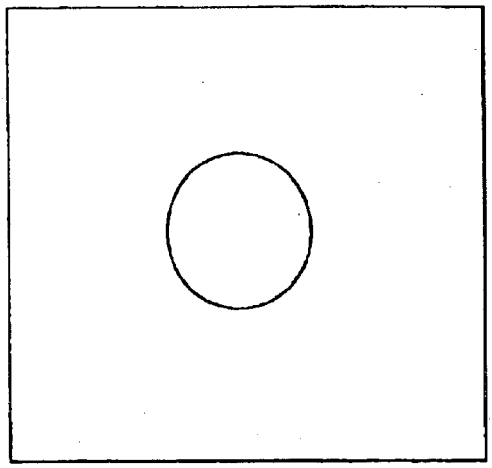
FIG. 91 shows the circular profile that is used to verify the derived methods.
Figure 92:
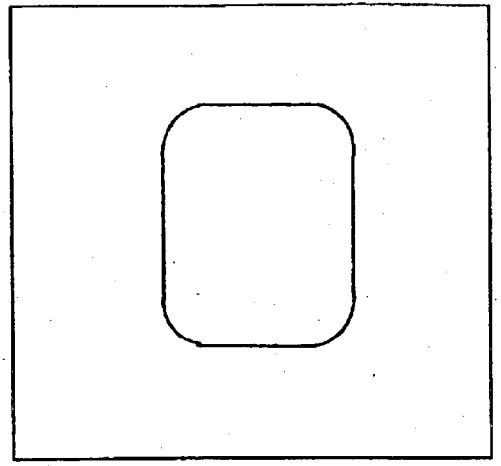
FIG. 92 shows the rectangular profile that is used to verify the derived methods.
Figure 93:
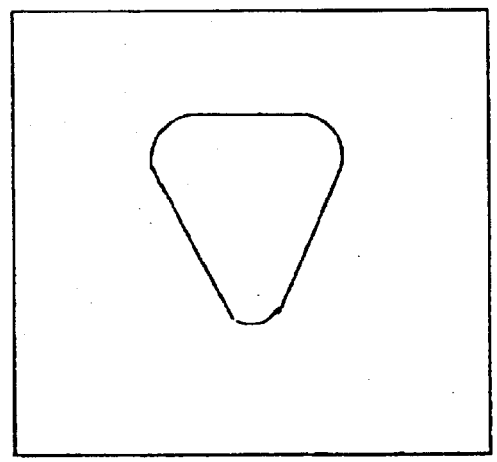
FIG. 93 shows the traingular profile that is used to verify the derived methods.
Figure 94:
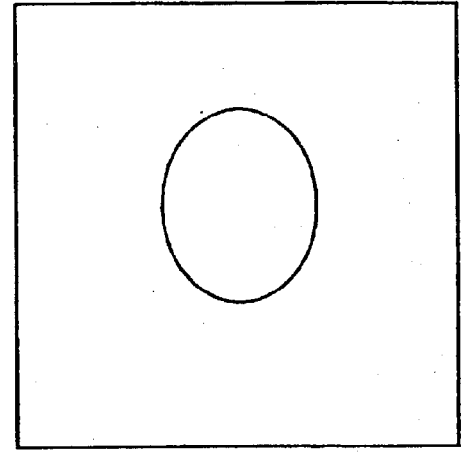
FIG. 94 shows the elliptical profile that is used to verify the derived methods.

Each rectangle $B_{\partial\zeta}^{(i)}$, or each smaller rectangle $B_{\partial\zeta}^{(j,m)}$, represents one face of a GV. The greatest volumes and their dimensions for the example part of FIG. 80 are shown in FIG. 90. The depths of each extent in each greatest volume are further examined to determine whether or not they extend outside the greatest volume and into an adjacent one. For example, a profile on the XZ face will have its Y dimension evaluated to determine whether or not it extends beyond the greatest volume. If it does, that portion of the extent is included as a part of the adjacent greatest volume. In this manner, the total number of GVs, $N_{GV}$, are determined, and each GV contains $N_{E,GV}$ number of extents on its six surfaces. It is possible that some of GVs may not contain any extents. For example, $(GV)_8$ does not contain an extent on any of its surfaces.

The algorithm for determining the GVs is based on the sorting of the extents, determining the boundaries of the bands and the rectangles and finally determining the GVs from the rectangles. The sorting algorithm takes the N extents on, a part and stores these extents in the three lists $L_\partial$, $\partial$=XYZ, such that each $L_\partial$ contains $K_\partial$ extents that lie on faces in the corresponding set $\{n_\partial\}$. The lists $L_\partial$ are then sorted using the distance $\partial_{ea_t}$ as the sorting criterion. The sorting algorithm takes the $K_\partial$ extents from each list $L_\partial$ and identifies the extent $^{n_{eg}}F_{a_g}{}^{(K)}$ that has the maximum value of the distance $\partial_{ea_g}$. It then moves $^{n_{eg}}F_{a_g(K)}$ to the last position $K_\partial$ in the list $L_\partial$. The algorithm then takes the $K_\partial-1$ extents, identifies the extent $^{n_{eg-1}}F_{a_{g-1}}{}^{(K-1)}$ that has the maximum value of $Q_{e,a_t}$, and moves it to the $K_\partial-1$ position. This procedure continues until the entire list is arranged such that $\partial_{ea_{k+1}} > \partial_{ea_k}$, k=1, . . . , $K_\partial-1$.

The arrays $L_\partial$, $\partial$=X, Y, Z, are then used to determine the boundaries of the bands $B_{\partial\zeta}$, $\partial$=X, Y, Z and $\zeta$=1, . . . , $N_{B,\partial}$, where $N_{B,\partial}$ is the maximum number of bands $B_{\partial\zeta}$ in the direction $\partial$. The algorithm takes an extent $^{n_{eg}}F_{a_t}{}^{(i)}$ from the sorted array $L_\partial$ and retrieves the corresponding value of the distance $\partial_{ea_t}$. The value $\partial e,a_i$ is then compared with the value of each of the distances $\partial_{ea_t}$ of the extents $^{n_{tb}}F_{a_t}{}^{(k)}$, k=i+1, . . . , $K_\partial$. The bands are identified in the $\partial$—direction using Rule 1 or Rule 2. Rule 1 is used when $\partial e,a_i < \partial o,a_t$, otherwise Rule 2 applies. This process is repeated until the boundaries of the bands in each direction $\partial$ are determined. The number of extents $N_{E,\zeta}$ in each band $B_{\partial\zeta}$ is determined by incrementing $N_{E,\zeta}$ by one whenever an extent is included in the band $B_{\partial\zeta}$.

The algorithm then determines the rectangles $B_{\partial\zeta}{}^{(j)}$, j=1, . . . , $M_{\partial\zeta}$, where $M_{\partial\zeta}$ is the number of rectangles in $B_{\partial\zeta}$ such that each band $B_{\partial\zeta}$ is given by equation (6.4). This is done by taking a band from the set $B_{\partial\zeta}$, $\partial$=X, Y, Z and $\zeta$=1, . . . , $N_{B,\partial}$ and retrieving a set of corresponding orthogonal bands. The intersection of the edges of the band $B_{\partial\zeta}$ with each of the orthogonal bands then form a rectangle $B_{\partial\zeta}{}^\omega$. In this manner the $M_{\partial\zeta}$ rectangles are determined in each band $B_{\partial\zeta}$ using equation (6.5). The number of extents in each rectangle $B_{\partial\zeta}{}^\omega$, that is, $N_{\partial\zeta}{}^\omega$, is then found by determining whether or not the distance to the neareset boundary of each extent $^{n_{eg}}F_{a_t}{}^{(k)}$ from the $\partial$—axis is greater than the distance to the nearest orthogonal edge and is smaller than the the distance to the farthest orthogonal edge of the rectangle. If it is, then the extent $^{n_{eg}}F_{a_t}{}^{(k)}$ is included in the rectangle $B_{\partial\zeta}{}^\omega$ and $N_{\partial\zeta}{}^\omega$ is incremented by one. If it is not, then the next extent is taken and the same procedure is repeated until all the extents have been examined. All the rectangles for which $N_{\partial\zeta}{}^\omega > 1$ are then split into smaller rectangles $B_{\partial\zeta}{}^{(j,m)}$, m=1, . . . , $N_{\partial\zeta}{}^\omega$. The width of each smaller rectangle is then set so that only one extent is included in each of them.

The greatest volumes $(GV)_l$ are formed using the rectangles $B_{X\zeta}{}^\omega$, j=1, . . . , $M_{X\zeta}$ and the smaller rectangles $B_{X\zeta}{}^{(j,m)}$, m=1, . . . , $N_{X\zeta}{}^\omega$ that exist in the set of X-bands $B_{X\zeta}$, $\zeta$=1, . . . , $N_{B,X}$. The rectangles within the bands $B_{X\zeta}$ determine the X- and Y-dimensions of $GV_l$. The Z-depth of each $GV_l$ is then equal to the width of the Z-band $B_{Z,2}$. The next group of GVs that is stacked under these GVs have the same X- and Y-dimensions, however the Z-depth equals the width of the next Z-band, that is, $B_{Z,2}$. This procedure is continued until all Z-bands $B_{Z,\zeta}$, $\zeta$=1, . . . , $N_{B,Z}$ are considered. In this manner the total number of GVs, $N_{GV}$, are determined.

Once the location and size of each GV is determined, the extents that lie within it are found. An extent $^nF_{a_k}$ that exists either in the pair $B_{X\zeta_1}$ and $B_{Y\zeta_1}$ in the pair $B_{Y\zeta_2}$ and $B_{Z\zeta_3}$ or in the pair $B_{X\zeta_1}$ and $B_{Z\zeta_3}$ is included in $(GV)_l$. This is done by taking an extent $^nF_{a_k}$ from the band $B_{X\zeta_1}$ and determining whether or not $^nF_{a_k}$ exists within $B_{Y\zeta_2}$ or $B_{Z\zeta_3}$. If it does, then it is included in $(GV)_l$, otherwise another extent is taken from $B_{X\zeta_1}$ and evaluated in the same manner. This process is repeated until all the extents in the band $B_{X\zeta_1}$ are considered.

The algorithm then takes another extent $^nF_{a_k}$ from the band $B_{Y\zeta_2}$ and determines whether or not it exists within the band $B_{Z\zeta_3}$. If it does, the extent $^nF_{a_k}$ is included in $(GV)_l$, otherwise the next extent is examined in the same manner. This process continues until all the extents in the band $B_{Y\zeta_2}$, are considered.

It is possible that the extent $^nF_{a_t}$, may also extend into an adjacent GV. All extents that reside within a GV are evaluated to determine whether or not they extend beyond the GV. If the Z-dimension of the extent $^nF_{a_k}$ (for n=1 or 6) is greater than the Z-dimension of the GV, then all of $^nF_{a_t}$ is included in the $GV_l$ and the portion extending beyond it is included in the adjacent GV, say $GV_{t\partial}$, $\partial$=X for n=3 or 5; $\partial$=Y for n=2 or 4; and $\partial$=Z for n=1 or 6. In a similar manner extent $^nF_{a_t}$ is again evaluated to determine whether or not it is entirely contained within $GV_{t\partial}$ and the process is continued. Similarly, the extents on faces n=2 or 4 and faces n=3 or 5 are evaluated to determine whether or not they extend beyond the GV in Y-dimension and X-dimension, respectively.

The previous discussion provided the details of representing the machinable profiles by FMEMs. The methods for determining the intersections of the profiles of the FMEMs on a common surface and intersections of the profile shells from two orthogonal surfaces were also described. The results of the program are presented below.

Consider the four profiles shown in FIGS. 91 through 94. These four profiles and their combination will be used as shown in FIG. 95 to illustrate that the intersection routines developed above. The first column of FIG. 95 shows the four profiles that are used to generate the combinations A through D. The four profiles are a circle, a rectangle with rounded corners, a triangle with rounded corners and an ellipse. Thus, combination A for a circle describes the intersection of two identical circular holes, whereas combination C for a rectangle illustrates the intersection of three identical rectangular pockets. Combination D includes the intersection of a thin rectangle that divides the island formed by the four intersecting profiles shown in combination C. The last row of FIG. 95 includes only two combinations: combination C, which uses one profile from each of the previous four profiles, and combination D, which includes the additional intersection of a narrow rectangle with the island formed by the intersecting profiles and with the boundary resulting from the four intersecting profiles.

Each of the eighteen combinations shown in FIG. 95 are used to verify the method employed to determine the multi-profile intersection on a common surface. These various combinations were given as input to the program. The results are shown in FIGS. 96 through 114.

Figure 96:
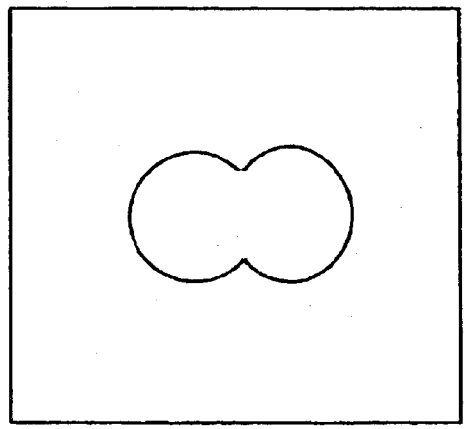
FIG. 96 shows the profiles resultaing from intersections of two circles.

FIGS. 96 through 99 show the results of the intersections of circles for the combinations A, B, C, and D, respectively. The intersection of two circles is given by combination $C_5$ above. In this case, the two intersection points segment the circles into four circular arcs. One of the arc segments of each circle is removed such that the resultant profile is given by equation (4.19), which is shown in FIG. 96.

Figure 97:
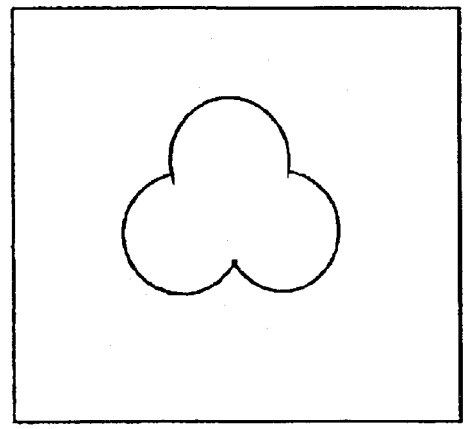
FIG. 97 shows the profiles resultaing from intersections of three circles.
Figure 100:
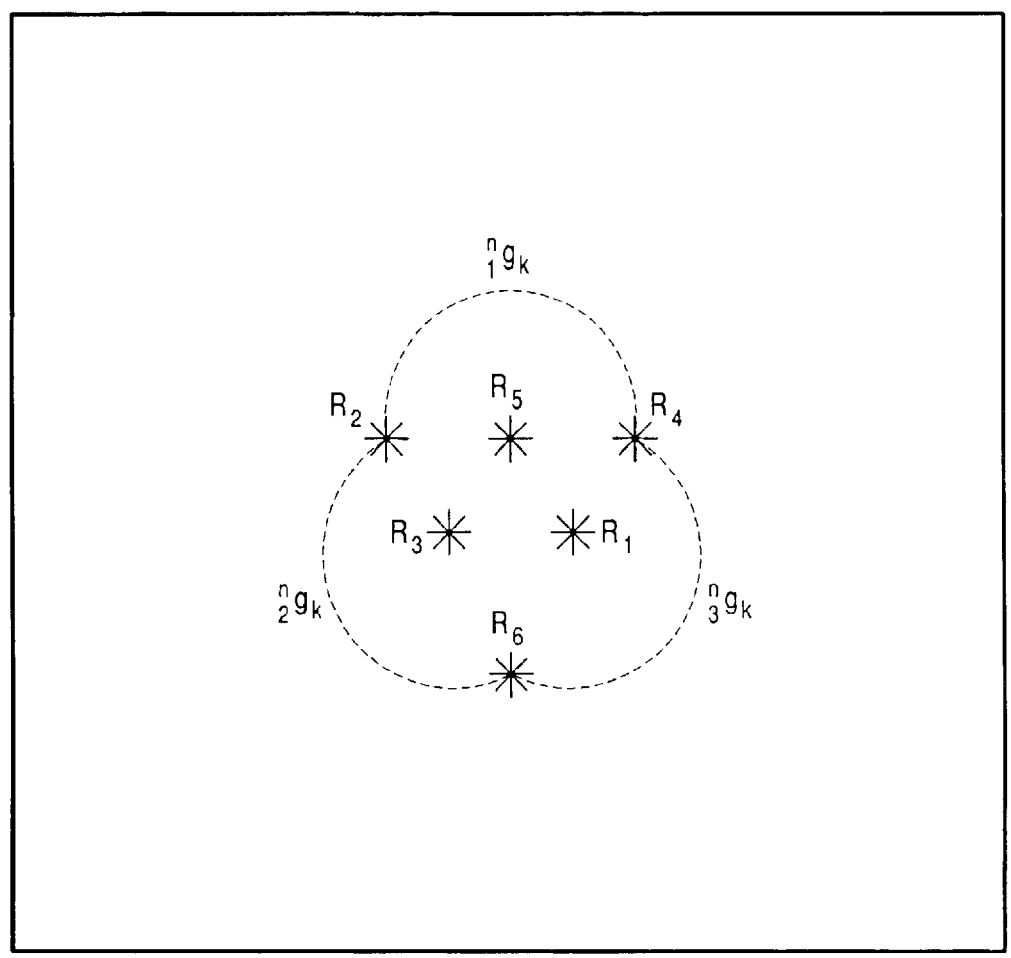
FIG. 100 shows three circles intersecting in such a way that six intersection points are created.

FIG. 97 shows the intersection of three circles that results in six intersection points. This intersection results in the intersection points $R_1$ through $R_6$ of the intersecting circles $_1{}^ng_k$, $_2{}^ng_k$, and $_3g_k$ and is shown in FIG. 100. The intersection of circle $_1{}^ng_k$ with $_2{}^ng_k$ yields points $R_1$ and $R_2$. The pairs of the points $R_3$ and $R_4$, and $R_5$ and $R_6$ result from the intersections of $_1{}^ng_k$ with $_3{}^ng_k$ and $_2{}^ng_k$ with $_3{}^ng_k$, respectively. The intersection points $R_1$, $R_2$, $R_3$ and $R4$ lie on the circle $_1{}^ng_k$. The points $R_1$, $R_2$, $R_5$ and $R_6$, and $R_3$, $R_4$, $R_5$ and $R_6$ lie on the circles $_2{}^ng_k$ and $_2{}^ng_k$, respectively. Each of the three circles is partitioned into five segments. However, only the even segments of each circle remains after the intersection, since the starting points of each circle is within the cavity. The algorithm for segmenting the circular arcs was discussed above. The governing equation for the resultant profile is given by equation 4.13(b), and is shown in FIG. 97.

Figure 98:
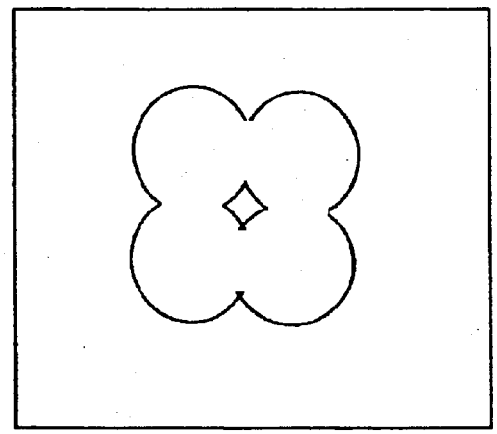
FIG. 98 shows the profiles resultaing from intersections of four circles.
Figure 99:
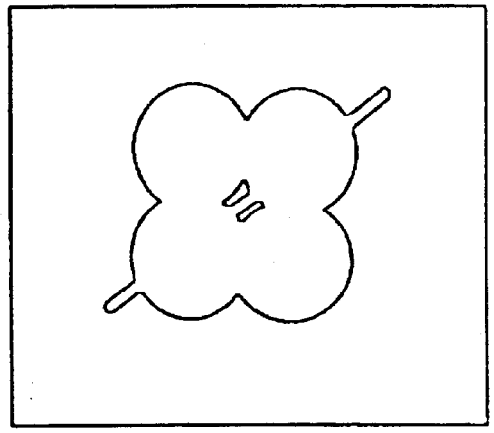
FIG. 99 shows the profiles resultaing from intersections of four circles and a narrow slot.

FIG. 98 shows the intersection of four circles. In this case, an island results within the resultant cavity. The island is comprised of the segments of the circles that remain after the intersection. This combination verifies the procedure presented above. FIG. 99 shows an example of the intersection of a narrow slot with the island resulting from the intersection of these four circles and with the boundary resulting from the four intersecting circles.

Figure 101:
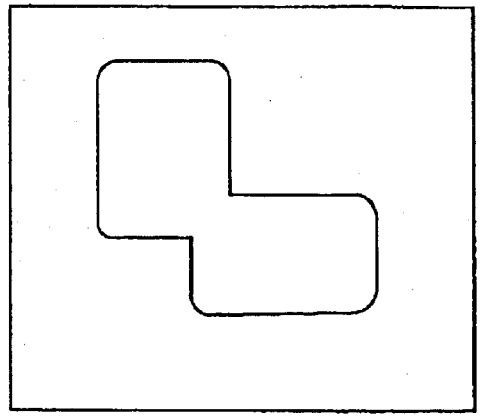
FIG. 101 shows the profiles resultaing from intersections of two rectangles.
Figure 102:
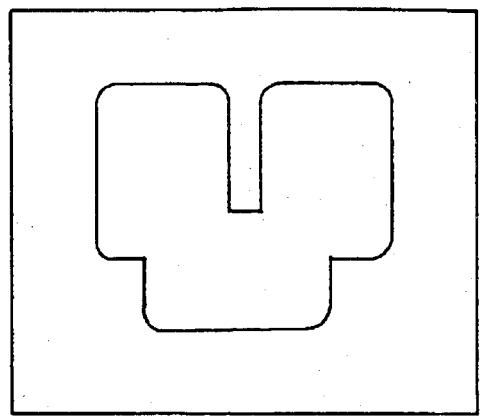
FIG. 102 shows the profiles resultaing from intersections of three rectangles.
Figure 103:
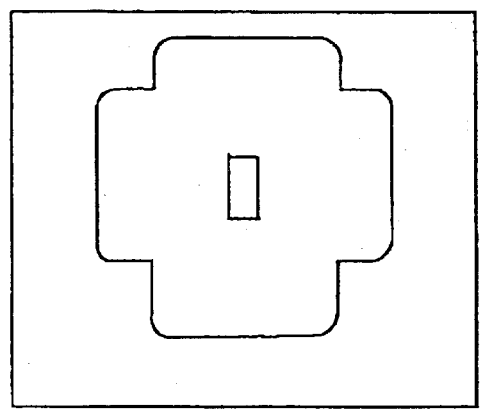
FIG. 103 shows the profiles resultaing from intersections of four rectangles.
Figure 104:
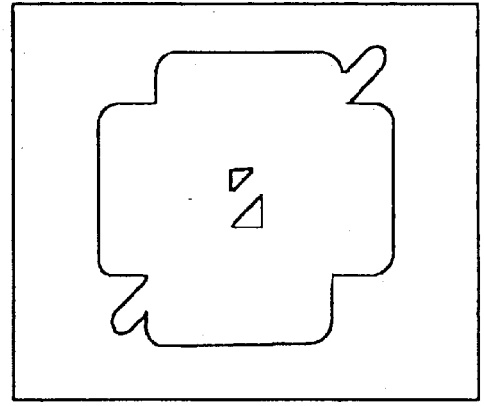
FIG. 104 shows the profiles resultaing from intersections of four rectangles and an arrow slot.
Figure 105:
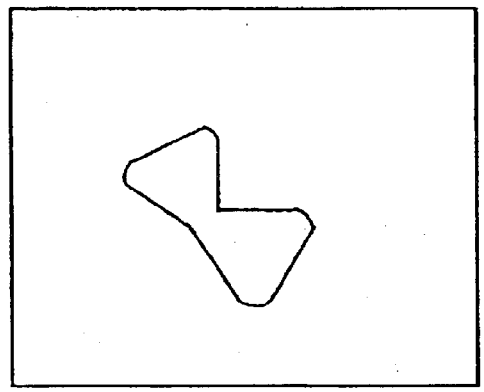
FIG. 105 shows the profiles resultaing from intersections of two triangles.

FIGS. 101 through 104 show the results of the intersections of the combinations A to D for the rectangular profile, respectively. The intersection of two rectangles shown in FIG. 101 has been denoted combination $C_1$ and was discussed above. The procedure used to determine whether or not the end points are inside the intersecting profile was also discussed above. It is shown in FIG. 101 that one of the four fillet curves of each rectangle has both end points within the intersecting profile; therefore, the two curves are removed. FIG. 102 shows the resultant profile due to the intersections of three rectangles. As shown in FIG. 103, an island is created in the middle of a cavity when these four rectangular pockets intersect. FIG. 104 shows a narrow slot passing through the island.

Figure 106:
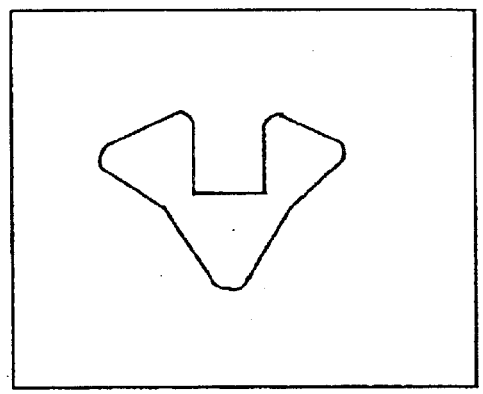
FIG. 106 shows the profiles resultaing from intersections of three triangles.
Figure 107:
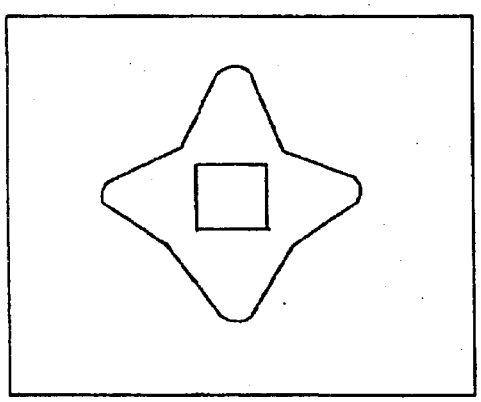
FIG. 107 shows the profiles resultaing from intersections of four triangles.
Figure 108:
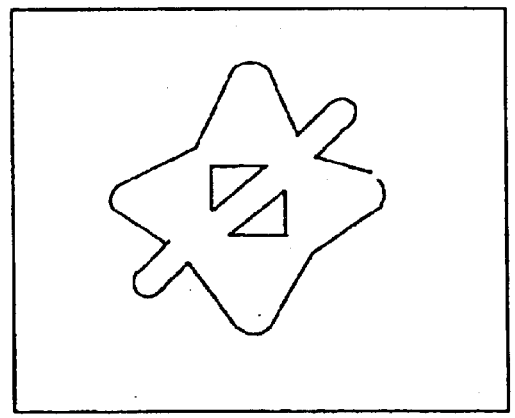
FIG. 108 shows the profiles resultaing from intersections of four triangles and a narrow slot.

FIGS. 105 through 108 show the results of the intersections of the combinations A to D for a triangular profile; respectively. The intersections of two triangles has been denoted the combinations $C_1$ and $C_2$ above. FIG. 106 shows the resultant profile from the intersections of three triangles. When four triangular pockets intersect, an island is created in the middle of the cavity. This is shown in FIG. 107. FIG. 108 shows a narrow slot passing through the island and intersecting with the boundary formed by the four triangles.

Figure 109:
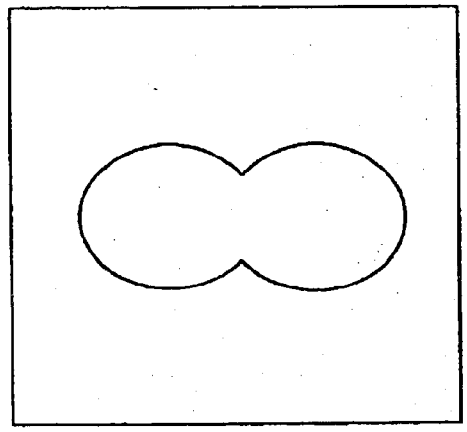
FIG. 109 shows the profiles resultaing from intersections of two ellipses.
Figure 110:
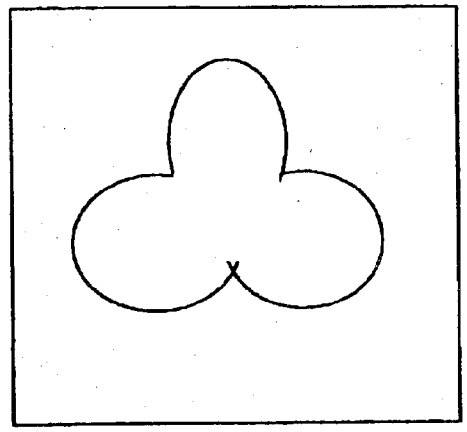
FIG. 110 shows the profiles resultaing from intersections of three ellipses.
Figure 111:
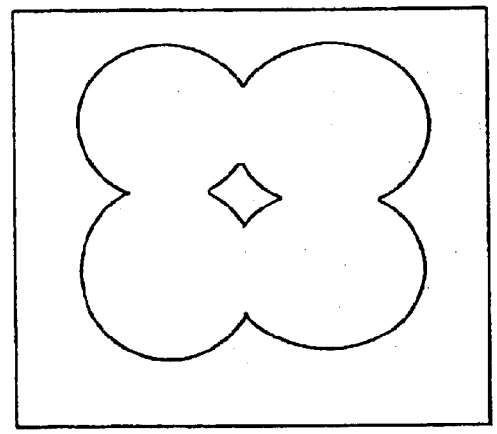
FIG. 111 shows the profiles resultaing from intersections of four ellipses.
Figure 112:
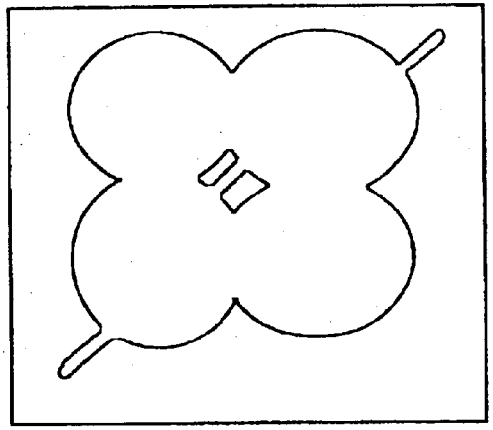
FIG. 112 shows the profiles resultaing from intersections of four ellipses and a narrow slot.

FIGS. 109 through 112 show the results of the intersections of the combinations A to D for elliptical profiles. The intersection of two ellipses is shown in FIG. 109, and has been denoted the combination $C_6$ above. FIG. 110 shows the resultant profile from the intersections of three ellipses. When four elliptical pockets intersect as indicated, an island is created in the middle of the cavity. This is shown in FIG. 111. FIG. 112 shows a narrow slot passing through the island and intersecting with the boundary formed by the four ellipses.

Figure 113:
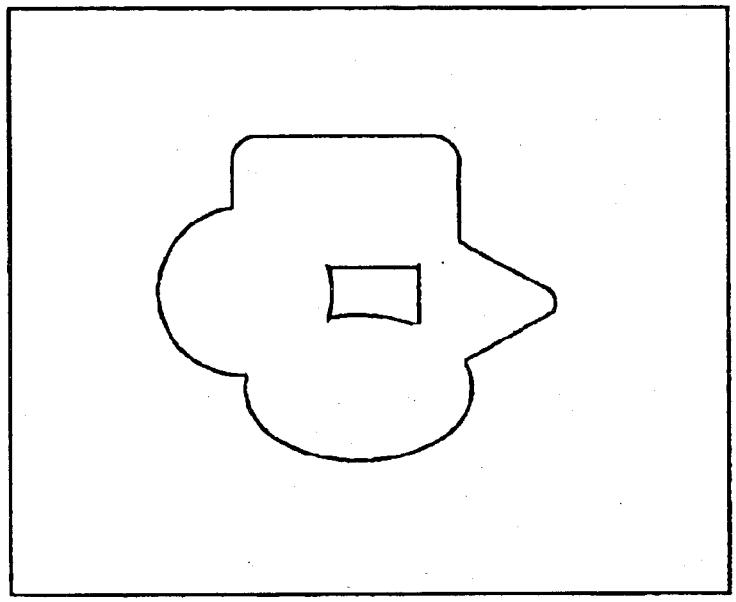
FIG. 113 shows the profiles resultaing from various intersections of four different profiles.
Figure 114:
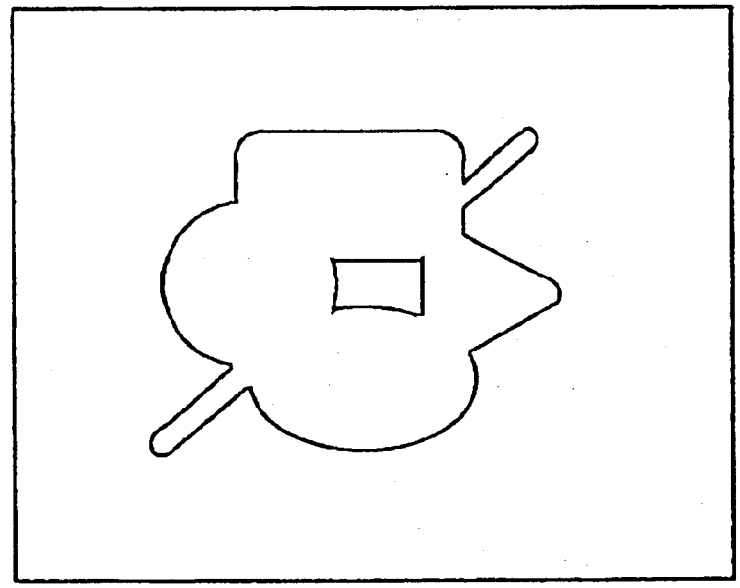
FIG. 114 shows the profiles resultaing from various intersections of four different profiles and a narrow slot.

The result of the intersection of the mixed profile is shown in FIG. 113. The set of intersecting profiles illustrates the combinations noted $C_1$ through $C_4$. The $C_1$, $C_2$ and $C_3$ combinations are for an edge of the rectangle intersecting an edge of the triangle, a fillet curve of another rectangle, and a circle, respectively. The combination $C_4$ is created by the intersection of a circle with an ellipse. FIG. 113 also shows that an island is created in the middle of a cavity when these four profiles intersect. A narrow slot is then is then created on the island as shown in FIG. 114.

Figure 115:
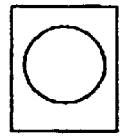
FIG. 115 is a table of combinations of similar shell profiles used for the verification of two orthogonally intersecting FMEMs.
Figure 115:
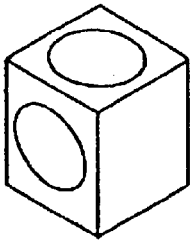
Figure 115:
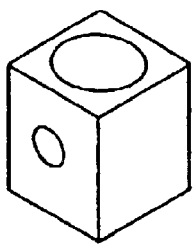
Figure 115:
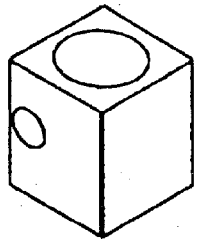
Figure 115:
Figure 115:
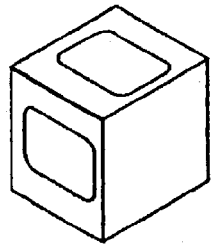
Figure 115:
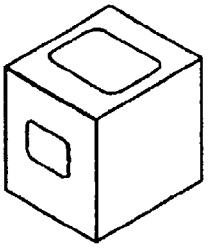
Figure 115:
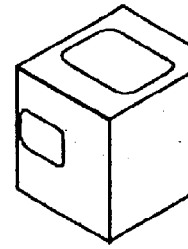
Figure 115:
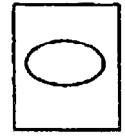
Figure 115:
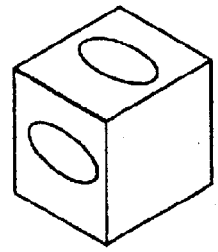
Figure 115:
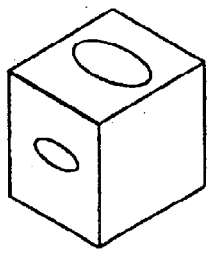
Figure 115:
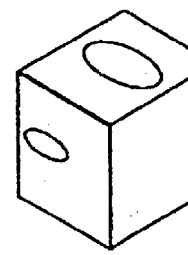

FIG. 115 shows the combinations of orthogonally intersecting similar profile shells that are used to verify the orthogonal intersection of FMEMs. Each of the three combinations contains the same type of profile, one place on each of two orthogonal faces. Pair A consists of two identical orthogonally intersecting identical profile shells such that their axes intersect. Pair B contains two orthogonally intersecting profile shells of the same shape such that their axes intersect, but the two profiles are of different sizes. Pair C contains two orthogonally intersecting profile shells of the same shape but different sizes such that their axes do not intersect. The first column of FIG. 115 defines the three profiles used. The next three columns of FIG. 115 define the pairs A to C for a circular, rectangular, and elliptical profile shells, respectively.

Figure 116:
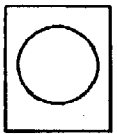
FIG. 116 is a table of combinations of dissimilar shell profiles used for the verification of two orthogonally intersecting FMEMs.

FIG. 116 shows the combinations of orthogonally intersecting dissimilar profile shells that are used to verify further the orthogonal intersection of FMEMs. Pair A consists of two orthogonally intersecting dissimilar profile shells of "same" size and such that their axes intersect. Pair B consists of two orthogonally intersecting dissimilar profile shells of different size and such that their axes intersect. Pair C consists of two orthogonally intersecting dissimilar profile shells of different sizes and such that their axes do not intersect. The first column of FIG. 116 defines one of the two profiles for the pairs A to C. The next three columns of FIG. 116 define the combinations A to C for circular, rectangular, and elliptical shells orthogonally intersecting rectangular, elliptical and circular profile shells, respectively.

Each of the eighteen combinations shown in FIGS. 115 and 116 is used to verify the orthogonal profile intersection algorithm. These combinations were given as input to the program. The results are shown in FIGS. 117 through 134.

Figure 117:
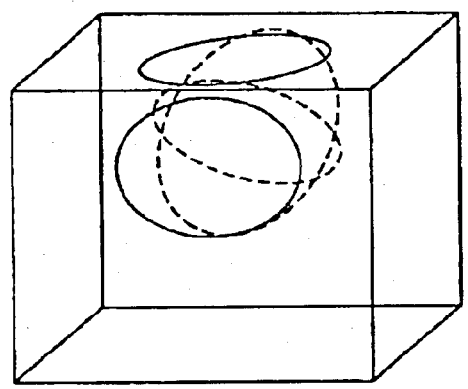
FIG. 117 shows the profiles resulting from ortogonally intersecting same size circular profile shells.
Figure 118:
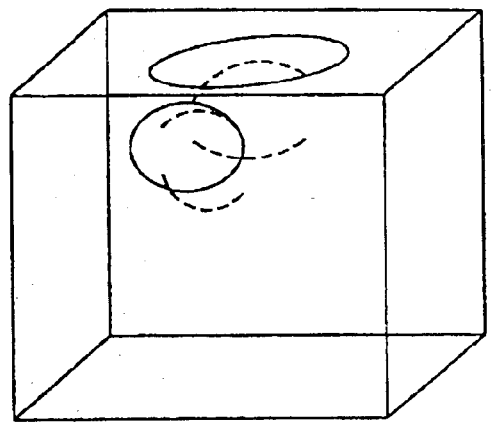
FIG. 118 shows the profiles resulting from ortogonally intersecting not same size circular profile shells.
Figure 119:
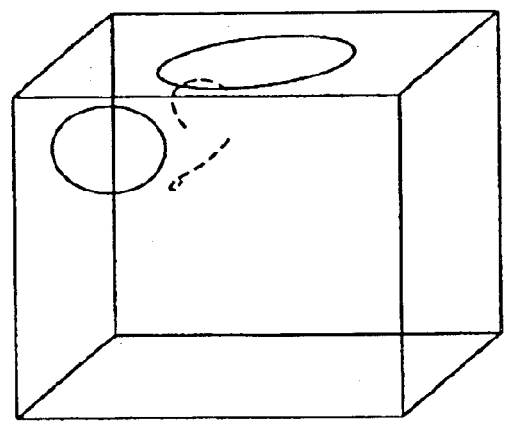
FIG. 119 shows the profiles resulting from ortogonally intersecting not same size circular profile shells when the axes of two profile shells are not in the same plane.

FIGS. 117 through 119 show the spatial curves resulting from the orthogonal intersections of circular profile shells for combinations A, B, and C, respectively. The orthogonal intersection of two circular shells is denoted combination $\Pi_5$. The intersection curve is a pair of orthogonal planar ellipses given by equation (5.34). Each of the two cylindrical surfaces are then dissected into the patches given by equation (5.23). FIG. 118 shows the spatial intersection curve of circular shells for combination B. FIG. 119 shows the intersection of the circular profile shells for combination C.

Figure 120:
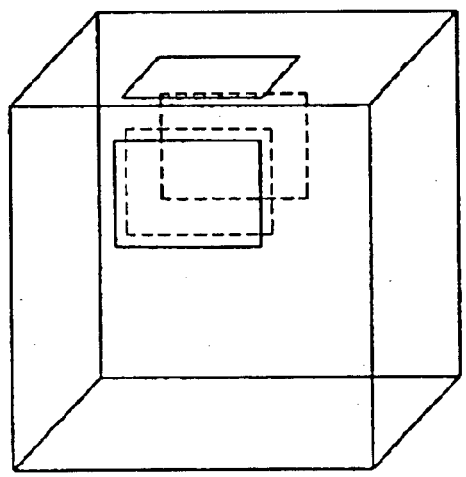
Figure 121:
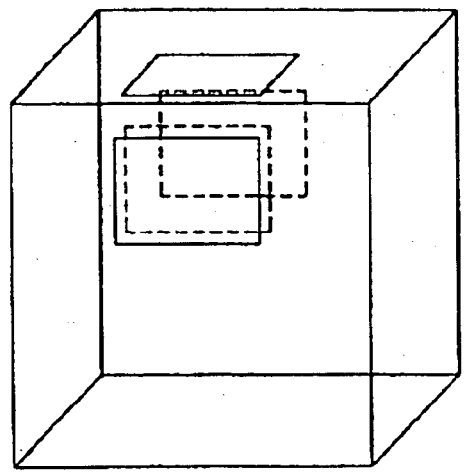
Figure 122:
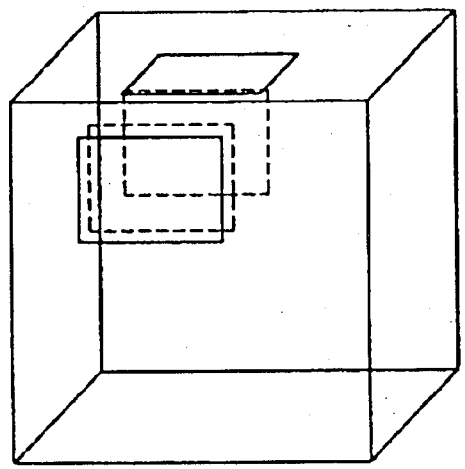

FIGS. 120 through 122 show the results of the orthogonal intersections of the rectangular profile shells for combination A, B, and C, respectively. The orthogonal intersection of two rectangular shells is denoted combination $\Pi_1$. Each plane of the rectangular shell intersects with one of the four planes of another rectangular shell and yields in a straight line given by equation (5.5). FIG. 121 shows the results of the intersection of two rectangular profile shells for combination B. The smaller rectangular shell fully intersects two of the four planes of the larger shell. The intersection curves, in this case, match the profile of the smaller rectangular profile shell. Each of the intersected planes of the two shells is dissected into patches given by equation (5.12). FIG. 122 shows the spatial curve resulting from the orthogonal intersection of the rectangular shells for combination C. Out of the three intersecting planes of the smaller rectangular shell, only one plane fully intersects the other, and the other intersect partially.

Figure 123:
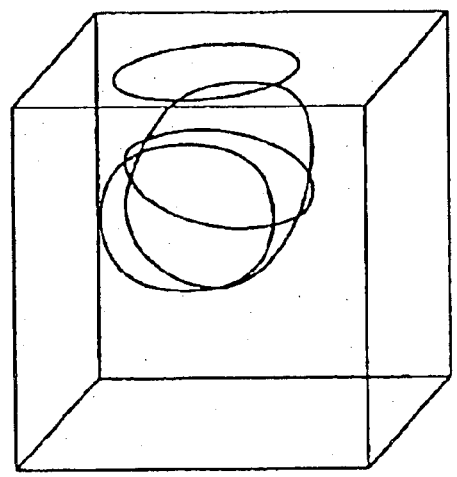
Figure 124:
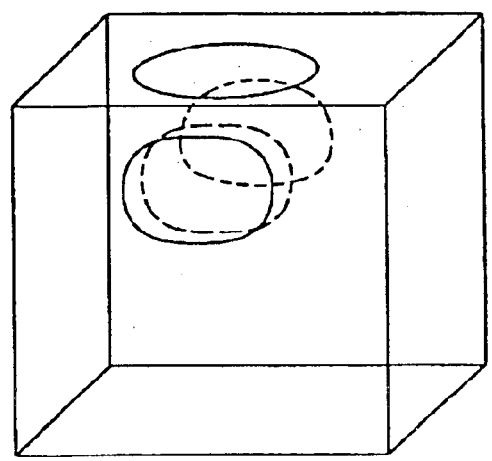
Figure 125:
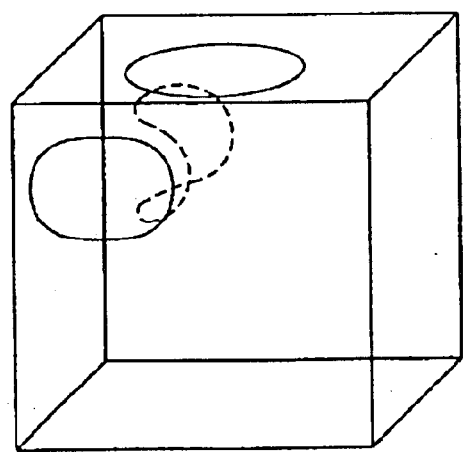

FIGS. 123 through 125 show the results of the orthogonal intersections of the elliptical profile shells for combinations A, B, and C, respectively. The orthogonal intersection of two elliptical shells is denoted combination $\Pi_6$. The spatial intersection curve is a fourth order curve given by equation (5.37). FIG. 124 shows the results of the orthogonal intersection of the elliptical profile shells for combination B. The smaller elliptical shell fully intersects the larger shell. The spatial intersection curve in this case is also given by equation (5.37). Each of the intersected elliptical shell surfaces is then dissected into patches given by equation (5.18). FIG. 125 shows the spatial curve resulting from the intersection of the elliptical profile shells for combination C.

Figure 126:
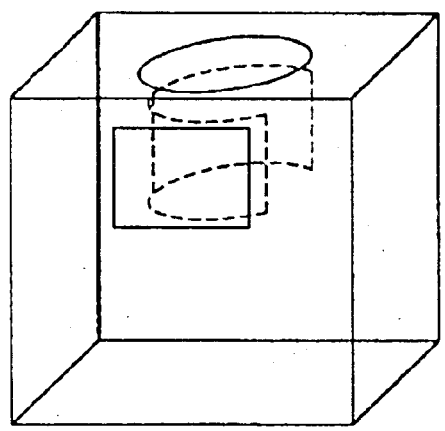
Figure 127:
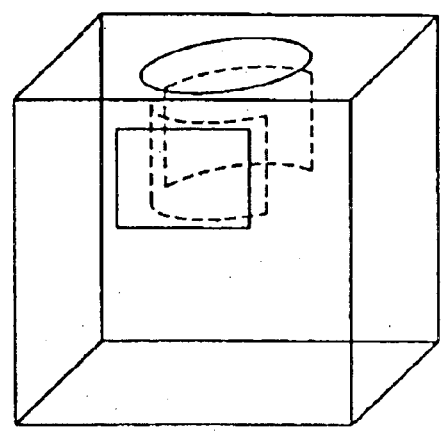
Figure 128:
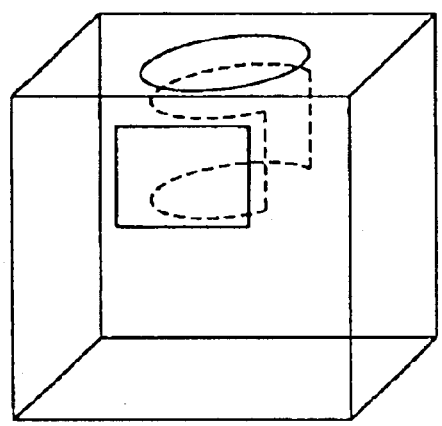

FIGS. 126 through 128 show the spatial curves resulting from the orthogonal intersections of the circular profile shells and the rectangular profile shells for combinations A, B, and C, respectively. The orthogonal intersection of a circular shell with a plane is denoted combination $\Pi_3$. The spatial intersection curves consist of a collection of circular arcs given by equation (5.15). Each of the dissected cylindrical surfaces is then given by equation (5.23). FIG. 127 shows the intersection of circular profile shells and rectangular profile shells for combination B. FIG. 128 shows the spatial curves resulting from the intersection of the circular profile shells and the rectangular profile shells for combination C.

Figure 129:
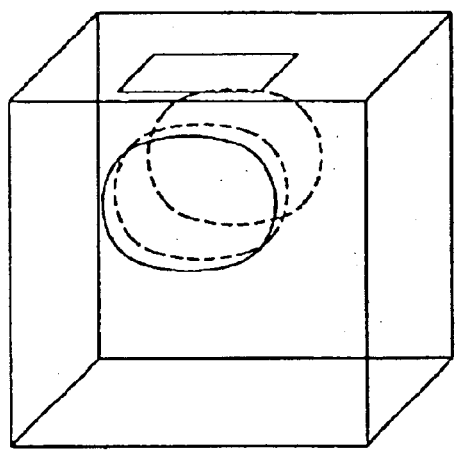
Figure 130:
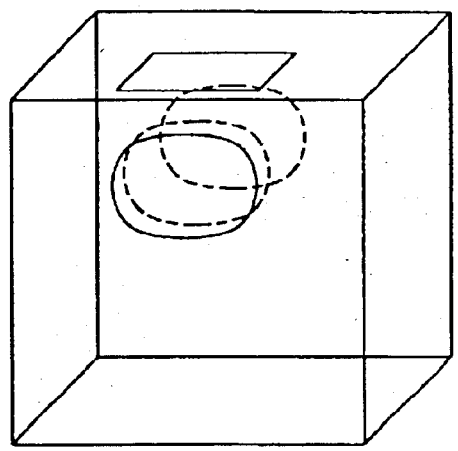
Figure 131:
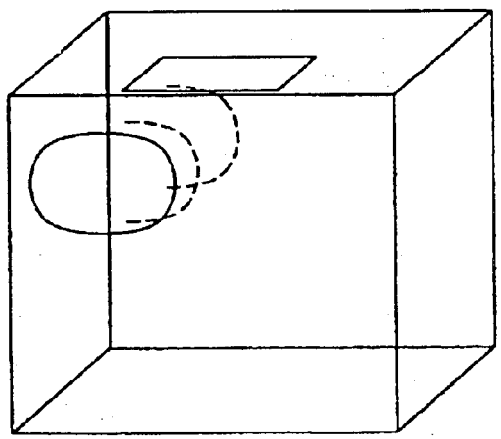

FIGS. 129 through 131 show the spatial curves resulting from the intersection of the rectangular profile shells and the elliptical profile shells for combinations A, B, and C, respectively. The orthogonal intersection of a plane with an elliptical shell is denoted combination $\Pi_2$. The intersection curves consist of a collection of quadratic curves given by equation (5.15). Each of the dissected elliptical surfaces is then given by equation (5.18). FIG. 130 shows spatial curve resulting from the intersection of rectangular profile shell and the elliptical profile shells for combination B. FIG. 131 shows the spatial curve resulting from the intersection of the rectangular profile shell and the elliptical profile shells for combination C.

FIGS. 132 through 134 show the spatial curves resulting from the intersections of the elliptical profile shells and the circular profile shells for combinations A, B, and C, respectively. The orthogonal intersection of a cylindrical profile shell with an elliptical profile shell is denoted combination $\Pi_4$. The resulting spatial intersection curve is given by equation (5.28). FIG. 133 shows the spatial curve resulting from the intersection of the elliptical profile shell and the circular profile shells for combination B. FIG. 134 shows the spatial curve resulting from the intersection of the elliptical profile shell and the circular profile shells for combination C.

FIG. 135 shows the profiles of FMEMs of various shapes that are used to verify the overall algorithm. These FMEMs are applied on four of the six faces of a stock block. Three rectangular pocket FMEMs, a left pocket, a right pocket and a horizontal pocket are applied on the front face of the block. The horizontal procket intersects the left pocket, but has a shallower depth. The left side face and the back face of the block has applied a triangular profile FMEM and an elliptical profile FMEM, respectively. The top face of the block has three FMEMs, a narrow rectangular pocket, a gasket-shaped cavity profile with an island within it, and a circular profile on the island of the gasket-shaped cavity.

Each of the seven profiles shown in FIG. 135 was given as input to the program. The resultanat geometry determined by the program is shown in FIG. 136. The 2D algorithm determined the intersections of the left and the horizontal pockets on the front face of the part and the intersections of hole and the island on the top face. The triangular profile of the left side face orthogonally intersects the narrow pocket and the gasket-shaped cavity profiles of the top face. The triangular profile also intersects the left and horizontal pockets of the front face. The right pocket of the front face orthogonally intersects the gasket cavity and its island, and then intersects the circular profile on the island. The elliptical profile of the back face orthogonally intersects the three cylindrical surfaces of the gasket-shaped cavity. The program determines the intersections on the common planes and on orthogonal planes of the part. The final part geometry is then displayed as shown in FIG. 136.

The successful development of a parametric solid modeler for milling represents a radical departure from the methods currently being used to generate a part model for milling, or any other manufacturing process. The essence of the modeler's philosphy is "what you machine results in what you get" (WYMRIWYG). The modeler permits the user to very easily generate over 125 unique cavity profiles and about the same number of island profiles, all of which are represented by the same data structure. These profiles include circular and elliptical holes, slots, triangular and rectangular pockets, "gaskets", and many others. In addition, each of cavity can contain an island, whose profile and orientation are independent of the cavity's profile.

The results presented above clearly illustrated the system's powerful algorithms that can determine the profiles resulting from the intersections of two or more profiles on a common surface and the spatial curves resulting from the complete or partial intersections of two orthogonal profile shells. It was also shown above that very complicated 3-D shapes can be easily created with this new system, and that the order in which the FMEMs are applied is not a factor. This latter feature is a significant improvement over the capabilities of existing solid modelers.

This work resulted in a modeling tool that employs a primitive for solid modeling, called a fundamental manufacturing entity for milling (FMEM), that is based on the machining process itself, mimics real world milling operations and allows the immediate display of the part's shape, stores the results of each machining operation in a single, uniform and compact database, allows the application of the machining operations in any order, stores machining information as an integral part of the geometric model, thereby creating a straight forward link between CAD and CAM, can easily create complex 2D profiles and the intersection of any combination of them on any of the six faces of the part, cavity and island profiles can be created independent of one another, employs a sophisticated algorithm that automatically divides the part into greatest volumes (GVs) and then determines the intersections of the profiles of the FMEMs on its orthogonal faces irrespective of the order in which they were generated, provides a means by which an inexhaustive list of FMEMs can be created, stored and used repeatedly on any surface of any part, determines the intersections of complex shell profiles on any two orthogonal faces, saves the information about the volume of the material removed after each milling operation rather than the material remaining, which should make the generation of process plans straight forward, can transfer the resulting geometric shape to automatic mesh generation routines used by finite element programs, since the exact surface representation is available.

can use the FMEM and GV data structure to determine interference of an assembly of machined parts,

I claim:

1. A graphic display system to provide a graphically represented solid modeler for simulating a material removal process in a computer aided machining environment, said graphic display system comprising:

at least one fundamental manufacturing entity representing a three dimensional object;

profile generation means for generating at least one machine profile representing a volume of material to be removed from said at least one fundamental manufacturing entity, said machine profile is selectively defined on at least one surface of said at least one fundamental manufacturing entity by an ordered combination of edges defined by a non-uniform rational B-spline curve represented as a first circular arc connected in series at a first point to a non-uniform rational B-spline curve represented as a first quadric curve connected in series at a second point to a non-uniform rational B-spline curve represented as a second circular arc connected in series at a third point to a straight edge connected in series at a fourth point to a non-uniform rational B-spline curve represented as a third circular arc, wherein parameters defining a shape and the existence of each of said first circular arc, said first quadric curve said second circular arc, said straight edge, and said third circular arc of said ordered combination are manipulated to define said machine profile.

2. The graphic display system of claim 1, further comprising storage means for storing matrix information representing said machine profile as an integral part of said solid modeler.

3. The graphic display system of claim 1, further comprising validation means for validating said ordered combination against a predetermined set of rules describing acceptable combinations of edges and surfaces representing valid machine profiles suitable for real world machining operations such that said volume to be removed from said at least one fundamental manufacturing entity is substantially identical to a real life volume produced by an actual machining operation.

4. The graphic display system of claim 1, wherein said machine profile defines at least one cavity such that the total perimeter of said at least one cavity is defined by said ordered combination of edges and surfaces.

5. The graphic display system of claim 1, wherein said machine profile defines at least one island such that the total perimeter of said at least one island is defined by said ordered combination of edges and surfaces.

6. The graphic display system of claim 1, wherein said ordered combination is defined by a plurality of straight edges, each of said plurality of straight edges being connected by a curve to thereby define a closed perimeter, and wherein a grouping of arcs are disposed on an intermediate portion of each of said plurality of straight edge to define a rounded hump on each of said straight edges, and wherein said ordered combination is manipulated to define said machine profile.

7. The graphic display system of claim 4, wherein one of an inner and outer profile of a cavity formed on any surface of said fundamental manufacturing entity is defined by an ordering of four edges, twelve circular arcs, and four quadric curves, and the vertices that bound each of the curves.

8. The graphic display system of claim 1, further comprising storage means for electronically storing complete analytical specifications of said machine profile.

9. The graphic display system of claim 1, further comprising conversion means for converting individual machining operations generated by said profile generation means into an NC code to perform an actual machining operation.

10. The graphic display system of claim 1, further comprising intersection calculation means for determining a numerical representation of an intersection of at least two machine profiles.

11. The graphic display system of claim 10, wherein said intersection calculation means determines said numerical representation automatically.

12. The graphic display system of claim 10, wherein said machine profiles intersect each other on a common surface.

13. The graphic display system of claim 10, wherein said machine profiles intersect each other on two orthogonal surfaces.

14. The graphic display system of claim 10, further comprising consolidation means for consolidating a plurality of intersecting machine profiles into a single machine profile.

15. The graphic display system of claim 1, wherein each of said at least one fundamental manufacturing entity represents a separate machining operation.

16. A graphic input method for creating a three-dimensional solid modeler for simulating a modeling process in a computer aided modeling environment, said method comprising the steps of:

choosing a stock element representing a bounded object from which said solid modeler will be defined, said stock element comprising stock surfaces and stock edges defining at least one dimension of said stock element;

defining at least one model profile representing a region to be modeled, said at least one model profile comprising profile surfaces and profile edges defining dimensions of said model profile, wherein a standardized model profile defines said profile edges, and wherein said profile surfaces defines a volume of said at least one machine profile;

locating said at least one model profile on said stock element, wherein said standardized model profile is defined by an ordered combination defined by a non-uniform rational B-spline curve represented as a first circular arc connected in series at a first point to a non-uniform rational B-spline curve represented as a first quadric curve connected in series at a second point to a non-uniform rational B-spline curve represented as a second circular arc connected in series at a third point to a straight edge connected in series at a fourth point to a non-uniform rational B-spline curve represented as a third circular arc, wherein parameters defining a shape and the existence of each of said first circular arc, said first quadric curve, said second circular arc, said straight edge, and said third circular arc of said ordered combination are manipulated to define said machine profile.

17. The method according to claim 16, further comprising a step of validating said at least one model profile against a predetermined set of rules defining acceptable model profiles.

18. The method according to claim 16, wherein said standardized model profile is defined by an ordered combination of edges, a quadric curves, and intermediate arcs which are selectively chosen to define said profile edges of said model profile.

19. The method according to claim 16, wherein said standardized model profile is defined by an ordered combination of a plurality of straight edges, each of said plurality of straight edges being connected by a curve to thereby define a closed perimeter, and wherein a grouping of arcs are disposed on an intermediate portion of each of said plurality of straight edge to define a rounded hump on each of said straight edges, and wherein said ordered combination is manipulated to define said model profile.

20. The method according to claim 16, wherein said model profile defines a part to be created by injection molding.

21. The method according to claim 16, wherein said model profile defines a part to be created by powder metallurgy.

22. The method according to claim 16, wherein said model profile defines a part to be created by casting.

23. The method according to claim 16, wherein said model profile defines a part to be created by milling.

24. The method according to claim 16, further comprising the step of storing matrix information describing said model profile, said matrix information being stored as an integral part of said solid modeler.

25. The method according to claim 16, further comprising the step of converting individual machining operations defined by said model profile into an NC code.

* * * * *